US011393323B2

(12) United States Patent
Daoura et al.

(10) Patent No.: US 11,393,323 B2
(45) Date of Patent: Jul. 19, 2022

(54) XCB TRACKING DEVICES, METHODS AND SYSTEMS

(71) Applicant: PB Inc., Issaquah, WA (US)

(72) Inventors: Daniel J. Daoura, Renton, WA (US); Johnathan Charles Miller, Renton, WA (US); Robert Aldridge, Renton, WA (US); Kal K Lambert, Hammond, OR (US); Nicholas R Pearson-Franks, Issaquah, WA (US)

(73) Assignee: PB, Inc, Issaquah, WA (US)

( * ) Notice: Subject to any disclaimer, the term of this patent is extended or adjusted under 35 U.S.C. 154(b) by 0 days.

(21) Appl. No.: 17/570,333

(22) Filed: Jan. 6, 2022

(65) Prior Publication Data

US 2022/0165146 A1 May 26, 2022

Related U.S. Application Data

(63) Continuation of application No. 17/163,403, filed on Jan. 30, 2021, which is a continuation-in-part of
(Continued)

(51) Int. Cl.
*G08B 21/24* (2006.01)
*H04W 4/80* (2018.01)
(Continued)

(52) U.S. Cl.
CPC ............ *G08B 21/24* (2013.01); *H04W 4/025* (2013.01); *H04W 4/029* (2018.02); *H04W 4/80* (2018.02); *H04W 8/005* (2013.01)

(58) Field of Classification Search
CPC ..... H04W 12/06; H04W 4/021; H04W 4/025; H04W 4/029; H04W 4/80;
(Continued)

(56) References Cited

U.S. PATENT DOCUMENTS 6,564,330 B1 5/2003 Martinez
8,032,107 B1 10/2011 Beard
(Continued)

*Primary Examiner* — Joseph Arevalo
(74) *Attorney, Agent, or Firm* — Fogg & Powers, LLC

(57) ABSTRACT

XCB poly-radio devices as finders, locators, scanners, sensors, and radio topology reporters. XCB devices function as "smart objects" in the TOT and combine transceivers operating in the telecommunications and the low power ISM radio spectra, with default power management setting overrides under local control of a Bluetooth modem controller, and can be authenticated on a variety of local area networks (LANs), personal area networks (PANs), piconets and cellular networks. Finding, wayfinding, tracking, scanning, locating and proximity monitoring are provided as complementary services supplemented by a Bluetooth Proximity Locator Services Toolkit, Cellular Remote Locator Services Toolkit, and a "Tap-2-Connect" community-supported on-demand lost-and-found data or voice link between an owner and a passerby who finds a lost smart object. Data logging of local sensor data and ISM radio "pollution" enables provisioning of the physical web, piconets, tracking minders, geofences, living maps, walk-up computing, and "proximity avoidance tools" such as useful for wireless security and viral prophylaxis. The devices may include a user interface for communications and natural language voice control and optionally also include a display and video interface, with or without camera.

22 Claims, 44 Drawing Sheets

Related U.S. Application Data application No. 16/950,666, filed on Nov. 17, 2020, and a continuation-in-part of application No. 16/575,315, filed on Sep. 18, 2019, now Pat. No. 11,184,858.

(60) Provisional application No. 63/114,464, filed on Nov. 16, 2020, provisional application No. 63/108,843, filed on Nov. 2, 2020, provisional application No. 62/968,105, filed on Jan. 30, 2020, provisional application No. 62/936,588, filed on Nov. 17, 2019, provisional application No. 62/882,465, filed on Aug. 2, 2019, provisional application No. 62/732,945, filed on Sep. 18, 2018.

(51) Int. Cl.
*H04W 4/029* (2018.01)
*H04W 4/02* (2018.01)
*H04W 8/00* (2009.01)

(58) Field of Classification Search
CPC ......... H04W 52/0216; H04W 52/0229; H04W 52/0245; H04W 52/0254; H04W 52/028; H04W 76/28; H04W 8/005; H04W 84/042; H04W 84/12; H04W 84/18; G08B 21/24
USPC ........................................ 370/254, 441, 246
See application file for complete search history.

(56) References Cited

U.S. PATENT DOCUMENTS

| | | |
|---|---|---|
| 8,824,606 B2 | 9/2014 | Cheng |
| 9,032,225 B2 | 5/2015 | Lake |
| 9,357,348 B2 | 5/2016 | Evans |
| 2005/0176371 A1 | 8/2005 | Palin |
| 2007/0140199 A1* | 6/2007 | Zhao ................... H04W 52/287 370/338 |
| 2008/0012760 A1 | 1/2008 | Derrick |
| 2009/0086711 A1 | 4/2009 | Capretta |
| 2009/0168848 A1* | 7/2009 | Constantinidis ....... H04B 1/707 375/140 |
| 2009/0233735 A1* | 9/2009 | Savarese ............ G08B 13/1436 473/407 |
| 2010/0107238 A1 | 4/2010 | Stedman |
| 2013/0339758 A1 | 12/2013 | Lake |
| 2014/0229727 A1 | 8/2014 | Jun |
| 2015/0287298 A1* | 10/2015 | Zur ........................ G08B 13/08 340/545.2 |
| 2016/0023043 A1* | 1/2016 | Grundy .............. A63B 21/0726 482/8 |
| 2016/0110975 A1 | 4/2016 | Oppenheimer |
| 2016/0174022 A1 | 6/2016 | Nhu |
| 2016/0262082 A1 | 9/2016 | Flynn |
| 2016/0346617 A1* | 12/2016 | Srugo .................. A63B 21/072 |
| 2018/0018704 A1* | 1/2018 | Tunnell .............. G06Q 30/0269 |
| 2018/0088098 A1* | 3/2018 | Mandava ............... G01K 1/022 |
| 2019/0026724 A1* | 1/2019 | Wade ................ G06Q 20/3278 |
| 2020/0367471 A1 | 11/2020 | Deliou |

\* cited by examiner

CELLULAR REMOTE LOCATOR SERVICES TOOLKIT

BLUETOOTH PROXIMITY
LOCATOR SERVICES TOOLKIT

FIG. 11

FOR ANY RADIOTAG:SMARTPHONE PAIR

LOCATION KNOWN?
TIME 0 | YES or NO?                                       — 1101

IF LOCATION KNOWN "YES", THEN IN "SAFE ZONE"?   — 1102

IN SAFE ZONE?
TIME 0 | YES    NO    IF YES, THEN SLEEP

IF NOT IN SAFE ZONE OR NO LOCATION, THEN CK MOTION.
COMPARE MOTION OF RADIOTAG VERSUS SMARTPHONE:

MOTION (Truth Table)

| TAG | PHONE |        |
|-----|-------|--------|
| F   | F     | GO TO 1 |
| F   | T     | GO TO 2 |
| T   | T     | GO TO 3 |
| T   | F     | GO TO 3 |

(1103)

1. ENTER OR CONTINUE IN SLEEP MODE  — 1104

2. GENERATE "LEFT BEHIND" ALERT AND "CALL HOME"  — 1105
IF RADIO TETHER IS BROKEN

3. CHECK PROXIMITY CHANGE (dRSSI/dT)  — 1106

PROXIMITY CHANGE (dRSSI/dT)*
TIME (dT) | ~     >     <

* ~: Unchanged; > Strengthening; < Fading

IF UNCHANGED, THEN SLEEP.  — 1107

IF FADING OR LOST RSSI, THEN GENERATE "LOST" ALERT
AND "CALL HOME".   — 1108

IF STRENGTHENING RSSI, LOOP T=T+t AND ReCK MOTION  — 1109 iBEACON FORMAT

EDDYSTONE UID BEACON FORMAT

EDDYSTONE URL BEACON FORMAT

ALTBEACON FORMAT

ESTIMOTE BEACON FORMAT

BT SIG FORMAT

BT INQUIRY PACKET (ID PACKET)

BT POLL or NULL PACKET

BT FSH PACKET

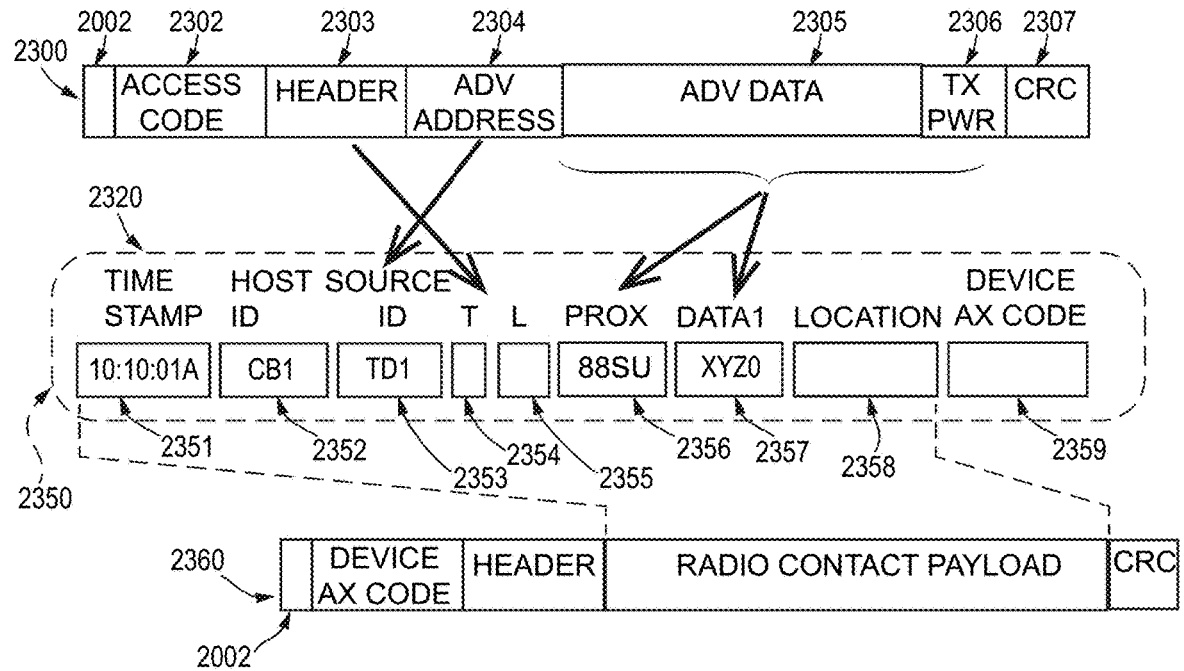
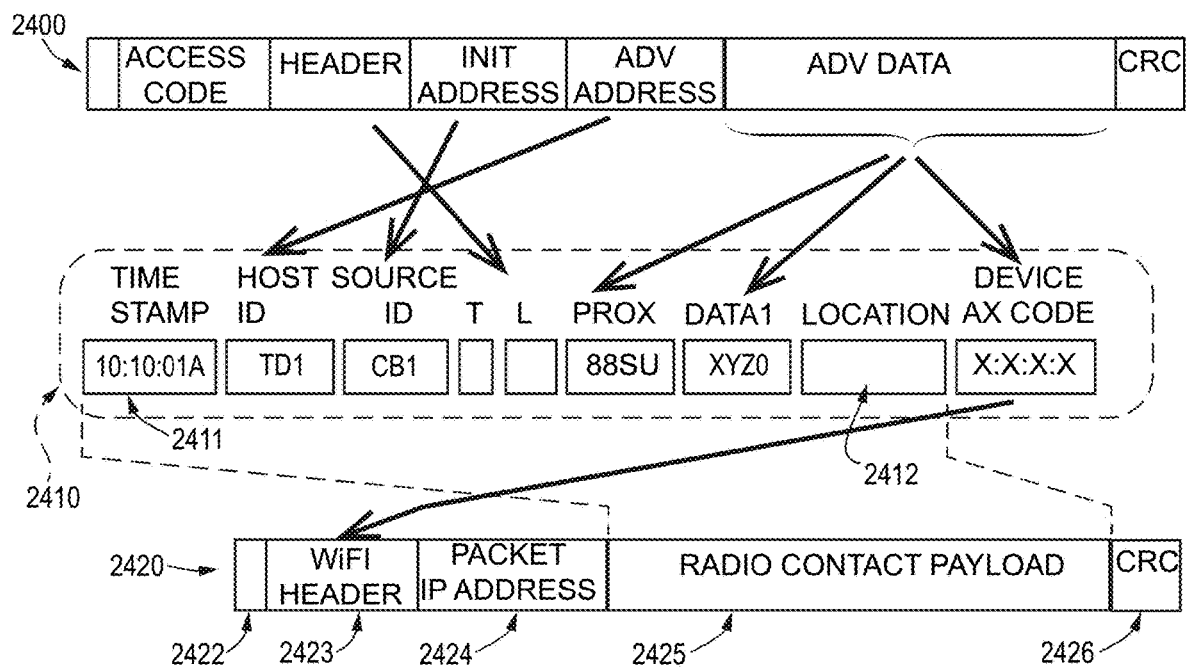

FIG. 29

Block 2900a (bottom), timestamp 10:10:01A, 47.00.01NxW, XCB1, 2912: X:X:X:X

| R01 | UNK | UNK | UNK | UNK | UNK | TDN | TD3 | TD2 | TD1 |
|---|---|---|---|---|---|---|---|---|---|
| D | D | P | P | A | A | A | A | A | A |
| B0 | B1 | B2 | B3 | B4 | B5 | B6 | B7 | B8 | B9 |
| 90 | 88 | 88 | 88 | 88 | 40 | 39 | 22 | 21 | 18 |
| 000 | XYZ0 | 001 | 001 | 001 | XYZ1 | XYZ2 | XYZ3 | XYZ4 | XYZ5 |

Block 2900a (middle), timestamp 10:10:11A, 47.00.02NxW, XCB1, 2914: X:X:X:X

| R01 | UNK | UNK | UNK | UNK | UNK | TDN | TD3 | TD2 | TD1 |
|---|---|---|---|---|---|---|---|---|---|
| D | D | P | P | A | A | A | A | A | A |
| B0 | B1 | B2 | B3 | B4 | B5 | B6 | B7 | B8 | B9 |
| 90 | 98 | 89 | 88 | 78 | 40 | 49 | 21 | 29 | 18 |
| 000 | XYZ0 | 001 | 001 | 001 | XYZ1 | XYZ2 | XYZ3 | XYZ4 | XYV5 |

Block 2900a (top), timestamp 10:10:21A, 47.00.03NxW, XCB1, 2916: X:X:X:Y, 2922, 2923

| R01 | UNK | UNK | UNK | UNK | UNK | TDN | TD3 | TD2 | TD1 |
|---|---|---|---|---|---|---|---|---|---|
| D | D | P | P | A | A | A | A | A | A |
| B0 | B1 | B2 | B3 | B4 | B5 | B6 | B7 | B8 | B9 |
| 90 | 48 | 76 | 78 | 89 | 42 | 33 | 27 | 81 | 18 |
| 000 | XYZ0 | 001 | 001 | 001 | XYZ1 | XYZ2 | XYZ3 | CYZ4 | XYZ5 |

FIG. 30

RADIO CONTACT RECORDS

NEW IN →

| TIME STAMP | MAC/UUID ADDRESS | RSSI PROX | LOCATION | DATA1 | DATA2 |
|---|---|---|---|---|---|
| 100 | XXX | 021 | 90.01 | | |
| 110 | XXX | 021 | 90.01 | | |
| 120 | 001 | 080 | 90.01 | AAA | XYZ |
| 130 | XXX | 021 | 90.01 | | |
| 140 | 001 | 080 | 90.01 | BBB | XYZ |
| 150 | XXX | 033 | 90.01 | XXX | XXX |
| 160 | XXX | 022 | 90.01 | XXX | XXX |
| 170 | 001 | 080 | 90.00 | BBB | XYZ |
| 180 | XXX | 042 | 89.88 | | |
| 190 | 003 | 055 | 88.33 | XXX | XYZ |
| 200 | 002 | 045 | 88.33 | ABC | QRT |
| 210 | XXX | 044 | 88.18 | BBB | XYZ |
| 220 | XXX | 038 | 87.01 | | |
| 230 | 001 | 080 | 84.93 | BBB | CDE |

OLD OUT ←

COLD CHAIN DATA LOGGING

XCB TRACKING DEVICES, METHODS AND SYSTEMS

CROSS REFERENCE TO RELATED APPLICATIONS

This application is a Continuation of U.S. patent application Ser. No. 17/163,403 titled "XCB Tracking Device, Methods and Systems" filed 30 Jan. 2021, which is a Continuation-in-Part of U.S. patent application Ser. No. 16/575,315 titled "Bluecell Devices and Methods" filed 18 Sep. 2019, which claims the benefit under 35 U.S.C. § 119(e) from U.S. Prov. Pat. Appl. No. 62/732,945 titled "Hybrid Cellular Beacon Devices" filed 18 Sep. 2018; and is a Continuation-in-Part of U.S. patent application Ser. No. 16/950,666 titled "Hybrid Cellular Bluetooth Tracking Devices, Methods and Systems" filed 17 Nov. 2020, which claims the benefit under 35 U.S.C. § 119(e) from U.S. Prov. Pat. Appl. No. 63/108,843 titled "Hybrid Cellular Bluetooth Tracking Devices, Methods and Systems", filed 2 Nov. 2020, and from U.S. Prov. Pat. Appl. No. 63/114,464, titled "Hybrid Cellular Bluetooth Tracking Devices, Methods and Systems", filed 16 Nov. 2020 and U.S. Prov. Pat. Appl. No. 62/936,588 titled "Finder Devices and Systems with Location Notifier Control Interface", filed 17 Nov. 2019.

U.S. patent application Ser. No. 17/163,403 further claims the benefit under 35 U.S.C. § 119(e) of U.S. Prov. Pat. Appl. No. 62/968,105, titled "Private Wireless Network Communications Systems, Methods and Devices, filed 30 Jan. 2020.

This application is further related to U.S. patent application Ser. No. 14/301,236 filed 10 Jun. 2014 titled "Tracking Device System", now U.S. patent Ser. No. 10/580,281 and to U.S. patent application Ser. No. 16/777,815 titled "Cellular Devices, Systems and Methods for Logistics Support", filed 30 Jan. 2020, now U.S. patent Ser. No. 10/592,849. All said patent documents are incorporated in full by reference.

TECHNICAL FIELD

Multiband radio devices, methods and systems for wayfinding, networking and location services.

BACKGROUND

An ad hoc radio network and standard for data and voice sharing was long envisaged but has not yet been successfully integrated into the 5G radio access network (RAN) on which the Internet is built. In a first effort at universal connectivity, "Citizens Band" (CB) radio was created in the United States in 1945 for wireless short range messaging and remote control at 26.9 to 27.4 MHz. However, the standard was not widely adopted and today, CB radio finds only limited use; for example as "Channel 19" in vehicle-mounted walkie-talkies. The Zigbee radio standard is another example that has had a limited following. But more recently, Bluetooth radio has become an explosive success, and now boasts more than 40 billion devices worldwide—with 5B new devices or more shipping annually. There are more BT radios on the planet than people.

At this time, Bluetooth (BT) radios do not provide direct access to the Internet, and despite the efforts of Internet founder Tim Berners-Lee, Personium Project Manager Akio Shimono, and Center for Human Technology co-founder Tristan Harris, among many others, the Internet remains a private conglomerate directed primarily at monetization of data; with no core toolset for human-centric personal control of that data. The recently released Bluetooth Low Energy protocol (BTLE) has added new limitations that teach away personal control and favor Telecomm utility control. Major manufacturers have committed to a "handset-centric model" in which the "center device" (also termed the "master") is a telecomm-supplied smartphone with by-subscription service, encryption and restricted access except for emergency calls (eCall and CMAS). This bias toward centralized control of data and connectivity has been revenue driven, and aligns with "connectivity-by-subscription" trends in social media that promote private monetization of the public airwaves. Both iOS and Android still allow developers a window within which to transmit BTLE advertising packets in an open mesh network, but the peer-to-peer open discovery envisaged by the Bluetooth Special Interest Group (SIG) is not supported by recent editions of iOS or Android for cellular handsets. The intent is instead to limit open connectivity to a brief window in which a new device is discovered and claimed by a handset, headset or other class of "master" device. This bias has also not realized the potential of the 2009 release (WiFi 4, IEEE 802.11n standard) of 2.4 GHz and 5 GHz ISM bands for single and dual band WiFi and BT radio use, including BT 5.0 and beyond.

This bias will handicap efficient use of 5G national critical infrastructure by limiting the mesh network connectivity beneath the SIM-authenticated radio access network (RAN) layer. A new platform is needed that grafts devices having SIM-authenticated connectivity with the capacity to connect to or at least monitor open peer-to-peer networks in both a credentialed and uncredentialed way. What Bluetooth offers in sheer number of deployed devices is balanced by their limited range—typically no more than a distance of about 100 meters at 0 dBm. BTLE 5+ offers 20 dBm in some countries, but increasing use of overlapping WiFi results in increasing packet error rate at greater distances despite forward error correction and other innovations. Thus the intimacy of Bluetooth in local areas is helpful in informing proximity-driven applications but is a critical limitation when location and data services must be provided over greater distances.

In some instances, even more intimacy is needed, and higher wavelengths (in the 6 to 10+ GHz UWB range) provide a needed short range and specificity in making connections based on proximity, such as for directed wireless transfer of files. Very short range transmissions ensure a reasonable level of privacy and specificity in making connections, and can be used to bootstrap other wireless connections such as WiFi 802.11a/b/g/n/ac/ax to build sensor nets or complete larger data transfers by allowing for exchange of encryption keys without a likelihood of interception. The "tap-to-pay" system of NFC (near field communications) radio is another example of very short range radio authentication and credentials transfer, and also is used to bootstrap more robust ISM wireless connections for larger data transfer.

Recently proposed THz bands for "body-area networks" also seem to offer a fusion of biometrics and nano-area radio networks, all of which can relieve some of the congestion in the increasingly crowded 2.45 and 5 GHz radio spectra.

The deployment of 5G and 6G radio networks is bringing increased complexity and variety to radio use. The backbone of 4G and 5G systems for most users has been the cellular broadband network that supports voice and mixed media communications as well as data. Access to this system is tightly controlled by authenticating of users based on an IMSI (International Mobile Subscriber Identity) physically encoded in the subscription identifier module (SIM card) in every cellular device. But the need for security comes at the cost of energy consumption, which limits the field life of detached cellular radio devices. The bulky cellular handsets carry large, heavy batteries and are easily dropped. More than 50M phone screens are cracked every year in the United States alone, according to a 2018 report.

An improved radiotag and system would enable owners to expect and to realize an extraordinary level of power management sophistication while enabling both long distance and short range location management tools, including finding, wayfinding, and tracking. Power management must be so stringent, for example, that an owner can attach a radio device to a pet or other asset, and be able to track the signal over long distances if the asset goes missing weeks or months later—while having adequate broadcast range and no unacceptable latency or dead time. The advantage would be a single solution that allows an owner to interact with a lost radiotag, or for example to interact with any passersby who encounters the radiotag in order to enlist their help, for example a lost child at an airport in need of being reunited with a parent. A solution to this complex problem has not been achieved with conventional radiotags to date.

SUMMARY

An unmet need exists for a hybrid XCB radio device and platform that has the intimacy and ubiquity of a BT piconet or mesh open network, but also the power to connect globally with the packet data backbone of LTE-Cat M and emerging cellular and WLAN 5G networks. A new platform is introduced that combines BT "situational awareness" for power management and security with a capacity to report and make connections via the global IP networks and their virtual private gateway cousins.

The new radio devices introduce BT radiotags with a capacity to scan and report the BT radio topology associated with their current location, where "BT radio topology" includes BT radio traffic as an envelope of propagated digital radio signals broadly encompassing the BT spread spectrum. Radio signals in the BT spread spectrum are treated as meta-data by which ambient BT signals come to be recognized by machine learning for patterns and signatures that are associated with location, activity, day, calendar, and any threat environment. Threat security for example relates to detection of abnormal radio activity in a network and to use of BT signatures to detect session hijacking using "man-in-the-middle", "replay", "teardrop", "ping-of-death", malware, and botnet attacks. Whereas hackers are increasingly sophisticated in exploiting code weaknesses to game network resources, steal credentials or deny service, the hacker cannot readily mimic the "local color" of a known BT radio topology that surrounds a genuine user who is familiar to the system and in a safe and known location. Where the user's location is not readily authenticated, and the system relies only on private and public keys for authentication, stopping an alien attack that originates from foreign soil is difficult, but the sampling of BT radio topology plus sensor biometrics may supplant the system of private and public keys that lead to vulnerabilities in 5G networks, and also helps to establish a decentralized system for storing and accessing personal data.

Because BT relies on FSK radio modulation and has a specialized packet structure, BT radio contact feeds cannot be directly transmitted to the 5G radio access network (RAN), most of which operates with PSK radio modulation. The RAN and CORE IP packeting environments define multiple unique packet types that have not been supported in BTLE standards. IPv6 support over BLE with the adaptation of 6LoWPAN and Thread protocols can result in a crossover from WLAN to BLE. IPv6 can be emulated over Bluetooth Low Energy (BLE) as defined in RFC 7668 according to the Internet Engineering Task Force, for example. But this standard does not allow native BTLE transmissions to be routed onto the IP packet data networks. The devices described here map BTLE radio packets to a standardized database entry format or "radio contact record", and these database records are shared as a sort of "snapshot" of the BT world around the originating device. This snapshot can be used for authentication, but also finds a myriad of uses in provisioning new devices, in erecting geofences, in wayfinding and locating, and in maximizing throughput in the ISM spread spectrum by identifying pathways around congestion. The snapshot may include 1280 octets or larger when transmitted over WiFi or using the 6LoWPAN standard, but is assembled from smaller snippets extracted from the advertising packets and PDUs in the intercepted radio traffic.

As disclosed here, these new radio devices are termed "crossover cellular Bluetooth" radios (XCB). XCB devices include at least a Bluetooth (BT) radio modem and a cellular radio modem, with a processor with supporting circuitry and power management features that default to a "sleep" mode for extended battery life. Synergically, by engineering the BT radio as part of the device controller and attaching a cellular modem to the controller, the BT radio can be used as a "wake up receiver" or "always listening radio" (ALR) for activating the cellular modem. These poly-radio devices may also include one or more WiFi radiosets in the ISM band and one or more of the WPAN radios such as for Thread, 6LoWPAN, pulsed UWB, and so forth.

The bandwidth available for mesh BT and WiFi radio includes 2.4 and 5 GHz and combines the 802.11a/b/g/n/ac/ah/ax WiFi, 802.15.1-3 Bluetooth, and 802.15.4a/g WPAN radio standards. While this includes some sub-GHz bands, the other component of radio spectrum relevant here is the LTE/GSM/5G bands dedicated for telecommunications. BT standards most relevant are 4.0, 5.0 and 6.0 (and continuing innovations) each of which adds new complexity to the ISM bands.

In other embodiments, the poly-radio are provided with multi-band antennas that satisfy communications needs over several disjoint radio bands, such as the LTE cluster, or dual-band WiFi, or a combination antenna for LTE, Bluetooth and WiFi, for example. Fractal, PIFA, ceramic, stacked patch, diversity, and phased array antennas are also included. Electronically impedance matched receivers are also included that can jump from band to band depending on the transmission/reception feed. Radio antennas form a large segment of the patent literature, for example U.S. Pat. No. 4,381,566 to Kane, U.S. Pat. No. 6,452,553 to Cohen, U.S. Pat. Nos. 7,148,850, 7,202,822 to Baliarda, U.S. Pat. No. 8,456,365 to Pros, U.S. Pat. No. 9,000,985 to Baliarda, and U.S. Pat. No. 9,755,314 to Baliarda, for example. Also relevant are papers by Hong, S S et al. 2012, Picasso, Flexible RF and Spectrum Slicing, In ACM SIGCOMM 42:37-48. Helsinki FI. [doi.org/10.1145/2377677.2377683] and Hong, W et al. 2017. Multibeam Antenna Technologies for 5G Wireless Communications. IEEE Transactions on Antennas and Propagation, 65: 6231-6249 [doi.org/10.1109/TAP.2017.2712819].

Inexpensive "software-defined radio" chips are readily available. We suggest that the "synthetic radio" oscillators of XCB devices may also include a "software-defined antenna" that advantageously can be upgraded via firmware rather than requiring new hardware, as will be increasingly important with the proliferation of radio technologies to be implemented in 4G, 5G, 6G and user-defined networks. Given that most XCB devices are powered to operate at less than 20 dBm, regulatory restrictions and SAR (biological exposure) considerations are minimal. Here we introduce a software-defined antenna that uses a programmable FET gate array to achieve impedance matching and beamforming in a hand-sized or wearable device.

While typically defaulted to sleep state for power savings, when activated, an XCB cellular modem can make a new cellular network connection or reestablish a network connection in a process generically termed here a "CALL HOME". Any call home is at least a status update and offers an opportunity to share a location fix with the network or to receive network assistance in establishing a location fix. Location data is the key to many community services facilitated with XCB radio devices.

XCB radiotags function in locating, tracking and monitoring lost or wayward objects, children or pets for example. In use, a radiotag is attached to a child, object or pet by an owner of the object, and can wirelessly report the radiotag's location from around the world or can make itself found by emitting an audible alarm when misplaced out of sight. Because XCB radiotags can self-initiate a call to an owner of a radiotagged asset, the owner is not strictly dependent on the goodness of strangers to recover what is lost. Advantageously, the current location can be displayed on the owner's smartphone for example, and updated locations can be displayed as a series of waypoints that track the location of the lost child, object or pet until safely recovered.

Output from onboard sensors such as motion, electronic heading, photocell or body temperature sensors, or a combination of radio traffic sensor data and motion sensor data, for example, also can result in a CALL HOME if something is amiss. In another embodiment, the BT radio functions as a sensor that reports on the surrounding radio topology. Sensor data stored in memory may be shared in an uplink with the network.

During radio contacts mediated by the system, the system may also send new instructions to the cellular radioset of an XCB device that will modify its cellular wake cycling so that it can be tracked with frequent cellular updates. In some instances, the system will know that a radiotag is lost before the owner does.

Importantly, battery power is not wasted on useless cellular radio activity before a relevant event occurs. In one embodiment, the lost radiotag may be activated by someone who comes across the lost child, asset or pet and presses a button or other activation switch on the radiotag. At that point, the radiotag begins a location determination and a cellular broadcast. Because the radiotags include an LTE-M cellular radio, location is readily determined by AGPS or other network-assisted location service, and the location is readily transmitted to a system administrative host, so that the system can generate a notification to the owner/subscriber, for example. The system will react promptly so that the radiotag can be reprogrammed to broadcast in an "active-tracking mode" for a period of several weeks, or even a month or more, using cellular eDRX power savings mode with wake up for paging opportunities and location update, so that the system can generate a notification to the owner/subscriber and owner is able to recover the radiotag and attached asset.

BT radio control of power management over the processor(s) and dual radios enables extended portable operation of the devices in which the BT radio acts as a "wake up radio". Carriers in the 5 to 11 GHz bands may also be employed for wake-up radio and bootstrapping of LAN interconnecting of peripherals and centrals, servers and clients, but the digital packet structure of BT radio signals is compatible with data, voice and video. With software-defined radio, a polyphony of radio interconnections is achieved. Synthetic radio is used to sample the digital radio envelope in the MHz and GHz bands, yielding an organic network of community monitoring devices with a high level of "situational awareness" to prevent spread of spyware and malicious software and to offer services such as location finding, wayfinding, and detection of a lost or left behind item before the owner knows the item is lost, for example.

As an introductory consumer product, for recovery of a lost item, each radiotag or device can include a speaker or LED that can be activated remotely, for example a beeper that emits an audible tone, or a speaker that interacts with nearby persons, to aid in locating it when misplaced. For more privacy, a display screen can be used to guide the user back to the lost item. Our proximity locator toolbox is active to 100 meters or more. When used with these poly-radio radiotags, the cloud host combines global cellular and BT networks into a highly granular wide area network for finding lost pets, children and wayward assets generally with meter resolution on a minimal energy budget. A synthetic radio chipset with multiple antennas, diversity antennas, or "on demand" multiband antennas enables an economy of manufacture and the flexibility to be wirelessly upgraded to improved performance configurations or new features.

In more advanced consumer products, a display or voice interface may be provided to map the lost item in a virtual topology of landmarks and vectors and to provide distances and directional cues that speed its recovery.

BT radios may be configured to operate in one or more low power BT-radio states, and include a passive "always listening" mode where active transmissions are suspended. BT devices will transition from standby to an active BT-radio awake mode in response to a qualified BT radio signal or traffic pattern, for example, or will actively scan for and respond to inquiry scan requests and connection requests. When the BT radio is in passive "always listening" mode, the BT radio may report intercepted radio traffic to its modem and even populate a flash memory database with a rolling stack of records that constitute a "snapshot" of surrounding radio activity, while not actively responding to the radio signals. In active mode, the BT radio may solicit responses or may actively respond to inquiries from other BT radios.

BT radio traffic may include actionable qualified BT radio signals and non-qualified BT radio signals. Both qualified and non-qualified BT radio signals are part of the BT radio topology around a BT radio that may intercepted when the BT radio is in "always listening" mode.

By adjustments to the duty cycle, XCB devices spend a significant amount of time in sleep mode—but because of the low latency, in practical use they appear to be "always listening radios" (ALR). A qualified radio signal addressed to the BT radio will wake the BT processing circuitry, or can wake a cellular or WLAN radio if needed. Cellular, WLAN or PLAN network connectivity may include IP packet data connections that enable full global-area network (Internet) communications, M2M remote activation, or interaction with a cloud host, for example.

The cellular radio transceiver is configured to cycle between at least one cellular-radio sleep mode and a cellular-radio awake mode. The radio will transition from the cellular-radio sleep mode to a cellular-radio awake mode in a paging window, or when an internal connection request is generated. A qualified radio signal addressed to the cellular modem includes a cellular radio unit identifier and is transmitted in a paging window on a cellular network for which authentication has been made and access has been granted.

But once awakened, either radio will receive and convey radio commands to the processing circuit(s), commands that are executed while the device is in the processing-circuit awake mode before reverting to its default sleep mode. The processing circuit is enabled to cycle between a processing-circuit sleep mode and a processing-circuit awake mode in response to activity from the BT radio, the cellular radio, from an onboard sensor, or according to machine intelligence.

Lightweight XCB devices are rapidly achieving success as wearables and as radiotags for attachment to assets, pets and even children. Embedded embodiments have been realized. By tapping into the power of BT and cellular networks to do positioning and proximity mapping, the tracking and finding of radiotagged objects becomes simple and doable from anywhere with a basic package. Voice user interface functions bring an intimacy to 5G networks that permeates the IoT and a universal user interface is achieved with a microphone and speaker as part of an XCB radio device.

The radiotag devices may also include a user interface for voice messaging as part of a voice control package. The user interface may include a switch to activate an "on demand" location fix and communication package useful in child, asset or pet location services and recovery. For example, smart systems enable alerts, messaging, maps and mixed media support with "community open arbors" system access for location, wayfinding and proximity management services.

It is to be expressly understood, however, that the drawings and examples are for illustration and description only and are not intended as a definition of the limits of the inventions. The various elements, features, steps, and combinations thereof that characterize aspects of the inventions are pointed out with particularity in the claims annexed to and forming part of this disclosure. The invention(s) do not necessarily reside in any one of these aspects taken alone, but rather in the invention(s) taken as a whole.

BRIEF DESCRIPTION OF THE DRAWINGS

The teachings of the present invention(s) are more readily understood by considering the drawings, in which:

FIG. 11 is a flow chart for driving location management logic and power consumption using motion sensor data from a radiotag and a smartphone. The concept of a "safe zone" is introduced.

FIG. 23 is a more detailed view of a BT advertising packet and demonstrates how data having characteristics of location and proximity can be extracted from an advertising packet to build a radio contact record.

FIG. 24 is a view of a BT connection request packet and demonstrates how location and proximity characteristics can be extracted from a connection request packet to build a radio contact record.

FIG. 29 illustrates a series of radio envelope snapshots in a chronology.

FIG. 30 is a view of a rolling memory stack containing radio contact records in flash memory of an XCB radiotag.

Figure 1:
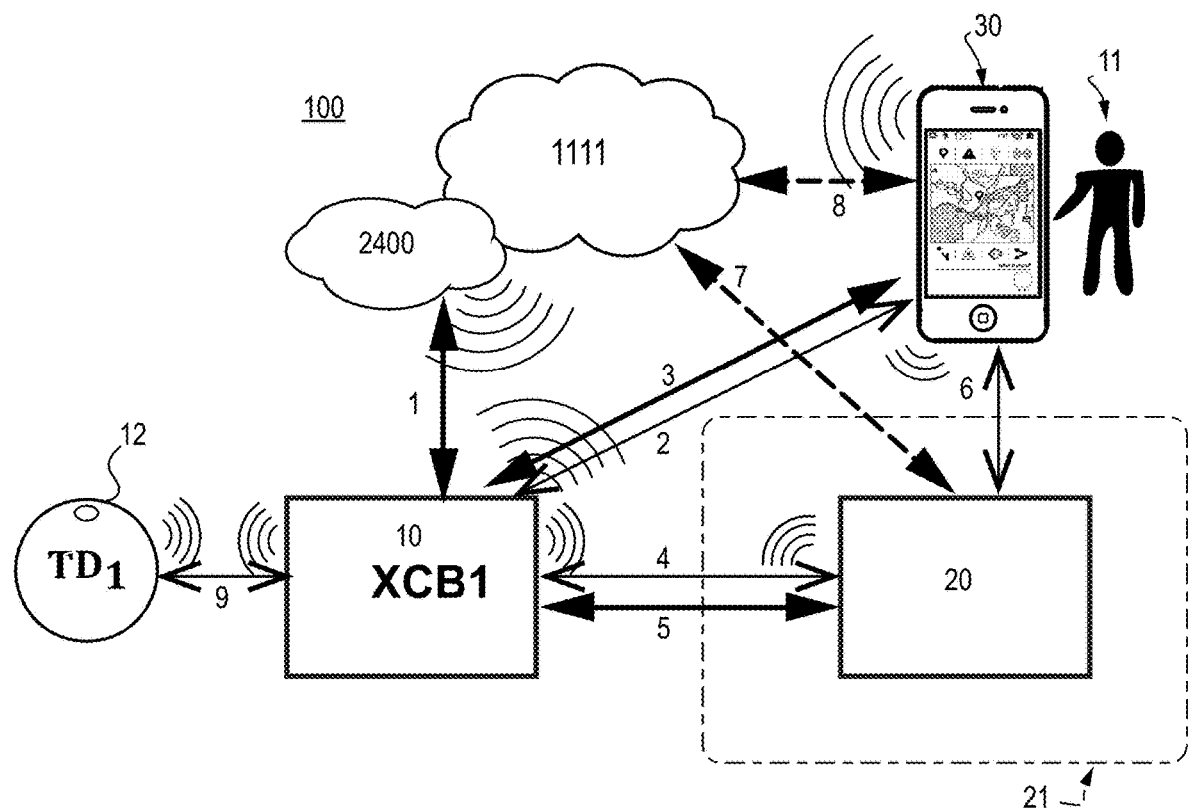
FIG. 1 depicts a networked system with XCB radiotag 10, reference hub 20, user equipment 30, and cloud host(s). A CALL HOME 1 is depicted.

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description and teachings disclosed herein.

GLOSSARY

The following definitions supplement those set forth elsewhere in this specification. Certain meanings are defined here as intended by the inventors, i.e., they are intrinsic meanings. Other words and phrases used herein take their meaning as consistent with usage as would be apparent to one skilled in the relevant arts. In case of conflict, the present specification, including definitions, will control.

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted in the concepts disclosed herein without departure from the inventive content.

"Bluetooth Radio" or "BT radio"—includes "Bluetooth Low Energy" (BTLE), "Bluetooth Classic", and "Bluetooth Dual Mode" (BTDM) radio. BT radios share signals with other BT radios in an open, shared ISM band between 2.400 and 2.483 GHz. A spread spectrum with frequency hopping is used to reduce interference. The operational frequency band is split into channels spaced by increments of 1 MHz or 2 MHz. Digital data is transmitted by GFSK (Gaussian Frequency Shift Keying) in which a binary "one" is modulated as an increased frequency and a binary "zero" as a decreased frequency, or by DPSK (Differential Phase Shift Keying) as known in the art. Frequency modulation ensures a constant amplitude envelope around the signal that allows higher RF amplification, and achieves a satisfactory bit error rate and tolerance to interference while at low power. DPSK achieves higher data rates. Robust repeat and error correction including CRC, ARQ, or other checksum support functions is combined with whitening techniques known to improve fidelity at low power.

In short, BT is designed for short range, robust, low power transmission and reception—with a built in promiscuity that enables easy interactions between newly discovered devices with minimal setup and requiring essential no dedicated connections. The magic of BT piconets is in a system of access codes that are part of the packet/header structure. Details are described in the Bluetooth Core Specification, originally published in 1999, with periodic updates.

However, the BT standard also allows for BT radios to "belong" to certain small networks, termed "piconets", and for members of those network units recognize each other and quickly recover a state of more intimate CONNECTED data exchange termed "pairing"—while not losing the capacity to listen for other radio traffic and to respond selectively or non-selectively when addressed non-specifically or specifically.

The original BT Specification also allows for BT devices to communicate in "scatternets" formed as loose and transient associations between devices operating in different piconets. Piconets may even share BT devices in different scatternets. This capacity was limited in BTLE to conserve energy, but the capacity remains in the core specification and is included here in some embodiments. While less mainstream, research has also been conducted into mesh networks by which data moves from scatternet to scatternet through internodal devices as relays. The capacity to modify the BT Specification to permit this, while preserving backwards compatibility, is anticipated here, and the use of XCB devices of this disclosure as internodes between piconets, scatternets and as members of mesh networks is, by intent, not precluded in future applications.

BT radio signals are formatted as packets. BT devices include packet composers and decomposers. BT radios also include correlators with registers for sorting and identifying received signals based on access code or service, for example as described in US Pat. Publ. Nos. 2002/048330 and 2009/0086711, which are incorporated herein for all they teach and reference.

"Access codes" are part of a header that addresses BT radio traffic. For example, a general inquiry access code (GIAC) identifies traffic broadcast to any listening device, and indicates a discoverable device. Other inquiry access codes may be directed to individual devices, such as particular members of a piconet. The access code may be derived from, but is not the radio unit identifier of the transmitting device or the intended receiving device.

BT unique radio identifiers (RUI) or "radio signatures", as used here, may be a MAC address of a BT radio device or may be a universal unique identifier (UUID) or a part of a UUID, and may include a serial identifier assigned by the Bluetooth Special Interest Group (Bluetooth SIG) as administered through the IEEE Standardization group (accessible via a WHOIS-style lookup). The RUI may also include a part number given by the manufacturer. The SIG standard also permits developers to encode a "group identifier" or "community identifier" inside an extended unique identifier (EUID) issued by the manufacturer, inside the BD_ADDR, or inside a Service UUID. Proxy identifiers such as service UUIDs link to services associated with a discovered BT device. Identifiers may include payload URLs and payload unique identifiers (UIDs) that identify proprietary services. The payload may include frames or "values" containing more information. Payload information may include subtype or location, advertising data, sensor output in digital form, and records of Bluetooth radio contacts, for example.

Service identifiers inform the radio of protocols to be followed in sending or receiving data, and allow developers to create tools that incorporate elements of the payload as "deep intent" triggers for software applications. Advertising messages may include one or more identifiers and service UUIDs, for example. Other messages may not provide sufficient information to identify all services associated with a device, but a qualified BT receiver can respond to obtain more information without actually connecting.

For example, identifiers in a message actuate protocols in receiving BT radios that can wake smart devices, direct a smart device to a URL, push a notification to a remote device, or pull attachments from cloud library resources, for example. A smart device can receive Bluetooth radio traffic from any Bluetooth device in radio proximity, and forward that traffic to an IP address associated with a Bluetooth group or community, after adding a timestamp or a location stamp. By doing so, the smart device serves as a "hub" to transfer Bluetooth traffic radio contact records to the broader cellular network (or vice versa), enabling a host of location-driven services that can be modified according to sensor data.

Many devices broadcast their RUI or MAC address in the open, or in response to a SCAN REQUEST. A class of "BT Sniffers" may detect these addresses and compile stacks of addresses and device names as BT traffic metrics. Devices may also be recognized by the services they advertise. For dedicated peripheral devices, a client application can scan for devices offering services or features associated with a UUID that specifies the GATT services the BT device supports, and in full CONNECTION, data specific to a service or feature can be transmitted across the connection.

The RUI address can be an advertising address, a device address, a dedicated address of a piconet device, a virtual address, or a subscriber address, as is useful in mesh networks and for creating whitelists. Some address standards are open, others are proprietary or are obfuscated to prevent BT snooping.

In recent trends, BT signal payloads may include URLs that link the device to the physical web. Alternatively a community identifier is transmitted in a message as part of a header, routing address, or payload that when recognized by packet decomposer in a receiving device, causes the message to be forwarded to an IP Address and associated cloud host. This approach has enabled community lost-and-found services such as described in US Pat. Appl. Publ. No. 2016/0294493) which is incorporated in full by reference.

These community lost and found services may be facilitated by offering a gratuity to any smartphone operators who install the needed software and enroll in a community open arbors "lost-and-found" network. Because the "found notifications" are made when a BT signal of a lost smart object is discovered, and the remaining uplink and reporting is done automatically in background on the smartphone, the process entails little or no effort by participating community members but serves a valuable need to reunite lost assets with their true owners. A found notification is generated when a Bluetooth radio transmission that includes the unique radio unit identifier associated with the lost smart object and a community identifier or URL is intercepted by the smartphone or XCB radio tag of a community member; said found notification being forwarded to a cloud administrative host associated with the community identifier or URL.

The radio header and payload may also include resource identifiers that direct communications protocols in the link layer and activate software applications keyed to the resource identifiers. This approach is seen frequently with smartphones—installed Apps react in real time to BT transmissions. For example, a received BT transmission can wake up a sleeping device (US Pat. Appl. Publ. No. 2020/0242549), which is incorporated here by reference. More recently, data supplied in the fields or payload of a BT transmission can cause an App to be installed, or if the App is installed and the appropriate permissions are in place, the App can be run at a particular instance in the program as most relevant to contextual clues in the received BT signal. This is termed "deep intent" to indicate that the App anticipates the user's thought process and causes the client smartphone to display the most relevant materials from a resource or takes an appropriate action in anticipation of the need. More recently the process has been extended to wall screens, so that "walk up" computing is increasingly automated by invisible BT radio transmissions that identify the user and guess the user's intent from radio proximity or accelerometry data. For example, if a user picks up a shoe in a shoestore, a BT radiotag attached to the shoe will send a sensor output and a wall monitor will display more information about the shoe, or push that information onto the user's smartphone.

In connected links, BT signals transmit data. Newer BT 5.0, 5.1 and 5.2 standards permit multi-slot messages for sharing larger amounts of information, even encoding of speech. Connectionless data sharing is also supported in the newer protocols.

"Smart device" is defined by example. The most commonly recognized smart device is the ubiquitous cellphone or "smartphone" (also termed here a "handset"), having a user/subscriber interface, a powerful battery, a cellular radio, highly advanced computational capacity, an operating system, capacious memory for programs and "apps", capacitive touch screens, typically a BT radio, and commonly tens of sensors, all in a pocket-sized device. However, laptops, PDAs, Google glasses, smart wrist watches, and any generally portable device with Internet connectivity and onboard processing power is commonly understood to be a "smart device" sensu lato. Smart devices are typically provided with a SIM card when used in cellular telephonic radio communications and each such device is given an IMSI identification number that points to one particular unique device and more generally is referred to as the cellular "radio unit identifier". The XCB devices disclosed here may also have a BT manufacture's EUID, or a derivative thereof, possibly one or more UUIDs in volatile or non-volatile memory, and a cellular IMSI and IMSI, in addition to any serial or lot number given by the manufacturer. The XCB radiotags may qualify as a "smart device" sensu lato when operated as a platform with memory and computational power.

IMSI is an "international mobile subscriber identifier."
IMEI is an "international mobile equipment identifier."
eDRX abbreviates "extended discontinuous reception."
PSM abbreviates "power savings mode."
VPG is a Virtual Private Gateway.

RSSI abbreviates "received signal strength indicator", which is an indication of incoming signal strength power or power present in an incoming radio signal and is commonly specified as an up to 8-bit unitless integer. RCPI is an improved version of RSSI, and stands for "received channel power indicator" and is logarithmic in dB, measuring total power received in a defined channel bandwidth at the antenna connector. A more general characteristic is "path loss" which relates to radiation power (dBm) minus RSSI (dBm). Transmission power is specified in some beacon signals, which allows a well-defined estimation of range by use of a path loss calculation. Other variants of RSSI exist, and the definition given here is intended to broadly encompass all such indicators of received signal strength regardless of the details of the indicium. A method provided in U.S. Pat. No. 8,879,993 provides for bidirectional exchange of signal strength to better establish proximity. The BT chip includes DC compensation that is active during receiving of the preamble (first 8 bits) of a BT message, and that function outputs the RSSI.

"Timestamp" is a temporal tag given to a data record. Timestamping is an automated function performed as a background service in most smart devices. Timestamps should be standardized as per ISO 8601 using YEAR, MONTH (MM), DAY (DD), followed by HHMMSS.SSS to specify milliseconds, and optionally as Zulu time (or with a specified offset for local timezone or daylight savings) for best practice.

The capacity of a device to timestamp data is dependent on its clock function and memory organization. Conventional Bluetooth radio tags do not provide their own timestamping (instead data is time-tagged by a companion smart device or by a network host when data was received). But the XCB radiotags of the invention may actively timestamp data for storage in local memory or prior to uploading the data. Timestamping may be an integral process with geostamping.

"Geostamp" is a map tag given to a data record that generally indicates the location of a receiver of a transmission, but in some instances, the location may be a transmitter, as from a lighthouse radiobeacon. In other instances the location of the receiver or the location of the transmitter may be stored in a radio contact record. Each radio contact detected is assigned to a record having a timestamp and geostamp in which the geostamp can be the host device location or the source device location, for example. Related services are "location history" services offered as part of the Android platform. Location is generally stored in coordinates given as latitude and longitude.

Geostamping can be an onboard function, much as a camera associates an image in memory with a location (determined by accessing GPS signals and by making a calculation of latitude and longitude; generally on a dedicated chip included in the device for that purpose). Satellite location systems include GPS, BeiDou, the Indian Nav Satellite System (NAVIC), GLONASS, Galileo, QZSS, DORIS, transmitting in L5 and S bands (1.1, 1.5, 1.6 and 2.4 GHz) for position, navigation and timing, for example. Iridium and Starlink may degrade the quality of Satnav signals in the L1 bands. Cellular network-assisted location services include AGPS and PoLTE. Cloud host servers may further refine location accuracy using aggregated data or by correlating PoLTE and GPS positioning, for example. Bluetooth radiobeacons having known fixed locations can also be used to refine location, particularly in indoor environments, much as a lighthouse marks a landmark place. Google supplies Eddystone and a Proximity Beacon REST API that allows users to register a beacon with location (Lat/Long) and indoor floor level, for example, which is wiredly used to geotag commercial establishments and places of interest on the Google cloud.

A geostamp or "geotag" associated with a radio contact or sensor data record can be given by a XCB device if the device is provided with satnav capability or with a processor enabled to receive and store location fixes from a network. The functions of geostamping and timestamping can be coordinated, and can be synchronous or performed separately, either or a single XCB device or at different network levels during network signal processing. Because discoverable BT devices reveal information about the user's proximate location, an explicit permission is often required in the device discovery process. But for some platforms such as Android 8.0 (API level 26) or higher, the Companion Device Manager API gives a generic permission for registered applications to perform device discovery with location information disclosures.

"Sensor"—includes any device having a measurement function, either qualitative or quantitative, parametric or non-parametric. Sensors may measure physical properties such as temperature or motion. Sensors output a digital signal to the processor indicative of the parameters of the physical properties. The XCB and BT devices of the system may function as sensor tags that monitor and report local conditions to a higher level network. Once uploaded, aggregated sensor data may be used in generating a composite map of the local environment as has found application in "crowd-sourced functions" such as weather mapping, traffic mapping, and hazard anticipation. Other sensors measure and report background noise level, particular sound patterns, radio traffic level, particular radio signals such as from Bluetooth beacons, and so forth. Sensors include photocells, radiation sensors, motion sensors, velocity sensors, accelerometers, jolt sensors, gyroscopic sensors, gesture sensors, gravitational sensors, heading sensors, magnetic sensors, compass sensors, clock sensors, switch open/closed sensors, vibration sensors, audio-pattern-detection sensors, vehicle-performance sensors, biological-agent sensors, biochemical-agent sensors, pollution sensors, chemical-agent sensors, temperature sensors, humidity sensors, windspeed sensors, pressure sensors, location sensors, proximity sensors, altitude sensors, smoke sensors, oxygen sensors, carbon-monoxide sensors, global-positioning-satellite sensors, relative-radio-signal-strength sensors, and radio-traffic sensors, for example. Sensors may be provided as packages having multiple sensors or individually. Sensors packages having audio sensors, such as a microphone or diaphragm, may include some level of acoustic-pattern-matching capability embedded in the sensor package. In some embodiments, a sensor is a combined 9-axis motion sensor and temperature sensor. In one preferred device, a sensor is an integrated package having an accelerometer, gyroscope, and magnetometer for each axis. In some instances, the sensor package is incorporated into a processor or an integrated circuit. Also contemplated are sensors for gases such as methane, CO, $CO_2$, NOX, CBD vehicle performance indicia, QR sensors, aerosol particulate levels, history of sub-zero temperature, history of product over-temperature, analytes such as chemical or biological substances, and the like. More generally some sensors can detect biological agents, biochemical agents, and/or chemical agents for example. Sensor data may be stored in a rolling sensor data log.

"Electronic heading sensors" are solid state devices that combine a 3-axis magnetometer with a 3-axis accelerometer and rate gyroscope that are integrated with a processor for establishing magnetic heading even when the magnetometer is not level with the horizon. The heading sensors may also report turns and tilts.

MEMS-based motion sensors include an accelerometer and a gyroscope. An accelerometer can be used to measure linear acceleration. The physical mechanisms underlying MEMS-based accelerometers include capacitive, piezoresistive, electromagnetic, piezoelectric, ferroelectric, optical and tunneling. MEMS-based accelerometers can be simple devices consisting of a cantilever beam with a predetermined test mass (also known as proof mass seismic mass). Under the influence of external accelerations, the mass deflects from its neutral position. This deflection is measured in an analog or digital manner. Commonly, the capacitance between a set of fixed beams and a set of beams attached to the proof mass is measured. MEMS-based accelerometers generally operate in-plane, that is, they are designed to be sensitive only to a direction of the plane of the die. By integrating two devices perpendicularly on a single die a two-axis accelerometer can be made. By adding an additional out-of-plane device, three axes can be measured. Accelerometers with integral electronics offer readout electronics and self-test capability.

A compass is an instrument used for determining direction relative to the earth's magnetic pole. It consists of a magnetized pointer free to align itself with the earth's magnetic field. Miniature compasses are usually built out of two or three magnetic field sensors, for example Hall sensors, that provide data for a microprocessor. The correct heading relative to the compass is calculated using trigonometry. Often, a miniature compass is a discrete component which outputs either a digital or analog signal proportional to its orientation. This signal is interpreted by a controller or microprocessor. The compass can use highly calibrated internal electronics to measure the response of the compass to the earth's magnetic field. Examples of miniature compasses available in the marketplace include the HMC1051Z single-axis and the HMC1052 two-axis magneto-resistive sensors sold by Honeywell International Inc., the AK8973 3-axis electronic compass sold by Asahi Kasei Microdevices Corporation, and the AMI 201 (2-axis) and the AMI 302 (3-axis) electronic compass modules sold by Aichi Micro Intelligent Corporation of Japan.

A gyroscope is a device used for measuring or maintaining orientation, based on the principles of conservation of angular momentum. MEMS-based gyroscopes use vibrating proof masses. Those masses typically vibrate at a high frequency. As the sensor housing rotates in inertial space a Coriolis force is induced on the proof mass. The Coriolis force causes a vibration in an orthogonal plane and the amplitude of the orthogonal motion can be measured. This type of device is also known as a Coriolis vibratory gyro because as the plane of oscillation is rotated, the response detected by the transducer results from the Coriolis term in its equations of motion ("Coriolis force"). A vibrating structure gyroscope can be implemented as a tuning fork resonator, a vibrating wheel or a wine glass resonator using MEMS technology.

Accelerometers, compasses and gyroscopes can be used to detect movement when a direction or speed of movement changes and are termed more generally as a class, "movement sensors" or "heading sensors", and are contrasted with the more limited motion sensors that rely strictly on accelerometry.

Sensors also include radio devices designed to detect radio traffic, such as a "ping" from a proximate radio device. Such sensors may detect received radio signal strength. Other sensors may be GPS sensors having a function of fixing a location in present time, and may by combined with other data such as by registering a radio contact, a sensor datum with a time stamp and a geostamp. Sensor or location data may be sent in real time without timestamp by the transmitting device, or may be recorded in a memory with a timestamp for later transmission. Sensor data may be stored in a rolling sensor data log.

Sensors may function as triggers when linked to an enabled machine having instructions for receiving and acting on a sensor output value, where the remote machine is linked to the sensor through a network having at least one node and at least one cloud host server, and where a conditional rule has been set up so that sensor data value(s) or trends may be logically evaluated, for example as greater or less than a threshold value defined by a rule and associated with a conditional executable function. Self-reporting of machine state, such as reporting a low battery level, is also included in the scope of contextual awareness supported by sensor data sensu lato. Preferred sensors are miniaturized so that they may be co-housed with the radio controller and encoder module and sensor activity is controlled to reduce power draw.

"Media" as used to store or transport information generally includes any media that can be accessed by a computing device. "Computer-readable media" may include computer storage media, wired and wireless communication media, or any combination thereof. Additionally, computer-readable media typically embodies computer-readable instructions, data structures, program modules, or other memory containing data. Data also may be stored or transmitted in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wireless media such as acoustic, radio frequency, infrared, and other wireless media, and wired media such as twisted pair, coaxial cable, fiber optics, wave guides, and other wired media.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers.

"Remote machine"—may be what is termed here an "effector machine", indicating that the machine executes a physical transformation, such as a garage door opener, or what is termed here an "actuation device" more generally, indicating that the device may be a display for displaying content to a user/subscriber, or may be enabled to transmit or broadcast to other machines and to recruit other machines and devices to actuate performance of designated functions.

A "server" refers to a software engine or a computing machine on which that software engine runs, and provides a service or services to a client software program running on the same computer or on other computers distributed over a network. A client software program typically provides a user/subscriber interface and performs some or all of the processing on data or files received from the server, but the server typically maintains the data and files and processes the data requests. A "client-server model" divides processing between clients and servers, and refers to an architecture of the system that can be co-localized on a single computing machine or can be distributed throughout a network or a cloud. Specialized servers are sometimes termed "Cloud Host" here and are used for operating the Internet and its services. The server may also serve the function of distributing an "Application" to devices in need thereof. Applications are intended to augment the functionalities of the smart device on which they are installed and operated and may also be required to access supplemental resources or databases of the server. Typically, a user or "subscriber" will register with the server's administrator when downloading and installing an Application from the server.

By installing what are called "applications" on a smart device, a developer can add functionality, and for example can supply an interactive display or graphical user interface (GUI) that permits the user/subscriber to navigate through and customize programmable features of a Bluetooth or XCB device that has been paired to a smart device, for example. In practice, an installable application can support a dashboard for easy access to all the XCB and BT radiotag devices operated by a user/subscriber, for quick adjustments to setup, and for viewing maps or plots of sensor data with trendlines and threshold monitoring that will result in automated actions taken by the system according to logic rules programmed by the user. The GUI typically may also provide any needed programming tools and support for creating conditional rules, geofence definitions, and other user customizations. The user interface may access a "user profile" stored locally or in a cloud host; the user profile may include user identifiers, radio unit identifiers, conditional rules programmed by a user, geofence definitions, and logs of sensor data uplinked from a radiotag.

"Computer" means a virtual or physical computing machine that accepts information in digital or similar form and manipulates it for a specific result based on a sequence of instructions. "Computing machine" is used in a broad sense, and may include logic circuitry having a processor, programmable memory or firmware, random access memory, and generally one or more ports to I/O devices such as a graphical user interface, a pointer, a keypad, a sensor, imaging circuitry, a radio or wired communications link, and so forth. One or more processors may be integrated into the display, sensor and communications modules of an apparatus of an embodiment, and may communicate with other microprocessors or with a network via wireless or wired connections known to those skilled in the art. Processors are generally supported by static (programmable) and dynamic memory, a timing clock or clocks, and digital input and outputs as well as one or more communications protocols.

Computers are frequently formed into networks, and networks of computers may be referred to here by the term "computing machine." In one instance, informal internet networks known in the art as "cloud computing" may be functionally equivalent computing machines, for example.

"Processor" refers to a digital device that accepts information in digital form and manipulates it for a specific result based on a sequence of programmed instructions. Processors are used as parts of digital circuits generally including a clock, random access memory and non-volatile memory (containing programming instructions), and may interface with other digital devices or with analog devices through I/O ports, for example.

As used herein, the terms "infer" and "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Probabilistic inferences lead to predictions, and are an arm of artificial intelligence (AI).

General connection terms including, but not limited to "connected", "attached," "conjoined," "secured," and "affixed" are not meant to be limiting, such that structures so "associated" may have more than one way of being associated. "Fluidly connected" indicates a connection for conveying a fluid therethrough. "Digitally connected" indicates a connection in which digital data may be conveyed therethrough. "Electrically connected" indicates a connection in which units of electrical charge are conveyed therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation.

Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the embodiments may be combined in any suitable manner in one or more embodiments.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure, referencing Aspex Eyewear v Marchon Eyewear 672 F3d 1335, 1349 (Fed Circ 2012). "Configured to", as used here, is taken to indicate is able to, is designed to, and is intended to function in support of the inventive structures, and is thus more stringent than "enabled to" or "capable of".

As used herein, the terms "include" and "comprise" are used synonymously, the terms and variants of which are intended to be construed as non-limiting.

The words "exemplary" and "representative" are used here to mean serving as an example, instance, or an illustration. Any aspect or design described herein as "exemplary" is not necessarily to be construed as preferred or advantageous over other aspects or designs. Rather, illustrations and examples given are intended to present concepts in a concrete fashion.

"Conventional" refers to a term or method designating that which is known and commonly understood in the technology to which this invention relates.

It should be noted that the terms "may," "can," and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

Poly-radio XCB devices function as portable radiotags, hubs, sensors, and radio contact reporters with power management synergy. In a first embodiment, the devices include a cellular modem with cellular radio antenna and cellular radio unit identifier (the cellular modem having a wake mode and at least one power-savings mode), a Bluetooth (BT) radio transceiver with antenna and BT radio unit identifier (the BT radio transceiver having a wake mode, at least one sleep mode, and an "always listening" standby mode); a processor and processor support circuitry. The processor support circuitry may include an alarm apparatus under control of the processor. The processor also has at least one wake mode and at least one sleep mode. Also included is a power supply with portable source of DC current. The device is further characterized in that following initialization, the cellular modem, the BT radio transceiver, and the processor are operably linked to the support circuitry and power supply, and are all configured to cycle to a sleep mode or standby mode as a low-power default condition with the exception that the BT radio receiver executes a listening mode at a duty cycle with such low latency that it appears as an "always listening radio". Generally, the processor is configured to cycle to a wake mode when one of (i) the cellular radio or (ii) the BT radio detects a radio signal that carries one or more symbols or frames that satisfy the characteristics of a "qualified wake signal". A digital correlator may be use to match the pattern of the incoming digital radio signal to a repertoire of qualified wake signals.

More generally, intercepted "qualified" BT radio signals may optionally be actionable or may be responded to because they are intended for or are addressed to the particular receiver that is listening, whereas "non-qualified" radio traffic is not generally addressed to the particular receiver but are intercepted incidentally by an "always listening" BT radio on one of the advertising or data channels during the course of regular passive scanning. We distinguish signals that conform to a model in which each signal has a sender and an intended receiver, from signals that may be broadcast in the open, and have both intended and unintended receivers.

In other embodiments, the "qualified wake signal" may be a pattern that emerges by meta-analysis of patterns in a fragment or fragments of BT radio traffic in the BT spread spectrum without a requirement for a coherent message structure or a specific addressee. ARQ, FEC, CRC, parity bit summation and other methods for ensuring reception fidelity are not actively enforced. Bit error rate BER may be assessed indirectly, but errors do not require correction. This non-stringent, connectionless meta-analysis is conducted in a passive listening mode and results in logging of radio contact data with timestamps. A chronology of "radio contact log data" is built up in a series of snapshots of radio traffic received by a radiotag. The interpretation of the patterns in the log data may include identification of segments of BT digital signals that are characteristic of a location. In some instances, the characteristic segments such as MAC addresses and access codes may be correlated with a whitelist of transceivers associated with a neighborhood or suite of rooms, but in other cases the characteristic segments may be significant by their alien content and structure, and while the signature-like characteristics are significant, they may be of unknown origin, identity and meaning. Meta-analysis of the BT radio envelope in a neighborhood or other local area may be classified on a "scale of familiarity" (SOF) or "scale of strangeness" (SOS) from a pattern associated with a home safe zone to a pattern associated with an alien and unsafe environment, and the device and system may use the SOF familiarity or SOS strangeness of the pattern in effecting security measures, in controlling pairing with new devices, and in flagging items that have been left behind or lost before the owner of the item knows that they are lost, for example. Items that attach themselves may also be flagged for inspection.

FIG. 1 depicts a system 100 with XCB radiotag 10, cloud host(s) 1111,2400, reference hub 20, and smart device 30. Also shown is a BT radiotag 12 (TD1). XCB device 10, illustrated here schematically, may be part of system 100 for tracking lost items, for collecting sensor data from networks of radiotags 10,12 and for enforcing safe zones independently or in conjunction with reference hub 20, for example.

Radiotag 10 and smart device 30 both have a BT radio and a cellular modem. Radiotag 12 and reference hub 20 have a BT radio. Reference hub 20 differs from radiotag 12, however, in that the BT radio of the hub is plugged in to the grid and is not power constrained. It may transmit and receive at +4 dBm or higher, whereas radiotag 12 is frequently limited to +0 or −4 dBm maximum power to conserve battery, for example. In addition to a BT radio, smart device 30 and reference hub 20 may have a WiFi connection or serial USB connection that permits data sharing with a network host 1111 or 2400.

BT radiotag 12 transmits BT radio signals that may be received by any of the devices 10, 20, and 30. Device 12 may join a piconet with BT devices 10,20,30 or with other BT devices, but is not able to form a radio link directly to cloud server 1111 or cloud portal 2400.

Device 10 differs from device 12 in several respects. Device 10 includes both cellular and BT radios, whereas device 12 has only a BT radio. Both devices include microcontrollers or processors, but because device 10 has a cellular modem, it can connect 1 via cellular radio to cloud host 1111 (shown here with a virtual private gateway 2400). This is defined as a "CALL HOME" 1, but in the interests of saving power, the cellular modem is used sparingly in tracking, locating, and uplinking data.

Data exchanges with the cloud from device 10 generally occur over a cellular connection 1 but may also be routed through reference hub 20 via a BT 4 or other WLAN radio link 5. Similarly, data exchanges with the cloud from device 10 may be routed through smart device 30. In other instances, data received 9 from a BT piconet or other IoT sensor device may be pooled in memory of the XCB device 10 or in the reference hub 20. Data may be shared over BT radio links 2,4,9 and then uplinked to cloud host 1111 via (i) a wired connection 7 from hub 20, (ii) via a BT connection 6 to a smart device 30 and then to cloud host 1111, or, (iii) via a direct cellular radio connection between device 10 and a cloud server 2400 for example. As used here, cloud server 2400 is representative of a class of cloud hosts termed "virtual private gateways".

Devices in network 100 that can uplink the BT radio layer to the cloud layer include smart device 30, XCB device 10 and reference hub 20. With the exception of a recent BTLE 5.0+ standard, BT data is generally transmitted by frequency-shift keying and hence cannot be directly injected into the IP packet data environment by which most cloud and smart device traffic is routed.

A CALL HOME 1 need not be a voice call—the call may serve to refresh a network connection, to get a location fix from the network, or to update the system with current location and status of the XCB device 10. And, if needed, a CALL HOME can generate a notification to a user/subscriber 11 or to a system administrator. Notifications are generally programmable by rules-based logic resident in device 10 or a system host and are conditional on some aspect of the current status or location of device 10, as will be described below. Thus FIG. 1 provides a general overview of the emergent properties of hybrid lost-and-found networks 100 combining BT and cellular devices in a 5G or LTE packeted network environment. A challenge for these devices is to define logic controls that limit when the cellular modem is used and how power savings states eDRX, DRX and PSM for cellular radio use are implemented to reduce battery drain while enabling "on demand" cellular network connectivity. Advantageously, whereas BT connectivity is hit or miss in many areas, cellular connectivity, once authenticated to a network, is much more reliable and structured over large areas of the planet, a key consideration in designing a global lost-and-found system 100.

Links 2,4,6 and 9 are BT signals (connected or extended advertising mode); links 1,3,5 are cellular connections. Link 7 is a link between reference hub 20 through a packet data network environment to cloud host 1111, as may be wired, wireless or a combination of both. Cloud links 1,7,8 are routed through the packet data environment of a 5G or LTE cellular network, through Ethernet connections, through WiFi, or through other wireless or digital networks. Link 8 is a link between smartphone 30 through a packet data network to cloud host 1111, as may be wired, wireless or a combination of both. Device 10 may connect 3 via a cellular link to smart device 30 in one embodiment and connect 1 to cloud host 2400 via cellular or WiFi wireless links, for example. Cellular links generally involve one or more cellular towers, base stations and other elements of a cellular telephonic infrastructure (not shown). WiFi links generally involve local and base station routers using IEEE 802.11a/b/g/n/ac/ah/ax and/or 802.15.4a/g WPAN radio technologies, for example.

BT links to device 10 may be optimized using dynamic gain. In making a response to a qualified incoming BT signal, device 10 will assess the RSSI, (or other index of apparent "path loss" such as RCPI or PER) of the incoming BT signal and can boost transmit power (broadcast power) if the incoming signal is weak or intermittent. Conversely, device 10 can reduce transmit power to save battery if the incoming BT signal from a linked transmitter is strong. A BT transducer operating in dynamic mode at a nominal 0 dBm can increase its transmit power to +4 dBm or +8 dBm if a received signal from a linked transmitter is weak, for example, and can decrease its transmit power to −4 dBm, or even −12 dBm if a received signal is strong, for example. In field use, a BT receiver may experience intermittent signal loss as the RSSI drops to a threshold of about −100 dBm or lower, but in order to restore a BT link or overcome edge effects, the BT transceiver can increase transmit power temporarily, and send a message that includes TX POWER as a field in the packet payload. The receiving device can calculate path loss from the transmit power minus the received signal power, and can increase its transmission power to compensate if needed. The Apple iBeacon, Eddystone, and other beacon formats include a native field with 8 bits for sending TX POWER, where TX POWER is defined as the nominal received power at 0 meters, in dBm, and the value ranges from −100 dBm to +20 dBm at a resolution of 1 dBm. The value is a signed 8-bit integer as specified by the TX POWER LEVEL characteristic in the BT SEC Specifications. As a rule of thumb, the experimentally determined output as measured at 1-meter distance corresponds to the transmitted power minus 41 dBm. A software development kit (SDK) can be used to implement dynamic gain in BT beacons so as to reduce energy consumption, for example. The kit may include a library or table of path loss-versus-distance calculations based on known factors such as type of phone and environment (such as indoor versus outdoor) by which dynamic assignment of gain can be implemented to improve connection quality while minimizing unnecessary power consumption.

Cloud services are provided by cloud host 1111, optionally in cooperation with virtual private gateway 2400. Cloud services can be accessed via cellular radio from device 10, via smart device 30, represented here as a smartphone, or via wired services. The cloud host may serve as a repository for sensor data and user profiles, for example, and may have much greater resources for analytics than the portable devices.

Reference hub 20 may be in cloud communication via WiFi for example, and smart device 30 (here represented as a smartphone) has conventional connectivity by cellular and WiFi to the IP packet data environment of the World Wide Web, termed here a global area network (GAN). Smartphone connectivity through GSM, LTE-M and 5G networks is ubiquitous and of interest here is the novel capacity to deploy personal and community radiotag internodes 10 having both cellular and BT network links.

Signals received on the BT radio of an XCB device 10 may cause the cellular modem to be activated when context dictates the need for a CALL HOME 1, for example to establish a location fix, to communicate status to a cloud host 1111,2400, or to generate a notification to user equipment 30. In other instances, an eDRX cycle at 2.5 min intervals or a PSM cycle at 10 min intervals may be feasible within the energy budget of the XCB device' battery, but in most instances, further limits are needed to achieve a useful field life as defined by a battery size and discharge.

The cellular radio is packaged as a modem that stores the cellular network connectivity and synchronization data including IMEI and ISMI data. By combining the two radios in one device, the main disadvantage of cellular power saving mode (that the radio is unresponsive in sleep mode) is overcome because BT radios have a "flickering" standby mode that is "always listening" (FIG. 8A) for radio traffic at low power even when the rest of the device 10 is in deep sleep. The latency of the system is adjustable, but can be satisfactorily balanced by making millisecond switches from passive listening to standby and back in a continuous repeating loop (FIG. 8A), and increasing active power to one or more device components if and only if relevant radio traffic is intercepted.

The hybrid radio networks enabled by community deployment of devices 10 and 20 result in other emergent properties of system 100. For example, the virtual geofence 21 (dashed box, FIG. 1) formed around reference hub 20 may be stationary and may be a radio tether: a repeating broadcast that defines a stationary radio geofence. The signal quality of the repeating broadcast, as received by the XCB radiotag in need of location monitoring, is an indication of the integrity of the radio tether: i.e., poor signal quality may indicate a deterioration or breakage of the radio tether as for example if the XCB radiotag leaves the safe zone area within the radio geofence. This enables an owner to implement location services such as monitoring a pet in a fenced yard, and also provides a community resource for creating a BT radio map of neighborhood (the BT radiobeacon "lighthouse" effect).

As a basic tracking system 100 for finding lost objects and radiotagged items, aspects of the system that are relevant include: (i) BT radio proximity sensing functions and BT proximity locator services toolkit; (ii) radio contact data collection, data entry and mapping functions, (iii) network servers with relational database functions and some level of machine intelligence, (iv) open access to global IP packet data networks, and (v) a cellular remote locator services toolkit. The systems may also include one or more private IP networks for providing virtual private gateway (VPN) functions. Synergy is manifested in the merging of the very particulate local network(s) of BT radios capable of ad hoc piconets, micronets and local nets combined with the cellular network(s) that can span 2 miles or 20000 miles over transoceanic cables and orbital satellite relays, for example.

In more detail, when BT signals from reference hub 20 are used to define a radio safe zone 21, the loss or decay of the BT radio envelope (such as measured by RSSI) around a mobile radiotag 10 is an indication of increasing distance, and if the BT radio signal is lost, the device 10 may be configured to initiate a CALL HOME 1. Data reported to the cloud 1111 or to a virtual private gateway 2400 is used to assess the location of radiotag 10 and to issue notifications to an owner 11 of the tagged asset or to make other interventions if the location relative to the geofence is not in compliance with a rule programmed by the owner/subscriber. BT radio alone is not sufficient for establishing a location fix where local area BT radio traffic is absent. GPS radio is not conveniently installed in BT radiotags because the process of calculating GPS location is very energy intensive. Thus the capacity to make a network assisted cellular location fix is a compelling value of XCB radiotags.

As illustrated here, reference hub 20 may function as a mobile or stationary radio geofence. The hub 20 may include means for monitoring radio signals from radiotag 10, or vice versa, and may also monitor signals from radiotag 12 and from smartphone 30, for example. Hub 20, radiotag 10, and smartphone 30 may convey notifications, commands and data to and from compatible radio devices 10,12,20 and 30. In embodiments, the system 100 is configured so that any detection of a signal from any of radiotag devices 10,12 outside a designated "geofenced" area 21 will result in an alarm or a notification to a responsible party 11. If device 10 loses the signal from reference hub 20, it may be triggered to CALL HOME and to obtain its location independently using its cellular radio. BT radiotag 12, on the other hand, is dependent on system 100 to track its location. The relative proximity of device 10 and 12 can be estimated from the strength of the BT radio signals between the devices, and a rough position can be refined by triangulating BT signals between smartphone 30, the hub 20 and device 10, for example. Yet surprisingly, BT device 20 plays an important role in networks of this kind because its spread spectrum signal and those of other BT devices define a BT radio topology or envelope that enables power management of the cellular radio in device 10.

Figure 15A:
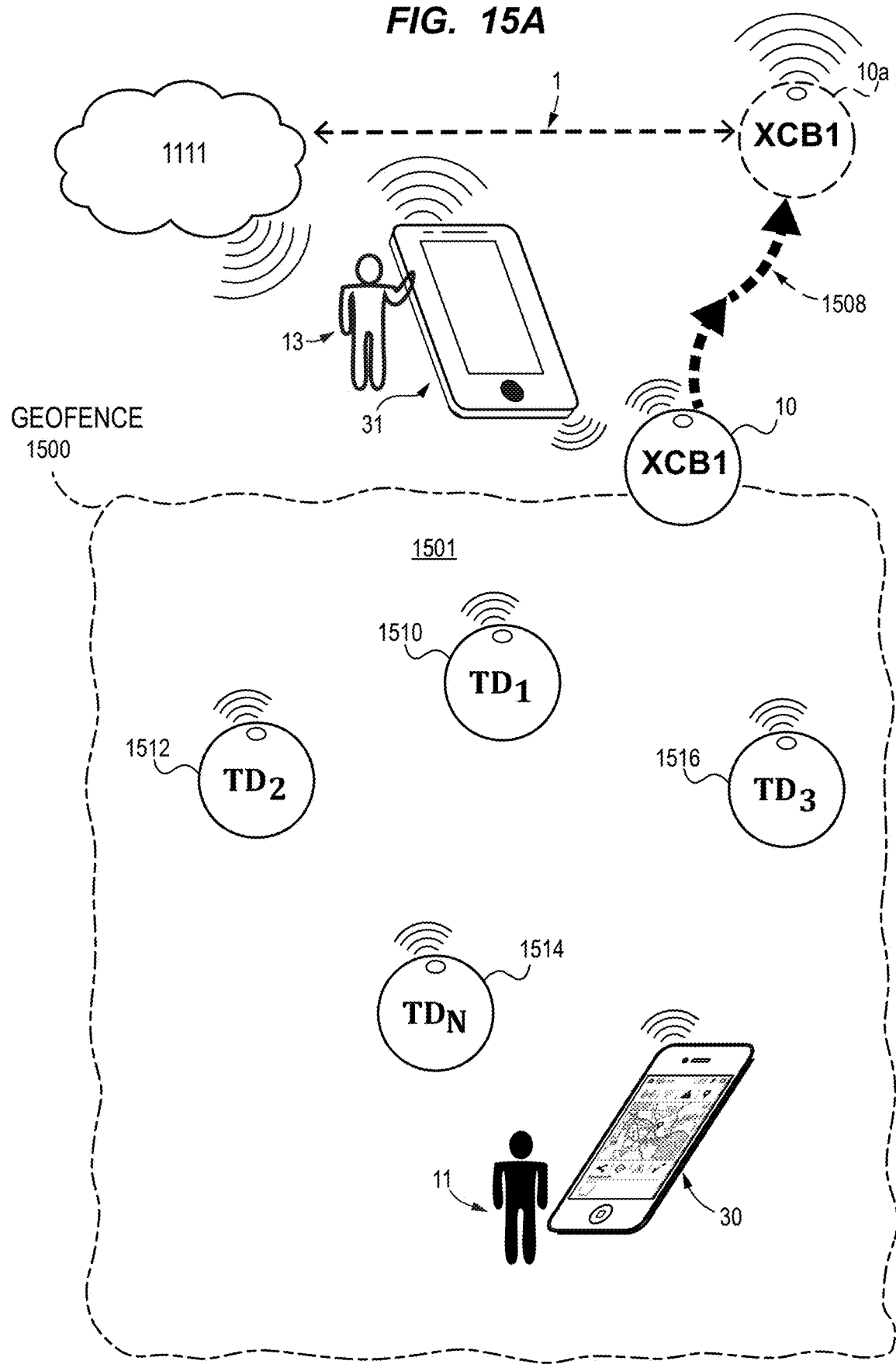
FIGS. 15A and 15B are views of location tracking applications using safe zones.
Figure 15B:
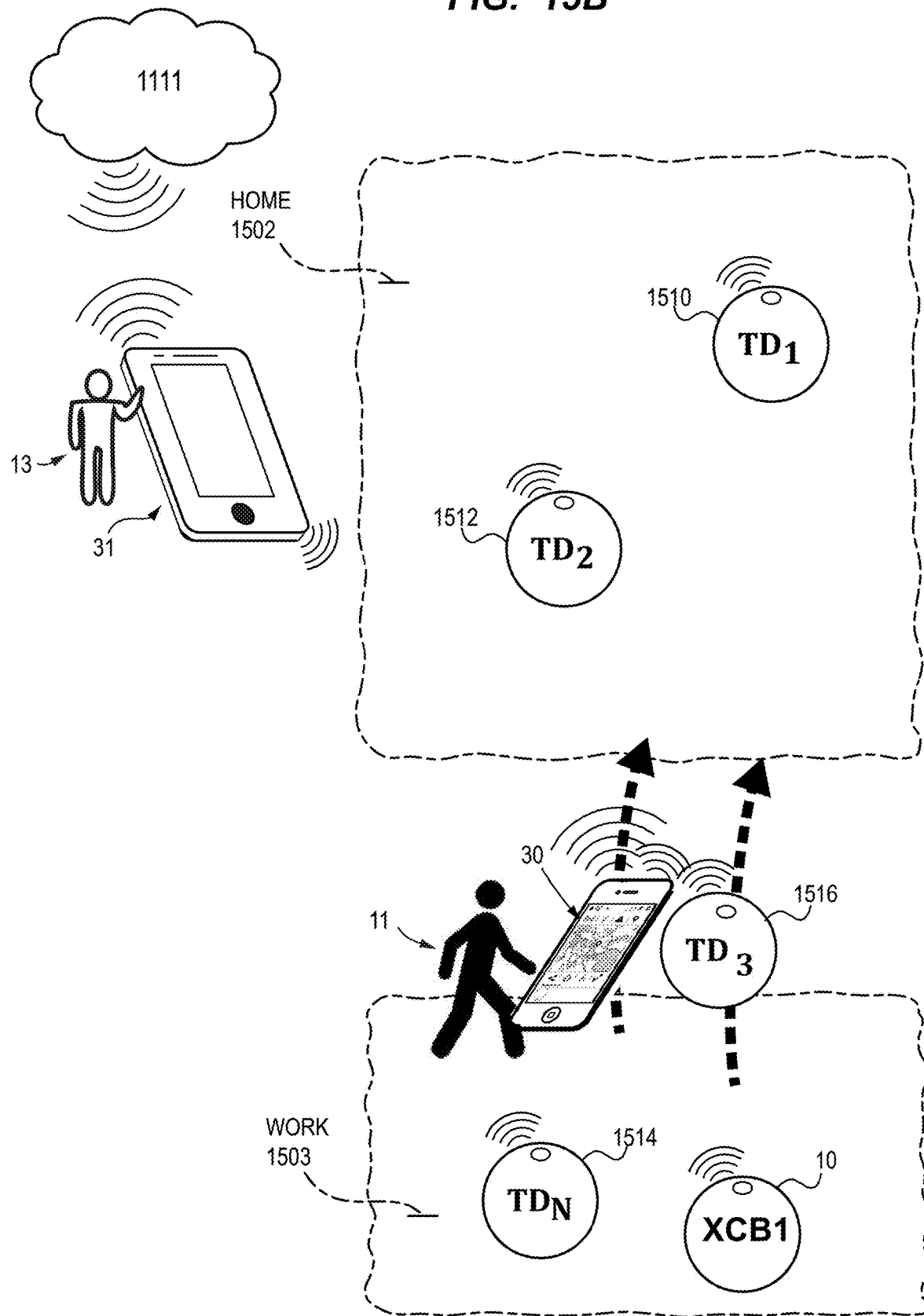
Figure 15C:
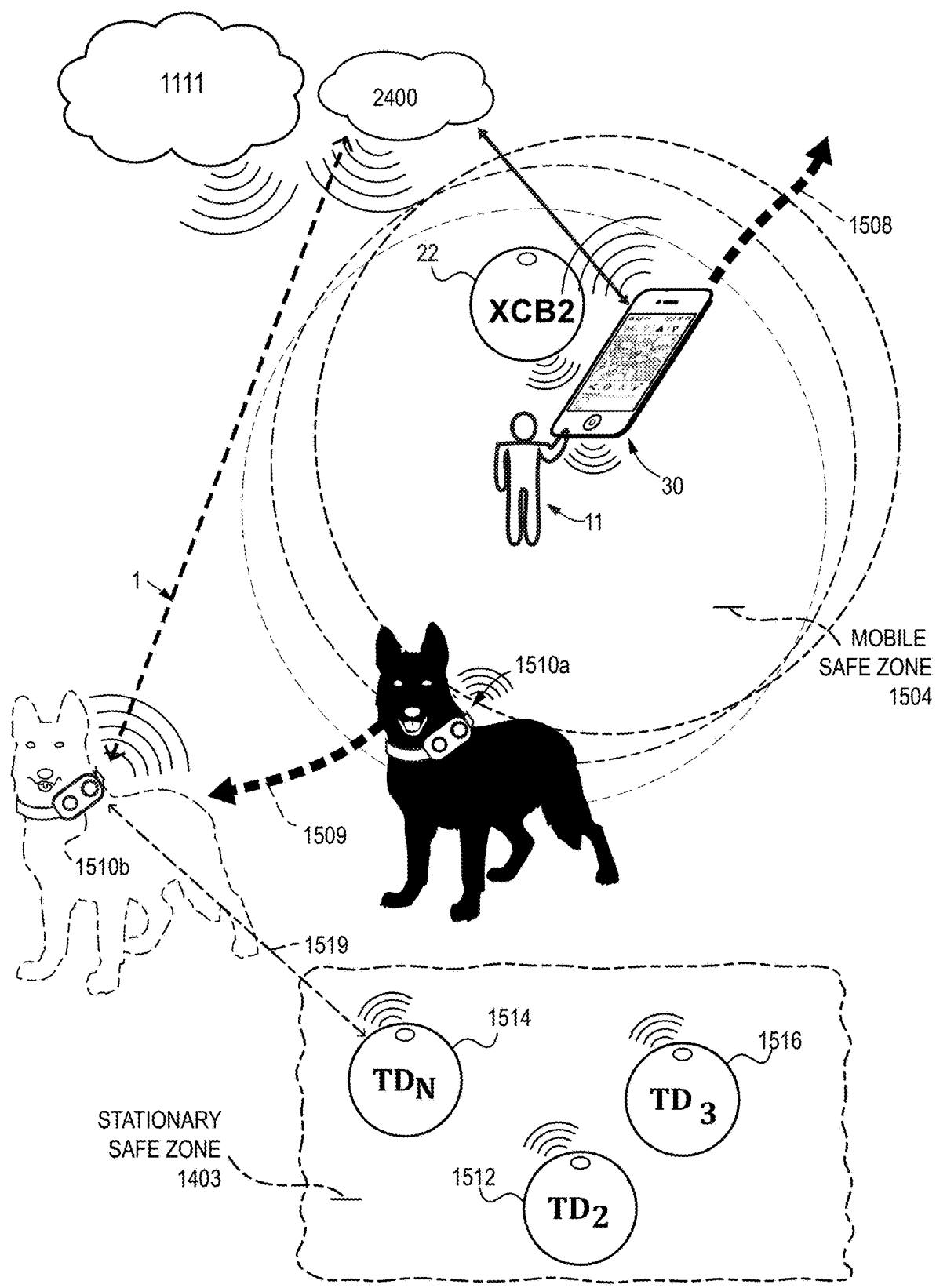
FIG. 15C extends the concept of a mobile radio safe zone as relate to pet location monitoring services.

In FIG. 15C, a portable XCB device 22 (XCB2) is centered in a mobile safe zone 1504. The device is active as a mobile radiotether or mobile geofence. In this embodiment, the device 22 defines a mobile safe zone or geofence 1504 that travels with owner/subscriber 11. Radio geofence 1504 is a subdomain of the BT radio envelope and radio tether of BT transceiver 22. Accessory XCB radiotags like device 1510a may be tethered to mobile hub device 22. The enforcement of the geofence is further enhanced by the cellular connectivity of device 1510a, which functions as a radiotag, such as for a pet collar, asset tag or embedded device. Mobile device 1510a may be operated in cooperation with the cloud server 1111 or with companion smart device 30 to enforce the safe zone that travels with user 11. If the device leaves (arrow 1509) the safe zone, as for device 1510b (dog collar with phantom lines), a key capacity is the ability to turn on the cellular modem when needed to find or track a lost asset. The goal of any logic is to minimize any power loss by eliminating unnecessary cellular radio traffic, but to acquire or reactivate a cellular network connection to device 1510b if the radiotag outside the safe zone 1504, for example because the owner has gone in direction 1508, and dog has gone in direction 1509. In an ideal situation, the radiotag will know that the dog has gone astray before the owner does and will initiate a CALL HOME 1 and cause an alert to be sent to the owner's smart device 30.

Referring again to FIG. 1, in other embodiments, reference hub 20 may be a conversational hub, such as the smart home hubs sold as Google Assistant, Echo Plus, Bixby, Siri or Alexa. The computing resources of the cloud have been interfaced with an XCB reference hub 20,22 having a speaker and microphone and a voice-cloud interface for asking simple questions. These plug-in devices 20 have BT radios and are useful to monitor radio proximity and to interact with radiotags 10, 12 1510a.

Radiotags 10 may be used in conjunction with BT radiotags 12 to keep track of things. Of themselves, autonomous ad hoc BTLE networks are unique for several reasons, i) because BTLE devices are small and are readily embedded in wearables, in things, or even organisms, ii) because they are digital radios capable of energy-efficient radio communication at 0 dBm or less, and iii) because the radio devices in the network are true peer-to-peer (P2P) networking tools in which one device can act as master in one or more networks while simultaneously acting as slave in multiple other networks, and the roles are interchangeable. While initially developed for pairing accessories to cellphones (Ericsson Mobile, Stockholm), BT pico- and micronets have been discovered to have surprisingly useful emergent properties because they dispense with base stations and access points and spontaneously form autonomous FH-CDMA peer-to-peer (P2P) mesh networks. There is no single point at which transmission in a network can be disrupted. By hybridizing BT networks with XCB networks, yet another level of emergent properties is achieved.

The BT radios are entirely self-sufficient digital radios and can pick up BTLE transmissions from up to 1500 ft away. The cellular radios are native to cellular networks, and can quickly be located anywhere around the globe. Having both together in an XCB device 10,22,1510a provides a dramatic increase in search granularity, the cellular radio providing a general location and the BT radio permitting the owner of a lost article to activate a Bluetooth Proximity Locator Services Toolkit so as to locate the lost article by sight, sound, or feel, as will be described below, or even to display a detailed map with the location of the lost radiotag on a companion smartphone.

To enable user programmability, the system 100 may include an application installable on smartphone 30. Lost-and-found services are achieved with one or more of radio devices 10,12,20 when used in combination with software installed by user 11 on a smart device 30, for example. Related tracking functions are enhanced by the participation of a cloud host 1111, but in many cases, only radiotag 10,12 and active hub 20,22 are needed to monitor asset location within a radio perimeter. In some instances, smartphone 30 can act as a hub. The software supplied to user 11, when installed on smartphone 30, functions to relay sensor data and radio contact reports to the cloud host, for example, and may also function to receive notifications sent to user equipment 30 and provide a user interface for setup and customization of features of the lost-and-found network 100. Webpages are accessible using a smart device 30 that may include administrative tools for navigating through, managing, and customizing programmable features of a Bluetooth or dual radio device 10,12, and for selecting notification instructions and preferences, entering user information, updating or upgrading subscriptions to cloud services, and so forth. The smartphone need not be in a user's possession to be accessible by radio and many functions of a smartphone can be accessed in background while it remains in the user's pocket.

The application generally supports a graphical user interface (GUI) configured to monitor, track or help locate one or more radiotagged assets such as keys, TV remotes, briefcases, wallets and other valuables. Devices 10 may also function independently to keep track of children and pets, and one can be placed in a car so that the car can be found if the user 11 is having a "senior moment" or is simply unsettled after a long day and doesn't remember where the car is parked. Synergy is immediately apparent in that the devices 10 may include sensor functions such as for detecting and alerting if a child is in hot car or has had a fall, for example. Device 10 may also establish a mobile safe zone when placed in a vehicle where access to WiFi is not available.

The cloud is capable, with permission, of controlling radiotags 10,12, for example by causing one to go into an alarm state as a convenience in locating a missing asset. But the opposite is also true, the radiotags can control functions of the smartphone 30. Functions such as taking a picture, responding to an email, sending a hug to a loved one, and indirect or direct control of remote machines, such as opening a garage door on the way home, starting the coffee pot from bed, turning off the alarm clock without getting up, and checking that all the doors in the house are closed and locked can be programmed into the system 100 with the radiotag(s) 10 functioning as both a sensor and an actuator. In some instances the XCB radiotag will be embedded in the effector or remote machine.

Figure 2A:
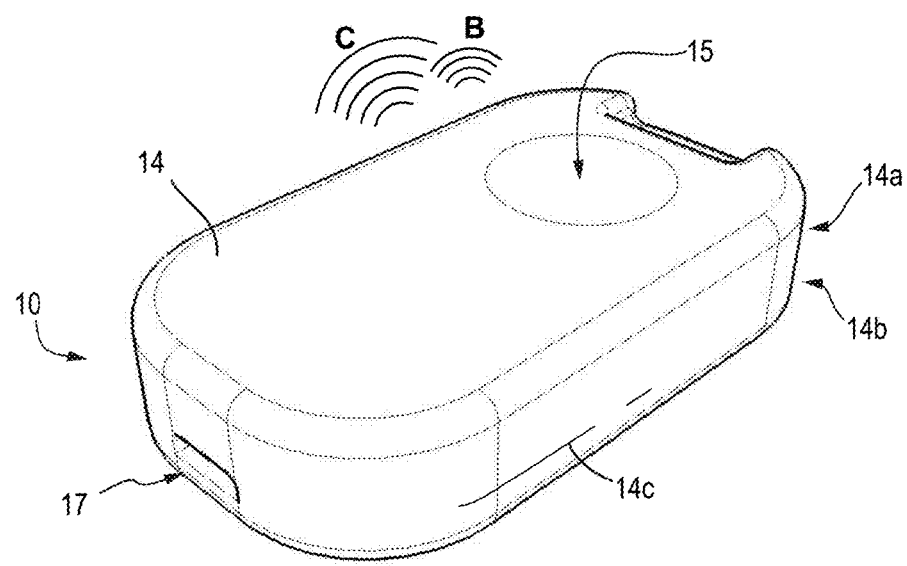
FIG. 2A is a sketch of a first XCB device 10 containing a Bluetooth and cellular radio pair with button switch on a keychain. In these drawings, signals from the radios are indicated by concentric arcs that connote electromagnetic waves, wider for cellular radio signals C and narrower for BT radio signals B.

FIG. 2A is a sketch of an exemplary dual-radio XCB device 10 containing a combination Bluetooth radio (B) and a cellular radio (C). The device includes a radiolucent hard case 14, shown here with clamshell construction with upper case member 14a and lower case member 14b joined at seam 14c. Optionally a battery access port may be provided on an undersurface of the case 14, or in other embodiments the devices may be sealed and may be inductively rechargeable. A USB port 17 for recharging and data transfer is shown at the back lower end of the device.

XCB devices 10 include a battery or mobile power supply and supporting circuitry as will be described below. The case includes an annulet or slot 16 (FIG. 2B) for receiving a lanyard or chain. One skilled in the art will readily appreciate that there are various ways of associating a radiotag with an asset in need of tracking or likely to get lost. Also shown is an actuator or switch 15 formed on an upper surface of the case. The switch 15 may function as a "homing button" to cause the device to CALL HOME when the switch is depressed, as will be described below. These features are representative of radiotags that embody aspects of the invention but are not to be construed as limitations of the inventions as claimed.

Figure 2B:
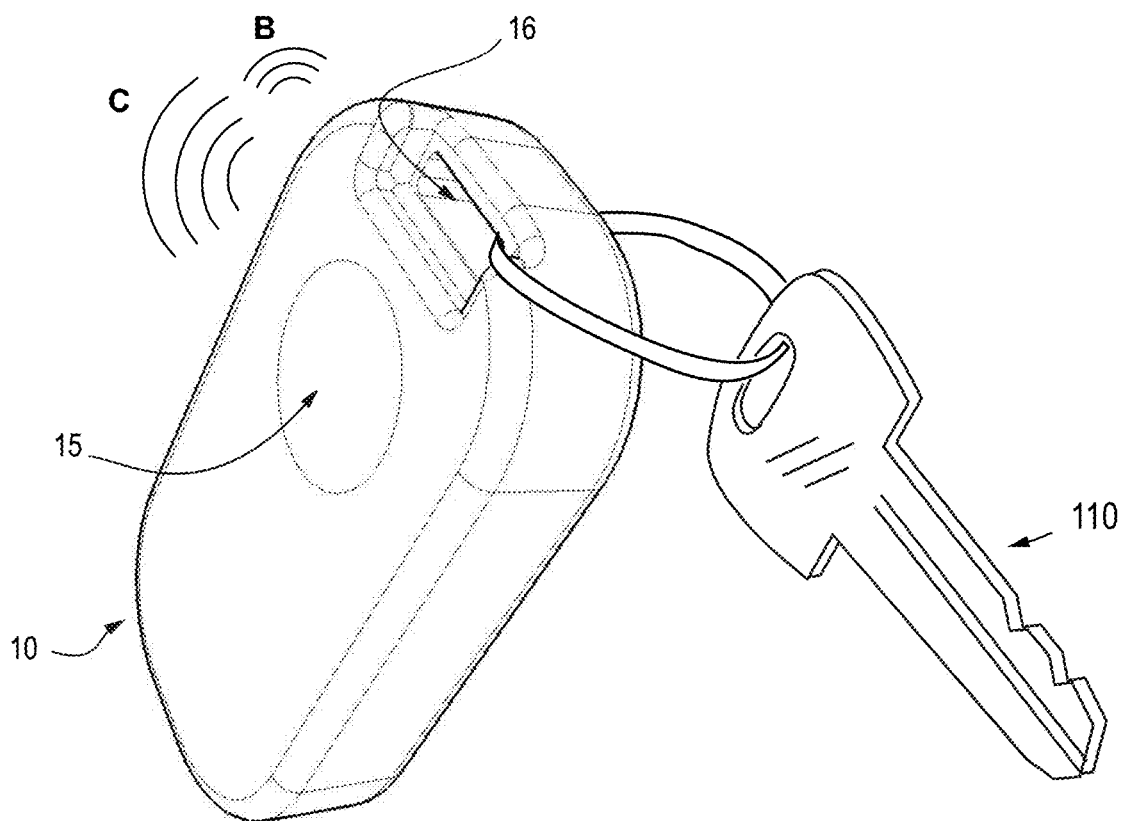
FIG. 2B is a perspective view of a first XCB radiotag 10 with button and keychain.

FIG. 2B is a perspective view of first XCB device 10 with keychain or lanyard through annulet 16. In these drawings, signals from the radios are indicated by concentric arcs that connote electromagnetic waves, wider for cellular signals (C) and narrower for BT radio signals (B).

Figure 2C:
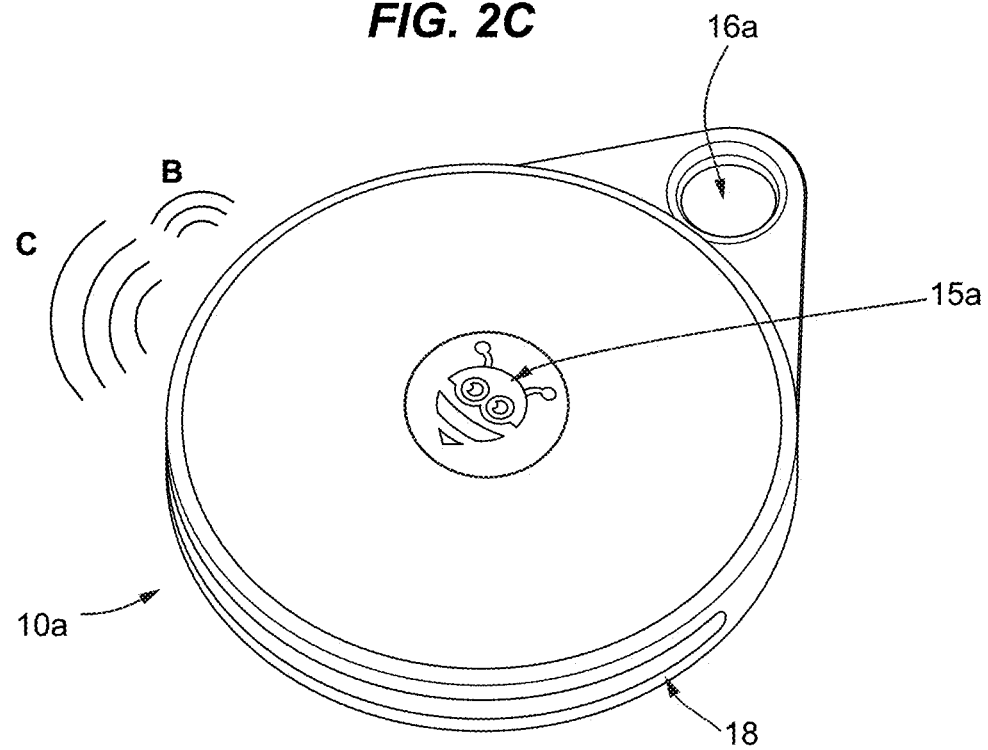
FIG. 2C is a CAD view of a second XCB device.

FIG. 2C is a CAD view of a second XCB device 10a with annulet 16a for keychain or other attachment. The device includes cellular and BT radio modems with multiband antenna in a sealed package. Inductive charging is achieved with a Qi or NFC antenna on the base of the device. In addition to the center activation switch 15a on the top of the case, there is an RGB-LED inlaid on the wall of the case that extends in a band along about a 180 degree arc opposite the tabbed annulet. The RGB-LED may be segmented and may operate in a pulsatile or function specific mode to provide feedback during user setup and interactions. Also enclosed is a speaker with resonant voicebox and microphone. Battery life ranges from weeks to months depending on the frequency of cellular network uplinks and the latency in the BT scanning mode.

Figure 3:
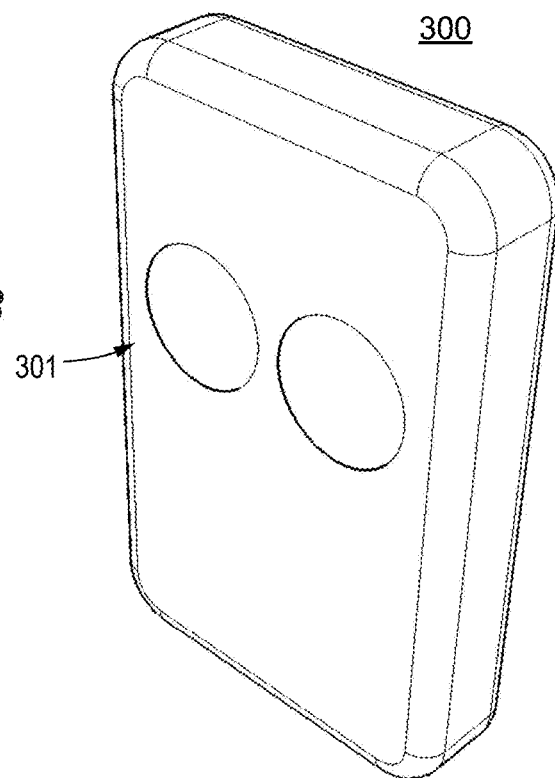
FIG. 3 is a view of an alternate XCB device with pocket user interface.

FIG. 3 is a view of another XCB device 300 with alternate form factor and user interface 301. The user interface can include button switches, LEDs and a buzzer or speaker, for example. The piezo element may be suitable as a hypersonic whistle for pet obedience training, if desired, and the radiotag may be attachable to a pet collar. In other use cases, the device slips into a pocket of a jacket and keeps tabs on other BT radiotags under control of a user.

Figure 4:
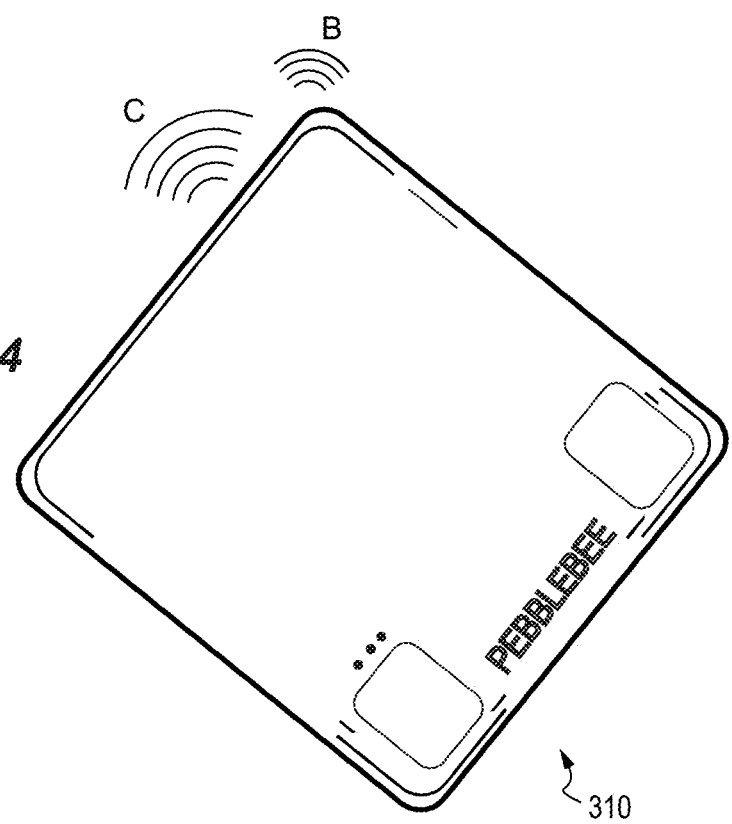
FIG. 4 is a view of a card-sized wallet device with basic user interface.

FIG. 4 is a front view of an XCB finder device 310. The device is operable on battery power and includes a battery access port (reverse side, not shown). Optionally the device may include a USB recharging port or an inductive recharging circuit, for example. The device may include user interface elements selected from button, LED, speaker, or even a microphone. In this instance the body form factor is card-like and may be inserted in a wallet or daybook, for example.

Figure 5A:
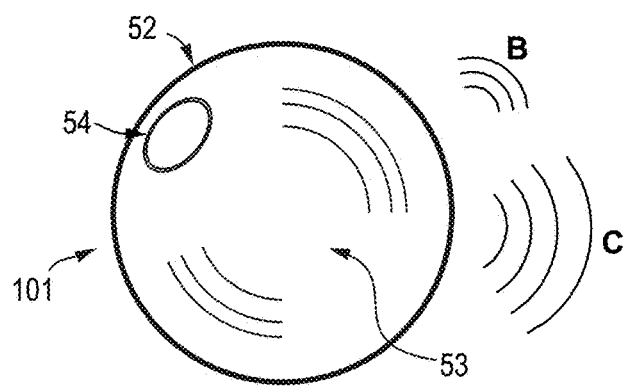
FIG. 5A is a view of an XCB radiotag with annulet for mounting on a chain or link.

FIG. 5A is a view of an alternate discoid device 101 operable on battery power. The device includes a sealed shell 52 with annulus 54 and potted internal components for weatherproofing. Optionally, the battery can be rechargeable, such as by inductive recharging. The device may include a multifunction capacitive or diaphragm-type button switch (53, center surface), for example.

In one embodiment, the button switch 53 functions to trigger a CALL HOME when pressed. For example, a passerby, who is able to approach a lost dog or who has found a radiotagged asset, may press the button to activate a notification that goes out to the owner, and the notification may include an updated location. In some instances, a system that monitors radio signals from the device may offer other asset management services. Similar applications are readily apparent in managing lost children and assets generally, and will be described in more detail below.

Figure 5B:
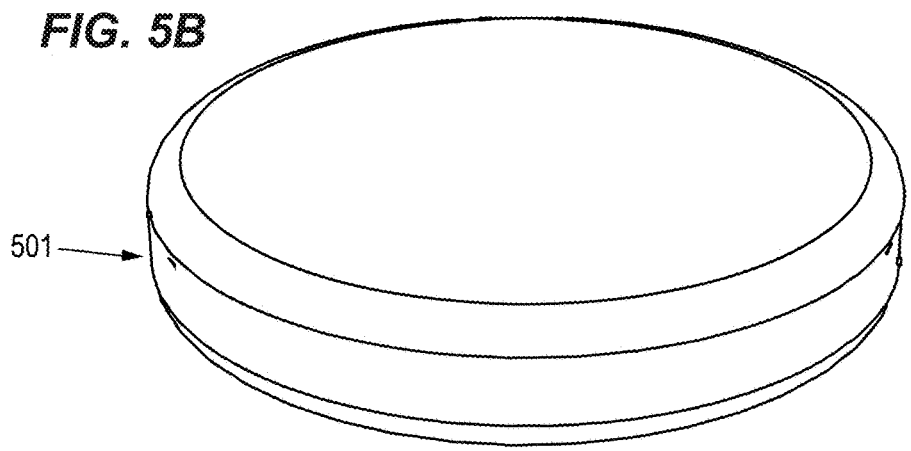
FIG. 5B is a view of a sealed XCB device having a disc shape.

FIG. 5B is a puck-shaped XCB radiotag 501 and includes edge-mounted touch capacitive switches and a translucent body for viewing the activity of an RGB LED assembly within the sealed case. An NFC antenna or "Qi" charging antenna is provided along with a 2400 mAh LiPo battery, for example. The case functions as a resonant diaphragm with internal speakers and microphones in a noise-cancelling array. Dual-band antennas are configured for BT and WiFi at 2.4 and 5 GHz and a multi-band LTE antenna are connected to BT, WLAN and cellular radio modems under common control of a BT modem and microprocessor. A battery, SIM card and micro-SSD card slot are accessible in a threaded door on the underside of the device. The device connects to a user's smartphone for access to a more detailed user interface, and tracks user radiotags that have been registered with the device. The device will also respond to voice inquiries and make voice notifications, for example if one of the user's radiotags is slipping off its radio tether.

Figure 6A:
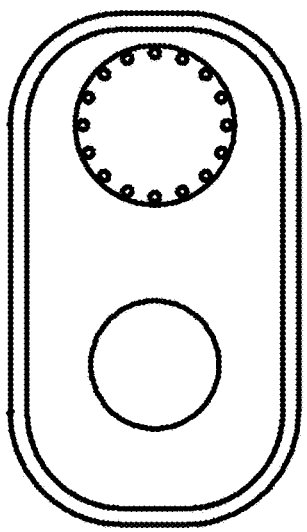
FIGS. 6A and 6B are plan and perspective views of an XCB radiotag with user interface.
Figure 6B:

FIGS. 6A and 6B are views of a contoured device 601, pocket sized, that includes an XCB radio pair, a speaker, microphone and multifunction switch accessible on front case. The device may include a mounting port for receiving a strap or lanyard and is intended as a minder for tracking children and pets. The BT radio (B) monitors local radio traffic and reports to a system host periodically. The device learns familiar radio environments and issues notifications if the radio environment manifests characteristics of an unfamiliar or alien location or unexpected presence of strangers. Voice SMS messaging is enabled by pressing the switch once to receive a voice message and twice to record and send a message. Each voice SMS message is recorded as a digital file, transmitted, and the message is unpacked for replay at the receiving device. The location of the device can be monitored remotely using periodic actuation of cellular network-assisted AGPS and will report location and heading on a map to a parent smartphone by subscription.

Figure 6C:
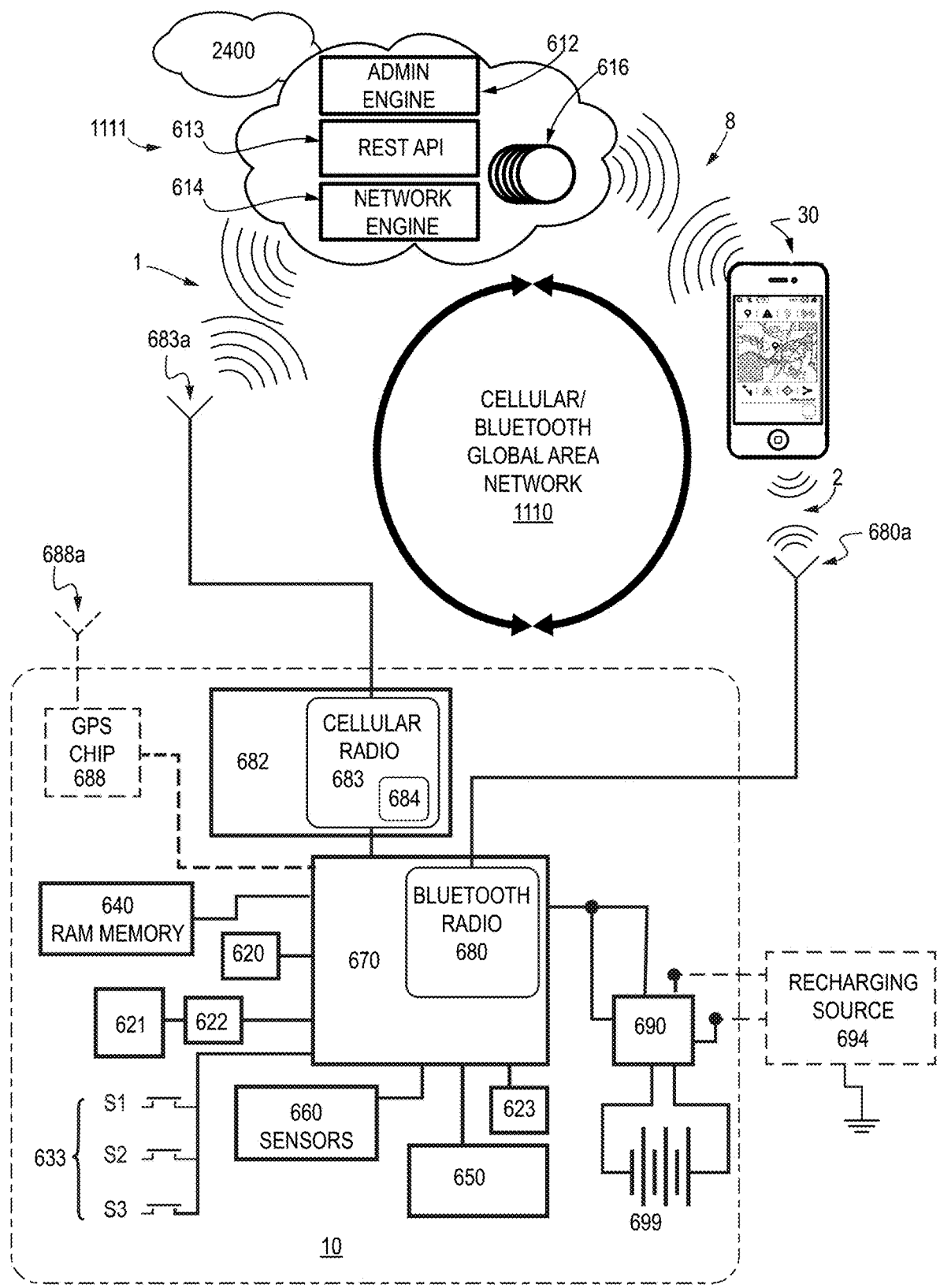
FIG. 6C is a network schematic showing an XCB radiotag 10 and cloud host(s) in a combined BT and cellular global network 1110.

FIG. 6C is a network schematic showing XCB radiotag 10 and cloud host(s) in a combined BT and cellular network 1110. Global area network (GAN, 1110) is built from a cellular network, a Bluetooth network, and a network of cloud hosts 1111. A single radiotag 10 and a single smartphone 30 are shown for simplicity but each layer of the network can include many radio units and computing machines.

The cloud host 1111, broadly, is a virtual network and may also include one or more virtual private gateways (VPG, 2400) with private IP addresses. In a preferred embodiment, CALL HOME traffic 1 is addressed to a dedicated IP address of a VPG. Use of private IP addresses with a VPG 2400 reduces any security concerns with remote location tracking of a child, for example, but the rate of battery power loss due to of inadvertent, unauthorized, and network-incidental messaging is also reduced. We have published our findings that unsolicited cellular radio traffic on a typical commercial network consumes an enormous amount of power, and use of a VPG is an effective solution (Yasukawa et al. 2019. Waking and Interacting with an IoT Device in eDRX Mode on Demand), said non-patent document being incorporated in full by reference for all it teaches.

In one embodiment, the cloud administrative host 1111 uses an IP address to access the device 10 by the BT radio modem 680 or by the cellular radio modem 682, depending on which radio(s) are active. For security, the radiotag 10 may be operated as a cellular device accessible by an IP address on VPG 2400 to find and track the whereabouts of the device via a dedicated and secure 5G private network or gateway VPG.

Data uplink and downlink occurs in a packet data network, and may conform to TCP/IP or UDP protocols. Data transfer by SMS messaging is also enabled. Data may include embedded AT commands to the cellular modem 682 with cellular radio 683, for example, or a qualified BT or cellular signal may cause the processor 670 to generate an AT command to the cellular modem. Packets include a header and payload as known in the art.

Location data is of particular interest in a lost-and-found application. The device 10 may include one or more logic triggers that causes a cellular network connection request, direct or indirect, and the upload of data. We have termed this a CALL HOME 1. The trigger can be sensor data such as accelerometry or button data, a timer, or may be a trigger inherent in the topology of the physical web, for example. A direct upload of location data to the cloud host 1111 or VPG 2400 can be requested by the network or by the device 10, either when the cellular modem 682 executes or responds to a paging window call or when the BT radio 680 receives a cellular connection request via BT radio signal 2. At any time there is a BT connection with a piconet, in which there is a cellular-competent device 10 in the piconet, indirect uplink of data to the network may be executed over BT radio links 2. Generally smartphone 30 will forward the data to the cloud host via network connection 8.

In one embodiment, the SIM module 684 may serve to establish an exclusive private IP address for device 10. VPG network 2400 may collect location information periodically from cellular modem 682 to create a "trail of waypoints" that track locations of device 10.

The cloud host also adds a layer of artificial intelligence. By supplying and aggregating data from sensor networks composed of devices 10,12,20,30, dynamic control of cellular radio activity in the individual devices 10 is enabled. As internodes between cellular and BT mesh networks, devices 10 serve an important role in bridging connectivity over much larger areas, while also preserving the proximity and open intimacy that characterizes BT radio. The cloud host may be useful in storing data and preferences, in looking up device identifiers, in making notifications across the Internet, in making long distance connections, and in aggregating large amounts of sensor data. With increasing use of machine intelligence, aggregated sensor data in combination with geostamps and timestamps can be the source of valuable warnings and notifications addressed to particular user/subscribers or the community as a whole. The deployment of XCB devices 10 by a community results in emergent properties of a system that cannot be predicted from the sum of the individual parts. Synergy is immediately apparent in that location and sensor information can be uplinked directly to a cloud host via the XCB cellular radio (when powered on) and at all times shared with local networks of Bluetooth devices via the BT radio set. Location data kept current in this way provides lost-and-found systems with the capacity to downregulate or upregulate location collection as a dynamic process that responds to variable levels of uncertainty in the system and consumer needs. Data may also include logs of radio contacts intercepted by device 10, and when aggregated with timestamps and geostamps, the radio contact log data is useful to establish situational awareness by which a user in possession of the data can determine whether the radiotag is where is supposed to be or not, and if not, then to find and track it as needed.

The cloud host server 1111 may include a REST API 613, for example. Once authenticated, the cellular modem 682 with radio 683 can uplink data to the cloud host 1111 and receive commands and data. Using an API 613, the cloud host parses sensor data, radio contact records, extracts relevant information, and combines that information to generate executable commands that may take the form of a notification, a warning, or an intervention. User programmable commands that are conditional on sensor data, location, time or other inputs may be stored in user profiles in database(s) 616 and accessed at administrative engine 612. Any notification or executable command is handled by the network engine 614 and may involve one or more smart devices 30 or other remote machines as intermediaries, or may be delivered directly to the device 10 during a paging opportunity when the cellular modem 682 is receiving or directly to the device 10 in a BT signal via BT radio 680.

Figure 41:
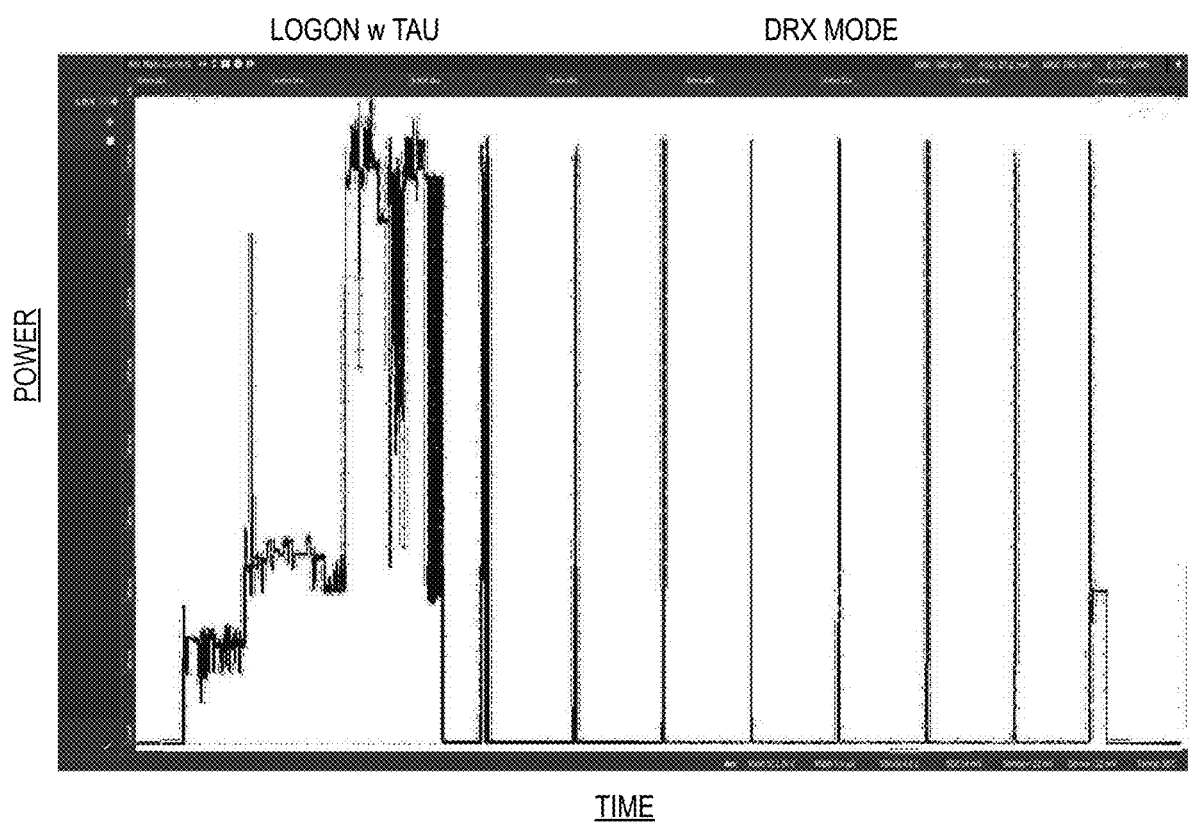
FIG. 41 is an oscilloscope image of instantaneous power consumption during a connection event followed by a series of paging opportunities in one of the DRX modes of the cellular modem.

Cellular modem 682 includes cellular radio 683, which is connected to antenna 683a. Modem 682 may be for example a Monarch LTE GM01Q (LTE-M/NB-IoT such as the SQN66430 SiP) or NBO1Q (NB-IoT) LGA module with integrated SIM platform (Sequans, Paris FR) for machine data exchange. Monarch SOCs such as the SQN3330 generally includes an integrated cellular RF front end, but not BT radio. Sequans modules typically support a variety of LTE bands for worldwide connectivity and consume less than 1 µA of power with PSM and eDRX modes and providing for batch data transmission in a centimeter-sized combination. An example of the power requirements of a Sequans cellular modem is shown in FIG. 41.

Generally, the information needed to authenticate to the cellular network is stored in a SIM unit 684 that is part of cellular modem 682 and can also be used for higher quality encryption of data. Cellular networks are closed networks and connections are subject to higher authentication security administered by the network. All cellular radio devices are authenticated by IMEI and IMSI information contained in a SIM module, as known in the art. A dedicated control frequency is used for coordinating the connection of user equipment (UE) to the network.

GPS chip 688 is shown with a separate antenna 688a. Antenna 680a is tuned for BT spread spectrum transmission and reception. Notifications may be received via either the BT radio 680 or the cellular radio 683 (with antenna 683a), and may result in a display such as activation of speaker 621 via acoustic driver 622. Optionally, a microphone 620 is included so that responses to notifications can be sent. Both the BT radio and the cellular radio are capable of transmitting and receiving voice signals.

The processor 670 can be programmed, or otherwise configured, using software resident in ROM (such as EEPROM 650) or as firmware, or a combination of both software and firmware. Processor or MCU 670 includes a BT radio die as an SOC 680 configured to transfer data and commands to and from the processor. The BT radio can control the power mode and sleep cycle of the processor and the cellular modem. Exemplary BT chipsets for BT radio include the Nordic nRF52840 (Nordic Semiconductor, Portland Oreg.) with ARM® Cortex M-4 processor, the Dialog DA1468X family, Dialog Semiconductor, Reading UK) or the Texas Instruments CC1640r2F (Texas Instruments, Dallas Tex.) with low power sensor controller for IoT applications. Other BT chipset manufacturers include STMicroelectronics, On Semiconductor, U-Blox, Silicon Labs, Toshiba, Ankya, RDA, and Cypress (Infineon). CSR (Qualcomm), Broadcom (Belkin) and MediaTek dominate the supply of BT chips used in smartphones.

In other embodiments, multiband antennas are used. Fractal and diversity antennas are becoming familiar technology and are both inexpensive and compact. Ceramic antennas are also reasonably priced. Because the antenna design includes the circuit board as a whole, the case, the battery, and any NFC or Qi antenna as well, mobile edge radio can benefit from software-defined radio supplemented with software-defined antenna. In a preferred embodiment, FET gate arrays are used for impedance matching over multiple bands. These packages are included in a small radiotag that fits in a hand, in a pocket, on a keychain, a wrist, or is embedded in an asset. Wearable XCB devices find increasing use in monitoring latchkey children in this work-all-day parenting society.

RAM 640 is provided for storage of volatile data, such as for data logging of sensor data. Sensor package 660 may include a single sensor or various combinations of sensors as a package. In some instances, one or more of the sensors are incorporated into the processor. The sensors may include an accelerometer 623.

The size of the RAM memory 640 is dependent on the size of the memory requirement for data. Stored data may include data from sensors 660 and from switches 633. Data from throw- and button-press switches is considered data. Stored data may also include radio contact records (see below). The memory may be supplied as cache memory in the processor, or may include external RAM if data logging functions requires it.

Working memory may also include dedicated registers for handling packet composition and decomposition, for encryption keys, and so forth. BT and cellular radio signal buffers may be gated by the processor and may include registers for parsing commands and command parameters from datastreams. This memory is generally distinct from non-volatile read-only memory 650 for storing processor instructions. EEPROM memory registers may be supplied, or in some instances firmware or combinations of EEPROM and firmware are used.

To save power, the cellular modem 682 and the processor 670 may default to a power savings mode and it may be a BT radio signal (received on antenna 680a and conveyed to the processor by BT radio 680) containing a qualified wake signal that tasks the processor to initiate some routine that wakes up various higher functionalities of the circuitry of device 10.

These higher functionalities may include initiating an uplink or a tracking area update (TAU) via the cellular modem 682. In one illustrative embodiment, the cloud host sends a signal to the BT radio 680 via the BT radio of an intermediary device such as smartphone 30, and that signal will cause the cellular modem 682 to initiate a CALL HOME 1, for example, optionally bypassing smartphone 30. In this way, the cellular modem can kept in a dormant or semi-dormant state most of the time but retains the capacity to report to the network and to execute network commands with reduced latency in response to an override command. The cellular modem can minimize or at least manage the kinds of energy demands illustrated in FIG. 41, where an oscilloscope trace showing a power consumption cycle of a full TAU cellular radio event.

Surprisingly, the Bluecell radiotag is enabled to receive a cellular power management mode override signal (or related power management parameters) in a BT radio signal sent over a piconet or via link 8 to a compatible smart device 30 and therethrough 2 in a connected or connectionless data transfer to the BT radio 680. Alternatively, during a CALL HOME 1, the cellular network may make modifications to the default cellular power savings mode.

Sleep management can include a restricted schedule of cellular activity, for example in a DRX or eDRX mode (extended discontinuous reception cycle) in which the network management node and the user equipment pre-arrange discrete time intervals in which pages will be delivered. The receiving device wakes up to monitor for a paging event (physical downlink control channel) at discrete intervals (along the lines of what is described in U.S. patent Ser. No. 10/313,085 to Namboodiri and PCT Pat. Publ. Nos. WO2017065671 to Siomina).

During an eDRX event, the cellular receiver is active and linked to the network so as to receive a page. Reception is an active process and may involve transmission of signal quality responses or command acknowledgements. Configurable parameters of eDRX include Paging Time Window (PTW), HSFN (system hyperframe numbering) and eDRX cycle length duration. The eDRX updates the clock synchronization. In a paging window, new commands can be received as a downlink, but generally an eDRX goes by without the need for an uplink of data in a paging opportunity. In modified eDRX, the initial paging window becomes a connection for data uplink so that a cellular location fix by the network PoLTE service or an equivalent can be completed. The device then returns to sleep or idle mode unless other paging instructions are sent. eDRX parameters are established during at ATTACH and TAU data transfer in the initial connection request or in subsequent updates to TAU. By these adaptations, eDRX can become a routine process of acquiring and storing a series of locations or waypoints, each with a timestamp.

Wake up in eDRX can be modified in response to a PDCCH page with a RCC-compatible request for location assistance. The network location assistance request (LAR) involves sending a snippet of signals captured from a plurality of cellular base stations back to the network, generally about 30 Kbytes in length, and receiving in return, a position fix with latitude and longitude from the network. In this way, network location fixes may be obtained every 5 min or 10 min, and there may be a TAU once an hour or three times an hour as required to maintain network synchronization and to balance network loading, for example.

During a tracking area update (TAU), if for example the device 10 has shifted out of a cellular tower coverage area, the cellular modem will lock on to a new tower with stronger signal to authenticate itself and renew its network connection at the new tower. Location data is updated during this "handover" process and will be stored in the memory of the host device or in a network database. The cloud host 1111 can be notified if device 10 is reallocated from one cell to another as it moves. Because this can occur when cell traffic is being levelled (i.e. by shifting users from a crowded cell base station onto an adjacent base station having lighter traffic) the cloud host can monitor the base station carrier channels in the network path to differentiate location changes that are traffic load driven versus changes initiated because the cellular radio 683 and antenna 683a detected a stronger signal from an adjacent base station and elected to initiate a handover to the new system transmitter because it had been moved.

Once the cellular radio is on and authenticated to the network, then network-assisted location fixes on its transmissions may be performed automatically. When requested by the network, the device 10 may supply GPS coordinates or data to assist in AGPS, for example. The device may optionally include a Satnav radio 688 and antenna 688a with specialized processing module for calculating position from the timed signals of satellites in low earth orbit. Some cellular radio chips 683 are provided with the accessory GPS radio integrated into the die. If needed, a network location assistance request (LAR) can seed a Satnav positioning calculation by the onboard GPS chip so as to reduce time and energy for making the calculations. A device energy budget may be used to balance the relative need for Satnav positioning calculations versus network-assisted LAR position data and may be configured according to user specifications or modified on the fly by commands sent from the network. The network can use PoLTE or AGPS to assist in device location calculation, measurement and reporting.

BT radiobeacons or hubs having known fixed locations can also be used to refine location, particularly in indoor environments. Google supplies Eddystone and a Proximity Beacon REST API that allows users to register a beacon with location (Lat/Long) and indoor floor level, for example, which is wiredly used to geotag commercial establishments and places of interest as a physical web. Reference hubs 20 may function as "lighthouse radiobeacons" in broadcasting stationary position coordinates.

Uploads of location data stored in memory 640 may be executed from time to time. A direct upload can also be requested by the network or by the device, either when the cellular modem 682 executes a paging window call or when the BT radio 680 receives a cellular connection request. During a BT connection with a piconet, in which there is a cellular-competent device in the piconet, indirect uplink of data may be executed over BT channels. A powerful set of tools for location-directed network services emerges by combining a Cellular Remote Locator Services Toolkit and a Bluetooth Proximity Locator Services Toolkit, as will be described below.

The device may be rechargeable from an optional recharging source 694. Battery 699 may be disposable or rechargeable via circuit 690. Other energy harvesting means known in the art may be used to extend the operating lifetime of the device beyond that offered by one full battery charge and a switching regulator may be used to manage power to the processor and radios.

Figure 7A:
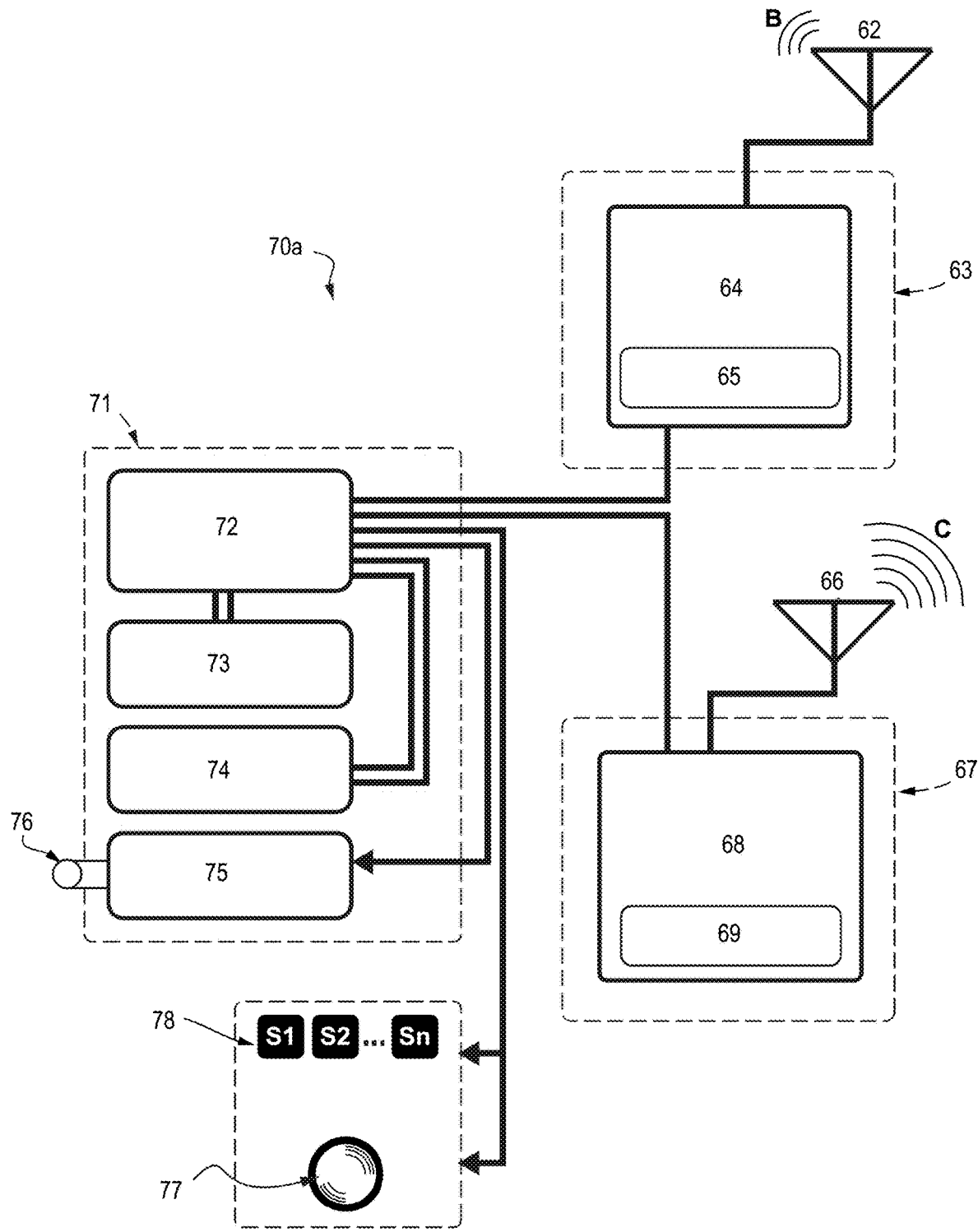
FIGS. 7A, 7B, and 7C are schematics of alternate dual-radio XCB device embodiments.
Figure 7B:
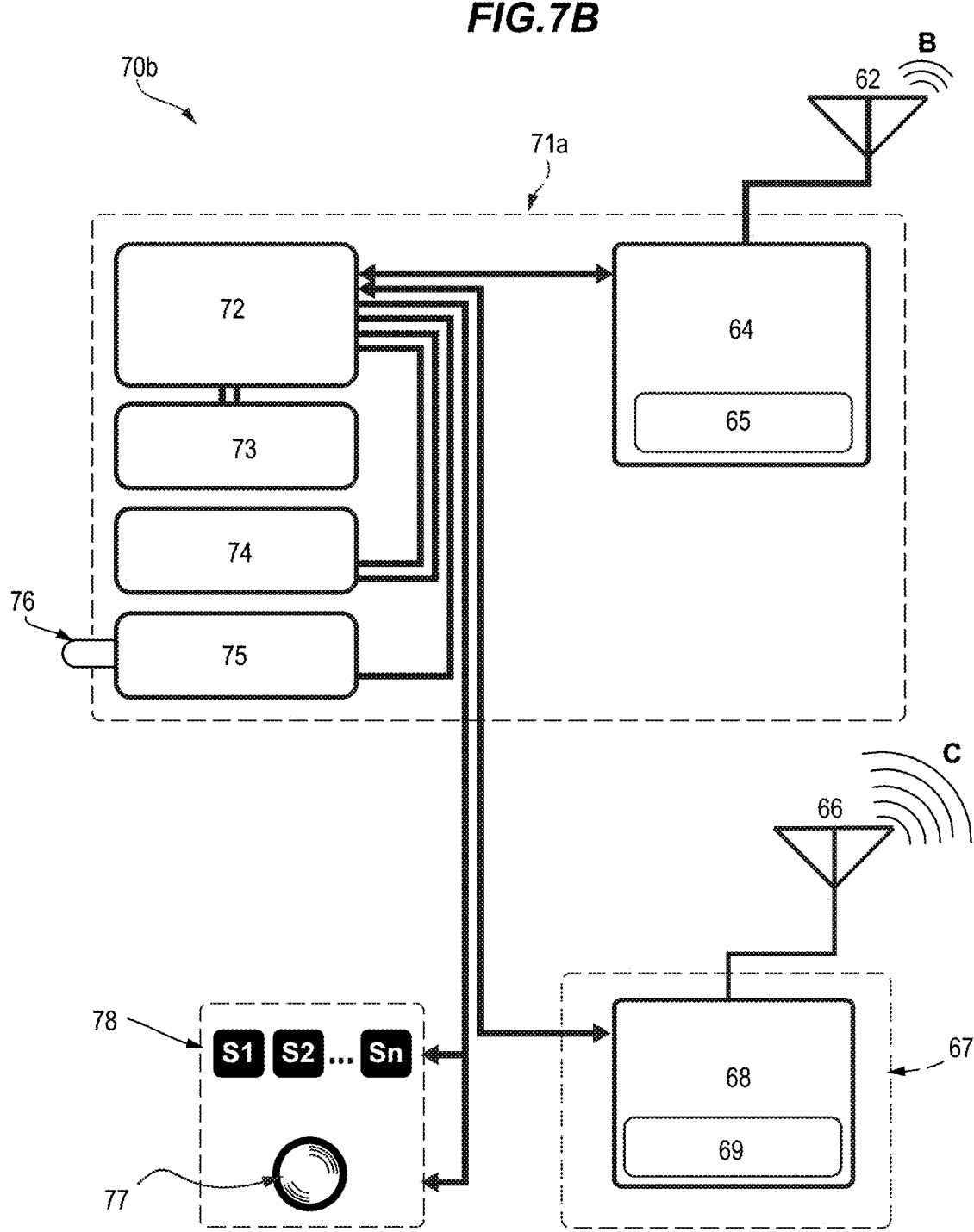
Figure 7C:
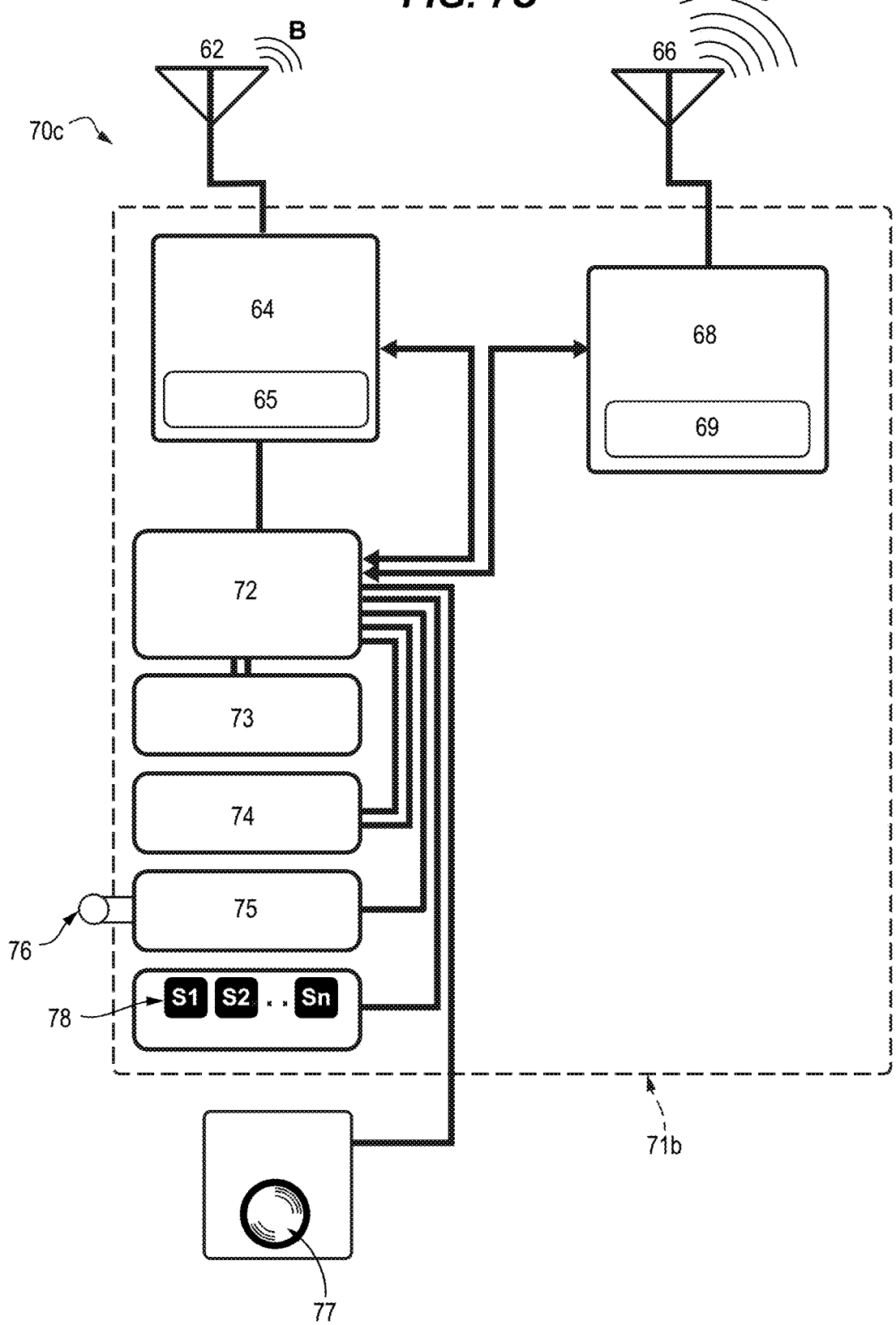

FIGS. 7A, 7B, and 7C are schematics of alternate dual-radio device embodiments. Radiotags of this kind can be attached to various assets or to pets, for example, and may also be worn or carried by children in need of cloud-based locating and tracking services. The devices are characterized by a functional combination of two radios: (A) a Bluetooth radio operable with low power for extended battery life in portable use; (B) a cellular radio in a modem that is connectable to LTE and 5G cellular network. The two radios work cooperatively to connect to ad hoc local mesh networks characteristic of Bluetooth and to the cellular basestations (eNodeB) of cellular telephone networks.

FIG. 7A is a schematic of a first device 70a having separate cellular modem 68 and BT radio unit 63 that share control and are linked to a single processor 72 and supporting circuitry. The processor assembly 71 includes ROM 73 and RAM 74. In some instances the processor instructions are not supplied by software but instead are hardcoded into an array of logic gates within the processor.

The unit is battery powered. Digital radio may be by frequency (GFSK) or phase (DPSK) modulation of a carrier baseband. The device includes two antennae, one 62 for the BT radio at about 2.45 GHz and one 66 for the cellular radio at LTE bands. Dual band BT radio may also be supported. The antennae may be printed on the circuit board in some instances, but may extend from the board as by bayonet mounts and are secured to or embedded in faces of the housing members, which are generally made of a radiolucent material. PCB attachment of ceramic antenna is known in the art. Fractal and PIFA antennae are also considered in the design of a working device. In some instances microcoaxial extensions are used to position the antenna within the peripheral edge faces of the device and away from any battery or display.

BT core 63 is a low energy processor and includes basic computing functionality for executing programming as well as the capacity to compose, broadcast, receive and decompose digital packets. The BT core has a unique feature that allows an external "wake up" command in the form of a "qualified wake signal" can bring it up to full power. By activating the BT core, the entire device 70a, or selected parts of the device, can be selectively activated. Even if the cellular radio is turned off to conserve energy, it can be activated by signaling the BT core 63. The "always listening" mode is awake (on a "flickering" duty cycle), but other parts of the BT core and processor are in standby or are asleep and internal BT radio power management circuitry wakes up accessory functions only when needed and only long enough to complete an assigned function before being put back to sleep mode. This aggressive power saving mode is responsible for the very long battery life of these tiny devices.

The BT radio component 64 is generally a transceiver. As per the BT Specification, the transceiver can be operated in PASSIVE mode, listening only, or in ACTIVE mode, in which the device is discoverable and will respond to INQUIRIES and PAGES so as to make connections or pair with other like BLE radios. The BT radio can also operate in an advertising beacon mode with repetitive transmission while remaining not connectable. Both BT radios 63 and cellular modem 67 have more than one wake or sleep level. Each wake state has an inherent energy draw as will be discussed with reference to FIG. 8A below.

Each radio includes at least one radio unit identifier (RUI). The BT radio 63 includes a BT core 64 and memory 65 containing a EUID assigned by the manufacturer, for example. A derivative of the EUID or BD_ADDR unique radio identifier may be transmitted with broadcasts in INQUIRY mode. The cellular modem 67 includes radio 68 closely linked to a SIM (69, subscription identifier module). The SIM is a microprocessor-based chip that generates an IMSI (international mobile subscription identifier) that is required to register the device on any cellular network. In some instances the SIM is a card inserted into a Molex connector for example. The SIM may be a nano-SIM, but in other embodiments the SIM is an eSIM (embedded SIM) that is integrated into the circuit board and is not removable. Future SIM units may be software based, but all rely on the use of 128-bit keys to authenticate the device. The manufacturer's IMEI (international mobile equipment identifier) may also be used for security. The cellular radio generally includes a modem.

The processor 72 may be a microprocessor or microcontroller and may include a co-processor or graphics processors. The processor is a solid-state digital device that can be programmed, or otherwise configured, using software resident in ROM 73 or as firmware, or a combination of both software and firmware.

The master processor 72 can delegate BT radio control to the BT unit 63 to save energy. The BT radio 64 can cycle to a standby "passive listening" mode, a unique feature that allows an external "wake up" signal to bring it up to full power almost instantly. By activating the BT core 64, the entire device can be activated. Parts of BT radio that are not in use are in standby or are asleep, and accessory functions are activated only when needed and only long enough to complete an assigned function before being put back to sleep mode. "Always listening" mode is like a flickering candle— with very low reception latency. This aggressive power saving mode is responsible for the very long battery life of these tiny devices.

Flash memory 74 is provided to store data, including sensor outputs and history of radio contacts, including any timestamps and location stamps. An alarm apparatus 75 with LED 76 is used for locating the radiotag when at close range as part of the Bluetooth Proximity Locator Services Toolkit. The alarm apparatus may include a speaker that can be actuated to attract attention and/or a buzzer that vibrates.

Switch 77 and sensor module 78 are peripherals that attach to or are surface mounted on circuit boards carrying the chips. The button switch 77 has multiple functions such as in actuating processor commands. A sensor or package of sensors 78 may be included. A motion sensor is typically provided because the information that a radiotag is moving or stationary is often relevant to whether it is lost or needs to initiate a CALL HOME.

FIG. 7B is a view of an alternate device 70b. The device schematic is similar to that of FIG. 7A, but includes a higher level of circuit integration. Microcontroller assembly 71a is an ASIC or SOC with controller 72, BT radio 64 and cache memory 65 for storing the radio RUI. Integration of a particular processor and radio components is partly a matter of convenience but is also useful in miniaturizing the tracking device. As shown here, the processor assembly includes ROM 73, RAM 74, and an alarm apparatus 75 with surface-mounted LED 76. The cellular modem 67 with radio 68 and SIM 69 is packaged separately. The interface components, including sensors 78 and button switch 77 for manual actuation of some commands, are separate units so as to be mounted through or on a housing instead of on a circuit board.

FIG. 7C is a schematic of another embodiment of a device 70c, this one having an ASIC 71b that includes a fully integrated combination of both radios 64,68, at least one processor 72, including supporting circuitry 73,74,75. The cellular radio includes a SIM module 69. The BT radio includes a radio unit ID cache 65. A sensor package 78 is also integrated into the ASIC. Again this is useful in miniaturization. Two antennae 62,66 are provided separately as shown, but may also be integrated into the chip. A button switch 77 is wired separately to the processor.

The integration shown in FIG. 7C is a higher level of integration than currently practiced. According to current practice, the cellular radio is a fully integrated modem 67 with basic MCU included. AT commands may be sent to the modem to control cellular activity, but a great deal of the cellular activity is controlled as part of the network connection 1. FIG. 7C may be interpreted as a synthetic radio pair within an ASIC, in which the integrated processor functions as a modem.

Figure 8A:
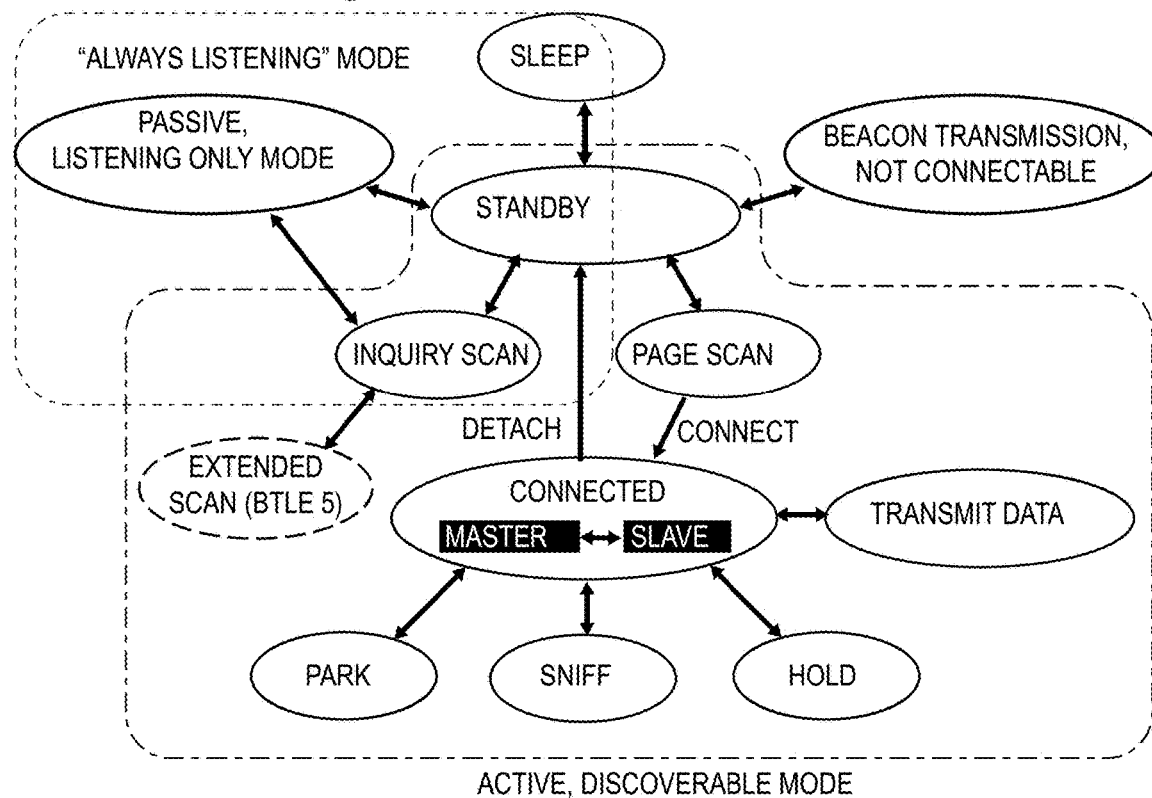
FIG. 8A is a view of power states of a BT radio showing multiple sleep and standby states with functional modularization of power consumption. An "always listening" mode or state is defined.

FIG. 8A is a view of power states of a BT radio showing multiple sleep and standby states with modularization of power consumption. The states correspond to the BT protocol stack. The lowest level of functionality of a BT radio is a SLEEP mode running with low power clock only. To approximate an "always listening" radio mode, a minimal STANDBY state alternates in rapid succession with a "PASSIVE LISTENING ONLY" mode, in which the radio will receive Bluetooth radio signal traffic and may forward received signals to the processor, but does not transmit responses or solicit inquiries. In this PASSIVE mode, the device is unresponsive while listening for and recording non-specific radio contacts and may not be discoverable. By adjusting the STANDBY/LISTENING ONLY duty cycle, a very low energy, low latency system can be achieved that meets performance goals in most respects for an "always listening radio" (ALR) and "wake up radio" (WUR). The latency is almost not perceptible to the user, and the radios are readily able to resume the connected state in a familiar piconet without user attention or intervention, for example, by transitioning from STANDBY to CONNECTED in a few quick steps.

A discoverable Bluetooth radio may be configured to listen for (i.e., SCAN) and to respond to PAGE and INQUIRY signals from other units. These energy states correspond to "INQUIRY SCAN" and "PAGE SCAN". In ACTIVE listening, the device will recognize and respond to inquiries and pages that include a recognized access code. A PAGE is a radio signal that initiates a connection. The radio unit that receives the page responds in a way (by sending an FSH packet) that leads to a formal CONNECTED mode between the receiving and transmitting radio units. In CONNECTED mode there are two substrates: MASTER and SLAVE, which for any two devices are interchangeable.

Bluetooth radio is notable for its robust resistance to interference and dropped connections, and has been widely adopted. The BTLE radio protocol standard is attractive than BT Classic and BTDM protocols because of its low energy consumption. Advantageously, controllers with integrated BT radio cores operating at 1.8V are readily available. A BT radio in standby "always listening" mode may burn less than 30 uAh power while retaining the capacity to wake up the processor and accessory circuitry from deep sleep in response to (i) a qualified radio command from a smartphone or a reference hub (ii) in response to sensor data, (iii) or in response to ambient radio traffic having selected characteristics, and thus supports portable applications for IoT use. Channel listening without response participation consumes only 0.3 mA at parts of the duty cycle when the receiver is on. In standby between listening periods, power consumption drops to less than 60 uA (Karjalainen O et al. A Comparison of Bluetooth Low Power Modes, 7th Intl Conf Telecomm. 2003. IEEE DOI: 10.1109/CONTEL.2003.176900). By controlling latency in a reasonable range, overall power consumption can average out as a sub-milliwatt load (while offering ALR continuously during extended remote deployment).

In the newer BTLE standard, inquiry is limited to three out of forty channels in the BT spread spectrum. Selection of the advertising channels was made to avoid most competition with WiFi channels that overlap the BT spectrum. When BT devices elect to exchange data, they can do so in an extended advertising state that uses some of the data channels not reserved for advertising. Devices can also exchange FHS packets and coordinate frequency hopping regime across the data channels to avoid interference. However, what this schema gains in reduced latency for discovery also has the effect of reducing traffic density in the unused data channels. In one application of radio scanning of the data channels, unused channels can be populated in extended advertising mode according to the vacancy rates of the channels so as to better distribute bandwidth usage. What emerges from the scans is a distribution of channel usage across the spread spectrum (data and advertising channels), and an index can be derived from this distribution pattern provides insight into the familiarity or strangeness of the locale surrounding the XCB device. Devices that encounter primarily traffic on the advertising channels are clearly in a public space that is readily differentiable from the more balanced data traffic that characterizes a home or office. With increased availability of synthetic radio, the capacity to "sniff" all the BT channels for traffic is realized and offers the users a simple method for scaling their encryption efforts in direct proportion to the local radio topology or concentration of advertising channel use.

BT radios may also be operated in a BEACON TRANSMISSION mode, which is not connectable. The radio broadcasts a canned message at a regular interval and is unresponsive in this state to any radio responses or inquiry traffic. A baseline energy budget for a BT radio in not-connectable advertising mode may consume about 30 uAh assuming an intermittent transmit period of 20 ms, a transmit cycle of 2.5 sec, (i.e., 1440 transmits per hour), and a transmit power of 3.5 mA (0.3-30 mA depending on packet type and radio hardware). In some BT radiobeacons, the transmission duty cycle is adjustable. Transmit power and frequency may be configured according to the application, and with increasing miniaturization of chip architecture to 14, 10 or even 7 nm gate structures, total energy consumption continues to fall sharply, enabling increasingly longlasting IoT devices in packages using either disposable or rechargeable batteries.

Connected units establish a "pairing" relationship that anticipates the frequency hopping regime and any HOLD, SNIFF, or PARK timing. The BT baseband/link manager configures low power sleep and standby modes that separate active transmission and reception sessions.

Access codes define the specificity of the relationship between the units. These formalities are native to the Bluetooth specification, which has received an essentially global adoption as the BT standard for wireless devices ranging from headsets to keyboards to printers to thermostats, smoke alarms, coffee pots, and smart doorlocks to smartphones.

Figure 8B:
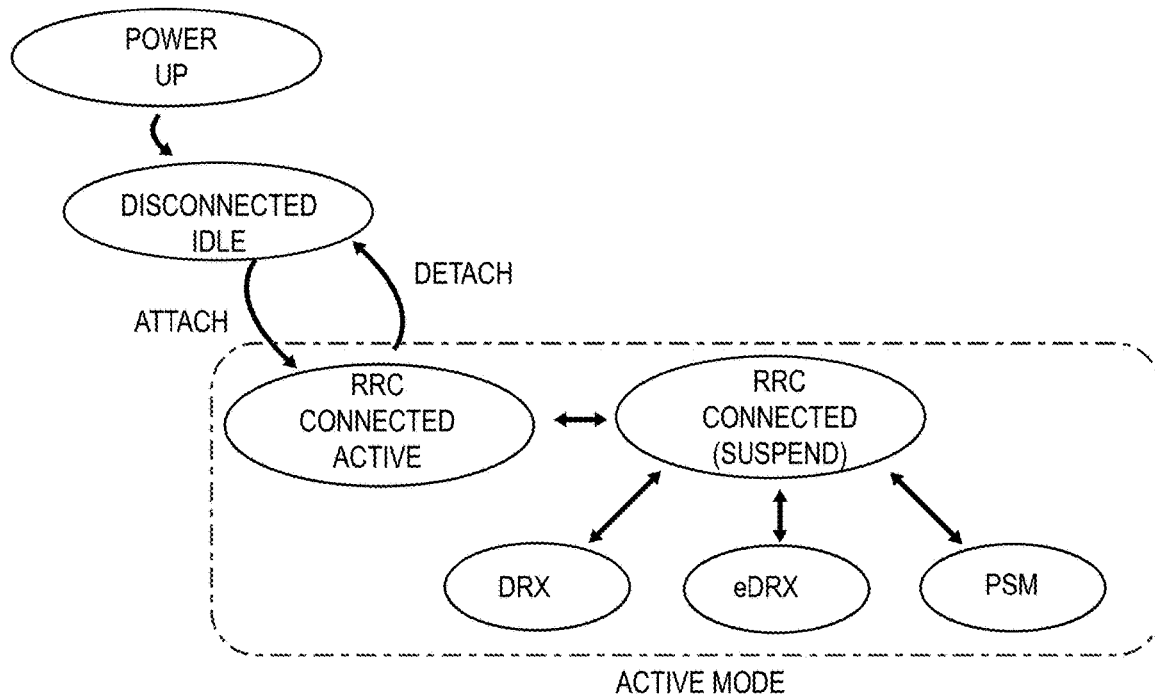
FIG. 8B is a view of power states of a cellular modem according to a 5G network standard.

Power states associated with 5G cellular network management are drawn in FIG. 8B. The energy states correspond to a Cellular radio packet environment protocol stack. ACTIVE/CONNECTED mode can include reduced power states. Power savings is achieved by reducing the duty cycle for the radio and associated processor (DRX, eDRX, PSM). These energy states are established by protocols set forth by network operators and by hardware features native to the devices; the UE and the network agree on a wake up schedule, i.e., a "duty cycle" with designated down time.

Following power up, the radio can exist in a low energy DISCONNECTED IDLE state until authenticated to a network. Once connected to a network, reduced power modes that do not include regular updates at frequent intervals are problematic in cellular radio. If the connection is lost and the device goes into low power disconnected idle, the user equipment (UE), without an assist, cannot be aroused from sleep or contacted by the network except during a designated "wake" period. In connected mode, the system implements only PSM as a standby condition. DRX and eDRX states operate on a reduced duty cycle in which the interval between network refresh windows cannot be extended indefinitely. If the network connection fails, the unit defaults back to DISCONNECTED IDLE and must initiate a new connection in order to be tracked by the network.

A Radio Resource Control (RRC) protocol controls the air Interface. The major functions of the RRC protocol include connection establishment and release functions, broadcast of system information, radio bearer establishment, reconfiguration and release, RRC connection mobility procedures, paging notification and release and power control. By means of signaling functions, the RRC configures the user and control planes according to the network status and allows for Radio Resource Management strategies to be implemented. The operation of the RRC is guided by a state machine which defines specific states of the UE relative to the network.

LTE power states have evolved with the introduction of 5G. In LTE, the EPS (evolved packet system) Connection Manager is in IDLE unless there is an active connection, whereas in 5G, the Connection Manager connects when the user equipment is attaching, and stays connected whether the connection is active or "suspended". In other words, the RRC is in DISCONNECTED IDLE or CONNECTED for LTE, and is INACTIVE or CONNECTED for 5G.

Standard cellular radios of smartphones may have signal strengths of 0.6 watts or 3 watts (for comparison, most Citizen Band radios transmit at 4 watts). Battery voltage is typically 3.8V. As a result, a typical transmission consumes 150 to 800 mA, not a trivial amount. Total current load on a smartphone in use ranges from 0.6 to 1.9 A, of which only 50 mA is related to WLAN radio draw. Other processes such as GPS calculations, processor boot and instruction set execution, camera imaging, capacitive screen sensors, and LED display lighting account for the remaining draw. LiPo batteries in Android smartphones may have a battery capacity of 3000 to 4000 mAh. Not surprisingly, most smartphone users find that the battery requires daily recharging, as would not be acceptable for a micro-sized device that is to be remotely deployed without access to a recharging dock for extended periods of time. As a consequence, a radiotag device for IoT use must find energy management solutions that surpass conventional cellular performance benchmarks.

In one embodiment, BT radio power states can be used to manage cellular low power states so as to implement a more robust standby condition. The BT radio core can actuate and adapt the cellular modem (and device processor(s)) according to more flexible rules that override the inflexible duty cycle that governs cellular extended sleep modes in conventional cellular modems. The BT radio can also control a CALL HOME event, which includes the initiation of a cellular Connection Request with network attachment if absent. In other words, the BT radio can assist in recovering from a cellular connection failure.

In our experience, in the XCB devices 10,22,1510a,70a, 70b,70c and applications described here, only about 4% (or less) of the energy a typical cellular modem expends is actually needed. More than 90% of cellular modem power can be throttled off—on the condition that the cellular radio activity is throttled by the BT radio modem as described here. With stringent application of integrated power management, XCB device field life readily exceeds one week in richly functional use, and can approach 1 year in remote monitoring applications. Power savings are achieved by selectively powering the cellular modem and controlling power to the processor according to the state of the BT radio, and by establishing qualifying radio signals and radio traffic patterns that, when intercepted, wake the processor. By using the BT STANDBY "always listening" mode to control the cellular modem, a "Wake up!" command may be executed so that the cellular modem of the device is activated to initiate a cellular network connection with a cloud administrative center on any available cellular network. The initiation of a cellular network connection is termed here as a "CALL HOME" 1.

Figure 9:
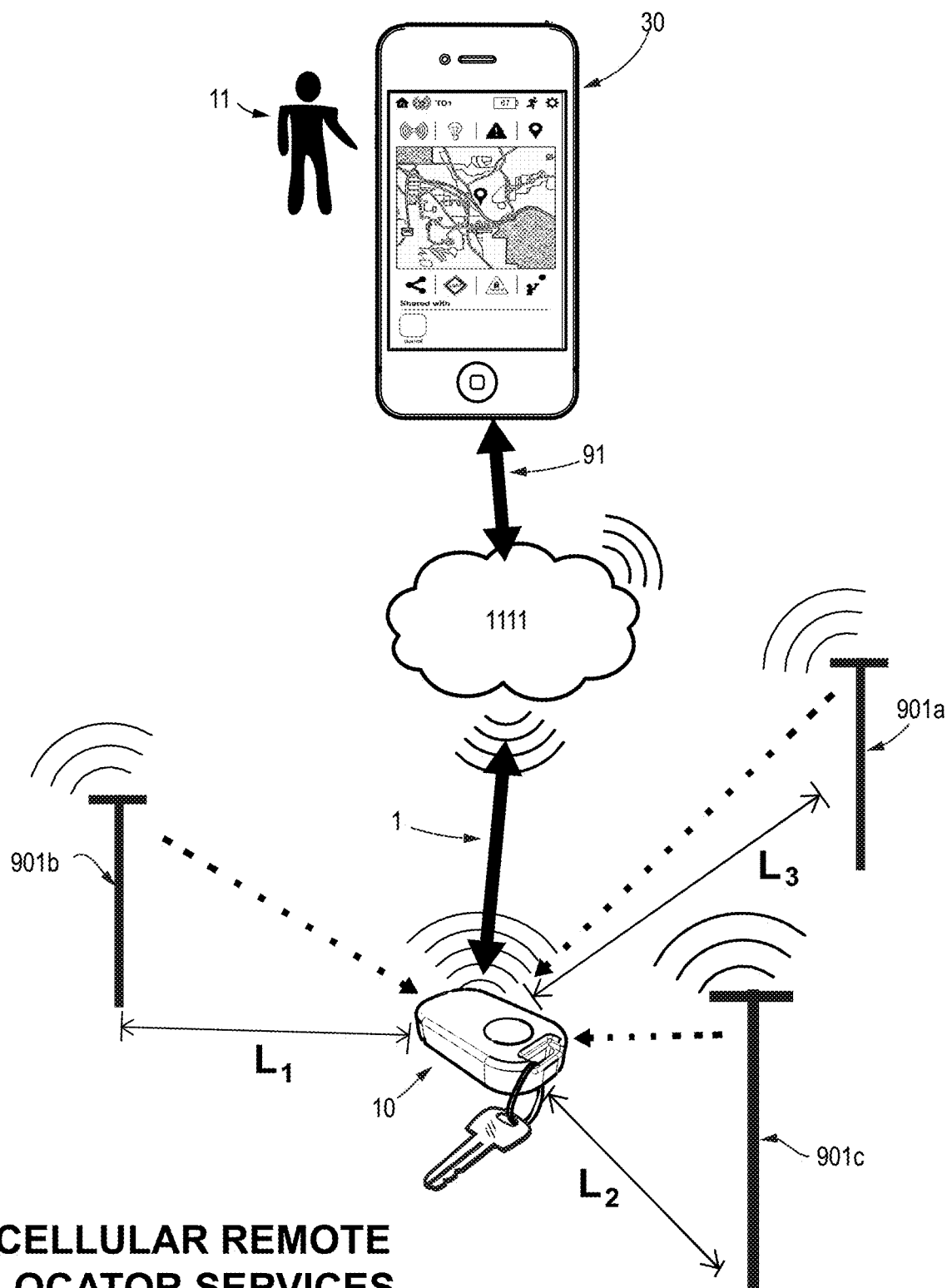
FIG. 9 and FIG. 10 are views comparing and contrasting BT and cellular localization strategies. Depicted are a Bluetooth Proximity Locator Services Toolkit and a Cellular Remote Locator Services Toolkit.
Figure 10:
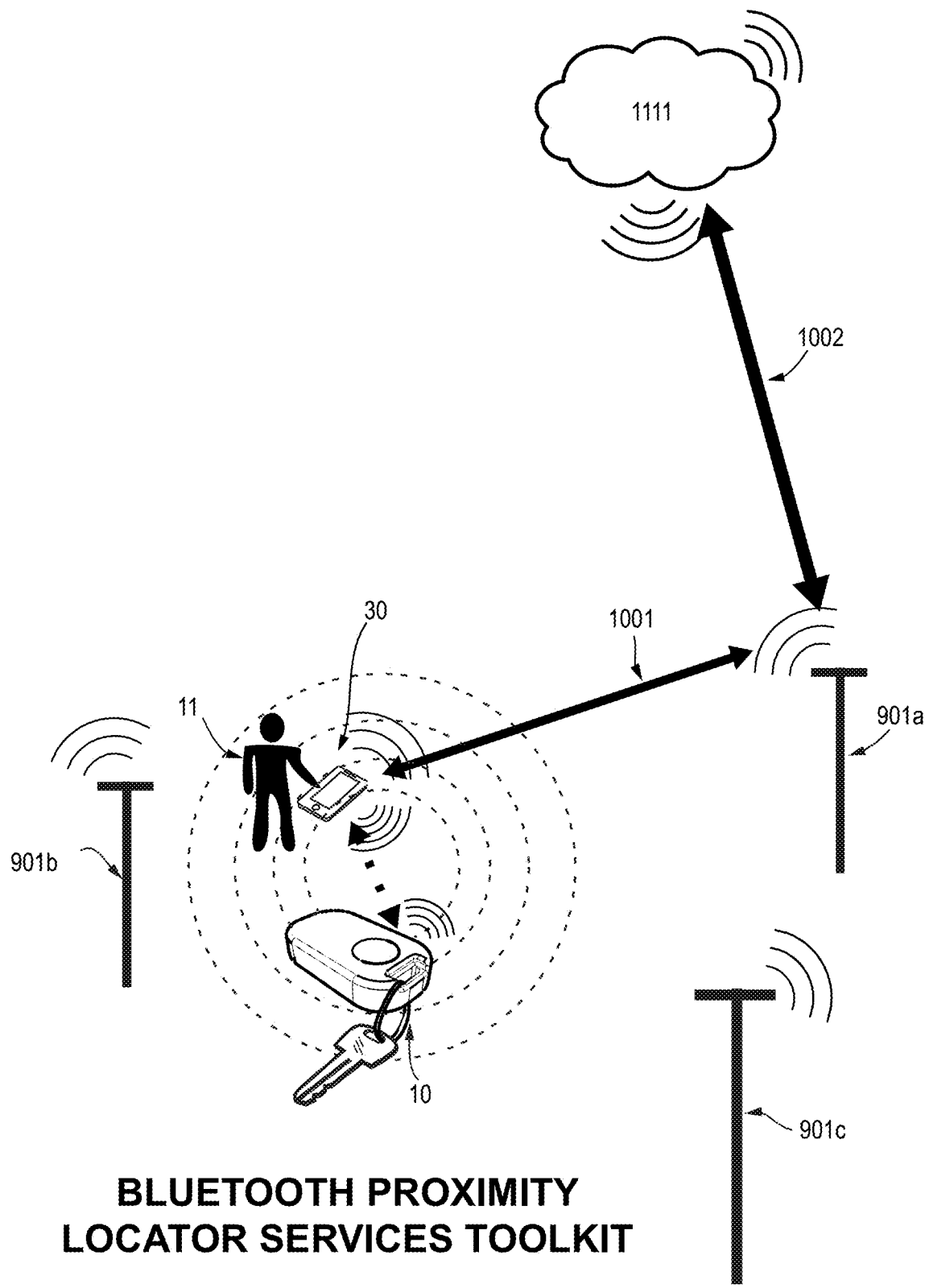

FIG. 9 and FIG. 10 are views comparing and contrasting cellular and BT localization strategies. Cellular location tools are termed a "Cellular Remote Locator Services Toolkit" and may include triangulation and network-assisted location services. The toolkit includes components of the radiotag with cooperative functional connections to a network or smart device that expand the user interface, display and analytical capabilities of the toolkit. The figure defines a CALL HOME 1. A CALL HOME generally includes a current location update and may require a TAU. In one instance, the cellular modem of radiotag 10 is awakened on a scheduled paging window or by a trigger and a network connection with a cloud host 1111 is refreshed or re-established. The device 10 may call home to report location, or may call home to obtain a location fix by POLTE, for example. Alternatively, location can be triangulated ($L_1$, $L_2$, $L_3$) from cell towers 901a, 901b, 901c, or by GPS, for example. The location may be stored in a database on cloud host 1111 or may be stored in an internal memory of device 10, or both, for example. The current location fix will inform any notification 91 to a user 11 via smartphone 30. Once a network connection is established, the user/subscriber 11 has the option of adjusting the cellular radio power management and sleep settings, such as to continuous or more frequent updates so as assist in tracking and recovery of the radiotagged asset. Typically the software application or a cloud host can log and plot aggregated data to generate a map of where the radiotag is located. For example, if device 10 is outside a safe zone and is in motion without being accompanied in proximity to user 11, then the notification may include the current location with timestamp on a map displayable on the user's smartphone 30, and may even show a trail of waypoints over time if the device continues to move. The notification 91 may include more options for the user to respond or offers of further assistance. By switching the cellular radio to continuous operation, battery life will be shortened, but the option may be loss of the radiotagged asset, so having cellular tracking capacity is clearly an improvement over Bluetooth tracking alone, especially over longer distances of separation.

The Cellular Remote Locator Services Toolkit may also include a service for initiating a CALL HOME in response to output from an accelerometer or an electronic heading sensor, for example if there is an impact or the tagged asset is moving in a direction away from where it should be, circumstances that would warrant getting a current location update reported to the cloud host and perhaps a notification to the owner/subscriber. The same Toolkit can be configured to report body temperature sensor output or temperature sensor output as can be useful in fever monitoring or cold chain tracking, for example. The radiotags can include memory for storing sensor data output so as to be useful for a wide range of specialized applications as will be described further below.

Cellular location fixes are less useful over very short distances, but the combination with BT in radiotag 10 offers an elegant solution that uses the best characteristics of both radios, combining the Cellular Remote Locator Services Toolkit and the Bluetooth Proximity Locator Services Toolkits.

FIG. 10 depicts Bluetooth radio locating capability. This is a short-range function and uses radio proximity determinations to zero in on the location of a lost asset. We term this functionality the Bluetooth Proximity Locator Services Toolkit. In this instance, the BT radio of user handset 30 listens for a signal identifiable as the signal of radiotag 10 and identifies a received signal strength (RSSI) of the BT radio signal. The signal strength is an approximation of proximity within a range of a few feet to a few hundred feet. Bluetooth radio antennae are not generally directional, so RSSI is indicative of a radius around a BT radio signal source, shown here centered on radiotag 10. As the user 11 gets closer, the signal strength increases and the location of the source of the signal is more obvious. The signals of BT radiotags are distinguishable by their RUIs, and in one embodiment, a user 11 who is searching for a lost item can open a user interface on smartphone 30, and by pressing a device-specific icon on the interface, cause a particular radiotag to emit a beep or flash so that its location is revealed to the senses, even if partially concealed. The command is transmitted in a BT signal to the radiotag. Alternatively, the handset 30 can display a detailed map of an area, as may be refined by UWB device installations, and pinpoint the lost device emissions in the map space. The Nordic nRF52840 BT chipsets have offered directional antenna hookup for several years, and with increasing sophistication in the radiotag finder market, directional antennas are realized in the miniature radiotag body using diversity and fractal antenna types. By electronically switching the baluns of paired antenna from a balanced to unbalanced receiver characteristic impedance, a simple "hot/cold" directional antenna pair is obtained.

Bluetooth range finding may be initiated at distances of 300 to 500 ft in some conditions, but proximity tracking is strongest within 20-40 yards, and for longer distances, the cellular tracking techniques discussed with respect to FIG. 9 may be more effective. For comparison, commercially available GPS, by itself, is accurate only to 20-30 yards. Thus, the light, speaker and buzzer of an alarm apparatus that can be activated when the user is within sight or hearing of the radiotag is more effective than GPS alone. The cellular and BT tracking systems of FIGS. 9 and 10 are complementary in geolocating a missing asset, child or pet; a missing radiotag can be located via cellular triangulation at a long distance, and then when the user is in BT radio proximity, the user can actuate a beeper or LED on the radiotag 10.

As described in U.S. Pat. Nos. 9,392,404, 9,892,626, and 1,050,281, any happenstance discovery of a BT radio signals by a smartphone belonging to a community of users can also result in recovery of a lost item. Briefly, looking ahead to FIG. 13A smartphones may be configured to report BT radio signals and RUIs to a cloud host, and by matching the RUI to a user profile, the cloud host can generate a notification to the owner 11. A map can be displayed in which the map coordinates are obtained from the system and an icon displaying an approximate position of the radiotag.

Advantageously, the transient BT radio contact between a community smartphone 31 and a wayward radiotag 10 can be used to leverage actuation of the cellular modem of the radiotag. A report 1301,1302 (FIG. 13A) transmitted to the cloud host via cellular tower 901a brings the cloud resources of the system to bear on recovering the lost asset. When the cloud host receives a report of a signal matching the identifier of a lost radiotag, the system can generate a BT radio signal command to turn on the radiotag's cellular modem, and can send that command 1303 (FIG. 13A) to the radiotag via the community smartphone 31, as described in below.

The Bluetooth Proximity Locator Services toolkit includes components of the radiotag and cooperative functional connections to a network or smart device that expand the user interface, display and analytical capabilities of the toolkit.

The Bluetooth Proximity Locator Services Toolkit may also include a service for initiating a CALL HOME in response to sensor data output. For example, an impact as sensed by an accelerometer can cause the Bluetooth radio core to broadcast an undirected Bluetooth advertisement for help, and to activate the cellular modem. A Bluetooth proximity monitoring system can cause the cellular modem to uplink data if another Bluetooth device breeches a proximity limit threshold mandated for communicable disease mitigation. The same toolbox can cause a CALL HOME if a Bluetooth radio tether is lost or fluctuates. The BT toolbox can include a dynamic gain adjust and can transmit a TX POWER index in its messages. By assessing received signal and transmitted signal power, a path loss can be calculated. The radiotag can increase transmit power if needed to recover a lost or intermittent radio tether, for example. The BT toolbox can also include memory for storing and white-listing radio contacts, such as members of a familiar piconet, and can prepare radio contact records of familiar and unfamiliar radio contacts as part of a snapshot of the surrounding BT radio environment to assist in location-related services. The radiotags can include memory for storing sensor data output so as to be useful for a wide range of specialized applications as will be described further below.

And with implementation of synthetic radio capable of UWB radio at 6-11 GHz operation, proximity monitoring can be significantly improved.

FIG. 11 is a general flow chart of a method 1100 for operating location management services with an economy of power consumption. In the analysis, a radiotag 10 is operated with a companion handset 30 and an application for executing the algorithm 1100 is assumed to be installed in computer-readable media on the handset. The analysis is directed at correctly identifying scenarios in which a location fix is needed and the cellular modem should CALL HOME.

Generally, any monitoring of location begins with a memory that associates an initial "location fix" in memory with a timestamp at time T=0. This memory may not be in the device 10, but may instead be stored at a higher network level, for example in a smartphone 30 or in a cloud server 1111. Generally, the initial location of the radiotag and the smartphone are assumed to be in close proximity, as during setup, or in the morning of a workday when both items are where they are supposed to be. At time T=0, the location of the smartphone can be taken as a proxy for the location of the radiotag and no further location fix by the radiotag is needed. Updating the location of the smartphone is a routine matter and is not an issue. The more pertinent question 1101 is whether to get a location fix by activating the cellular modem of the radiotag 10. While it may be desirable to have a current location for the radiotag at all times, from a power management standpoint in a portable device, this is not practical. Getting a location fix consumes power.

The decision tree for whether or not to get an updated cellular location fix for the radiotag at a future time T=T+t, where t is an interval selected based on predictive accuracy, can be made so that unnecessary location fixes are avoided by attention to a) initial location, b) the presence or absence of defined safe zones, c) data related to accelerometry of the radiotag and the smartphone, and d) any recent change in relative proximity of the radiotag and smartphone.

In a first approach, the location fix at time T=0 can be classified 1102 as whether the location is inside a "Safe Zone", where a safe zone is user defined as a space in which order is maintained and things are where they are supposed to be. By using radio-delimited safe zones, a YES or NO answer can be given to the question of whether a radiotag is inside or outside the safe zone. If the radiotag device is "tethered" to a reference hub or a smartphone by a radio signal that defines and anchors the safe zone, then the need to actually get a new location fix may not be urgent unless the tether is broken and lost or is intermittently broken. If the radiotag is not in a safe zone, then it may be necessary to get an updated location fix, but only if conditions are met that merit the energy consumption. Outside a safe zone, there is no simple assurance that something will stay where it is supposed to be.

A device that has moved cannot be assumed to have remained in its established location. If device 10 includes an accelerometer 623, then the simplest sensor output can be a MOTION truth value, TRUE or FALSE. Because the smartphone also has an accelerometer, a Truth Table can be constructed 1103 comparing motion truth values for the radiotag versus the smartphone. The quality of motion (e.g., hard vs soft acceleration), the speed, duration, and the direction are also useful, but the simplest and most economical bit of information from the sensor is whether motion has occurred or not.

If neither the radiotag nor the smartphone have moved (FIG. 11, 1104), then the radiotag can continue to SLEEP. If motion of the radiotag has not occurred 1105, but the smartphone has moved, and the radiotag is not in a safe zone, then it may be appropriate to generate, by the smartphone, a LEFT BEHIND alert, and to actuate the cellular modem of the radiotag for a CALL HOME so that its current location can be tracked and the owner/subscriber can be notified. In some instances, however, smartphone motion may occur that is incidental to normal activity, and the LEFT BEHIND alert is reserved for situations in which the radio tether link is lost or about to be lost. A radiotag that has not moved, but loses its radio tether to a smartphone, may CALL HOME to cause a LEFT BEHIND alert to be sent to the smartphone if the radiotag is not in a safe zone 1105. If motion of the radiotag has occurred 1103 at time T=T+t (i.e., after an elapsed ΔT, where the time interval is programmable), then it may be useful to look (1106) for a change in proximity. Over a range of several hundred feet, RSSI is a first approximation of distance between the radiotag and the smartphone. The proximity may be increasing or decreasing. Proximity is measure by Bluetooth radios as part of core competencies of BT radio and the smartphone will continuously monitor the RSSI of the radiotag signal as part of routine operations. And if there is no change in proximity, then any motion signal 1103 may be spurious and would not necessitate a need for a new location fix. Proximity will continue to be monitored. Similarly, an increase in proximity (strengthening RSSI 1109) is intuitively not likely to indicate a risk of loss of signal, and the algorithm 1100 can be looped to continue to monitor for motion and proximity.

But a fading or intermittent RSSI 1108, as indicates decreasing proximity and increasing separation, could be followed by a break in the radio tether, and for a tracked asset, may necessitate an immediate CALL HOME to get a new location fix and to generate a LOST or LEFT BEHIND alert notification to an interested party. The LOST alert generally occurs if a motion mismatch was detected between the motion of the smartphone and the radiotag, and the LEFT BEHIND alert occurs if there was not motion of the radiotag but the smartphone was in motion.

The logic of the method helps to distinguish between conditions that necessitate expenditure of energy versus conditions that permit resumption or continuation of a resting sleep or standby state. Under ordinary conditions, a sleep state would not be interrupted to CALL HOME unless there was a pattern of motion and/or a change in radio proximity.

Exceptions could be made if the motion data is more granular, for example a hard impact could merit a CALL HOME with status report even if proximity data is unchanged. And it may be appropriate to maintain an awake cellular network connection if Bluetooth radio proximity measurement is no longer possible because the signal has been lost, even if there is no motion.

The time interval ΔT for iterations of the method 1100 may be adjusted according to conditions. For example, in a safe zone, infrequent execution of the loop may be unnecessary. An interrupt flag on the processor can be set against the accelerometer output. Iterations can be more frequent if the motion activity is greater. Outside a safe zone, the loop may be executed more frequently, and the timing can be dependent on the nature of the motion input, on temperature or on a change in temperature, on changes in acoustic patterns, or on changes in Bluetooth radio traffic patterns, for example. When not needed, the device can be paused in SLEEP 1107 (FIG. 11).

Similar information can be obtained from other sensors. For example, a temperature sensor may provide evidence that a device has moved from a room temperature environment to an outdoor environment. A compass, G-sensor, or gyroscopic sensor output can suggest a change in attitude (or altitude). Acoustic information collected by a microphone may also suggest a transition from one environment to another. Motion sensor data can be collected and transmitted as described in U.S. Pat. Nos. 9,961,523 and 10,638,401 without added length of the BT radio message format, for example, and similar packaging can be used to transmit other sensor outputs. Recently, heading sensors have reached chip scale, and combine gyroscope and compass with 3D accelerometry to vector out fluctuations of momentum around a consensus heading and velocity. These chips are finding increased use in improving the logic needed for efficient utilization of cellular connectivity in XCB devices.

Figure 12:
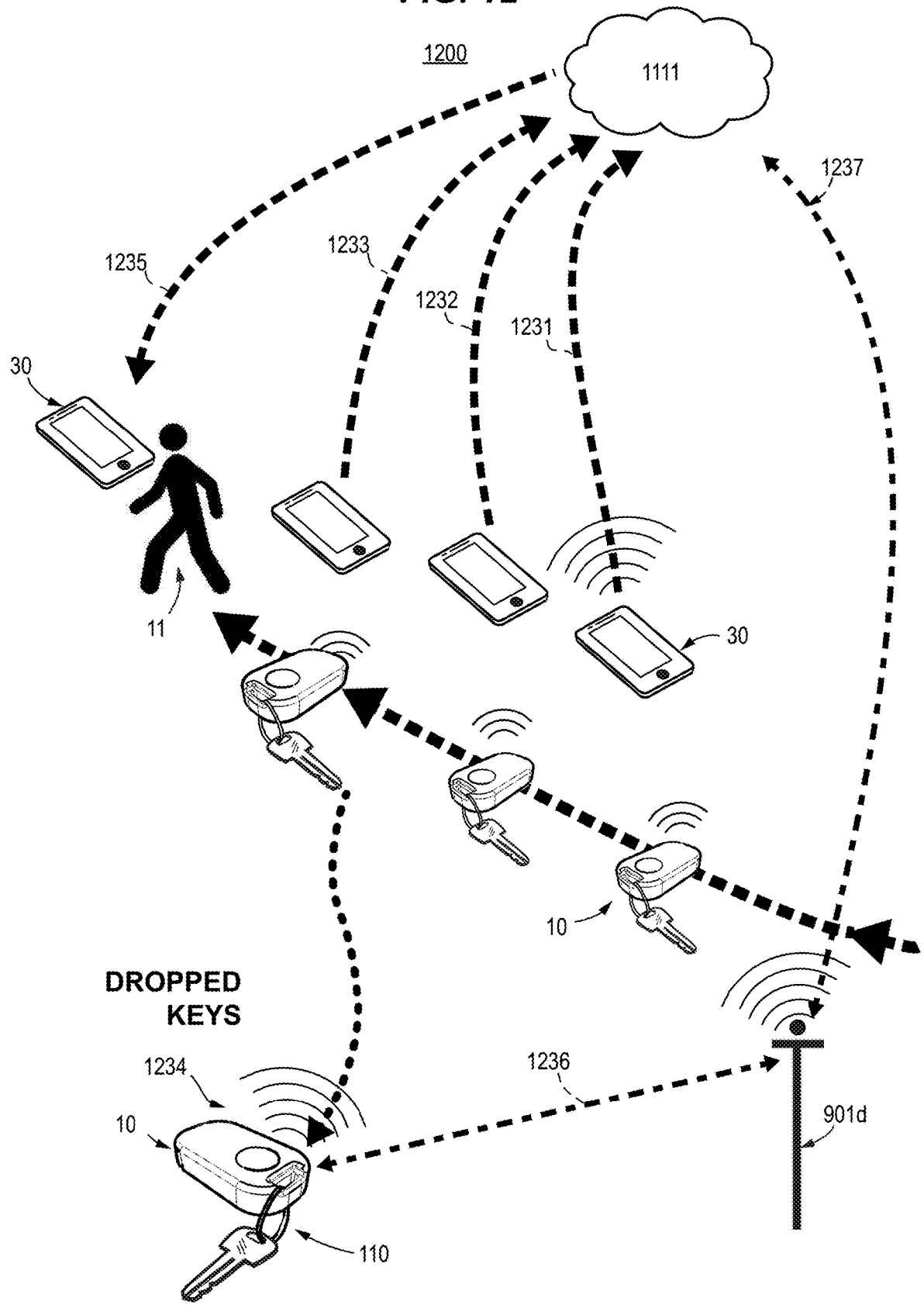
FIG. 12 illustrates a common problem encountered in tracking lost assets, here a "dropped keys" scenario.

FIG. 12 demonstrates sequential use of Bluetooth and cellular radios as a proximity tracker in a hybrid Bluetooth/cellular wireless system 1200 for monitoring radiotagged assets, here a "lost keys" scenario. Here radiotag 10 is shown attached to a keychain 110, and the scenario is one in which the keys are dropped by an owner 11 while enroute to an appointment. In the sequence of snapshots of FIG. 12, as the owner 11 walks, companion device 30 monitors signals from the radiotag 10. This data may be shared with a cloud host

1111 in sequential transmissions 1231,1232,1233. Initially, all is well, but the owner drops the keychain at 1234, and does not realize the keys have been lost.

System 1200 can detect the drop of the keychain in several ways. There may be a loss of the BT signal, but before that, from accelerometer and motion or heading sensor data, the system can infer that the owner is walking ahead without the keychain because motion or heading of the radiotag has stopped even though the owner has kept walking. The system flags the spot 1234 as the last known location of radiotag 10 and recognizing the illogic of the motion sensor data or other indicia of disorder, issues a notification 1235 and causes an alarm such as a bell or a vibrator on the owner's handset 30.

Devices 10 may use a multi-axis accelerometer 623 to detect movement and velocity of the device, a useful bit of information in understanding what is happening to the device. Is it being moved? Has it fallen still? Answers to these questions can be of great help in knowing where to look for a lost device and systems for generating accompanying alerts and notifications that provide motion sensor data are described for example in U.S. Pat. Nos. 9,564,774, 9,774,410, 9,900,119, 9,961,523, U.S. patent application Ser. No. 15/959,250, and US Pat. Pubs. 2015/0356862, 20150356858, and 20180190103, wherein all said patents and applications are co-assigned at this filing and are incorporated herein in full by reference.

In past versions, the logic for detecting "lost" or "left behind" scenarios is resident in a software package installed on the user's smart device 30. However, in an advance in the art, the XCB device can be provided with firmware that monitors BT radio traffic from the owner's smartphone and other BT local sources and if there is an abrupt change, can CALL HOME 1236, uplinking current motion, heading and radio topology data. Because the network is intimately monitoring the smartphone's position, the mismatch can be almost instantly recognized. This eliminates a nagging latency that has been observed in practice because the smartphone OS forces the finder app to operate in background with a lag of up to 10 minutes between updates. Transferring some of the smarts to the XCB radiotag, and getting a quick uplink from the XCB radiotag to the system host, the problem of late recognition of "lost" and "left behind" scenarios is eliminated.

The owner may realize that there is a "lost" or "left behind" problem within a few seconds and go back to retrieve the keys, but if not the system 1110 continues to intervene. If the owner becomes so far separated that Bluetooth connectivity is about to be lost, as evidenced by a weakening RSSI, then the device 10, lying on the ground, will use its cellular radio to broadcast another alarm 1236 at cell tower 901*d* that is relayed 1237 to the cloud host 1111. When the owner finally realizes he has lost his keys, he may activate a screen on his handset 30 and is guided by a map display back to the spot 1234 where the keys were lost. The system pushes the map onto the foreground screen when the user pulls out the smartphone. As radio proximity is restored and the owner doubles back toward spot 1234, the owner can use the BT Proximity Locator Toolkit on smartphone 30 to activate a beeper or light on the lost radiotag 10 and then search using hearing and sight. Navigation using a smartphone has increased dramatically in speed and accuracy and is driven by the emerging market for personal location data, and specialty markets such as self-driving cars, for example.

Even if someone else picks up the keys, for example, and turns them in to the cashier at the nearest business from which the owner would have exited, the system 1200 will know that the keys have been moved and via the cellular radio can pinpoint the updated location where the keys are to be found.

The administrative server 1111,612 (FIG. 6C) keeps location data and can help the user/subscriber recover the keys even from across town or across the other side of the world. The system will not alarm unnecessarily, such as when the keys are in a safe place at home, but can be quick enough to catch a user who is about to leave his keys in the car.

Similarly, a user/subscriber can program radiotag 10 attached to a keychain 110 to automatically tag the location where he parks his car. For example, when the car has stopped moving and the owner has exited the car, accelerometric and heading data is recognizable as characteristic of parking a car. Or a button press may be used. The radiotag sends this data to the companion handset 30 or host server, and a map pin is stored in memory that shows the location and the time the car was parked. The map pin will be updated if the car and driver moves again. It is a simple matter to call up this information if the owner has forgotten where his car is parked. And perhaps of equal value, the system can keep track of time on a parking meter, flag a warning when the time is almost up, and even contact an automated metering system operated by a city to add minutes when the owner is unable to tend the meter.

By incorporating cellular radio, the distances at which lost devices are retrievable is increased from tens of meters to tens or hundreds of kilometers. For example, a device that has been pilfered may show an unexpected burst of motion, resulting in an UNAUTHORIZED MOTION alarm, but mere notification is insufficiently speedy to result in its immediate recovery. However, with a cellular connection activated, the device can CALL HOME 1 from wherever it ends up, and will provide a location where it can be recovered. In addition, the owner's friends and the community of user/subscribers can also watch for it. Any smartphone that detects the BT radiotag signal or an active cellular network connection becomes a global finder for locating the lost item.

At any time BT connectivity is good and the companion smartphone 30 operated by a user/subscriber 11 is in BT radio proximity, the cellular modem of radiotag 10 may be kept in SLEEP mode to save energy. SLEEP mode will have features of PSM mode, for example (FIG. 8B). Alterations to PSM, DRX and eDRX modes can be triggered remotely using Bluetooth radio signals routed through a smart device or reference hub that is connected to the cloud, or when the cellular radio is AWAKE and receiving direct commands from a cellular radio network in a paging window. The cloud host can then immediately send a notification to the owner's smartphone 30, or if that opportunity is missed, the hard impact of the keychain when dropped can trigger actuation of the cellular modem of the radiotag, and the radiotag can make a CALL HOME 1, reporting its status and location to the cloud host. The cloud host then can command the radiotag to keep its cellular modem active while simultaneously notifying the owner.

Logic conditions in which the cellular modem is in SLEEP mode are those, for example, in which (a) the radiotag 10 is in a familiar "safe" location, such as at home or at an office, and not moving away from that location; or (b) is receiving a familiar BT radio tether signal from a hub or companion smartphone 30. Also, when accelerometry and motion sensing indicate that the device is stationary, the processor may shut down the cellular module until movement is detected. If movement is detected, the cellular wakes up to CALL HOME if at all, only according to a regular schedule, the periodicity of which is selected by the user or by the requirements of the network to keep the cellular device authenticated on the network.

Some logic rules for activating cellular modem may be based on RSSI. Other contextual information available to the cloud host or to the user's handset may be used to determine what if any added intervention is appropriate.

Figure 13A:
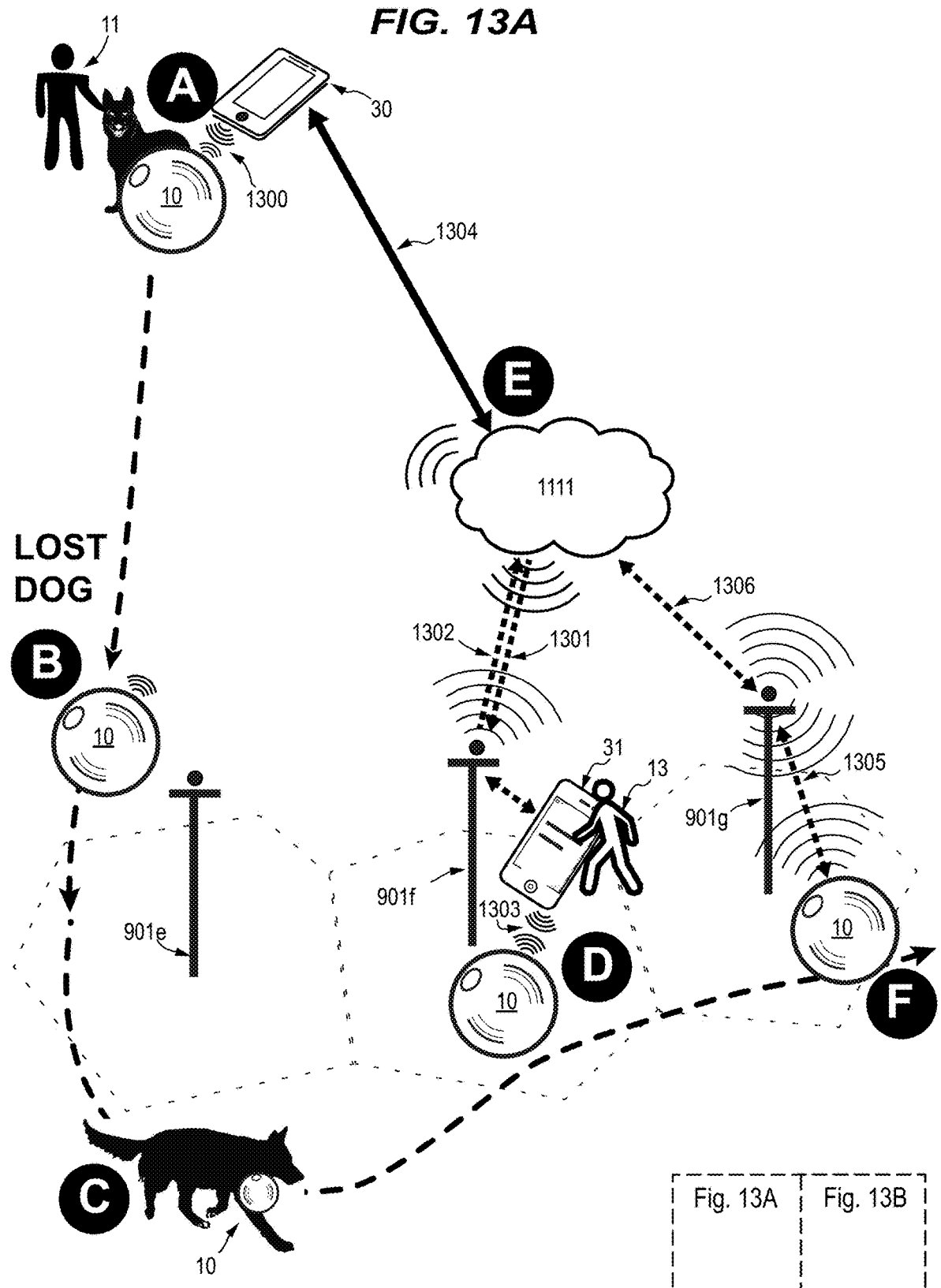
FIGS. 13A and 13B illustrate an analysis and systems approach to a "lost dog" scenario.
Figure 13B:
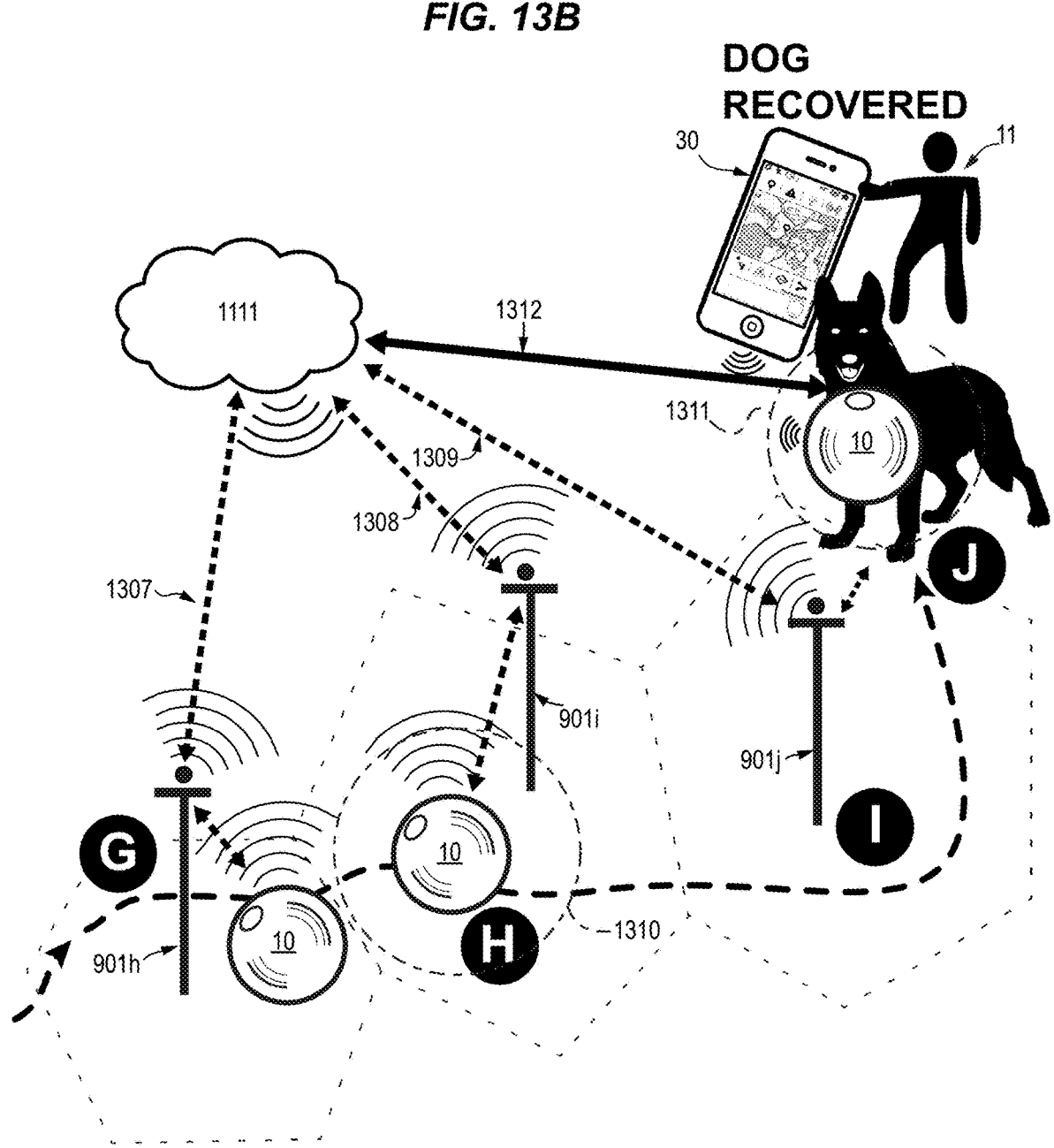

FIGS. 13A and 13B form a composite view that illustrates discovery and tracking system features in a "lost dog" scenario over an extended distance that includes several cellular towers (the distance being large enough that cooperative engagement of both the BT and the cellular radios is required to recover of the lost item). FIG. 13A illustrates a series of events that result in a cellular network connection and a location fix. FIG. 13B extends the concept of Bluetooth Proximity Tracking as a complement to cellular tracking.

Initially, at point A, the owner 11 attaches a new radiotag 10 to his dog's collar, and installs "application" software in a companion smartphone 30 so that the radiotag RUI can be captured and the device set up for use. When setting up a new radiotag 10, a prudent owner will generally select eDRX and PSM settings to limit radio activity of the cellular modem to short periods or intervals. In contrast, the BT radio is typically set to "always listening" and will immediately respond to BT radio commands from smartphone 30.

By way of illustration, the dog jumps the fence and runs off. By point B, the dog is lost. At this point, the cellular modem is asleep and the BT radio is listening but is out of range of the owner's smartphone 30. At C, the radiotag 10 is out of range of cell tower 901*e*, and even if it was in range, the cellular modem is in SLEEP mode and not available in a paging window. Because the cellular modem is programmed to be on and to CALL HOME only at certain intervals set up in eDRX or PSM (or if a cell tower is not available at the active time), the call will not go through, such as occurs at point C.

The situation improves at point D. The lost device 10 enters BT radio proximity to a compatible smartphone 31 carried by a community user 13, who is passing by. A Bluetooth discovery event 1303 occurs that allows the BT radio of the passerby's smartphone 31 to connect to the BT radio of device 10, and the passerby's smartphone sends transmission 1301 to cloud host 1111. The message 1301 contains the radio unit identifier (RUI) of the lost radiotag, along with a timestamp and typically a geostamp.

Almost instantly, the cloud host server 1111 sends a command 1302 back to the lost device 10, commanding the cellular modem to wake up and CALL HOME. A network communications link is established at tower 901*f*. During the brief time in which the two devices 10,31 are in BT radio proximity, the cloud host will "borrow" time on the community device to send a BT command 1303 to the lost radiotag from smartphone 31; essentially using the BT radio of the community device 31 as a proxy for the owner 11. This can be an AT command sent to the XCB cellular modem over the BT radio, for example. XCB radiotag 10 is preprogrammed to know how to make a CALL HOME and that information is stored with its SIM module. On receipt, radiotag 10 is configured to wake its cellular modem and override any cellular power management protocol.

Typically the network command to CALL HOME is queued for delivery while waiting for any first discovery of a lost radiotag so that it can be automatically and quickly initiated during any brief BT discovery event. In this way any fleeting BT contact can be "leveraged" to power up the cellular radio location tools of the lost device 10.

Once the cellular modem is ACTIVE and CONNECTED to a network, it can receive direct cellular commands 1304 from the cloud host or from its owner via cell tower 901*g*. Almost simultaneously, (point E) the cloud host server 1111 notifies 1304 the owner 11 and displays a map location of the lost dog on the owner's handset 30. As instructed by the owner, who can now enter direct cell-to-cell radio messages, the lost device at point F is updating location on a more frequent schedule 1305,1306. The cellular radio of radiotag 10 is now ON and a handoff to a next cell tower 901*h* is a routine matter at point G, referring to FIG. 13B.

By points G and H, cell towers 901*h* and 901*i* have received and forwarded a series of waypoints to the cloud host in signals 1307,1308; this continues 1309 at cell tower 901*j*, so that the owner can log a trail of waypoints tracking the lost device through the series of cell towers and extrapolate where the dog is going. Dashed circle 1310 indicates an approximate cellular location fix at point H.

Each cell tower reports an updated location with timestamp and the cloud host updates a map for the user on handset 30 so that the user can estimate an intercept point to catch the lost dog. By the time the lost dog is at point I, the owner is waiting to intercept it at point J. For final tracking at point J, the owner will switch on the Bluetooth Proximity Tracking Tools on the handset 30. By doing a sweep, an increase signal strength may be detected. When closing in (dashed circle 1311), using the Bluetooth Proximity Locator Services Toolkit, the owner can send a command from the handset 30 to the radiotag 10 to launch an alarm state, causing a buzzer to go off. In one embodiment, the radiotag is configured to emit a dog whistle alternating with an audible tone that the dog has learned to obey. Even though the dog is in an alleyway, the owner can readily find it (or the dog can find the owner) using the audible tone and the approximate position of the cellular location fix as shown on a streetmap of the area displayed on smartphone 30. On command from the Toolkit, an LED on the radiotag may also be illuminated to improve visibility if the alley is dark. Using these tools, the combination of network assisted location fixes and BT proximity radio commands, the dog is quickly re-united with the owner, even if the dog has strayed across town or into another State. Even though cellular coverage is spotty in some rural areas, if the owner can get close enough, BT radio is sufficient to know where to spot the dog.

More generally, in one embodiment, the tracking methods enabled by the system of FIGS. 13A-13B include receiving a message that identifies a transmission from a lost radiotag at cloud host 1111, the cloud host having an administrative server configured with an instruction set and an administrative database containing user profiles, such that the instruction set includes instructions for: (i) parsing the message so as to extract the radio unit identifier (RUI), any sensor payload, and any associated timestamp, proximity measurement, or geostamp coded therein; (ii) then, based on the owner identification, sensor payload, and any contextual information associated therewith in a user profile, (iii) formulating a command or a notification, such that the command or notification is based on rules associated with the owner profile in an administrative database and any rules implemented by a system administrator on behalf of a community of members; and finally, (iv) transmitting the command or notification over a network to at least one smart device 30, to a remote machine 31, to a radiotag 10 or to any other actuable device.

In a variant on the lost dog method, the XCB radiotag 10 on the dog's collar can include a homing button, such that if the dog can be approached by a passerby, the passerby can press the button to initiate a CALL HOME. The radiotag has an IP Address and will contact a cloud server over a virtual private gateway to reduce unwanted radio traffic and prevent unauthorized location tracking. The cloud host will receive the dog's current location, and may even be able to patch through a live voice call between the owner and the dog, or the owner and the passerby, by which helpful reassurance and information can be exchanged. Such radiotags may include a speaker and microphone in a weather-resistant package if desired. Any voice call made via a packet data environment with a radiotag 10 necessarily will consume significant battery power, but if it leads to the pet's swift recovery, then the radiotag can be easily recharged or replaced.

Figure 40A:
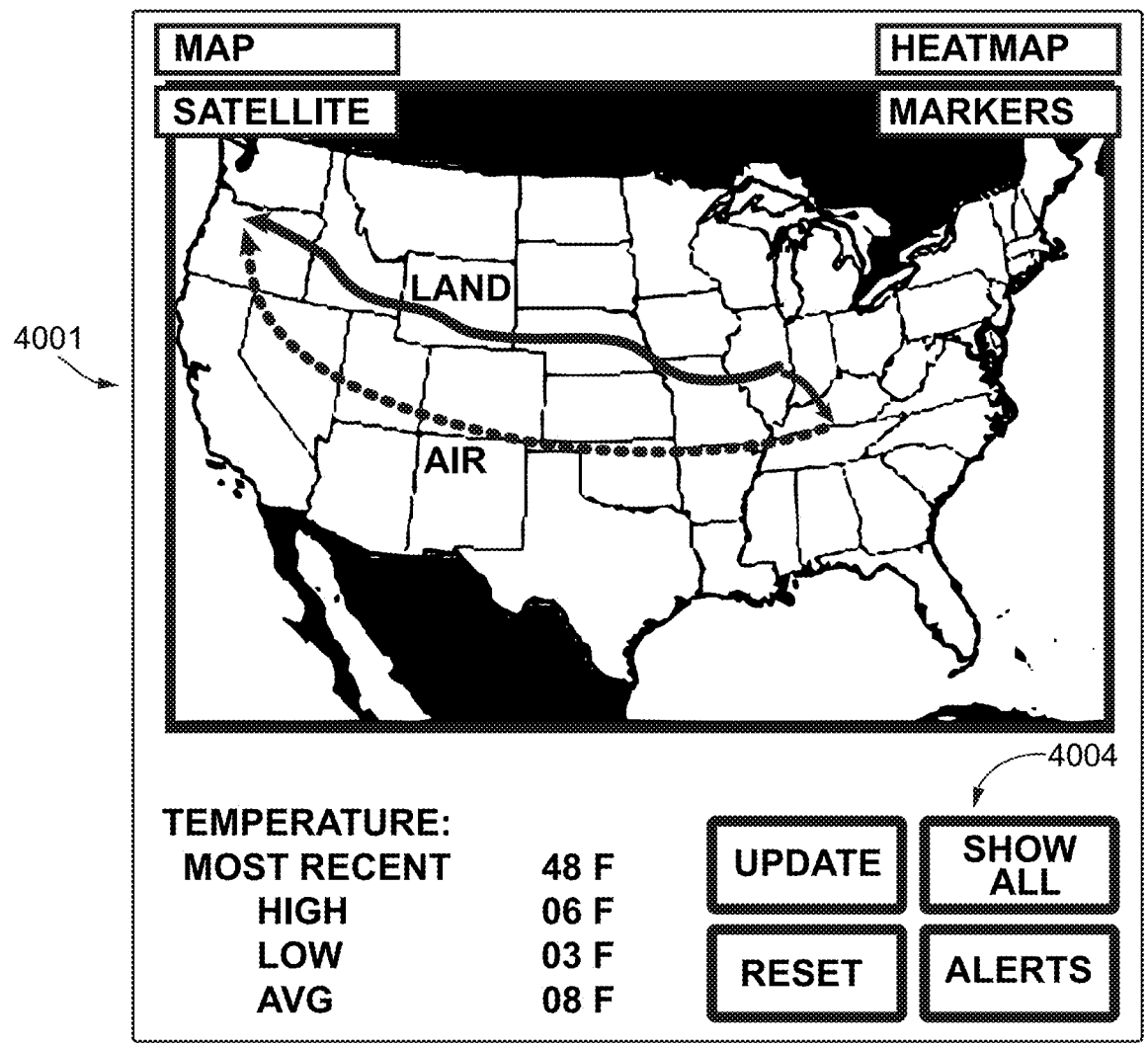
FIGS. 40A and 40B show a map with a shipping route and a plot of temperature data reported by a data logger device during a cross-country shipment.
Figure 40B:
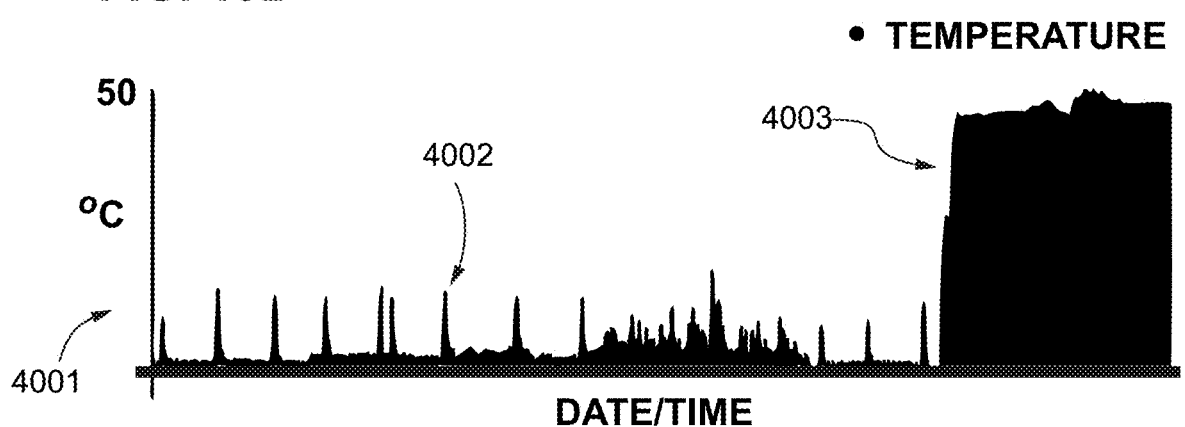

While the illustration above relates to a lost pet, the same apparatus can log temperature information in a shipment from point A to point J, for example, or, illustrated in FIG. 40A and FIG. 40B by another example, which relates to "cold chain" data logging. The logged data can be periodically reported to cloud host 1111 during a scheduled CALL HOME or if the temperature of the shipment as sensed by the radiotag 10 crosses a threshold. Analogously, a button on the radiotag can elicit a CALL HOME to activate tracking, to alert the shipper that the shipment has been received, or to prepare a report that plots a temperature history 4000 for the shipment, for example as a function of the route and miles travelled on map 4001. Temperature spikes 4002 may be indicative of handling or stops along the way. Temperature excursion 4003 may indicate a breakdown of the refrigeration system on the truck, for example. A control interface 4004 offers the user different ways to review the cold chain data and make decisions about the quality of the shipment.

In other embodiments, the method may include provision for transmitting a command such that a physical transformation will be achieved, for example opening a garage door, or rolling down a car window, where the owner is not in physical proximity and needs assistance in performing the action. The command to the plurality of remote machines or actuation devices may be a command to execute a machine action or to actuate a device.

The owner typically will preprogram the radiotag 10 with a duty cycle for the cellular radio set, setting wake/sleep duration and frequency, and any eDRX and PSM parameters, along with any geofencing and location suppression so as to reduce energy drain and activation of alarm features where none is needed. Alarms associated with motion patterns are used to further control unwanted activity. These preset features can be reprogrammed remotely; even if the device is lost.

Scheduling cell connectivity conserves power by setting rules that help reduce power loss. The device can be put to sleep for example, when it is safely at home (at a "home location" defined and fixed in memory). Or the sleep mode may kick in only at night, and the clock in the device will turn the device off at 10 PM and back on at 6 AM, for example. Alarms for specific geographical limits may also be preset, as will be described further below.

If the radiotagged asset not found promptly, then the owner can report the lost device 10 to a cloud administrative server, generally on a web page or user interface accessed through a smart device 30. Because the radiotag device is identified in the database by nickname, radio unit identifier (RUI) and/or IMSI, the server typically can analyze incoming radio traffic reports in real time and flag those reports that include the identifier(s) associated with the lost device.

Because a timestamp and location are included with the incoming radio contact reports, the server can notify the owner and show a map locating the most recent contact or plot a series of contacts to extrapolate its location. The system assembles information to construct a preliminary location of the missing device. First contact enables the system to now use cellular communication and more powerful the more wide-ranging location tools of the cellular network(s). These can include AGPS, capture of actual GPS locations from nearby smartphones, triangulation from cell towers, advanced forward link trilateration (AFLT), POLTE, and use of community resources to identify radio landmarks associated with the first contact. A map is constructed and the system may present a detailed GUI to help the owner map and grasp the location information and take action to recover the device. Based on where the initial contact is, for example, the owner can send the information to friends who might be able to assist if the device has been left at a friend's house.

A strategy for finding the device is quite different if the missing device is stationary versus a device that is on the move. If stationary, the cloud host can assemble aggregate information to finalize a consensus location (the office, the grandparent's house, the doctors' office, the restaurant, and so forth). It is then up to the owner to go there and do a sweep using the Bluetooth Proximity Locator Services Toolkit to find the device either using an RSSI sensor as an indicator of distance, or activating a visual or audible alarm. Positions obtained by Bluetooth RSSI mapping are generally about as good as those obtained by commercial GPS, but when in close radio proximity, activation of an alarm display, visual or audible or both, will generally be sufficient to find the lost device, even if it has fallen into a dark corner or is in a coat pocket.

The device is more difficult to locate if it is moving. The assistance of the cloud host is essential. The cloud host will receive periodic reports of cellular contacts, cellular coordinates by GPS, Bluetooth contacts, and so forth, and may be able to use predictive algorithms to extrapolate possible destinations or intercept points were a realistic attempt can be made to recover the device. Receiving location information from a cluster of cell towers by a process of advanced forward link trilateration (AFLT), AGPS or PoLTE as an alternative to the traditional triangulation with directional antennas has proved increasingly accurate in areas covered by cellular service carriers when used in combination with machine intelligence now becoming frequently a part of every online search. Chances are quite good that the location is going to be accurate within a few yards.

Figure 14A:
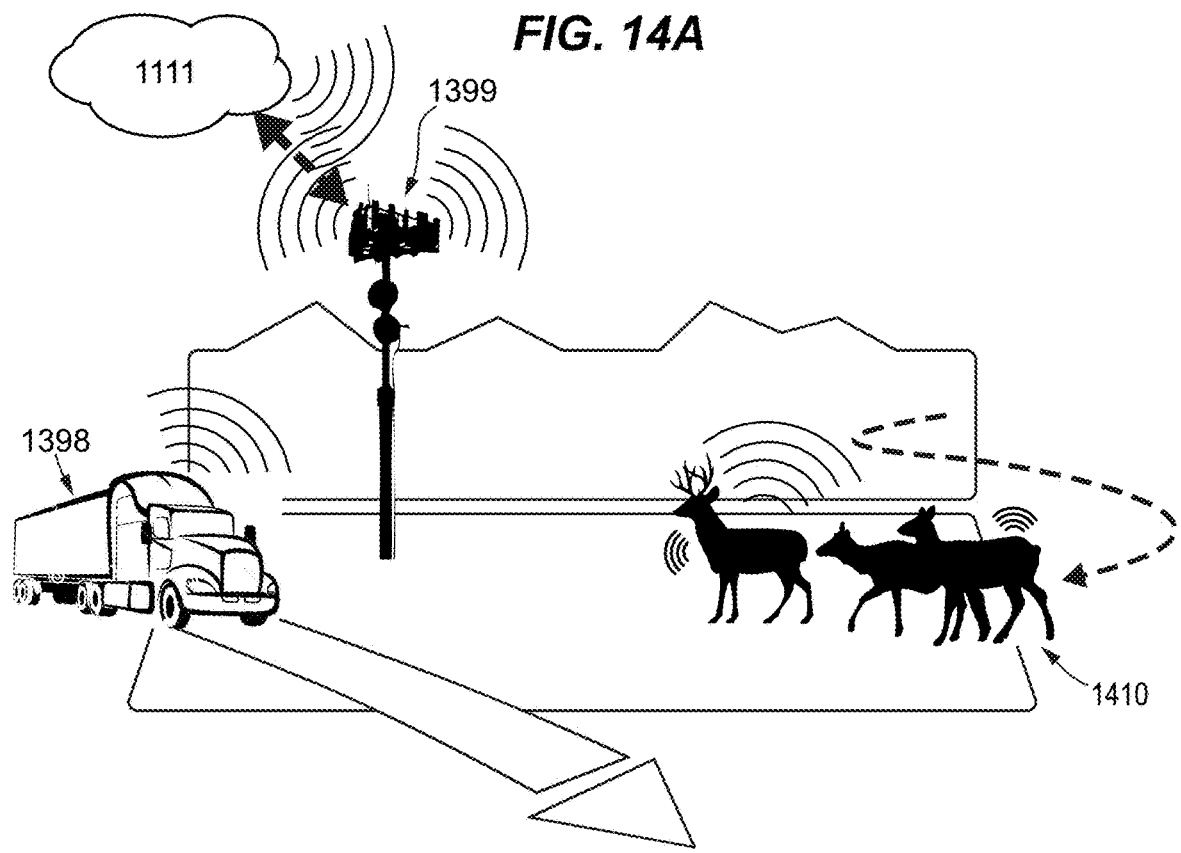
FIGS. 14A, 14B and 14C illustrates a radiotag solution to proximity monitoring and avoidance for vehicles and wildlife.
Figure 14B:
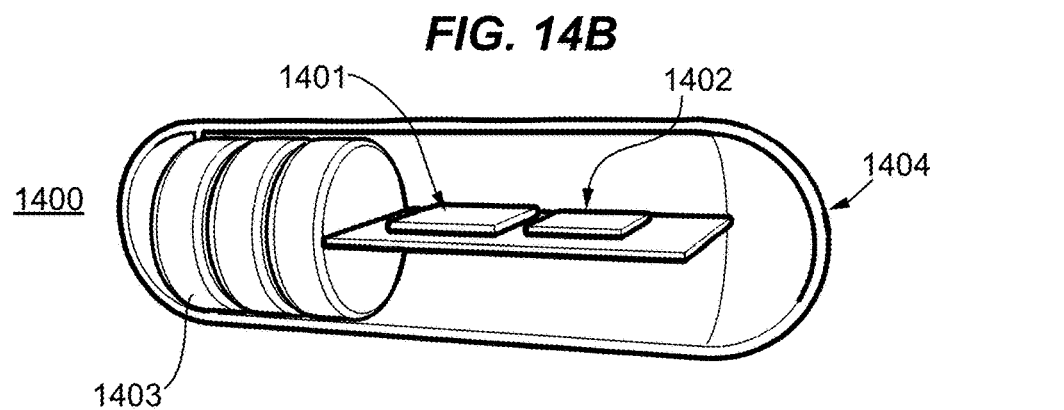
Figure 14C:
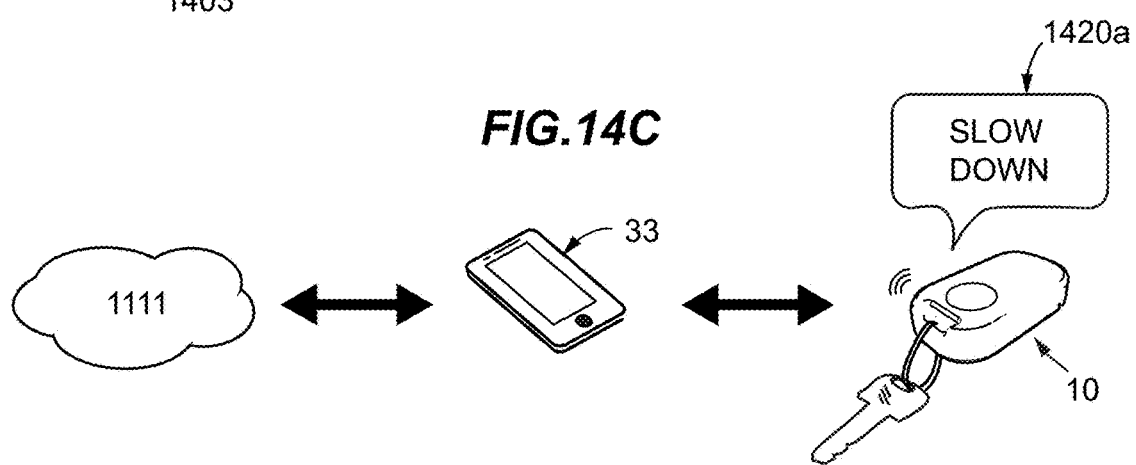

As shown in FIGS. 14A, 14B and 14C, XCB trackers are not limited to human use. Many areas of the world have spotty cellular coverage, but by tagging animals with an implantable XCB radiotag 1400, their location, even in rugged terrain, can be captured by citizen scientists, who can download an application, which when installed on a smartphone 33, detects any tagged elk in proximity and sends the location data, complete with individual animal identification, and sends the data to a cloud host 1111 operated by the National Wildlife Service for further analysis of the migratory patterns. The application enables crowd-sourced biology and can also be installed in drones for aerial surveys of populations.

Persons who are afraid of the animals can avoid them. Where animals and humans interact, the implantable devices can be monitored, either in cell radio areas around cellular radio towers 1399 or by Bluetooth-to-Bluetooth proximity radio. In this example, a herd of elk 1410 crossing a highway in a rural area are tagged and broadcasting. An approaching truck 1398 can receive a warning to slow down 1200 ft from the animals. In one instance, a smartphone 33 with installed application is alerted to the proximity of the animals and causes a second XCB radiotag 10 on the driver's keychain to speak in a synthesized voice, (Caption 1420a: "Slow down, elk crossing!") Bluecell-to-Bluecell radio interactions are implemented by cellular or by BT radio. A voice interface includes a speaker in the device, and optionally a microphone, essentially as a mobile voice-actuated hub.

And in advanced applications, the devices are equipped with piezo buzzers that alert the animals to look up and take caution. The devices are implanted under the skin of anaesthetized animals in the field, and have a service life of more than a year, allowing scientists to gain a rapid understanding of their range and habits. A temperature sensor logs and sends data that indicates the health of each tagged animal. Similar devices can be used to reduce poaching of elephants in the same way.

A cutaway view of an implantable subcutaneous XCB radiotag 1400 is shown in FIG. 14B. Numbered are a microcontroller 1401 with integral BT radio, a cellular module 1402, and a stack of coin cell batteries 1403 in a sealed polytetrafluoroethylene shell 1404, the interior of which is potted to prevent any leakage. Antennae for both radios are surface mounted on the PCB or are bayonet mounted. An RFID chip may also be included.

The systems described above enable generalized "proximity avoidance", such as useful for "social distancing" required to reduce viral infectivity and transmission rates between humans. The COVID-19 pandemic has led to widespread implementation of a prohibition against close proximity between any two persons, generally defined as a two meter or six-foot radius around any individual. Persons who approach closer than the prescribed distance are at greater risk of transmitting the virus in an aerosol or by direct contact. Social responsible behavior is to reduce the risk of transmission by maintaining a distance of greater than about 2 meters or 6 feet at all times, but particularly when having a conversation, because the virus can become airborne from an infected host during vigorous breathing or talking, even when the host is asymptomatic. Airborne droplets and aerosols containing virus particles are readily carried in the air over short distances.

Analogously to EXAMPLE I, for proximity contact detection and tracing CB radios are used to assess radio proximity. Cellular radio is used to report radio contact data, including radio proximity data, over a cellular network so that a cloud host 1111 can log close contacts for contact tracing and generate alerts to user/subscribers as needed. Advantageously, the Bluecell devices are enabled to detect close proximity by measuring RSSI of BT signals emitted from a first radiotag device and received by a second radiotag device. Individuals each wearing a device are automatically monitored for radio proximity. A spike in RSSI value indicates a close approach of the transmitting and receiving radiotags and a threshold in the RSSI value corresponds to a "too close" physical distance. The XCB devices not only can enter a TOO CLOSE alarm state if social distance is too close, with associated buzzer, synthetic voice alert, or blinking light that has a reminder and a training effect, but the devices collect and log an identifier of the proximate transmitter, be it a BT radio unit ID, an IMEI, an IMSI, or just a MAC Address, and transmit a summary of the radio contact record showing the identifier(s) of receiver and the transmitter radio units, the RSSI value as measured, a timestamp and optionally a geostamp. This data is logged by an administrative server and can be used for follow-up if one of the individuals later tests positive for the virus and there is a need to trace all the possible contacts back several weeks in time where a chain of transmission may have begun.

FIG. 15A illustrates use of a "safe zone" to monitor BT radiotags; shown here describing use of cloud cutting to enforce an exemplary radio geofence 1500. Radiotag XCB1 (10) is a dual-radio XCB device 10; radiotags TD1, TD2, TD3, $TD_N$ (1510, 1512, 1514, 1516) have only a BT radio. The radiotags are assumed to be associated with selected assets belonging to or of interest to user 11, where 'N' is an integer subscript indicating a number of radiotagged assets. While the radiotags may be attached to assets by any convenient mounting or attachment hardware, the radiotags may also be built into or embedded in the body of the assets. Each radiotag is registered in a user profile on a cloud host 1111. Safe zones may be used with XCB radiotags for enhanced pet finder services, for example.

Smartphone 30 is operated by user/subscriber 11 and includes software for displaying and operating a user interface. The user interface is designed for tracking the radiotags, entering user commands, receiving notifications, and creating or updating the user profile. The software defines an "application" or "control program". The user profile includes a programmable definition of geofence 1500 and is stored in computer readable media in the cloud host 1111.

Geofence 1500 bounds a "safe zone" 1501. The geofence can be defined by GPS coordinates or by reference to a location such as "home" or "office" having fixed coordinates. For example, the geofence can be described in several ways: by (a) coordinates for a northwest corner and a southeast corner of a rectangle (or more properly a "spherical rectangle") to describe a geographic area with enclosed topology, (b) a center coordinate and a radius or diameter, (c) a GeoJson-formatted list of points that outline a polygon; (d) the geographic area between any two latitudes and any two longitudes; (e) the area above or below an altitude bounding a hill or a valle; or, (f) known dimensions of a room or building with reference to a fixed point in space and time; without limitation thereto. Once established, the geofence defines a test that a computer can perform: given the coordinates and location of a radiotag in space, is the radiotag inside or outside the geofence? This simple test gives rise to a whole range of rules-based commands that can be programmed into a system and executed by one or more remote machines.

Having received and stored a user-defined geofence 1500 and safe zone 1501, the cloud host manages a system for enforcing rules related to the safe zone or zones. Any report of radiotags $TD_1$ through $TD_N$ or XCB1 at a location that is not within the expected boundary conditions of a geofence will trigger an "exception notification" to the user/owner 11 via smartphone 30 or some system intervention. Effectively, the system becomes a watchdog that monitors location of the assets and issues an alert to the registered user/owner if a detected location is not within the geofence.

The system includes a community of users 13, each operating a "community nodal device" (referencing U.S. Pat. Nos. 9,774,410, 9,900,119, 10,063,331, 10,361,800, 10,389,459) such as smartphone 31, that scans for signals from radiotags and reports them to the cloud host. The reports include a radio unit identifier (RUI) of the transmitter and timestamp and a geostamp that records the time and place the transmission was received.

For example, smartphones 30,31 make a location determination when a radio signal is received from radiotags TD1 through $TD_N$. A record of the radio contact that includes a radio unit identifier (RUI) associated with the radiotag is timestamped and geostamped before being sent to the cloud host. Signals from radiotag XCB1 (10) may also be reported by smartphones 30,31, but the cellular modem may make an independent location fix using internal GPS or network assisted AGPS.

Based on radiotag location information received from smartphones 30,31, and from any independent contact with radiotag 10, the cloud host 1111 looks up any geofence definition(s) associated with each radiotag in a user profile by its RUI and generates an intervention if needed. Thus for example if an asset associated with radiotag TD3 (1416) leaves the area demarcated by geofence 1400, any BT radio contact with community nodal device 31 will result in a radio contact report to the cloud host 1111 and the cloud host will issue a notification to owner's smart device 30 that indicates the time and location that the errant radiotag 1416 was detected outside safe zone 1401. By extension, other community nodal devices 31 may provide a continuing trail of waypoints that update movements of any errant radiotag outside the safe zone so that the owner/subscriber's smartphone can display the trail of waypoints on a map display 30.

If the asset TD3 left with some authorized user (such as a friend), the system may be able to note that radiotag TD3 has paired via BT radio link with an authorized user's smart device, and that information can be weighted by the system in making reports to the owner/subscriber 11. In this way, for example, an employer can keep track of assets that are routinely taken to job sites by employees and returned at the end of the day to a shop or central warehouse.

The timestamp may also be helpful in allowing a user to set time restrictions on the geofence and safe zone so that short term borrowing by authorized users is permitted, but overnight absence of a radiotagged asset from the expected location results in an exception notification, for example. If the asset was last linked to an authorized user, a notification can be sent as a query if there is a temporal exception, asking for an explanation to the authorized user, but if the asset left with a stranger, the system can attempt to track the asset and will report any outside radio contacts unless and until the asset is returned to its expected location within the geofence.

The behavior of XCB radiotag XCB1 (10) is distinct from radiotags that lack a cellular radio. When radiotag 10 exits the safe zone at 1508, its BT radio signal is registered by community nodal device 31. A report will be sent to the cloud and the cloud can immediately respond with a command to radiotag 10 to CALL HOME 1 by turning on its cellular modem. Alternatively, the radiotag, recognizing that it is not where it is supposed to be at 10a, will take a location fix on its own and can call home to report. On receiving the CALL HOME, the cloud host will generate a notification to owner/subscriber 11 via smartphone 30. Thus, the devices 10 of the invention enable autonomous tracking that is not possible with ordinary BT radiotags 12 (FIG. 1).

FIG. 15B extends the concept of radio geofencing to a user who programs a first and a second geofence, shown here as HOME location safe zone 1502 and WORK location safe zone 1503. Each geofenced area 1502,1503 is defined by GPS coordinates or by a radius around a fixed anchor point, for example. In this instance, the user 11 may carry an asset tagged with radiotag TD3 1516 back and forth between the two geofenced areas. Radio contact reports sent to cloud host 1111 from the user/owner's smartphone 30 will show that the radiotag is travelling in uniform proximity to the user. Even though there is motion of both the radiotag and the smartphone, because the radio proximity is unchanged, no system intervention is needed. Radio contact reports [[is]] received by an anonymous user 13 via community nodal device 31 during transit from one safe zone to another are not actionable if the radiotag is accompanied by the owner's smart device 30. At any time that radiotag TD3 1516 is within one of the safe zones 1502 or 1503, the system will not alarm or initiate a CALL HOME if the signal from smartphone 30 is lost. Thus 'safe zones' provide a valuable tool in reducing the complexity of logic conditions for location management.

By extension, the safe zone is adapted to include proximity to the owner/subscriber's smartphone 30. And a geofence can be time-dependent, such that geofences are enforced only in certain time blocks, for example. If any of the radiotagged assets are not in their expected local areas at designated times programmed by the user/owner, and are not in radio proximity to smartphone 30, then a "TAKEN AWAY" or "LEFT WITH" alert may be issued to the user/owner via smartphone 30 or to a secondary authorized user. In this way friends and associates can share assets but still ensure that unauthorized removal of an asset will be noted and tracked by the cloud host. These actions are all managed on the cloud host with essentially no burden on the owner, friends or on the community of users.

The owner/user 11 can select the alerts and threshold values on a user interface and the alerts are stored in a user profile. Any radiotag that is stationary when the user's smartphone is mobile could indicate that something has been left behind, and any device that is moving but moving in a direction away from the user's smart device would also trigger a "wayward motion" or LOST alert, for example. For example, if TD3 (1516) is moving with user 11 but $TD_N$ (1514) is not, then a "left behind" alert is caused to be issued even before the owner has left the area defined by work geofence 1503.

BT radiotags TD1 and TD2 1510,1512 are dependent on community user device 31 to send a radio contact report to the cloud host so that the system can evaluate and intervene if the radiotag has left the safe zone. In contrast, radiotag XCB1 (10) is not dependent on an external monitor, and can CALL HOME at any time to report a current location or to request location assistance from the network, for example if there has been a power failure in an office building, if there has been an earthquake, a shock, a temperature drop, or any of a variety of conditions, including a change in the radio signal environment in its vicinity. $TD_N$ 1514 is passive, and reacts to commands from the system but is not able to take action if lost; but CB1 10 can report itself lost and act to cause a system notification to the owner or a direct intervention. A wayward XCB radiotag 10 (XCB1) can initiate a cellular network connection to report its own position and if that position is outside the boundaries of a defined safe zone, then the system will intervene, either by notifying an owner/user 11 or by directly causing an alarm display on the radiotag, for example. Radiotag 10 capacity to obtain a location fix can be based on an onboard GPS or AGPS capacity or based on some cellular network serve such as LoLTE or PoLTE, for example.

In one embodiment, power management in radiotag 10 follows principles set forth in FIG. 11 (above). When the initial location is within a safe zone around owner/user 11, the cellular modem of radiotag 10 is in SLEEP mode. In response to motion detected by the radiotag, or by loss of radio proximity detected by the BT radio of the radiotag (where proximity to smartphone 30 is assessed), the device can wake up its cellular modem to CALL HOME and get a location fix.

Alternatively, the smartphone can monitor RSSI proximity of the BT radio signal from radiotag 10 and if there is an increased separation (decreased RSSI), for example, the smartphone 30 can send a command to the radiotag 10 (via the BT radio) to wake up the cellular radio and CALL HOME.

The safe zone can also be defined by a boundary condition established by a "radio tether" to a reference smart device or other stationary anchor or hub. The radio tether incorporates two concepts that were described in FIG. 11: accelerometry and/or heading data and radio proximity. For example, radiotags TD3 (1516) and TDN (1514) may be tethered in a piconet with radiotag CB1 (10). By making radiotag XCB1 the master of the piconet, it can generate a CALL HOME if there is some exceptional circumstances such as motion or heading in radiotag TDN, which is intended to stay at the owner's desk. The role of master can be switched among radiotags and smart devices, so that, for example, the smartphone 30 can take over the role of master for radiotag slave TD3 when the owner departs for home, but while at work, device XCB1 can be the master of the piconet when the owner goes to lunch but does not take the radiotagged assets with him. Where several radiotags are in use, any discrepancy between one radiotag and the others increases the probability that an alert should be issued. Any discrepancy between the motion of a device that defines a radio tether and a radiotag associated with the tether will also result in an alert.

In FIG. 15C, mobile safe zone 1504 is defined by smartphone 30, and the moving boundary of the safe zone (dashed circles) migrates with the direction 1508 of the smartphone 30.

In an exemplary embodiment, the mobile safe zone can be used to monitor a companion pet, shown here as a dog with radio collar 1510a. If there is excess separation 1509 between radiotag 1510a and the smartphone 30, such that the length of the radio tether increases to 1510b, a threshold is crossed before radio contact is completely lost, and that threshold can be a trigger for a CALL HOME 1. Location data may be routed through the virtual private gateway 2400 using a private IP address that minimizes network traffic and avoids security issues of the public IP networks. The cloud host will cause a notification to the owner/subscriber 11 if the location data violates a rule associated with the mobile safe zone.

Loss of signal from a radiotag can result in a system alert, but even before the signal is lost, the system can detect a fading signal or can receive motion data from the radiotag 1510a if the radiotag includes an accelerometer or an electronic heading sensor, and by comparing that data with motion data from the smartphone 30 for example, can preemptively issue a LEFT BEHIND or LOST alert, for example. If there is a motion mismatch in direction between the smartphone 30 and the radiotag 10, then the decision to wake the cellular modem is easier. For example, if the smartphone 30 is in motion but the motion sensor in the radiotag 1510a indicates no motion, then a LEFT BEHIND alert is generated. And if the smartphone 30 is moving 1508 in one direction or at one velocity, and the radiotag 1510a is moving in another direction 1509 or at another velocity, then a "wayward motion" or LOST alert is triggered and pushed onto the user's smartphone 30. Before the radio link is broken, the system assesses any drop in radio proximity (e.g., RSSI of radiotag at 1510b) as sensed by smartphone 30 and causes the smartphone to vibrate or alarm to call attention to the exception. Or alternatively, a buzzer or vibrator in radiotag 1510a may be actuated so that the user takes no more than a few steps before being alerted that the radiotag (and any radiotagged asset) is no longer moving in step. The system, the owner, or the radiotag may actuate a hypersonic whistle built into the radiotag to remind the dog to keep up with the owner on a walk, for example.

Prompt alerts simplify the process of retracing one's steps to find the lost pet. Radiotags equipped with motion detectors can provide a valuable stream of data that can be compared with output from a like motion detector in the user's smart device. With motion or heading data (FIG. 11), easily recognized discrepancies between moving and stationary radiotags are the changes associated with a getting into or riding in a moving vehicle, which would be readily detected even before radio signal was lost. The cadence of a walking step is distinctive from that taken on a stairway, for example. Direction that is not copacetic between radiotag and smartphone is flagged. Direction that is not copacetic between one radiotag and other radiotags of a group is flagged. Characteristics of motion may be recognized by machine learning from accelerometry data collected by a radiotag.

RSSI or other measure of path loss provides a criterion to test whether the motion of the smartphone and a radiotag are copacetic. Even within the mobile safe zone 1504, if one radiotag, for example wayward radiotag 1510b (attached to dog in phantom lines) is moving away from the user 11 (RSSI decreasing), but another radiotag TD1 1510 is moving with the owner (RSSI unchanged), the relative motion suggests a discrepancy that can trigger an early alert, as would be sent to smartphone 30 and pushed onto the display, or made evident by vibration of the smartphone, for example, to alert the user 11. Thus the system can signal to the owner that the dog has left the trail even before the owner looks back.

In another illustration, radiotags TD3 1514 and TDN 1516 are stationary and are left within a stationary safe zone 1503 such as a home with fenced yard. Interestingly, XCB radiotag 1510b (attached to dog in phantom lines) may be in BT radio contact with one or all of the stationary radiotags 1512,1514,1516 when leaving home. If wayward radiotag 1510a is fails to go with the owner and instead goes down the alley behind the house, for example, the radiotag can cause a system-implemented alert to the owner if it senses the continued radio contact with radiotag 1514 as an exception when compared with a fading strength of the radio contact with owner's smartphone 30 headed in direction 1508. By assessing radio proximity from the standpoint of wayward radiotag 1510b (as compared to radiotag 1510a), the level of confidence that a CALL HOME is needed can be achieved sooner, and for that reason, the BT radio environment around the radiotag offers useful clues to early detection of wayward behaviors. Prompt attention to location management is critical in developing obedience patterns associated with "heel" and "come" commands.

In another embodiment, radiotag 1510a may remember a radio safe zone. On return to a stationary safe zone such as a fenced yard 1503, radiotag 1510a will expect to encounter the familiar radio signals of the stationary radiotags 1512, 1514 and 1516. These can be whitelisted so that the signals are recognized. Typically these whitelisted BT radiotags would be restored to a dedicated piconet with XCB radiotag 1510a, but for example if device 1516 is missing on return home, that exception can give rise to a CALL HOME notification to the user 11 via smartphone 30. In this way, the system can identify missing items before the owner suspects they are missing.

Figure 16A:
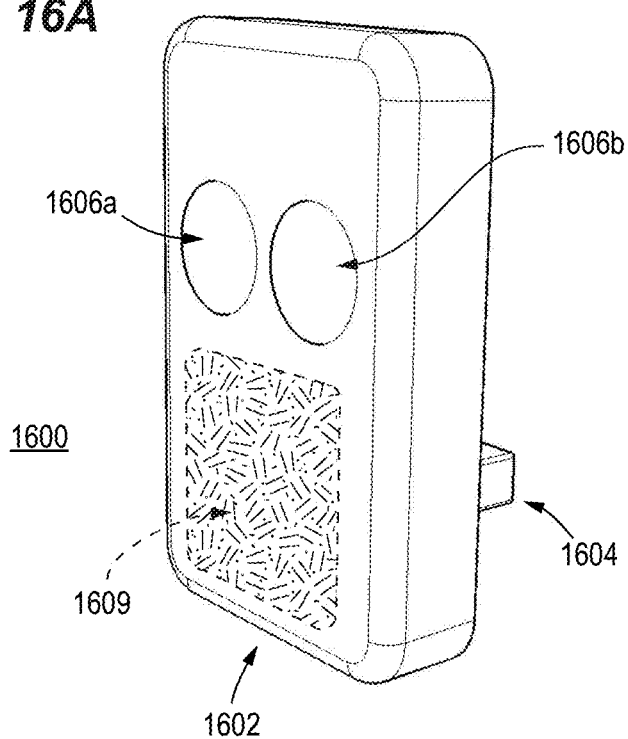
FIGS. 16A and 16B are views of a "reference hub", shown here with a USB-A male power fitting for plugging into a wall adaptor, for example in a home.
Figure 16B:
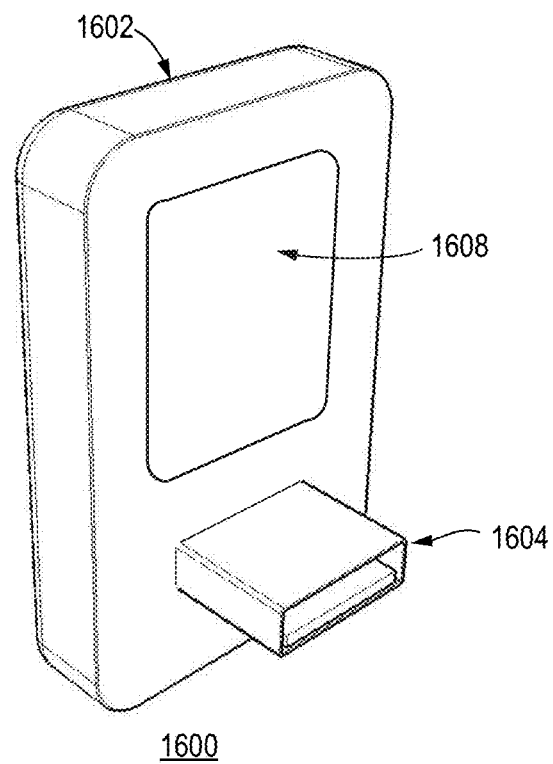

FIGS. 16A and 16B are views of a reference hub, shown here with a USB-A male power fitting for plugging into a wall adaptor, for example in a home. As shown, reference hub 1600 includes a housing 1602 with face cover and back cover that encloses circuitry. The circuitry includes a green LED visible through a button or window face 1606a on the front cover and a red LED visible through a second button or window face 1606b. The green light is an "ALL GOOD" status light that indicates one or more radiotagged assets are in radio proximity to the reference hub 1600—i.e., where they are is supposed to be. The red light is an alert that means a signal from one of the radiotags has been lost. A blinking LED indicates that one of the signals is fading. The hub 1600 is set up using a GUI provided with installable software on a smartphone or other user equipment that guides the user through set up of a piconet between the reference hub and the one or more radiotags. When the owner/user is home the user's smartphone can be master of the piconet and can monitor the radiotagged items. When the user leaves home, the hub takes over as master of the piconet for any radiotags that remain at home, for example.

Reference hub 1600 may be plugged into an AC adaptor and may be operated indefinitely in a wall plug at a single location. In the event of regional power failure, the hub may have a backup battery power supply, indicated here by a removable battery access panel 1608.

The hub 1600 may be the default master of a piconet that includes several BT 12 or XCB 10 radiotags of a common owner. As a community service, the hub may broadcasts location coordinates that a community of users (or the public in general) can use for telemetry-controlled applications, for rangefinding, for wayfinding, for finding lost radiotags, and for creating radio tethers or conditional rules-based actions linked to radio bubble centered on a fixed location. Reference hubs 1600 may be shared. A "Crowd Hub" is a unique service offered by the system. Multiple user/subscribers may establish safe zones for multiple radiotagged assets using a single hub and associated cloud service. In some instances the hub is a client; in other instances the hub is a server in relation to the radiotags and any cloud host. In client role, the hub may forward data such biometrics or voice to a server device. In server role, the hub may perform location management services for the radiotags and for user equipment. The system will manage notifications and alerts for radiotags that are connected to a hub-based piconet. LEFT BEHIND, LEFT WITH, LOST, FOUND and UNAUTHORIZED MOTION services are all supported by the hubs of the invention.

Reference hub 1600 may include an optional speaker and microphone 1609. The larger housing realizes better acoustics and optionally may be circular or spherical in shape and include a directional speaker and microphone array. U.S. Pat. No. RE47049 to Li teaches a dynamic microphone array for improved voice recognition. U.S. Pat. No. 7,177,798 to Hsu and U.S. Pat. No. 6,766,320 to Wang teach methods for natural language query and response interactions. These patent documents are incorporated in full by reference. Reference hub 1600 may include a natural language interface incorporating cloud-based speech recognition and response.

The radius of the radio bubble around hub 1600 is dependent on power. Generally the transmit power is +0 dBm or +4 dBm for BTLE applications, but can be as high as 20 dBm unless limited by law. A higher power increases the range, but care must be taken so that an impedance matched condition exists between receiver and transmitter antenna and amplifiers for best results. Because signal fade occurs with distance; given signal losses due to refraction of signals around radio opaque structural barriers, and because attenuation due to lossy media such as human bodies can be significant in crowded venues, transmit power may be variable, and a subroutine may be executable by the reference hub so that transmit power can be varied if a radiotag signal is lost. The purpose of increasing radio power is to improve the chances that a lost radiotag can receive a command to turn on its cellular modem.

In other embodiments, the hub may include WiFi so that a WLAN can be formed for reporting BT radio contacts to user equipment or to a cloud server 1111. A combination power and data connection through a USB port 1604 is provided as another option for establishing a hardwired connection to an internet portal. The device 1600 may be plugged into a household power outlet or into a dashboard of a vehicle, for example, using an appropriate adaptor. In some instances the hub may be solar powered or powered by kinetic energy for use in outdoor venues, for example.

When used portably, XCB radiotags 10 consume significant amounts of energy when maintaining a cellular network connection. By overriding cellular networking whenever a hub 1600 is within BT radio proximity, the battery drain on radiotag 10 can be minimized.

Hub master device 1600 and radiotags 10,12 have cache memory that can be used to store piconet membership and connection data, so that interrupted connections can be rapidly restored. The hub, as master of the piconet, can also designate PARK, SNIFF, and STANDBY mode for slaved radiotags, and can manage power consumption of the BT radio, the processor, and any cellular modem in the slaves while in BT radio contact.

The hub can also query qualified devices to determine battery power status and can make appropriate notifications to an owner if particular radiotag needs recharging or a new battery. By extension, where radiotags are embedded in assets such as cameras and other electronics, the radiotag can report asset technical data selected from temperature, battery status, fault status, and so forth to the hub, and that data is forwarded to the cloud host for analysis. Notifications directed at care and maintenance of user assets can be pooled and automated in this way.

In a variant, the piconet around a safe zone may be set up with reference hub 1600 and smartphone 30 as slaves and XCB radiotag 10 as master. The master will minimize its power in scanning for the slaves with a reduced duty cycle and the slaves can be set to broadcast directed advertisements at higher frequency. The XCB radiotag makes the determination if the radio tether has been broken or stretched and can call home as needed. The slaves may be programmed to report radio contacts with the master to a cloud host 1111 when the master is in a safe zone, and the network can follow the master through a companion smartphone 30 when away from home. This eliminates the need to switch master roles from reference hub to smartphone or vice versa.

Each reference hub 1600 may have an IP Address that associates it with the physical web of the IoT, and may be connected by wired, Bluetooth, WiFi or cellular means to a packet data environment via a GAN gateway or portal. The hub will have one or more RUIs and UUIDs that identify it and its services. A cloud host 1111 that receives radiotag data from the hub is able to extract additional identifiers from a user profile associated with a UUID or other radio unit identifier associated with the radiotag. Where WiFi is provided, BT and WiFi may function as complementary radios in overlapping LANs and piconets in which an internet gateway or portal is provided. Where cellular radio is provided, the capacity of the hub to interface directly with a cellular network provides a direct relationship with an administrative server.

The GAN connection may be to a cloud host 1111 or to a virtual private gateway 2400. The advantage of the VPG is the relative lack of background chatter that can drain battery power and increase latency. The VPG is also much more security friendly for sensitive information such as child location, which may be tracked using the radiotags 10 of the invention.

As a matter of convenience, a user interface can be displayed on user equipment by installing a software application, for example on a smartphone. In other instances, a user interface is accessible at a website with APIs for managing databases containing administrative and user information.

Figure 17:
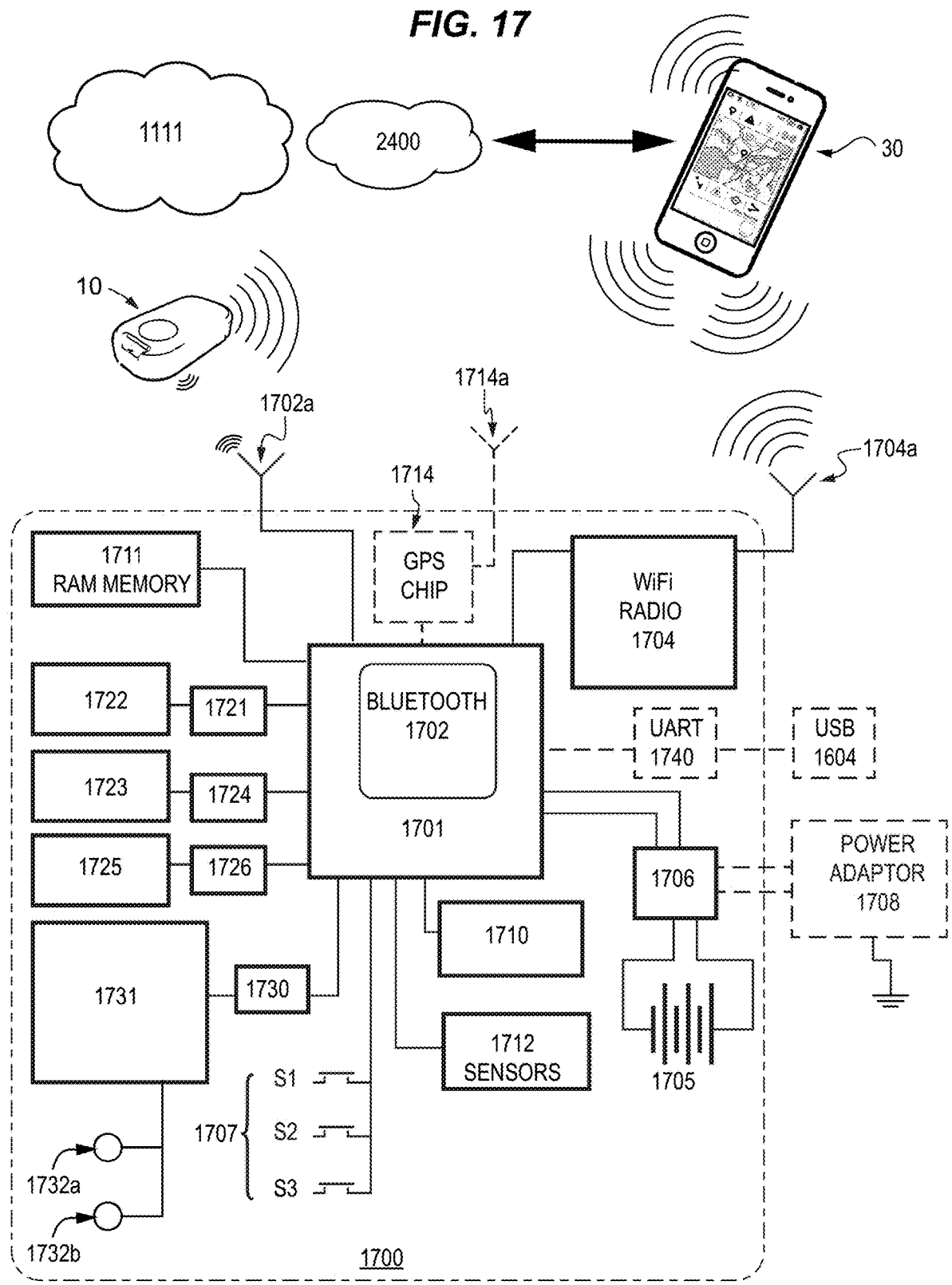
FIG. 17 is a schematic describing circuitry of a reference hub with Bluetooth and WiFi radios in a network context.

FIG. 17 is a schematic of a system with stationary reference hub 1700 useful for managing radiotags in a network context. Reference hub 1700 includes Bluetooth and WiFi radio sets.

In embodiments, the circuit includes a BTLE radio 1702 controlled via a controller circuit 1701. Power is supplied from a power adaptor 1708 and battery 1705 with power supply circuit 1706. The device may be insertable into a wall outlet power adaptor 1708 as a USB plug 1604 (as shown in FIG. 16), or the power adaptor 1708 may be a computer with a USB power and serial data plug 1604a, for example. The power circuit 1706 may be configured to convert the power input into a regulated power signal having a regulated voltage in an approximate range of 1.8 Volts (V) to 3.6 V. For example, the power-supply circuit 1706 can be any suitable type of voltage regulator, such as a linear regulator, a buck converter, a boost converter, a buck-boost converter, or a flyback converter. Logic and analog device power can be supplied via a $V_{cc}$ rail for example, directly from the battery or as regulated by the controller 1701 or power conditioning and management unit of power supply circuit 1706, for example.

The hub may include a Bluetooth radio 1702, a LAN radio 1704, and an optional GPS chip 1714 with associated antennae 1702a,1704a,1714a, respectively. GPS chip 1714 is shown as being optional not just because it may not be supplied in inexpensive units, but also because in some instances the GPS functionality will be built into the controller 1701, into a cellular radio (not shown), or into the LAN radio 1704. Many cellular radio chips are provided with accessory GPS functionality integrated into the die. The GPS antenna 1714a may be separate from a cellular radio antenna, but, in some instances, a combination antenna package is used. Based on an autonomous or network-assisted location fix, the reference hub 1700 may function as a "lighthouse radiobeacon", transmitting Lat/Long or other coordinate information as an open broadcast, and the message may be used to define a radio tether of a geofence or for community uses and applications.

For use in pet location management, reference hub 1700 can define a safe zone in which a pet is free to move around, such as a fenced yard. If the pet jumps the fence and goes for a run, the system will alert the owner. A tethered radiotag 10 may detect a break in the radio tether and wake up its cellular modem and cellular remote locator services toolkit so that a current location update can be sent to the owner at a convenient smartphone 30 and tracking services can be initiated.

The LAN radio 1704 may be a WiFi radio or equivalent. The BT core 1702 of the controller 1701 reports not only BT radio signal data, but also an index of received signal strength such as RSSI, and gives an indication of BT radio proximity within several hundred feet. If a cellular modem is provided, it is generally packaged in a cellular modem SOC and may be controlled by controller 1701 based on input from the Bluetooth or WiFi radios. In other embodiments, data sharing is achieved with a UART 1740 linked via USB port 1604 with the packet data environment of a wired network.

Optionally the XCB radiotag 10 may include multiple WLAN radios, including WiFi. As synthetic radio is implemented with software or firmware defined radios, the technical barriers are eliminated for putting multiband radio devices in radiotag-sized packages.

The BT radio 1702 may include correlators used for radio signal recognition and "always listening" radio power control. Digital messages include access codes, MAC addresses, and UUIDs, but wake commands and other network commands may also be received in BT signals. Antenna 1702a is tuned for BT spread spectrum transmission and reception. Notifications may be sent to the device via either the BT radio 1702 or the WiFi radio 1704, and may result in a display such as activation of speaker 1722 via acoustic driver 1721. Optionally, a microphone 1723 is included with audio codec 1724 so that responses to notifications can be sent. The hub housing 1602 may be configured for fidelity in reproducing human voice and for capturing voice commands by users. Broadband connection to a cloud server allows relatively low budget smart plug-ins such as these hubs 1700 to have a highly sophisticated voice-actuation and conversation interface.

The circuit diagram of FIG. 17 shows non-volatile memory 1710 for storing program instructions. The circuit may also include flash memory 1711 for data logging. The flash memory may supplement cache memory associated with the controller 1701.

For example, the non-volatile memory 1710 can store data for configuring one or more sensors 1712 of reference hub 1700, and a set of software instructions that, when executed by the controller 1701, cause the controller, or one or more circuits under the control of the controller circuit, to execute routines for transmitting BT and other wireless signals, for receiving BT or other wireless data, and for performing location management calculations.

The controller may be associated with a packet composer and decomposer that works in concert with buffers and registers of memory. The volatile memory of the memory circuit 1711 can include registers and buffers configured for storing records and data received from sensor package 1712, from a linked smart device 30, from WiFi radio 1704, from BT radio 1702, from the optional GPS chip 1714, and for buffering outgoing transmissions, for example. In some embodiments, controller 1701 is an SOC that includes a BT radio core.

RAM 1711 is provided for storage of volatile data, such as for data logging of sensor data from sensor package 1712, which may contain multiple sensors, for example, such as temperature, humidity, noise, and so forth, and may function as part of a "smart home" or "smart building" platform. Stored data may include data from sensors 1712 and from switches 1707. Data from throw- and button-press switch array (S1,S2,S3) 1707 is considered data. The size of the RAM memory 1711 is dependent on the size of the memory requirement for data. Large caches of radio contact record logs are not generally stored on board but are uploaded to network when possible.

Stored data may also include radio contact records. The radio contact data may include host-tabulated sensor data and source-tabulated sensor data. The RAM memory may be supplement cache memory in the processor if the data logging function requires it. Memory is generally organized as a rolling stack so that outdated data is dumped from the bottom of the stack and new data is added at the top of the stack if not first uplinked to the network.

The controller circuit 1701 is configured to generate and format output for radio transmission and to select a radio band according to context, radio environment, and power status. When on battery power, BT radio is the preferred radio. When on AC power, WiFi 1704 may supplement BT radio. In circumstances where WiFi is not available, other options may include cellular radio authentication and communication, or a USB connection 1604a, with UART 1740, for example.

BT radio is used to communicate with BT radiotags and smartphones 30,31 when power savings is important. BT or cellular may be used to communicate with radiotags 10. WiFi is used for LAN networking where supported, such as by a home computer or smartphone. The above-described configurations of the circuit 1700 allow the hub, smart devices, and radiotags to communication with one another bidirectionally as part of a system for managing asset locations.

The controller circuit 1701 also may command a notification circuit 1730 to call attention to the data. Circuit 1730 can include one or more LEDs 1732a,1732b. The hub may include a buzzer driver 1726 and one or more buzzers 1725 configured to provide notification functions. To create a user-friendly experience, in some instances, RGB LEDs are used in combination with an LED configured as a nightlight, for example. The buzzer or LED(s) can serve as an alarm if there is an exception to a rules-based contingency, such as loss of a linked signal, or can indicate an "all clear" if the linked connection(s) are intact and within expected proximity. In some embodiments, an LCD or OLED display screen 1731 may be provided, but generally a fully functional GUI is provided as an installable software application in a smartphone 30 that serves as the master of a piconet formed with the hub device 1700 during setup of features and user profile(s). The companion smartphone, with installed application, also provides remote notification and monitoring that supplements and enhances any user interface directly part of the reference hub housing 1602.

Still referring to FIG. 17, alternate embodiments of the hub 1700 are contemplated. For example, the hub 1700 can have an ASIC architecture, with integrated controller circuit 1701 and integrated communications system. The radios 1702,1704 and the controller circuit 1701 can be on separate chips or on a same chip. Radio 1704 may be a WiFi radio in one embodiment, but other suitable LAN radio protocols may include Zigbee and Thread, while not limited thereto.

In one embodiment, using a small solar cell (not shown) associated with a reference hub 1700, the current needed to maintain the Bluetooth radio for intermittent transmission of sensor data can be met from or supplemented by the solar cell output. In other embodiments, triboelectric structures that harness kinetic movement to generate current sufficient to support an always-listening radio are realized experimentally, demonstrating that the devices of the invention are well positioned to find increasing number of applications for future IoT needs.

Figure 18:
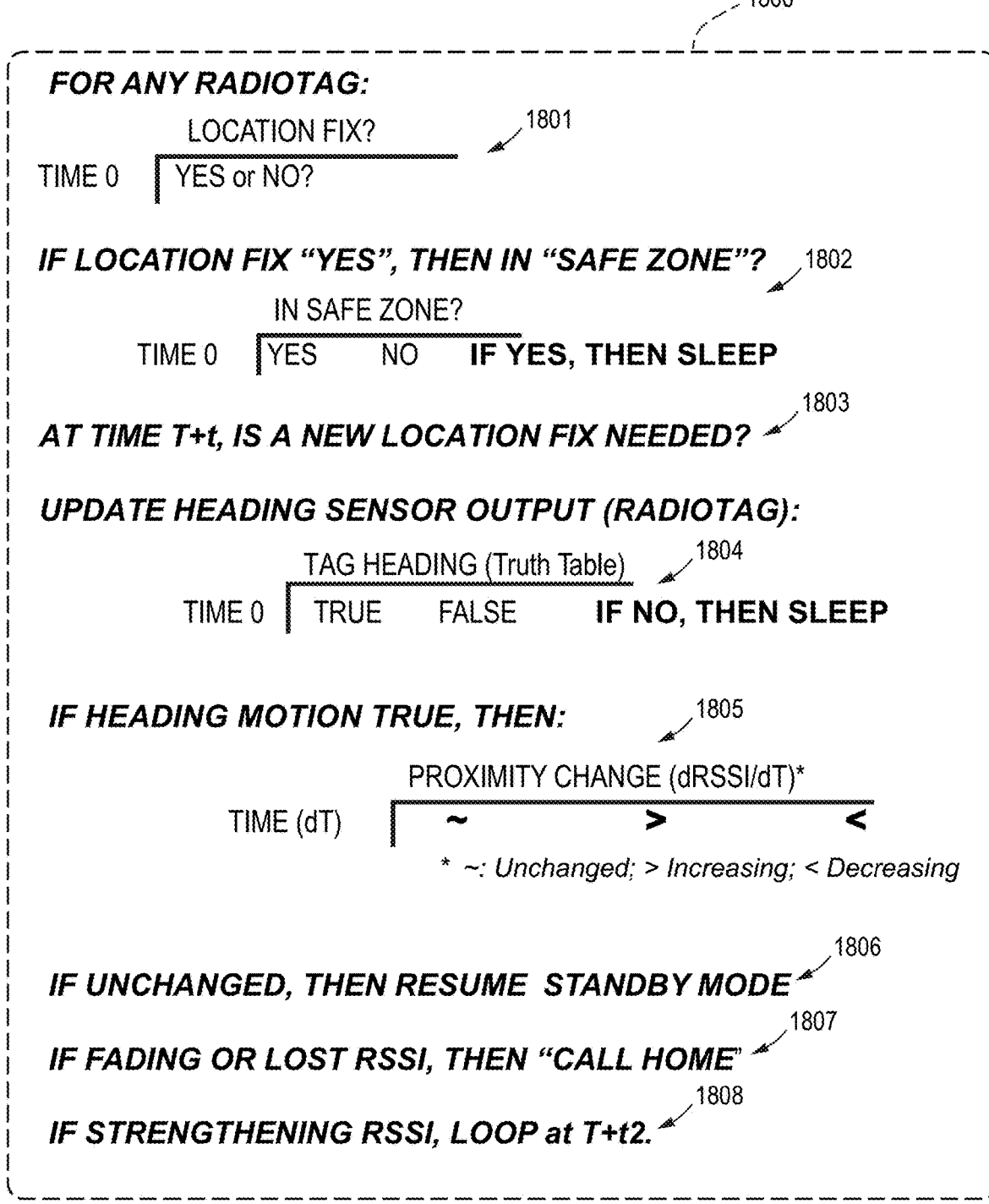
FIG. 18 is a flow chart for driving location management logic and power consumption using motion or heading sensor and radio proximity data collected by a reference hub.

FIG. 18 is a flow chart illustrating logic for safe zones established around a stationary reference device such as the reference hub 20,1700 (FIGS. 1 and 17). By installing a reference "hub" at selected locations, a user may define a virtual radio "geofence" that is anchored to the hub. Radiotags 10,12 are tethered in a piconet to hub 20,1700. By coupling the reference hub to cloud host 1111 for real-time uplink of data, data from the radiotags can be aggregated to administer a safe zone. The safe zone is useful to prevent radiotagged assets from straying outside the geofence or in reminding the user what to take with them when they go out, for example. "Lost" and "left behind" alerts are readily administered with minimal latency. A smartphone is useful for conveying notifications to a user, but a pocket XCB radiotag 10 with minimal user interface, a wall mounted XCB radiotag 1600 with minimal user interface, or a wearable XCB radiotag 3500 with voice and OLED display, can provide the user with notifications and guidance as part of a cloud system for location monitoring services by incorporating a basic operating system or firmware for administering rules-based conditional logic related to safe zones and radio tracking. The smartphone 30 may provide a more detailed user interface that has utility in setup of customized safe zones, but once established, the system can provide services even in the absence of the smartphone.

A beacon signal from a reference hub 20,1700 can "tether" radiotagged devices to a home or office location, and a radiotagged pet, for example, can trigger an alert if the pet (wearing radiotag 10,12) leaves a fenced backyard. Children's activity can be monitored, and so forth. Reference hub 20 is illustrated schematically in FIG. 1 and in more detail in FIG. 17 (1700).

Once a radiotag 10,12 is a member of a piconet, it can remember its reference hub "master", and can resume the piconet even after the initial radio link is broken. Masters can also be switched, so that for example a stationary reference hub 20,1600 can serve as a master of a piconet in a home, while a smartphone 30 can serve as a master of the same piconet when at work. This is achieved by making the reference hub and the smartphone both members of a piconet and then reassigning the role of master according to the location of the smartphone. In another embodiment, the BT piconet can also be defined with a radiotag 10 as master and reference hub 20,1600,1700 and smartphone 30 as slaves, if desired, and can allow the master a prolonged standby duty cycle in listening only mode while the slaves, which have more power, do more frequent directed advertising. The concept of a "lazy master", in which radio activity is limited to passive listening with active PAGING mode limited to situations in which the radio traffic around the radiotag changes, is an advance in the art, and achieves an improved balance of power utilization and latency for the battery-limited radiotag devices.

To administer a safe zone, in another embodiment, assuming radiotags 10,12 in the role as slaves, the slave devices may transmit their radio identifiers (RUI) and motion or heading sensor data with regular periodicity to a master reference hub 20,1600,1700. The stationary reference hub is assumed to have a wired power supply and hard data link to the cloud host and can operate independently of a smartphone. The portable radiotags do not need to perform extensive calculations or be provided with complex software. RSSI determinations are inherent functions of the BT radio core, and motion sensor output can be reduced to a single bit for transmission. Heading sensor output can also be simplified for basic functions. Heading is motion, but is motion in a vectored direction, whereas motion per se can sometimes be random, inconsequential or incidental. Algorithms for monitoring radio proximity can be made available as part of software installable on the reference hub 20,1700 or can be implemented by cloud resources. The energy budget for radiotags 10,12 is primarily related to periodic beacon message transmission in which the message includes a RUI and any UUID, plus optional fields for sensor data or a user name, for example, all within 31 to 37 bytes of a typical advertising message. A BT transceiver is generally provided so that the radiotag can respond to a command to enter an alarm state or turn on the cellular radio modem, but a programmable MCU is not required for complex computations. BT radios are provided with firmware that administers the BT radio stack and link manager so that BT radios are capable of advertising and discovery of other BT radios that are close by. CONNECTED and ADVERTISING modes were described earlier with reference to FIG. 8A.

A local piconet having member smart devices, reference hubs, and radiotags, for example, can be administered to establish stationary safe zones in which slaves in a piconet are set up and remember their master or "reference" device and their CONNECTED state in each safe zone. The master defines the safe zone by a radio tether. The access codes used by the members of the piconet define the relationships among the members and are stored in memory. The master can be a smartphone, but for stationary installations, a reference hub that has a BT radio and a wired power supply is more practical.

Hub devices may include WiFi and cellular, or WiFi instead of cellular, and with either WiFi or a wired connection, the reference hub has the capacity to contact the cloud host independent of the owner's smartphone. Smart plug-in devices that have a voice interface with speaker and microphone may be adapted as hubs, for example.

The system may include a predictive algorithm, and by machine learning can refine its predictions based on experience. Motion, heading, or radio distance of the radiotags can be compared with position of a stationary reference hub. When averaged, RSSI, relative radio proximity and heading are good indications of the length of the radio tether between the reference hub and the radiotag and can be relied in a decision tree.

Flow chart FIG. 18 illustrates a general method 1800 for operating safe zone services as part of asset location management. Radiotags are attached to or embedded in assets in need of location monitoring. In the analysis, radiotags 10,12 are operated as members of a piconet around reference hub 20,1700. A radio tether can be unidirectional or bidirectional. An application for executing the algorithm is assumed to be installed in the reference hub 20,1700 or operated remotely on a cloud host 1111. A user interface may be operated on a smartphone 30 or some other smart device. Remote notifications to an owner/user will be sent to the smartphone or to other user equipment. The initial analysis is directed at correctly identifying scenarios in which the system should issue a notification in response to an exception to one or more rules. The rules relate to the safe zone defined by a radio tether between the radiotag and the reference hub. Generally a notification is not needed if the radiotag is initially in the safe zone and has not moved significantly and the radio proximity is unchanged or increasing in strength. If a radiotag has moved and the radio proximity is fading, then a LOST notification may be appropriate. The relative motion of a smartphone 30 may be a consideration elsewhere (FIG. 11), but is not considered here so as to focus on what the reference hub can achieve without the smartphone. Radiotag 10 is assumed to include a cellular modem that is in a SLEEP mode by default, but which can receive a location update command during a preset paging window or via a BT radio command to the BT radio. Power to the reference hub is assumed to be unlimited, and an emergency battery can be supplied as part of the hub unit, but careful power management of the radiotag 10 is necessary in order to achieve a satisfactory balance of battery size and portable service life per charge.

Generally, any monitoring of a safe zone 1801 begins with a memory that associates a "location fix" in memory with a timestamp at time T=O. This memory may not be in the device 10, but may instead be stored at a higher network level, for example in a smartphone 30 or in a cloud server 1111. During setup the radiotag and the radio center are in close range, and the RSSI of a signal from a radiotag, as received by the reference hub, is indicative of radio proximity. At time T=O, if the radiotag is in the safe zone 1802, then no location fix by the radiotag is immediately needed. While it may be desirable to have a current location for the radiotag at all times, from a power management standpoint in a portable device, this is not practical. Getting a location fix consumes power. So the more pertinent question 1803 is the next location fix—when to get it—by activating the cellular remote locator tools of the radiotag 10?

The decision tree for whether or not to get a next cellular location fix for the radiotag at a future time T=T+t, where t is an interval selected based on predictive accuracy, can be made so that unnecessary location fixes are avoided by attention to (a) data related to accelerometry of the radiotag, and (b) any recent change in relative proximity of the radiotag and reference hub.

Assuming radiotag 10 includes an accelerometer 623 and/or heading sensor with digital output, then the simplest sensor output can be a MOTION truth value, TRUE or FALSE 1804 or HEADING vector and velocity for example. The quality of motion (e.g., hard vs soft acceleration), the speed, duration, and the direction are more useful, but the simplest and most economical bit of information from the sensor is whether motion has occurred. If motion has occurred, then the device may have been moved, and the location stored in memory may no longer be valid. If motion of the radiotag has not occurred 1804, then the radiotag can continue to SLEEP. If motion of the radiotag has occurred at time T=T+t (i.e., after an elapsed ΔT, where the time interval is programmable), then it may be useful to look for a change in proximity 1805. Over a range of several hundred feet, RSSI is a first approximation of distance between the radiotag 10 and the reference hub 20. The proximity may be increasing, decreasing or stay the same depending on whether the RSSI is strengthening, fading or about the same. Proximity is measure by Bluetooth radios as part of core competencies of BT radio and the reference hub will continuously monitor the RSSI of the radiotag signal as part of routine operations. The radiotag can also measure RSSI of the reference hub signal and report that as part of a smoothing operation to reduce noise in the determination. Binning and averaging are also useful to smooth RSSI data over small intervals.

If there is no change in proximity 1806, then any motion signal 1803 may be spurious and would not necessitate a need for a new location fix. Proximity will continue to be monitored. Similarly, an increase in proximity (strengthening RSSI, 1808) is intuitively not likely to indicate a risk of loss of signal, and the algorithm can be looped to continue to monitor for motion and proximity. Heading sensor data, which is output as vectored momentum, is more indicative of a significant change in location, and may be stronger in predicting the need for a location update than any fluctuations in RSSI, which can give false positive indications of significant location change.

A fading RSSI 1807 that is more than a fluctuation in signal strength, as indicates decreasing proximity and increasing separation, could be followed by a loss of signal, and for a tracked asset, a lost radio tether signal may necessitate an immediate CALL HOME by radiotag 10 to get a new location fix and to generate a LOST ALERT notification to any interested party.

Exceptions could be made if the motion data is more granular, for example a hard impact could merit a CALL HOME with status report even if proximity data is unchanged. A sustained motion in a direction is inequivocable in signaling a change in location that could merit a CALL HOME. And it may be appropriate to activate the cellular remote locator tools, even if there is no apparent motion, if the proximity signal has been lost.

The elapsed time interval ΔT for iterations of the method 1800 may be adjusted according to conditions. For example, in a safe zone, infrequent execution of the loop may be sufficient. An interrupt flag on the processor can be set against the accelerometer output. But if the radiotag 10 is outside a safe zone, the loop may be executed more frequently, and the timing can be dependent on the nature of the motion input, on temperature, or on changes in acoustic patterns, or on changes in Bluetooth radio traffic patterns, for example. The more motion activity, more frequent proximity monitoring may be useful.

Figure 19:
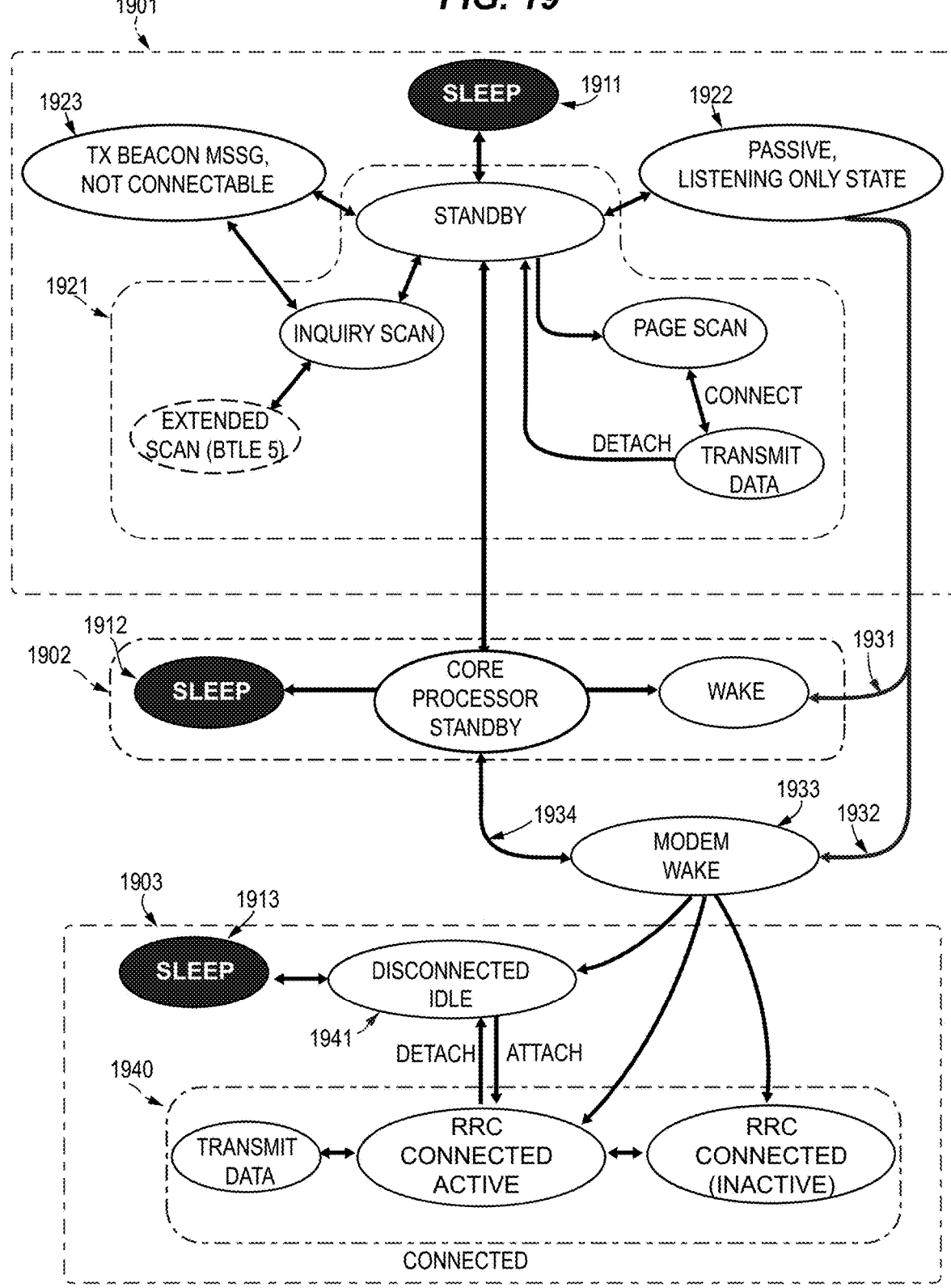
FIG. 19 is a view of power management in an XCB device in which the BT radio modem in listening-only state controls wake pin of an attached cellular radio modem; by-passing the core processor.

FIG. 19 shows a schematic for power and logic in an alternate embodiment of an XCB radio device. This figure differs from FIGS. 8A and 8B in showing active interactions between the BT state controller 1901, processor 1902, and the cellular modem 1903. All three units have SLEEP modes 1911,1912,1913. The processor core and cellular modem are generally defaulted to their deep sleep modes. The BT modem 1901 is structures so that different state functions may be separately powered, and the default mode is STANDBY. STANDBY power consumption is further reduced by alternating with SLEEP 1911. Other BT functional states are independently powerable, and include INQUIRY SCAN, PAGE SCAN, TRANSMIT DATA, EXTENDED SCAN that make up the link layer 1921. Also enabled is a PASSIVE, LISTENING ONLY State 1922 that intercepts BT traffic without error correction or ARQ and a TX BEACON MESSAGE State 1923 in which the device emits a periodic radiobeacon message and is not connectable.

In PASSIVE, LISTENING ONLY State 1922, the device can toggle power and data to the core processor at an I/O pin 1931 in order to generate log entries of received radio traffic in flash memory and can send a command 1932 to wake 1933 the cellular modem if a qualifying signal is received. The cellular modem can also be waked by a command 1934 from the core processor.

BT active standby is convertible to inquiry state (with extended response in BTLE), page state, connected state, sleep state, and has two passive modes, one for passive "always listening" and the other for non-connectable beacon transmission. In one embodiment, the passive always-listening state controls the processor and cellular modem independently.

Power management is hierarchical, with the BT core processor having an override input to the cellular modem wake-sleep-standby cycle. The cellular modem 1903 is shown with a CONNECTED state 1940 alternating with DISCONNECTED IDLE 1941. RRC CONNECTED (IN-ACTIVE) state may be sustained as a network-connected state, and permits DRX, eDRX and PSM power savings modes. The power of cellular to transmit data is lost after a network DETACH, but re-authentication to the network can be avoided by toggling the CONNECTED state from INACTIVE to ACTIVE if the cellular modem has not been put to SLEEP mode. For this reason, the MODEM WAKE pin can be used to initiate a NETWORK CONNECTION REQUEST if the modem is in RRC CONNECTED but INACTIVE mode or in DISCONNECTED IDLE, and can be used to refresh a CONNECTED link if the cellular modem is in RRC CONNECTED ACTIVE state. By configuring MODEM WAKE 1933 to interpret the current state of the cellular modem 1903 and to direct it with most parsimony to active transmission of data, reduction of latency is achieved without excess power consumption. All advertising radiobeacon messages are limited to a maximum of 48 Bytes and may be transmitted with a periodicity that is selected for battery life and minimum acceptable latency in the field.

The standard data message structure between transmitting and receiving BT radiosets as designated by the Bluetooth Special Interest Group (SIG) is published as part of the BT Specification.

FIGS. 20A,20B, 20C, 20D, and 20E are views of digital signal format of a sampling of advertising packets from various radiobeacon types. BT transmissions are tightly structured by the baseband and link manager protocols, but several competing standards have arisen for advertising beacon transmissions. These include the iBeacon®, Eddystone, Altbeacon, Estimote, and Geobeacon standards, for example, all competing for IOT placements in a growing sales market. Eddystone and Altbeacon formats are open source but most devices are not vendor agnostic. Typical messages are 48 octets in length in compliance with the original BT SIG standard and have a maximum payload of 31 bits or less.

In some cases a MAC Address is broadcast with the advertising message, but in other instances, device addresses are given dynamic pseudonyms or are broadcast behind non-discoverable access codes. Devices may instead be identifiable, at least in part, by their "services". For example, a UUID frame may be broadcast that corresponds to a generic attribute profile (GATT): which codes a general instruction set for how a device works in a particular application that is called by an attribute profile, for example a device could contain a heart rate monitor and a battery level detector, or a speaker and microphone, or a link pointing to a webpage. Each attribute is uniquely identified by a Universally Unique Identifier (UUID) or similar UID, which in the iBeacon standard is a 128-bit string used to uniquely identify information (data) specific to each type of sensor output. The attributes are formatted as characteristics (classes) and services (collections of classes). A "Service UUID" in an extended inquiry response may include shortened 16-bit, 32-bit and global 128-bit service UUIDs. A manufacture's UUID constitutes a service and may contain overloaded bits as described in U.S. Pat. No. 9,961,523, which is incorporated herein in full by reference.

Open and proprietary beacon standards are compared. The earliest BT radiobeacon standard was the iBeacon format 2001 introduced by Apple Computer (FIG. 20A, Cupertino, Calif.) for the iPhone 6 in 2014, which contains as a payload a 128-bit universally unique identifier (2004, UUID), along with major 2005 and minor 2006 frames for advertising location. All beacon messages include a preamble 2002 that is used for clock synchronization and for adjusting power gain of the receiver. The preamble results in a calculation of the RSSI of the message. The iBeacon prefix 2003 is proprietary and includes Apple-defined flags for classifying messages plus a company identifier. iBeacon messages include a suffix 2007 that includes an index of the signal power of the transmitting device.

Eddystone is a competing beacon standard introduced by Google in 2015. The format uses an open standard (Apache) that is compatible with both Android and iOS but requires a Google Proximity API installed on a smartphone. Android does not have native iBeacon support. Due to this, to use iBeacon on Android, a developer either has to use an existing library or create code that parses BLE packets to find iBeacon advertisements. As an added service, Google supplies a lookup web server whereby shortened URLs or user identifiers are used to call background resources termed "attachments" from a cloud host server. The attachments can be anything from a subdomain link to a video clip. The Google beacon transmission interval is programmable, unlike the iBeacon standard, permitting operation with a reduced battery consumption rate.

Eddystone consists of a family of standards built around common use cases, each having a different flavor of payload. One flavor (FIG. 20B, 2010) transmits a URL (as may be compressed when used with a cloud-based look-up table). The beacons can switch to another flavor at intervals or on demand. Cloud services are more extensive with the Google beacon platforms and include the capacity to update messaging on the fly as well as control over transmission frequency and capacity to omit some fields where a shorter message length is preferred.

In the UID beacon format 2010, radiobeacon message length is transmitted in a prefix 2002, along with Type and Flags that can be used to signal deep intent to a smartphone receiver that includes a developer's App. The Eddystone UUID 2012 includes a MAC Address, but can be encrypted, and Namespace ID or frame 2013 that may include one on more client services offered by the beacon that again tie into code supplied by the developer using the beacons. The payload frames may also include one or more instances 2014 that specify sub-services. A TX POWER field 2015 that closes the message is used by a receiver to improve the rangefinding accuracy. TX POWER (dBm) minus RSSI (dBm) is a better indicator of signal distance than RSSI alone.

Figure 20A:
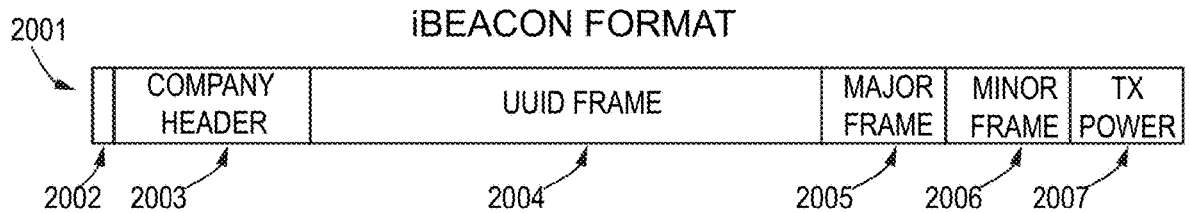
FIGS. 20A, 20B, 20C, 20D, and 20E are sample views of digital signal format of advertising packets of various radio-beacon standard types. Open and proprietary standards are compared.
Figure 20B:
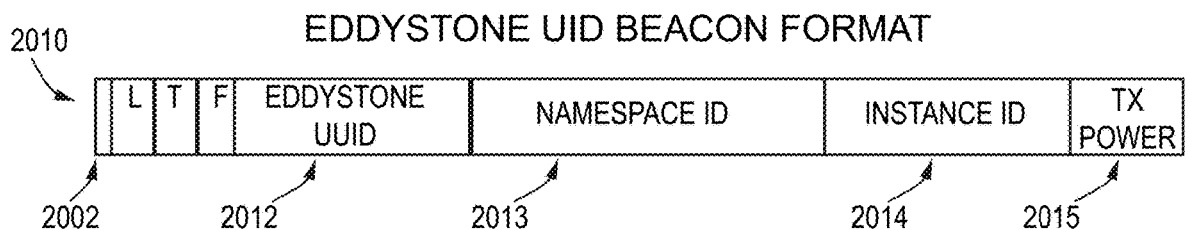
Figure 20C:
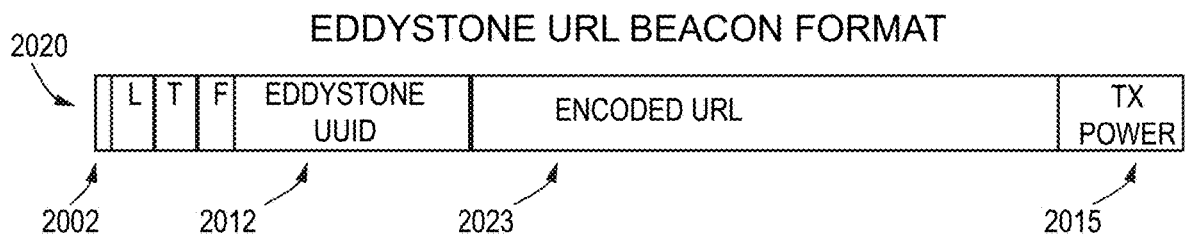
Figure 20D:
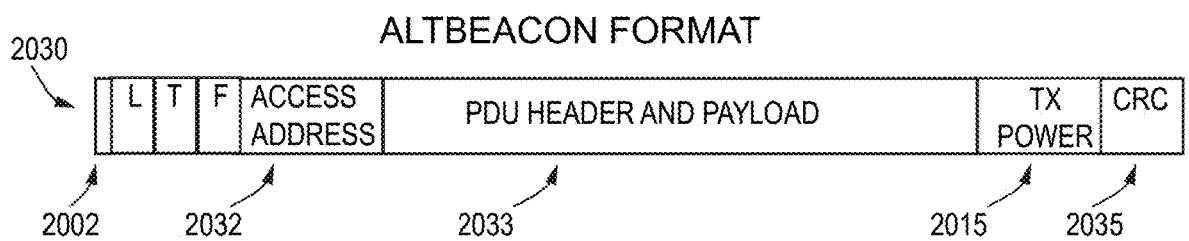
Figure 20E:
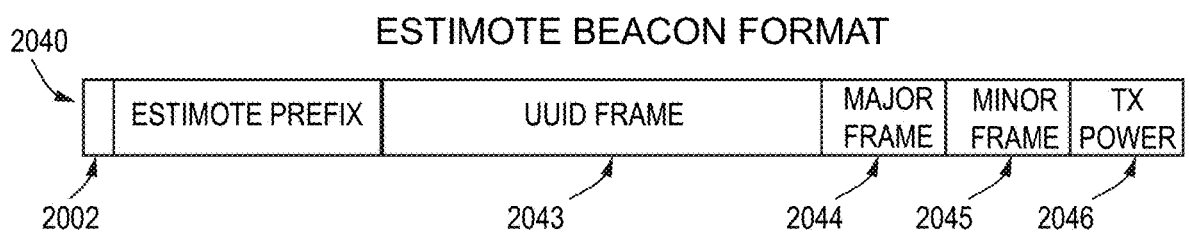

In the URL beacon format (FIG. 20C, 2020, the payload includes a webpage reference, often as an encoded URL 2023, that signals "deep intent" to a browser. The developer's App that opens when the beacon message is encountered takes the smart device to a webpage, and can even fill in fields in the webpage for an immediate interactive experience that merges the physical world of the IOT with the cloud world of supporting webpages.

Another Google beacon message type is the Telemetry message (TLM), which can include sensor information and a beacon diagnostics suite. TLM message may be interleaved with other Eddystone beacon messages to provide monitoring and maintenance of beacons in the field. Also available is an "EID" payload, which is dynamic and is used with a cloud resolving service to provide timely or context specific messaging by a "fetch" process. The EID message is limited to licensee-specific content, and has stronger privacy settings. Google EID messages contain signal characteristics that are difficult to spoof and can be associated with secure location services. Some elements of the Google platform may be depreciated in mid-2021 but the EID case is included here because it indicates how a radio topology can be shaped by dedicated beacons operating in concert with a dedicated cloud service in joining physical web radios with dynamic Internet content on demand.

The Altbeacon advertising format (FIG. 20D) is an open source, non-connectable beacon signal 2030. While iBeacons have 20 of 27 bytes available for user data (UUID+ Major+Minor) the AltBeacons have 25 of 28 bytes available (MFG ID, BeaconCode, BeaconID, MFG RSVD) and thus appeal to advertisers in need of a larger payload 2033. The access address 2032 may be used to key the message to specific users or a general audience and conforms to SIG standards, not proprietary standards. A cyclic redundancy check 2035 may be included to ensure message fidelity as received.

Estimote (founded 2012 in Krakow PL) beacon signals 2040 include formatting that can be generated using an SDK compatible with both iBeacon and Eddystone formats, but the UUID frame structure 2043,2044,2045 that more closely resemble the iBeacon frames. Telemetry packets may be broadcast. Transmit power may be altered to improved location tracking in indoor spaces. UWB and NFC radio support has also been added as an option. The TX Power field 2046 appears to be evolving toward more sophistication in gaining access to location services.

Figure 21:
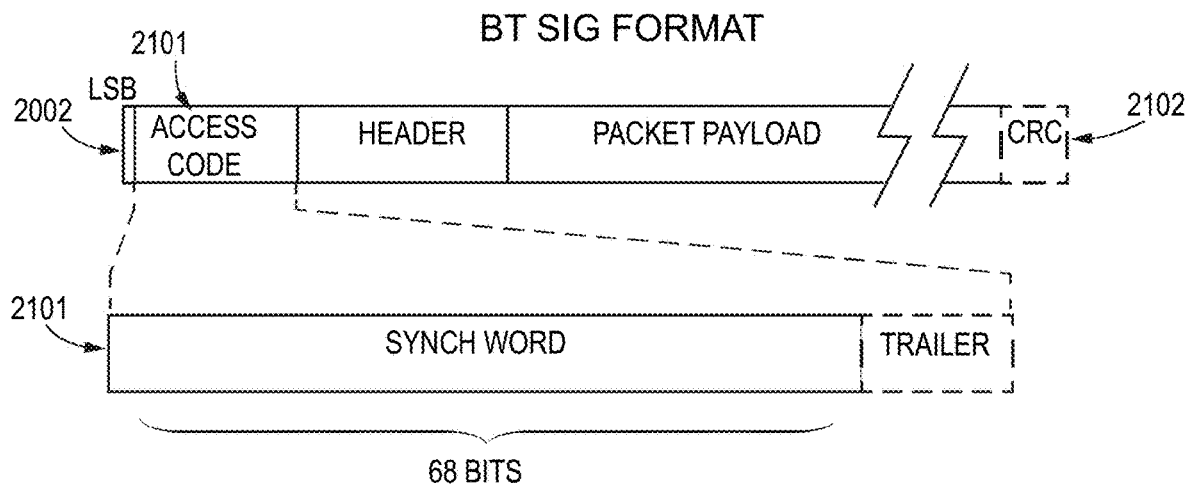
FIG. 21 is a generic view of a BT digital radio packet structure.

FIG. 21 is a generic view of a BT digital packet structure. A general structure of a BT message as proposed by BT SIG is shown for comparison with the commercial deployments depicted in FIGS. 20A, 20B, 20C, 20D and 20E. As can be seen, significant modifications are being made to implement proprietary markets.

Starting with the least significant bit (LSB) the message structure specifies a standard preamble 2002 followed by the SYNCH WORD and trailer of the ACCESS CODE 2101, and then a PDU Header followed by the PAYLOAD and a CRC. The synch word is designed to identify the relationship of the sender and receiver and to specify a basic synchronization sequence and clock offset for exchanging messages in the spread spectrum. The payload can be an advertising data payload of 0-37 Bytes or a data payload of up to 255 Bytes. The trailer 2102 is generally a message integrity check. Messages in the advertising channels will include the preamble 10101010 (1 octet); and messages in the data channels may have preambles of 01010101 or 10101010. The PDU header will specify the message type, which may be selected from i) connectable undirected; ii) connectable directed, (iii) non-connectable, non-directed, (iv) scan request, (v) scan response, (vi) connect request, and (vii) scannable undirected. A stealth access code may also be used that will not be accepted by the correlator of BT radios set up for routine interactions. In this way, the access code confers a significant level of structure on BT radio interactions.

BT radio signals are formatted as packets. BT devices include packet composers and decomposers. BT radios also include correlators with registers for sorting and identifying received signals based on access code or service, for example as described in US Pat. Publ. Nos. 2002/048330 and 2009/0086711, which are incorporated herein for all they teach and reference.

"Access codes" are part of a header that addresses BT radio traffic. For example, a general inquiry access code (GIAC) identifies traffic broadcast to any listening device, and indicates a discoverable device. Other inquiry access codes may be directed to individual devices, such as particular members of a piconet. The access code may be derived from, but is not the radio unit identifier of the transmitting device or the intended receiving device.

BT unique radio identifiers (RUI) or "radio signatures", as used here, may be a MAC address of a BT radio device or may be a universal unique identifier (UUID) or a part of a UUID, and may include a serial identifier assigned by the Bluetooth Special Interest Group (Bluetooth SIG) as administered through the IEEE Standardization group (accessible via a WHOIS-style lookup). The RUI may also include a part number given by the manufacturer. The SIG standard also permits developers to encode a "group identifier" or "community identifier" inside an extended unique identifier (EUID) issued by the manufacturer, inside the BD_ADDR, or inside a Service UUID. Proxy identifiers such as service UUIDs link to services associated with a discovered BT device. Identifiers may include payload URLs and payload unique identifiers (UIDs) that identify proprietary services. The payload may include frames or "values" containing more information. Payload information may include subtype or location, advertising data, sensor output in digital form, and records of Bluetooth radio contacts, for example.

Service identifiers inform the radio of protocols to be followed in sending or receiving data, and allow developers to create tools that incorporate elements of the payload as "deep intent" triggers for software applications. Advertising messages may include one or more identifiers and service UUIDs, for example. Other messages may not provide sufficient information to identify all services associated with a device, but a qualified BT receiver can respond to obtain more information without actually connecting.

For example, identifiers in a message actuate protocols in receiving BT radios that can wake smart devices, direct a smart device to a URL, push a notification to a remote device, or pull attachments from cloud library resources, for example. A smart device can receive Bluetooth radio traffic from any Bluetooth device in radio proximity, and forward that traffic to an IP address associated with a Bluetooth group or community, after adding a timestamp or a location stamp. By doing so, the smart device serves as a "hub" to transfer Bluetooth traffic radio contact records to the broader cellular network (or vice versa), enabling a host of location-driven services that can be modified according to sensor data.

Many devices broadcast their RUI or MAC address in the open, or in response to a SCAN REQUEST. A class of "BT Sniffers" may detect these addresses and compile stacks of addresses and device names as BT traffic metrics. Devices may also be recognized by the services they advertise. For dedicated peripheral devices, a client application can scan for devices offering services or features associated with a UUID that specifies the GATT services the BT device supports, and in full CONNECTION, data specific to a service or feature can be transmitted across the connection.

The RUI address can be an advertising address, a device address, a dedicated address of a piconet device, a virtual address, or a subscriber address, as is useful in mesh networks and for creating whitelists. Some address standards are open, others are proprietary or are obfuscated to prevent BT snooping.

In recent trends, BT signal payloads may include URLs that link the device to the physical web. Alternatively a community identifier is transmitted in a message as part of a header, routing address, or payload that when recognized by packet decomposer in a receiving device, causes the message to be forwarded to an IP Address and associated cloud host. This approach has enabled community lost-and-found services such as described in US Pat. Appl. Publ. No. 2016/0294493) which is incorporated in full by reference.

The radio header and payload may also include resource identifiers that direct communications protocols in the link layer and activate software applications keyed to the resource identifiers. This approach is seen frequently with smartphones—installed Apps react in real time to BT transmissions. For example, a received BT transmission can wake up a sleeping device (US Pat. Appl. Publ. No. 2020/0242549), which is incorporated here by reference. More recently, data supplied in the fields or payload of a BT transmission can cause an App to be installed, or if the App is installed and the appropriate permissions are in place, the App can be run at a particular instance in the program as most relevant to contextual clues in the received BT signal. This is termed "deep intent" to indicate that the App anticipates the user's thought process and causes the client smartphone to display the most relevant materials from a resource or takes an appropriate action in anticipation of the need. More recently the process has been extended to wall screens, so that "walk up" computing is increasingly automated by invisible BT radio transmissions that identify the user and guess the user's intent from radio proximity or accelerometry data. For example, if a user picks up a shoe in a shoestore, a BT radiotag attached to the shoe will send a sensor output and a wall monitor will display more information about the shoe, or push that information onto the user's smartphone.

In connected links, BT signals transmit data. Newer BT 5.0, 5.1 and 5.2 standards permit multi-slot messages for sharing larger amounts of information, even encoding of speech. Connectionless data sharing is also supported in the newer protocols.

In a typical BT interaction, a first BT device will send an INQUIRY packet 128 times in 1.28 seconds, each inquiry packet is sent in 16 time slots (10 ms, 625 us each) over two alternating sets of frequencies. The INQUIRY packet is short, just an inquiry access code. A second BT device, operating in an unsynchronized listening mode, intercepts one of these transmissions by coincidence (there are 79 possible frequencies [or 40 depending on the standard], three of which are reserved as advertising frequencies in BTLE). The Baseband protocol causes each radio to use pseudorandom "frequency hops" to jump from frequency to frequency over the spread spectrum (U.S. Pat. No. 2,292, 387). A device that is in INQUIRY SCAN at some crossover hop will intercept a packet with an inquiry access code that it recognizes, or that it chooses to accept. The frequency hop protocol is inherent in the access code, and a device that accepts an access code can then join the hop sequence with the first device and can send an FHS response packet containing its hardware address and its clock so that the first device can specifically address it with further instructions, if permitted. The interaction may then rapidly be escalated to a PAGE and PAGE SCAN interaction, resulting in a CONNECTION that formally makes a piconet link in which the RUIs of the radios are stored in device memory. The piconet relationship defines one of the devices as a "center" device ("master") and the other device as a "peripheral" ("slave") for purposes of organizing the transmission and receive sequences. At the hardware level, these roles are interchangeable and are controllable by a master-slave switch.

A BT device can participate in two or more piconets as separated by time division multiplexing with millisecond separation. While more limited in the newer BTLE standards, in one embodiment, any BT device may belong to a hierarchy of piconets, in which its participation in a second piconet is alternated with its active participation in a first piconet.

The device in the central role scans for BT radio sources, looking for advertisements and inquiry responses. The device in the peripheral role advertises itself and offers a service. GATT server vs. GATT client determines how two devices talk to each other once they've established the connection. GATT metadata is transferred from server sensor node to client center node, for example.

To inquire about other radio units in a receiving area, BT radios may also promiscuously announce their presence to other BT devices by sending a general INQUIRY access code (0x9E8B33, GIAC). An ID Packet may be exchanged in response to a FHS packet. Access codes are classed as DAC, IAC and CAC, indicating Device Access Code, Inquiry Access Code, and Channel Access Code, respectively, the details of which relate to link management. All packets begin with the CAC, a DAC or IAC, and a clock number segment. A correlator identifies relevant packets for processing. BT devices acquire information about other local BT radios in this way.

In a piconet, using link management, devices that are parked or lose a pairing connection can ignore public traffic but will "wake up" (almost instantly) in response to a beacon signal from a familiar or "whitelisted" partner—so as to restore or recover a piconet connection. The listening device can also partially wake up its MCU so as to log any radio contacts, while not responding further.

Not all radio interchanges result in a CONNECTION, but the listening radio can record information about the transmission, and by escalating to INQUIRY SCAN without wasting time or energy, will receive more detailed information about the transmitting device.

Bluetooth Core Specification, Version 5.2 and Supplement, (2019, incorporated herein by reference), includes an "Extended Inquiry Response". Data types may be defined for such things as local name and supported services, information that otherwise would have to be obtained by establishing a CONNECTION. A device that receives a RUI and a list of supported services in an extended inquiry response does not have to connect to do a remote name request and service search, thereby shortening the time to useful information reception. Backchannel communications facilitate the connectionless mode.

Figure 22A:
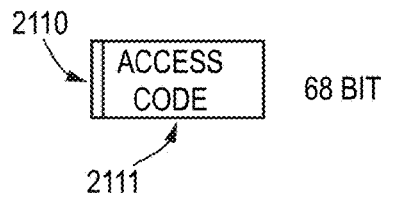
FIGS. 22A, 22B and 22C are sample packet structures that relate to the BT advertising and link layers.
Figure 22B:
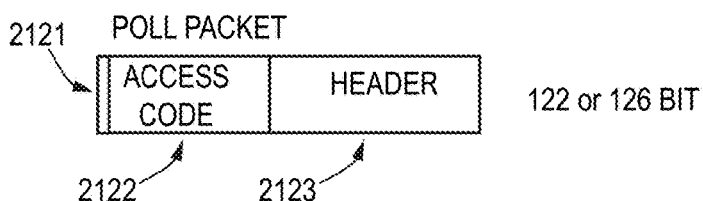
Figure 22C:
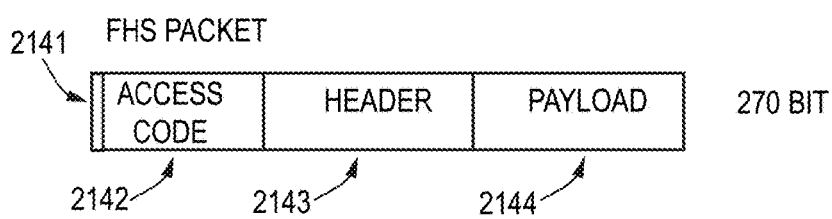

FIGS. 22A, 22B and 22C are sample packet structures that relate to the BT advertising and link layers. These advertising beacon message structures that have standardized lengths in the range of 31 to 47 octets. These tend to be proprietary formats having defined fields in the header and two to three open fields or frames in the body of the message for non-format contents such as an identifier associated with the device or an advertising service. In the case of Eddystone packets, packet types include those for broadcasting URL (or shortened URL lookup) or sensor data. The shortened names tie to a look-up service so that a device that receives the message can be directed to further information or attachments.

The shortest packet is an INQUIRY packet 2110 as shown in FIG. 22A, with a length of 68 bits. This is an access code 2111 of an inquiry or a device ID PACKET of a scan response. POLL 2021 and NULL packets used in messaging have a length of 122 or 126 bits (FIG. 22B) and include an access code 2122 and a header 2123 that defines the packet. The FHS packet (2141, FIG. 22C) is important in exchanging identifiers and clock hopping schema as part of the connection process prior to further data exchange by pairing and is 270 bits in length. The FHS packet includes an access code 2142 for addressing the transmission, a header 2143, and a payload 2144. In extended connection mode and connectionless transmissions, packet lengths may span up to 5 slots. For fidelity in voice transmissions, higher numbers of repeats of short packets are used. But packets are typically limited to a maximum payload of 258 octets (about 2 Kbits) with a total length of about 2854 bits in a 5 slot data payload, optionally with enhanced rate packet transmission with DPSK at 2 Mbps or 3 Mbps. These details point to the utility of cellular radio as an enhancement of BT radio for transmission of larger amounts of data at greater speed. 5G tops out at a theoretical 5 Gbps, permitting greater use of broadband services.

FIG. 23 is a more detailed view of an advertising packet and demonstrates how location and proximity data can be extracted from an advertising packet to build a radio contact record.

FIG. 23 describes a decomposition schema for an advertising packet 2300 that is harvested to generate a radio contact record 2320 with time stamp 2351 and host ID 2352 (referring to the host device that is capturing the radio contact record). Because advertising packets vary in structure, the correlator is a smart correlator that will categorize incoming radio signals to efficiently pull out some or all of the useful fields and to assemble those data into a radio contact record 2320, using null fields where data cannot be recovered. The preamble 2002 of the received message will be used to obtain an RSSI for the signal, and any TX POWER 2306 information in the advertising data payload 2305 can be used to calculate proximity 2356. If heading sensor data is transmitted, that also can be captured. The PDU Header 2303 of the transmitted signal typically includes length L (2354) and type T (2355) of the packet. The MAC Address TD1 (2353), if transmitted, may be in the ADV ADDRESS at the tail of the PDU header or may be part of a UUID transmitted by an iBEACON. The receiving device also has a MAC Address, and will insert that in field 2352 of the radio contact record 2320. Service UIDs are also included in the advertising data payload, and can be taken as proxies of device identifiers. Other parts of the advertising data may be useful as sensor data and stored in a separate field DATA1 (2357), such as for example telemetry including temperature, battery voltage, biometric readings, and so forth.

Location, field 2358 may be the location of the transmitting device (if transmitted), or may be the current location of an XCB device that receives the transmission, for example, at about the time the transmission is received. XCB devices are fitted with means for capturing location from surrounding networks. The radio contact record may also include the device access code in field 2359 as is received in the ACCESS CODE or synch work in field 2302. This information may be useful in establishing relationships between BT devices so that the intercepted signals can be viewed as a family structure of piconets and scatternets with master and slave relationships outlined by the use of GIAC, DIAC, LIAC access codes, for example.

Each radio contact record 2320 can be packaged in a BT data transmission 2360, that includes a preamble 2002, and standard BT data packet structure. Such packets would be sent to a master of a piconet or to a smartphone for example, or to a reference hub, for analysis of the meta-data in the logs of radio contact reports over an interval of time.

"Record making"—refers to creating and logging or storing a record of at least one datum and an associated timestamp in a memory module of a radioset. Records of a received radio contact may include an identifier associated with the transmitter and the radio signal strength, for example. Records may include an EUID, a cellular telephone number, or an IMSI for example. Records may also include a UUID. Records may include a geostamp or other contextual information. Records in storage are generally retrievable, such as by accessing or searching a table or a database, or other computer-enabled data retrieval systems known in the art. Records may also be uploaded to a higher layer in a network, such as to a server or other cloud-based service.

In one embodiment, the listening device will make a record of a radio contact in a log, and will add a timestamp to its record, and if available, may also add a geostamp. While the BT core radioset has a limited set of instructions, it controls power to a processor (microcontroller or "MCU") and actuates the logic for managing computing and memory resources with executable instructions needed to harvest the BT radio traffic in its local environment. Onboard sensor data outputs can also be coupled to actuation of designated logic systems and executables.

"Bluetooth radio contacts" are logged as an array of records in a stack, each record having multiple fields accessible as a database of data entries. The records are stored in a cache register or flash memory of a device and may be transmitted as packet data in response to an INQUIRY or PAGE from a qualified center unit.

In one embodiment, each record in the radio contact array is time stamped and records the radio unit identifier (RUI) of the receiving "host" device where the radio contact record is stored and the radio unit identifier of the transmitting device, the received radio signal strength measured by the receiving device, and optionally a geostamp. A MAC address may also be included. In response to a trigger, the radio contact log is uplinked to a smart device over BT radio or more efficiently to a cloud host by making a cellular radio link to the network.

In logging radio contacts, a convention is used for convenience. The "Source" device refers to a transmitting unit that is the source of a service or data. The "Host" device refers to the unit that enters and "hosts" the radio contact record. Both devices may generate radio contact records that include sensor data and location. For connection request packets, the terminology "INITIATOR" and "ADVERTISER" are used to indicate that the INITIATOR sends a SCAN RESPONSE to the ADVERTISER in response to an advertisement packet.

The trigger to uplink the data may be a correlator dedicated to recognizing particular BT radio signatures, or to a particular digital sensor output from an onboard A/D converter linked to a sensor package, to an IO pin such as a flag from a HOMING button, or to a pattern recognizer, such as a DSP, that can recognize voice fragments, radio signal patterns generated by a software-defined radio (SDR), or unique sound sequences. The DSP may also recognize QR Codes or fingerprints. The trigger may be a value presented to a specific I/O port in a specific logic state of the device. In some instances BT radiosets can be used to transmit larger datasets such as radio contact logs. But in practice, the trigger may instead actuate a packet composer to assemble a table containing radio contact log entries as a message for uplink directly on a cellular network via cellular radio to a cloud host, or indirectly via some other wireless radio technology such as WiFi.

Timestamping may also drive a field termed "Time to Live" that specifies a duration in which a memory is kept or a number of transmissions a memory is kept before it is dumped and fresh context replaces it in a Last in/Last out stack. If the TTL field is an integer, the field can count down the number of transmission that include a record before the record is dumped, for example.

FIG. 24 illustrates a similar decomposition of a BT radio transmission 2400, here a connection request, but the resultant radio contact report 2410 is packaged in a WiFi IP packet 2420 with timestamp 2411 and geostamp 2412 tailored for transmission through the IP packet data environment to a cloud host and may be analyzed locally or forwarded to a cloud host for analysis of the meta-data in the logs of radio contact reports over an interval of time. The device needed to transmit BT data to a WLAN or WPAN access portal as IP packet data includes a packet decomposer and composer configured to decompose BT packets and assemble IP packets from the radio contact information. By doing the repacketing at the local XCB device, the timestamp and geostamp are valid indications that can be accurately aggregated with other data received at higher network levels from other concurrent reporter nodes. A report from an XCB device that receives an emergency access request from a BT radiotag will be received as a set of reports from several XCB devices that forward the same emergency access request so that the origin of the signal can be accurately triangulated, for example.

IPv6 support over BLE with the adaptation of 6LoWPAN and Thread protocols can result in a crossover between BLE and WLAN comms. IPv6 can be emulated over Bluetooth Low Energy (BLE) as defined in RFC 7668 according to the Internet Engineering Task Force, for example. But this standard does not allow native BTLE transmissions to be routed onto the IP packet data networks. The devices described here map BTLE radio packets to a standardized database entry format or "record", and these records are shared as a sort of "snapshot" of the BT world around the originating device over a WiFi IP packet data environment. This snapshot can be used for authentication, but also finds a myriad of uses in provisioning new devices, in erecting geofences, in wayfinding and locating, and in maximizing throughput in the ISM spread spectrum. Analogous to the 6LoWPAN standard, the snapshot may include 1280 octets or larger when transmitted over WiFi or using the 6LoWPAN standard, but is assembled from smaller snippets extracted from the advertising packets and PDUs in the intercepted BT radio traffic, those snippets going into log entries of BT radio contacts.

Figure 25:
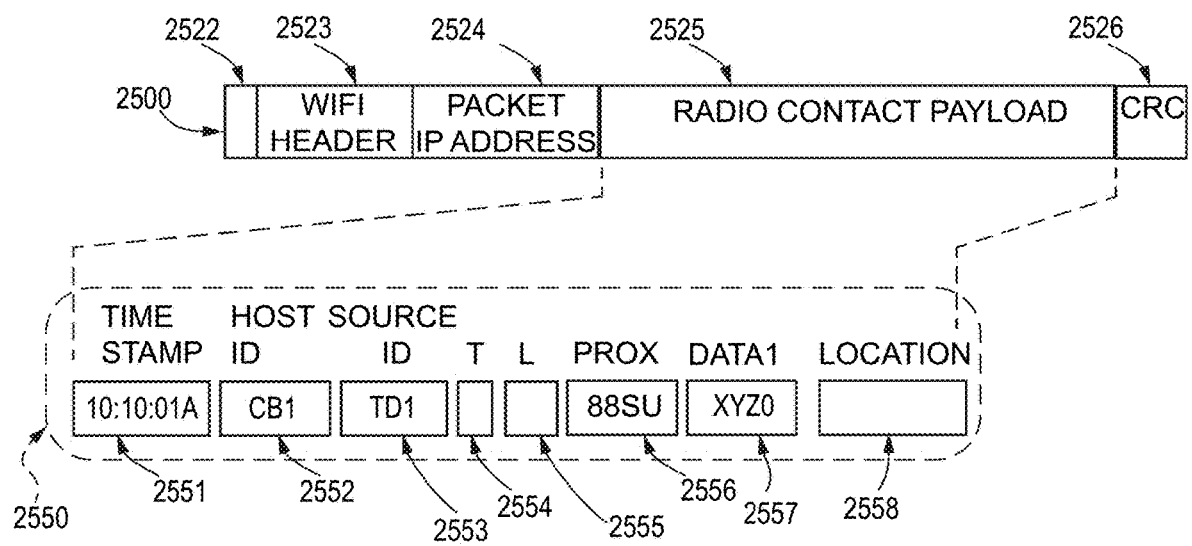
FIGS. 25 and 26 show how a multirecord payload of a log of radio contacts may be structured.

In FIG. 25, an IP data packet containing a BT radio contact record is decomposed to its element parts. The IP data packet 2500 includes a preamble 2522, a header 2523, an IP packet address 2524 of a host server that acts as a recipient or clearing house for the records, and a payload data packet 2525 and CRC 2526. The payload 2550 is a radio contact record, and includes a timestamp 2551, an ID of the host device 2552 that captured the radio contact record, an ID of the transmitting device 2553 that initiated the radio signal that was intercepted, message type 2554 and length 2555 statistics, a proximity indication 2556 that correlates the distance of the receiver and transmitter, any sensor data, UID, service characteristics or URL 2557 in the payload, and a location 2558 of the host device at the time the signal was intercepted.

Figure 26:
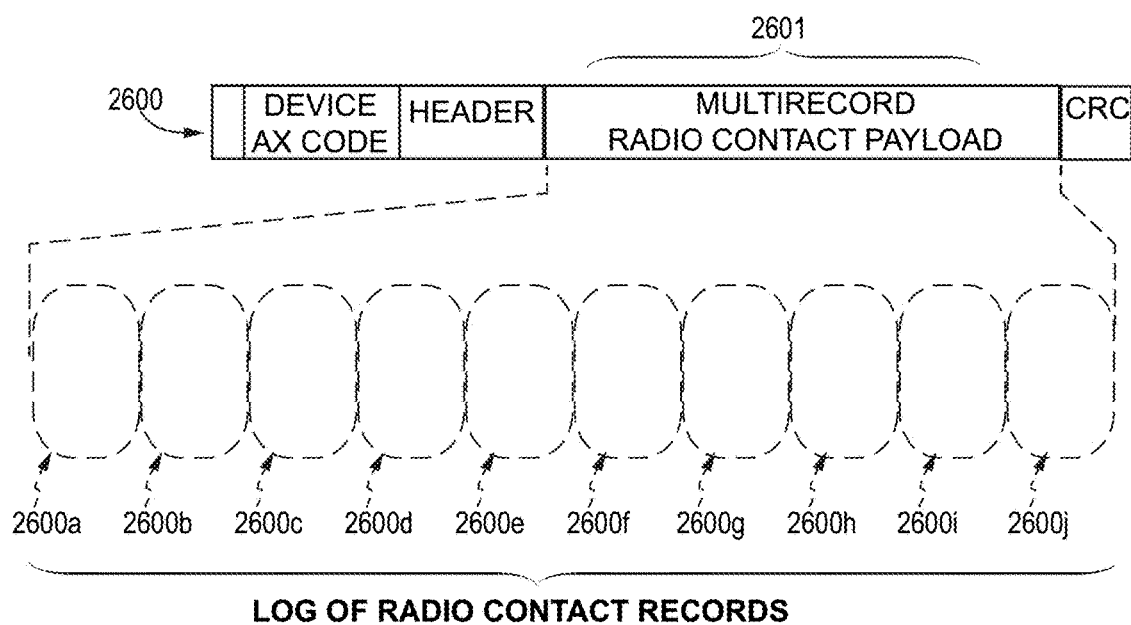

FIG. 26 makes clear that the IP data packet 2600 can be logged and transmitted across a WiFi signal in an efficient and data intensive way by concatenating the radio contact reports. A multi-record radio contact payload 2601 is a log of or a "snapshot" of the radio traffic around the host XCB device for a slice of time. Shown here are ten log records 2600a, 2600b, 2600c, 2600d, 2600e, 2600f, 2600g, 2600h, 2600e, 2600j, of individual BT radio signals that were intercepted. The snapshot provides a real time look at what kind of radio neighborhood surrounds the receiving device.

Figure 27:
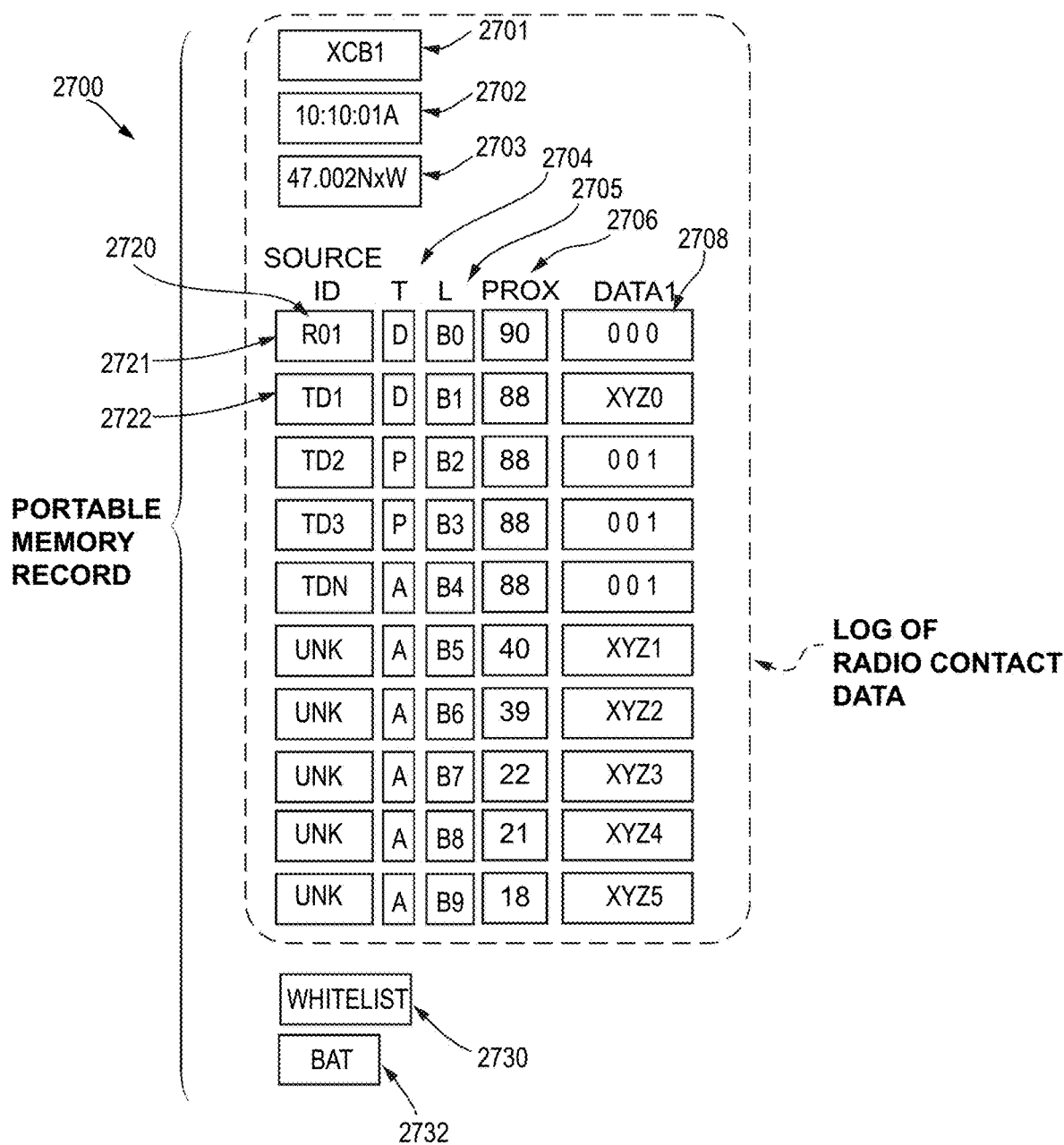
FIG. 27 is a view of a containerized portable memory record that comprises a "snapshot" or "log" of radio contact records.

If the device is in a familiar home office, there will be the BT printers, the smartphone, the user's radiotags, perhaps a headset or a BT mouse, all expected members of the radio ensemble that is characteristic of that home location. The unique radio identifiers of each device are combined to form a signature that indicates familiar surroundings. When the user leaves the front door, some of those radio identifiers accompany him, and are picked up on the next radio snapshot. Over time, a consensus "portable memory record" of the expected BT topology of a place is stored in memory of the XCB device or host server. The portable memory record 2700 may look like that shown in FIG. 27, where useful elements include the Radio ID 2701 of the XCB device that generated the record, a timestamp 2702, and a geostamp 2703 that relates to the snapshot as a whole. Within the snapshot, the records 2721, 2722 and so forth take the form of an array of fields in a relational database. Data may be containerized to limit access and to open the data for access by a variety of user Apps.

The relational database includes fields for SOURCE ID 2720 (the ID of the transmitter of the signal that was intercepted), the type of BT message 2704, the length of the message 2705, the proximity 2706 of the host device to the transmitter, and a field for data 2708 that can be anything from sensor readings to service characteristics, biometric readings, temperature, or even URLs indicating deep intent pushed by the transmitters. Field 2730 may cross-reference a whitelist of BT devices that are owned by the owner of the XCB radiotag. Field 2732 may indicate battery life residual in the XCB radiotag device, or some other telemetry useful in maintenance.

Thus it may be useful to look at the local BT radio topology from the point of view of a meta-analysis at a first level, and then based on correlator fits to known message types, to set up permission structure for controlling the "deep intent" features of smartphones and installed apps. So at the first level, defensive smartphone control may be possible without specificity. Particularly, by calculating a running "strangeness index" of the surrounding BT chatter or radio topology, the level of trust extended to recognizable BT messages may have to be adjusted, additional authentications may be needed, and further sandboxing or "drying" of wet code may have to be engineered to suit the danger represented by the environmental milieu of BT traffic. On the positive side, the BT traffic can also have a "familiarity index", and this can be used to recognize particular devices having or in need of a special relationship, and autoprovisioning a whitelist of those devices for immediate access based on history of pairing and history of DIAC inquiries, or other local chatter that is characteristic of a safe place, such as home or a secure office.

Let's take some examples. De-identification of data is doable. It is possible to know, for example, how many people in a county have been vaccinated without out knowing who has been vaccinated. It is possible to know how many dogs within whistling distance have collars that are paired by a BT radio to their owner's smartphone without knowing where the owner's live. It is possible to know how many persons in a city have firearms in a house with or without having a BT triggerlock if BT transceivers are embedded in firearms. It is possible to know if your camera has a link to your laptop, or needs one. And it is possible to walk up to an ATM machine, tap a smartphone on a pad, and have your encrypted balance information downloaded to your finance advisor in your BT device along with link for login set up to be biometrically authenticated and to cause a bootstrapping setup of a proprietary WiFi, 6LoPAN or UWB connection. Higher data transfer speeds are possible within BT, but the ubiquity of the BT radio interface as a number of installed devices clearly supports increased effort at making the BT radio interface into a flexible hand within the glove of a synthetic radio and antenna capable of M2M communication over a range of authenticated connections.

Figure 28:
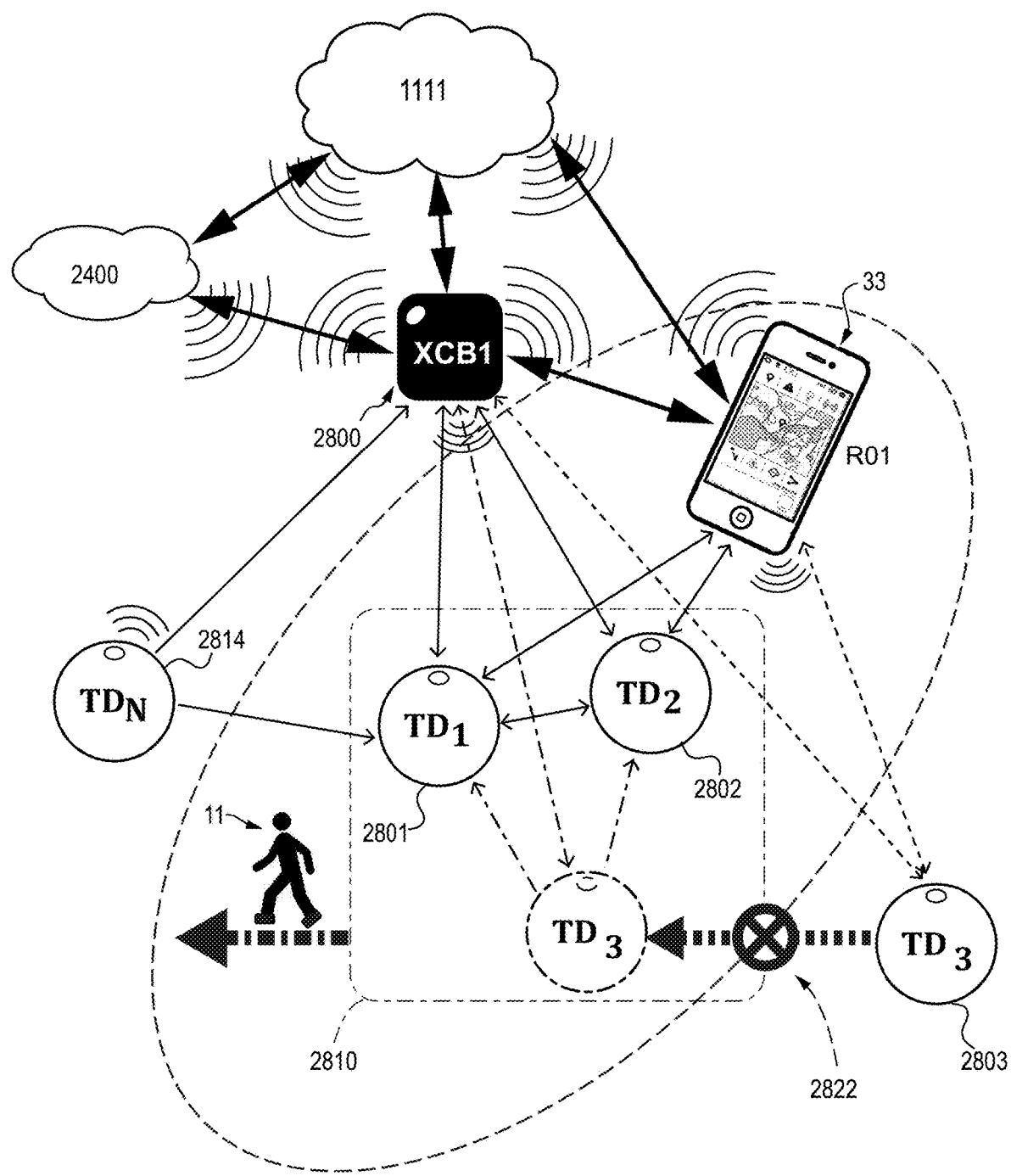
FIG. 28 demonstrates how a "radio envelope snapshot" is used in assessing situational awareness in a system context.

FIG. 28 identifies an XCB device 2800 surrounded by multiple BT radiotags TD1 (2801), TD2 (2802), TD3 (2803), TND (2814), a smartphone RO1 (33) and having access to a VPG 2400 and a general cloud IP environment 1111. Devices TD1, TD2,TD3 belong to the owner's personal piconet 2810 and generally travel together with smartphone 33. The XCB1 device (2800) and the phone RO1 (33) are capable of interfacing with both the cloud nodes and each other, but also with the BT radiotags. If radiotag TD3, for example an umbrella, is left behind as the owner 11 leaves home, the XCB and the smartphone receive an indication of decreasing RSSI and possibly heading sensor data that indicates the disconnect, but the smartphone has other priorities. However the XCB device has a primary processor level dedicated to monitoring the radiotag envelope and immediately pushes a notification to the smartphone that alerts the user. The XCB device may also have its own speaker and display, but either way, the owner is instantly notified that the TD3 radiotag is at risk of being left behind. This occurs at 8 AM while stepping out the door if there is a prediction of rain in the afternoon. RSSI data can be jumpy, header data less so, but it is the snapshot of radio signals assembled by the XCB radiotag, which shows the TD3 as being an anomaly on several parameters that causes the notification and intervention.

Similarly, $TD_N$ (2814), by example, is lying on the sidewalk ahead of the community user 11, and is connected to a headset or radio apparently dropped by an earlier passerby (not shown). Community user 11 can tap his smartphone 33 to the $TD_N$ radiotag, and the shock of the impact is digitized and sent to the XCB device in a radio contact report along with the UUID and MAC address of radiotag $TD_N$. The XCB radiotag sends this data to cloud 1111, where a look-up table is used to identify the true owner of the headset or radio, and a notification is sent to the owner that the lost item has been found. The XCB device also uses a voice interface to tell user 11 that the true owner (i.e., the earlier passerby) can be contacted by text and invites the user to enter a text describing what was found. The cloud service sends the text message and the current location of the true owner and offers to convey a reply that sets up a phone conversation that could lead to recovery of the item, or at least to an exchange of instructions so that the lost item can be returned.

These are simple means by which community resources can be implemented on a cloud host for operating a lost-and-found service that protects privacy but maximizes the small efforts of kindness by community members in restoring lost items to their rightful place.

Simple user-directed control functions are readily established. User/subscribers interacting with cloud hosts via XCB devices can manage or entirely automate many remote machine tasks ranging from turning on a coffee pot, opening doors and windows on a sunny day, turning out the lights at night, starting a video on a nearby screen, taking a user to a website, finding parking, initiating a purchase, tracking a lost pet, sharing a file with another device or printer, synchronizing contact lists between devices, and so forth.

In other instances, BT devices and hubs define "safe zones" and are used for safeguarding and managing assets, for example. Radiotags associated with each asset are radio tethered to the safe zone. In some embodiments, reference hub devices that are not smartphones may also include software or firmware and may include a user interface in the form of one or more buttons or other control surfaces for operating a safe zone. Conditional logic rules are established by a user/subscriber for controlling transit of objects out of or into a safe zone. By integrating the basic XCB package into each asset, "smart objects" are created and can be managed as part of network services by individual users or system administrators.

BT radiotags may also be used to manage or control proximity. By using XCB radiotags, proximity-related data may be collected, as may be useful in contact tracing to reduce spread of infections, for example, and any contacts that need followup can be uplinked to a cloud host over a cellular network connection. Software viruses can also be monitored. XCB devices that encounter malicious code will report local radio devices to a network administrator. Proximity alerts can then be used to quarantine infected devices. These and other instances will be described in more detail in examples below.

In another embodiment, basic connectivity is achieved using a software-defined BT radio sniffer in an inexpensive portable package. The BT "radio envelope" around an XCB device, including all the exogenous bitlets and snippets of advertising and data that have been called "BT pollution", is sampled to achieve "situational awareness". The sampling process includes a correlator that assesses a bitstring for registration corresponding to one or more whitelists or other criteria that are built into a gate array. The device may implement Kalman filters and semantic algorithms in a miniature platform that achieves a measure of situational awareness as may be supplemented to support machine learning (ML) using cloud resources. Situational awareness feeds context-driven features, in which context includes location, familiarity, and discovery, within an overall low energy budget for a consumer device.

And by facilitating internodal transfer and porting language for containerized file management with rolling temporary storage, sampling of the radio topology around a user becomes a tool for safe wayfinding. Patterns in the google of bits in a radio environment may be anonymously sampled and reported as "radio contact reports". Finding, tracking, scanning, locating and proximity monitoring are provided as complementary services supplemented by a Bluetooth Proximity Locator Services Toolkit and a Cellular Remote Locator Services Toolkit. Data logging of sensor data and radio contacts enables provisioning of the physical web, piconets, tracking minders, geofences, libraries, maps, clusters, human interactive, and "proximity avoidance tools" such as useful for managing social and network interactions.

Looking to the future, it is clear that beacon formatting has not evolved as an open resource, but instead is tied to smartphones and cloud servers built around advertising and the ecosystems of Apps provided by developers. The range of formatting is such that there is one level of specific data that can be decoded by a compatible App, and another level of data that is less clearcut in meaning, but is accessible on the advertising channels of the BTLE standard, and from which inferences can be made without access to a decoder or to a lookup table provided by the specific developer who released and supports the beacon. Google's initial offering includes what looks like a roadmap to a BT topology for the physical web of the IOT, with embedded deep intent links, but it is no longer clear that a universal authority on beacon message content can be relied on for future support. Thus the "BT pollution" that has specialized meaning if the user has the appropriate App installed on their handset, can instead be used as an ad hoc source of information gleened from the patterns in the pollution, as will be described below. Hints of meaning include the channel used by the signal, the length and type of the signal, any access code, any identifiable MAC address if any, and patterns in the payload.

FIG. 29 illustrates a series of radio envelope snapshots 2900a, 2900b, 2900c in a time series. The snapshots are taken by intercepting radio traffic in BT advertising and data channels at 10 second intervals. Passive listening is used so as to not consume more battery power by generating back-and-forth radio messages. Each message includes the HOST ID 2901 of the XCB device collecting the snapshot, a timestamp 2902, and a geostamp 2903. In this instance the top ten BT signals intercepted at a moment of time is captured in each snapshot. Five columns correspond to the transmitter identification, the type of message, a length of the message, RSSI, and any data content in the message.

At the bottom of each snapshot, a familiarity index 2912,2914,2916 is calculated that highlights the integrity of the BT topology as it accounts for each member of the owner's BT ensemble. A strangeness index can also be provided that accounts for irregular or unexpected BT signatures associated with a location. The familiarity index also takes into account location, scoring device signatures that typically remain in a safe zone differently from device signatures that always accompany the owner. By quickly recognizing the pattern of familiar and unfamiliar BT transmissions in a location, the XCB device can quickly auto-provision a kit list of what to keep track of, infer actions to be taken if there is an exception, and also note the overall characteristic of the location as a melange of BT radio traffic so that in the future, when that pattern is again detected, the device can know where it is. In this way, the XCB device can know something is lost before the owner does, can guide the owner to the lost device, and can also know where it is without the need for GPS, AGPS, PoLTE, or other advanced, energy intensive location acquisition means.

Referring to FIG. 28, radiotag TD3 (2803) is left behind at point 2822 marked by an X. Referring to FIG. 29, the combination of a sudden decrease in proximity and a vectored impact in the data columns at 2922 is manifested in a summary indication 2923 that one of the radiotags has been left behind. This conclusion is made by the XCB device and is communicated to the owner directly or via the smartphone. The XCB device performs the analysis autonomously; further confirmations are obtained if radiotag 2803 is a smart object having the capacity to intercept surrounding radio traffic and write a log of recent radio contacts that is shared with a master device 2800 or with a system server 1111. By comparing the logs of multiple radio devices, a consensus emerges and the "left behind" or "lost" alert can be issued instantly while the owner is still well positioned to backtrack and recover the lost radiotag.

FIG. 30 is a view of a rolling memory stack containing radio contact records. In this model, a continuous rolling stack of BT radio contact snapshots is taken. Anomalies in the data are detected by machine learning and probabilities associated with predictable outcomes are used to design interventions. A ten second lag is built into the memory stack. Rapid identification if issues results in a significant uptick in consumer confidence and successful resolutions of location management issues. Old data is sent to the network for use in building models for machine learning and is then discarded so that the memory resources inside the XCB radiotag are not overloaded.

Figure 31:
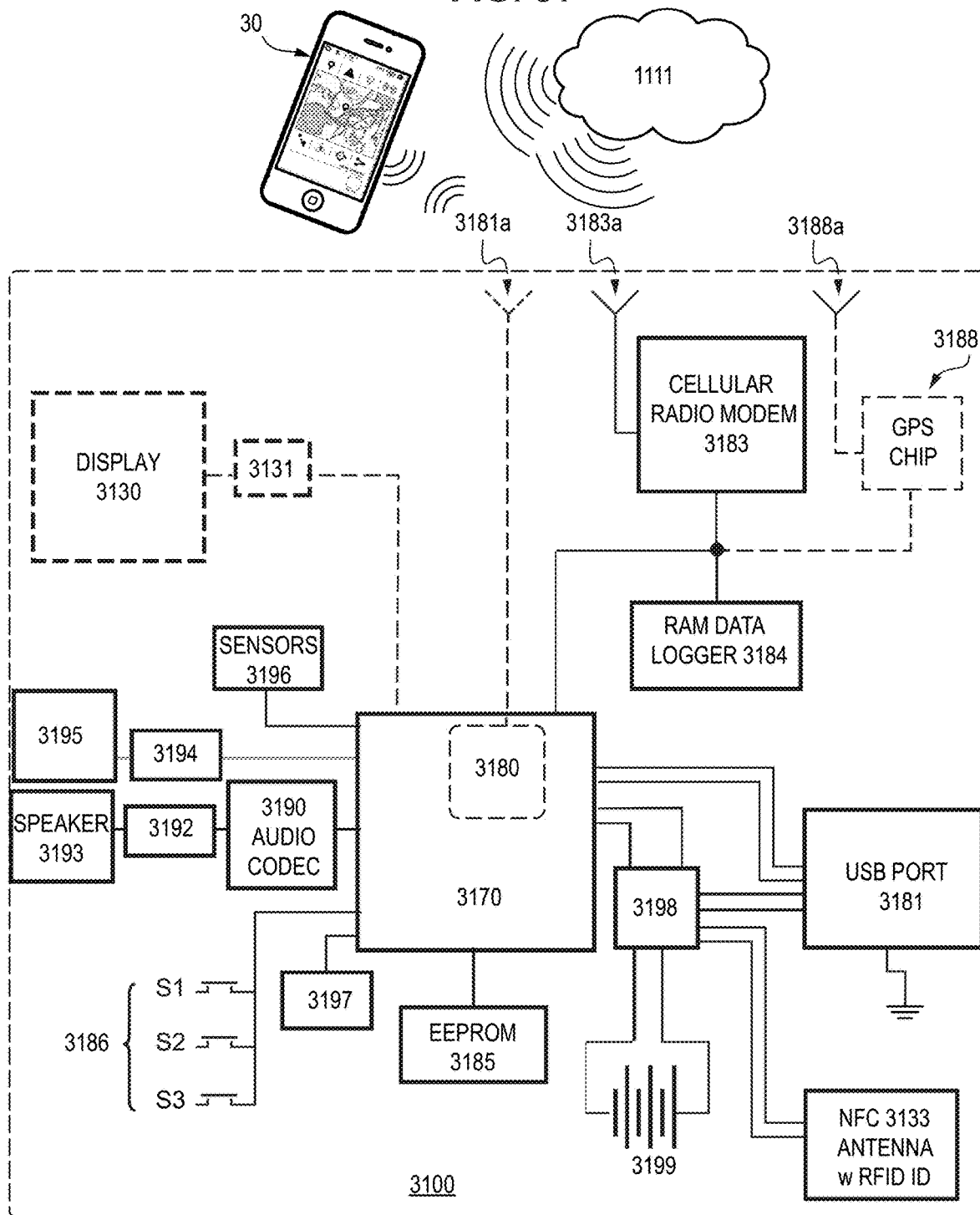
FIG. 31 is a schematic of another embodiment of an XCB device.

FIG. 31 is a schematic 3100 of another embodiment of an XCB device. Processor 3170 includes a BTLE radioset 3180 electronically coupled to an antenna 3181*a*, including, if needed, an encoder/decoder for parsing digital radio signals. The processor can be programmed, or otherwise configured, using software resident in ROM (such as EEPROM 3185) or as firmware, or a combination of both software and firmware. RAM 3184 is also provided for storage of volatile data, such as for data logging of sensor data that is transmissible by cellular or BT radio.

The MCU 3170 defaults to low power mode with clock function as a default, but can be powered up by a signal from the BT radioset or according to a power management schedule that also controls the cell transceiver 3183. The power management schedule includes PSM mode for deep sleep and eDRX mode for intermittent wake at paging windows and for TAU.

Cellular radio modem 3183 with cellular antenna 3183*a* is configured to provide simplified communication on a private network. In one embodiment, the XCB device is operated as a cellular device accessible by an IP address on a private network to find and track the whereabouts of the device via a dedicated and secure 5G private network or gateway VPG that is administered by a cloud-host administrative server. A SIM module may be installed to establish the exclusive IP address in the XCB device, with network access restricted to authorized parties such as smartphone 30.

In one embodiment, the cloud administrative host implements the VPG or cloud host 1111 network and uses the IP address to access the XCB device. By using the VPG to wake up the XCB device in a paging window as needed, sleep modes can be increased to save power. For example, an eDRX protocol can be overridden, or the parameters of a power saving mode modified. And by waking up the cellular device, then added commands and data can be transmitted to the XCB device and data can be uploaded from the XCB device. Once the cellular radio is on, then network-assisted location fixes on its transmissions may be performed automatically.

In one embodiment, use of private IP addresses with a VPG reduces the incidence of inadvertent, unauthorized, and network-incidental messaging that can drain battery life. The cloud host also adds a layer of artificial intelligence.

Devices having a cellular radio may wake up periodically, get a location fix, report the location to the cloud host, and then return to sleep so that the battery life is months or years. In one embodiment, the VPG network may use the location information to create a "trail of waypoints" of locations of the XCB devices over time by periodically generating and logging locations obtained by AGPS in an energy efficient manner. A motion sensor or heading sensor also improves the efficiency of the devices. For any given time period, if accelerometric motion is detected that is characteristic of motion, or a vectored heading, a position fix is requested and fulfilled. For example, the position fix is not repeated unless motion is again detected. In a variant on geofencing, XCB devices in identified "safe locations" are queried less frequently for location updates and not unless motion data is consistent with an excursion that would take the XCB device outside a designated range of the safe location. The tempo of a walking person is one flag, the higher frequency vibration of an automobile ride is another flag that would trip a location update command inside the XCB device. Thus only the accelerometer needs to be monitored on battery power unless and until a location update command is scheduled in advance or a query is received from the cloud host.

The signal strength of a cellular base station can also be monitored, as is typically the case in cellular networks to monitor connections and when needed transfer connections from one cell to another cell. Typically, the XCB device location is updated by TAU (Tracking Area Update) when a handoff is made between two cells. Depending on rules set by the cloud host that can be linked to the XCB device user's profile, to local events, time of day, and so forth, the cloud host can also be notified if the XCB device is reallocated from one cell to another. Because this can also occur when cell traffic is being levelled (i.e. by moving users from a crowded cell base station onto an adjacent base station having lighter traffic) the cloud host can monitor the base station carrier channels in the network path to differentiate location changes that are traffic load driven versus changes driven by a change in cell initiated because the XCB device detected a stronger signal from an adjacent base station and elected to initiate a handover to the new system transmitter.

The device optionally includes an OLED display 3130 and display driver 3131.

In some instances, the cellular radio chip 3183 will also contain a GPS position locator. In other instances, a GPS chip 3188 and antenna 3188*a* will be supplied as a separate component(s). Because GPS involves an energy-intensive signal acquisition and calculation, triangulation methods for determining location may instead be implemented using the cellular or BT radiosets, and such methods are satisfactory where multiple basestations having known locations are available, such as in most urban environments.

USB port 3181 is intended to operate with charger 3198 to recharge battery 3199 but may also be used to download program upgrades, for product qualification and troubleshooting, and for any other purpose for which a USB port may be utilized.

Audio codec 3190 is coupled by a LINE OUT to amplifier 3192, which drives speaker 3193. The speaker may be mounted on the housing rather than on a circuit board so as to take advantage of any resonance of the housing shell. The XCB device may include a vibrator driver 3194 and one or more vibrators 3195 configured to provide notification functions and may be combined with one or more buzzers. By selecting a higher dB piezoelectric buzzer (not shown), a FIND function can be realized analogous to the FIND PHONE function taught in U.S. Pat. No. 9,892,626, herein incorporated in full for all it teaches. Using the vibrator, an XCB device may be "nudged." A nudge is useful when a user of a parent device wants to attract the attention of the user of the XCB device, such as when a message is sent that needs a prompt reply.

Sensor package 3196 may include one or more sensors that are not switch sensors and are thus distinct from switches 3186 (S1, S2, S3). Various combinations of sensors may be provided in a sensor package. In some preferred embodiments, a sensor is a combined 9-axis motion sensor and temperature sensor. In one preferred device, a sensor is an integrated package having an accelerometer, gyroscope, and magnetometer for each axis. In some instances, the sensor package is incorporated into the processor.

As illustrated here, accelerometer or heading sensor 3197 is associated with processor 3170 and may be used to trigger processor functions as in motion/heading control and left-behind notifications. Generally, an XYZ three-axis accelerometer is included but may also include a 3D gyroscope and magnetic compass with firmware that generates a heading output to the processor. In some instances, the accelerometer may be integrated into the processor and has a number of uses. Input from the accelerometer, such as a double or triple tap, can be used as a wakeup signal as part of a power-savings sleep routine.

The device may also be equipped with a Qi charger antenna (not shown) or an NFC antenna 3133 for receiving taps. Each tap can be associated with a transmission of an RFID identifier from the XCB radiotag to a device such as a smartphone equipped with an NFC reader and suitable App. On sensing a tap, the XCB device powers on the NFC circuit to transmit the RFID ID and causes a bootstrap routine in cooperation with the smart device to initiate a BT connection or a WiFi connection for example.

GPS chip 3188 with GPS antenna 3188*a* is shown as being optional because in some instances the GPS functionality will be built into the processor or into one of the radiosets, if present at all. Some cellular radio chips are provided with accessory GPS functionality integrated into the die. The GPS antenna 3188*a* may be separate from the cellular antenna 3183*a* as shown, but, in some instances, a combination package is used. GPS may be actuated at extended intervals to save power, and may be smart GPS, that is, activation occurs when there is a need, such as when there is motion of the wireless device or there is a situation in proximity to the wireless device (as detected from other data feeds) that necessitates, or can benefit from, closer tracking and monitoring of location. AGPS may be used to reduce power.

Figure 32:
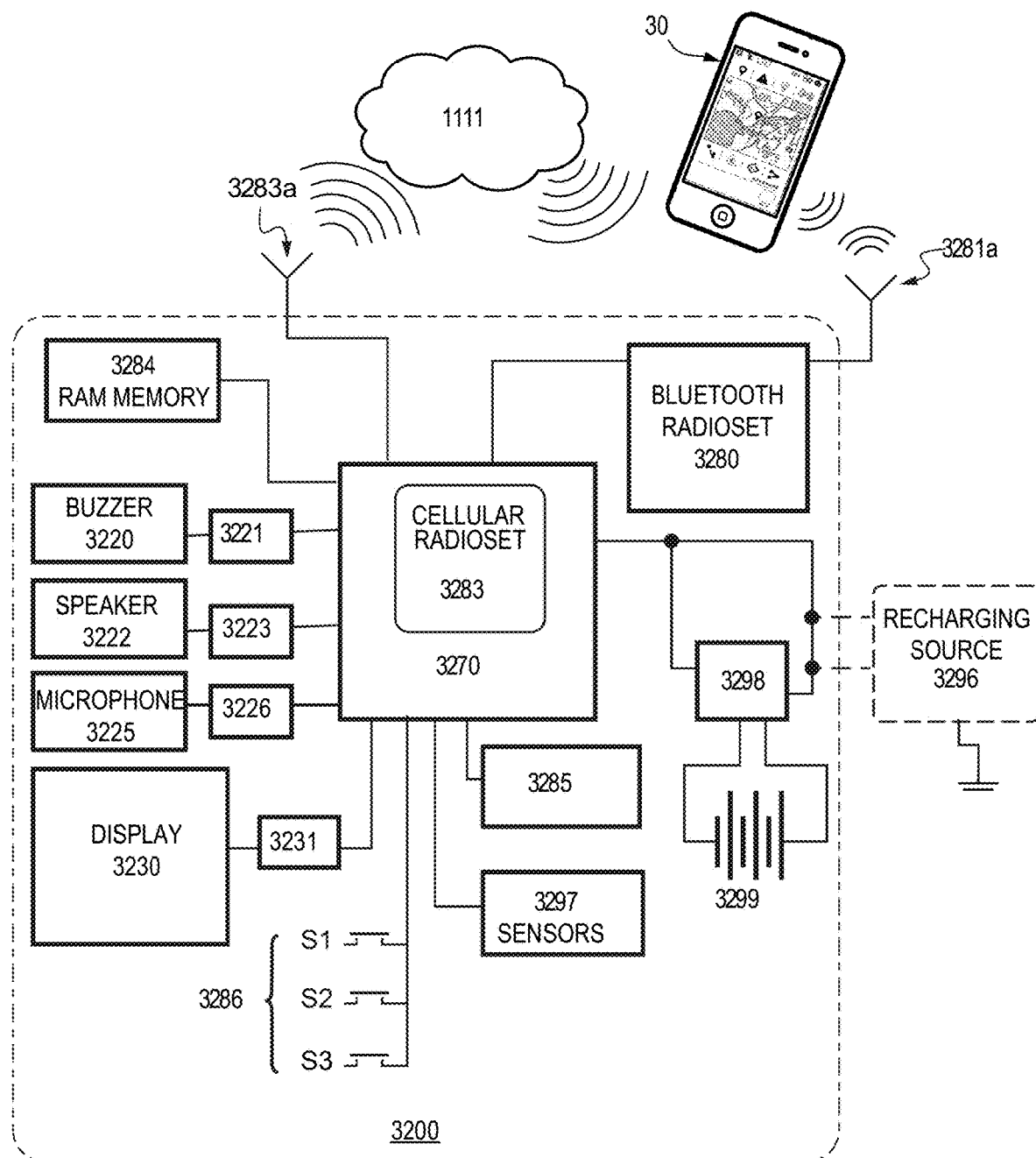
FIG. 32 is a block diagram view of an XCB radiotag and a global area network with cellular network, Bluetooth network, and a cloud host. The system includes voice and display capability for cellular and Bluetooth voice and data networking.

FIG. 32 is a block diagram view of an XCB radiotag 3200 and a global area network with cellular network, Bluetooth network, and cloud host 1111. A single radiotag 3200 and a single smartphone 30 are shown for simplicity but each layer of the network can include many radio units. The radiotag device 3200 has some variations from device 3100 described in FIG. 31 and will be described in detail in a systems context.

The processor 3270 can be programmed, or otherwise configured, using software resident in ROM (such as EEPROM 3285) or as firmware, or a combination of both software and firmware. The processor may be for example a Monarch LTE GM01Q (LTE-M/NB-IoT such as the SQN66430 SiP) or NB01Q (NB-IoT) LGA module with integrated SIM platform (Sequans, Paris FR) for machine data exchange. Monarch SOCs such as the SQN3330 generally include an integrated cellular RF front end, but not Bluetooth radio, thus the different layout here as compared to FIG. 31. Sequans modules typically support a variety of LTE bands for worldwide connectivity and consume less than 1 µA of power with PSM and eDRX modes and providing for batch data transmission in a centimeter-sized combination.

The cloud host 1111 is able to engage directly with smartphone 30 using conventional cellular or WiFi radio technology. The cloud host may also engage with cellular radio 3283 of the XCB radiotag via a cellular network such as LTE. But to save power, the cellular radioset 3283 and the processor 3270 may default to a power savings mode and it is a Bluetooth radio signal from the network or from a companion smart device 30 to the XCB radiotag (received on antenna 3281*a* and conveyed to the processor by Bluetooth radioset 3280) that tasks the processor to execute some routine that wakes up various higher functionalities of the device 3200. These higher functionalities may include initiating an uplink or a TAU by the cellular radioset as in a CALL HOME. In short, in one embodiment, the cloud host sends a signal to the Bluetooth radioset via an intermediary device such as smartphone 30, and that signal will cause the cellular radioset to initiate a direct CALL HOME, optionally bypassing smartphone 30. In this way, the cellular radioset can kept in a dormant or semi-dormant state most of the time. The cellular radioset can minimize or at least manage the kinds of energy demands illustrated in FIG. 41, where the power consumption of a full TAU is illustrated.

During a CALL HOME, the network can send commands to the XCB device that include modifications to the default cellular power savings mode. A DRX protocol can be initiated, with provision to extend it in eDRX mode, in which the frequency with which the cellular radioset uplinks for a network location fix or initiates a data uplink is prescribed by network command. The increased call activity will drain battery power, but the network uses the increased location data to assist in recovering or tracking a lost or errant item, for example, only when needed.

Cellular radioset 3283 with cellular antenna 3283*a* is configured to provide simplified cellular communication. The XCB device may be operated as a cellular device accessible by an IP address and may be used to obtain and report location fixes to a cloud host. The SIM module may serve to establish an exclusive private IP address in the XCB device. Typically, network access is restricted to authorized parties.

The information needed to authenticate to the cellular network is stored in a SIM unit that is part of cellular radioset 3283 and can also be used for high quality encryption of data exchanged. Once authenticated, the cellular radioset can be used to uplink data to the cloud host 1111. Using an API, the cloud host parses sensor data, radio contact records, extracts relevant information, and combines that information to generate an executable command that may take the form of a notification, a warning, or an intervention. The executable command is handled by the network engine and may involve one or more smart devices 30 or other remote machines as intermediaries or may be delivered directly to the XCB device 3200 during a paging opportunity when the cellular radioset 3283 is receiving.

Alternatively, the XCB device is enabled to receive a cellular power management mode override signal in a Bluetooth radio signal. That is, the cloud host can command the processor and cellular radioset to override a cellular default power management parameter by sending a signal to the Bluetooth radioset. That signal is conveyed to the processor, and the command is executed.

Sleep management can be by a restricted schedule of cellular activity, for example an eDRX mode in which network location fixes are obtained every 5 min or 10 min, and in which there is a TAU once an hour or three times an hour as required to maintain network synchronization and to balance network loading, for example. During a TAU, if the XCB device has shifted out of a tower coverage area, the device will lock on to a new tower to authenticate itself and re-establish an extended DRX mode with the new tower. In this way, hours of location data can be stored in the XCB memory and uploaded only when an opportunity arises, or can be requested either when the cellular radioset executes a paging window call or when the Bluetooth radioset receives a connection request. Expired location data will be dumped after it is uploaded or in response to an exceeded timeout that necessitates dumping memory to make space for new location data.

During an eDRX event, the cellular radio is fully active and linked to the network, so data can be exchanged and new commands received, but generally an eDRX goes by without the need for an uplink of data in a paging opportunity and the only network interaction is to request a cellular location fix by the network PoLTE service or an equivalent.

The signal strength of a cellular base station can also be monitored, as is typically the case in cellular networks to monitor connections and transfer connections from one cell to another cell in response to signal strength changes. Typically, the XCB device location is updated by TAU when a handoff is made between two cells. Depending on rules set by the cloud host that can be linked to the XCB device user's profile, to local events, time of day, and so forth, the cloud host 1111 can be notified if the XCB device is reallocated from one cell to another. Because this can also occur when cell traffic is being levelled (i.e. by moving users from a crowded cell base station onto an adjacent base station having lighter traffic) the cloud host can monitor the base station carrier channels in the network path to differentiate location changes that are traffic load driven versus changes driven by a change in cell initiated because the XCB device detected a stronger signal from an adjacent base station and elected to initiate a handover to the new system transmitter.

Data is transmitted via multiple channels, one termed a "traffic channel" for example, another a "control channel," and yet another as a data channel containing GPS-related data, although the terminology varies. The control channel carries commands to SIM cards of the parent devices and also carries data packets for SMS text messaging. The traffic channel is organized into slots for carrying symbols and on the uplink is controlled by a dynamic allocation of slots to each end user device. To avoid an imbalance on the backhaul, slot traffic is asymmetrical, and may be greater in the downlink then the uplink. In newer systems, slots can be mini-slots for carrying small payloads, slots can be aggregated as needed if reception is good, and packet data may be transmitted in the aggregated slots to support bit streaming applications. Dynamic allocation of slots is known in the art.

Continuing on FIG. 32, the XCB device includes voice and display capability for cellular and Bluetooth voice and data networking. The device here incorporates a voice-quality speaker 3222, speaker driver 3223, and display 3230 with display driver 3231. The circuitry includes a microphone 3225 and voice encoder 3226 for voice transmission. A simple buzzer or vibrator 3220 and driver 3221 may also be provided. Separate audio and visual codecs are supplied for higher fidelity quality. The chipset can include a Monarch controller (Sequans, Paris FR) with integrated LTE modem. RAM memory 3284 for use in data logging is adapted as a buffer for audio/video transmission or separate memory and buffering is provided. The recharging circuit 3298 may include a connector for a USB power cord or other adaptor, for example. The processor 3270 may also include a digital signal processor (DSP) or neural engine for recognizing voice patterns. In one embodiment, a CEVA (Mountain View Calif.) Bluetooth BTLE or BTDM RF front end chip is combined with a Monarch (Sequans, Paris FR) cellular front end chip in which the Bluetooth radio controls of the power state of both chips.

By adding a voice interface with microphone and speaker, the user/subscriber can communicate instructions directly to and from to the XCB device without the need for a keyboard. This enables VoLTE (voice over LTE) or VoBT (voice over Bluetooth). A speaker and microphone have utility in wearable XCB devices, such as one worn as a wristband or a headset. The scope and concepts of the invention are not limited to particular device forms, but may encompass other form factors as are readily apparent from these teachings. Any embodiments, alternatives, modifications and equivalents may be combined to provide further embodiments of the present invention that include an energy harvesting human interface or other user interface for a XCB device without departing from the true spirit and scope of the disclosure.

Interestingly, voice-over-Bluetooth (VoBT) can be enabled for short range voice interactions between an XCB unit and a smart device without the need for the more complex voice codex used by a cellular radioset. To save power, the data-over-LTE functions are sometimes limited to machine M2M data, not voice.

Larger transmissions such as audio recordings and video recordings can be transmitted using "store-and-share" ("audio SNS" and "video SNS") protocols in which there is an initial processing of data on the portable device that includes compression by a vocoder. The device stores for example the audio in memory temporarily, followed by processing to encapsulate the digital recording into the frame/slot structure of a transmission. Transmissions are completed in one or more bursts. The data then transits the packet data environment and is received by a cloud host at a designated IP Address. The cloud host examines the data, looks up an associated profile of the users, including any permissions, and forwards the message to one or more smart devices 30. In this way, the digital radio signals are made compatible with an Internet Protocol (IP) format and can be displayed or played back as audio on a smart device or on a XCB device equipped with a speaker and microphone. Any smart device or XCB device can also send audio (or video) messages by the same process of packetization followed by radio transmission in one or more frames.

Frame structure is complex and includes hyperframes, superframes, frames, and slots. In TDD, the frames and slots are transmitted at designated times. Each carrier is part of a transmission protocol managed by the network and includes its own meta-data, including error checking, synchronization, indexing, guard periods, and so forth. For example, a 5G network supports text message traffic from a smart device to an XCB device in larger slots, but can use mini-slots to carry a reply from a Bluecell device to a smart device if replies are limited to a button press of on the smaller Bluecell device.

RAM 3284 is provided for storage of volatile data, such as for data logging of sensor data. The size of the RAM memory 3284 is dependent on the size of the memory requirement for data.

Stored data may include data from sensors 3297 and from switches 3286. Data from throw- and button-press switches is considered data. Stored data may also include radio contact records as described above in FIGS. 27 and 30. The radio contact data may include sensor data received from other radio units. The memory may be supplied as cache memory in the processor, or may be provided with extra RAM chip space if more space is needed for a data logger device. Memory is generally organized as a rolling stack so that outdated data is dumped from the bottom of the stack and new data is added at the top of the stack if not first uplinked to the network. Memory may also include dedicated registers for handling packet composition and decomposition for example, for encryption keys, and so forth. This memory is generally distinct from non-volatile dedicated read-only memory 3285 for storing processor instructions.

Sensor package 3297 may include a single sensor or various combinations of sensors. In some preferred embodiments, a sensor is a combined 9-axis motion sensor and temperature sensor. In one preferred device, a sensor is an integrated package having an accelerometer, gyroscope, and magnetometer for each axis. In some instances, the sensor package is incorporated into the processor.

Bluetooth radioset 3280 is electronically coupled to an antenna 3281a. Notifications may be sent to the XCB device 3200 via either the cellular or the Bluetooth radioset, and may result in a display such as activation of buzzer 3220 via piezo driver 3221.

The device may be rechargeable from an optional recharging source 3296. Battery 3299 may be disposable or rechargeable via circuit 3298. Other energy harvesting means known in the art may be used to extend the operating lifetime of the device beyond that offered by one full battery charge and a switching regulator may be used to manage power to the processor and radiosets. Depending on the kind of power available, flags may be set that configure the switching regulator and processor.

Alternatively, at least some of the devices 3200 may be hard wired to a grid power supply that has a degree of always on reliability, and these specialized devices may function as reference hubs 20. The role of hubs may be to organize low energy slave beacons into piconets and to relay data to a network server, for example. In one embodiment, an XCB device may be master in a piconet of Bluetooth devices. The XCB device may optionally be battery powered, or may be wired to be always on. Combinations of powered and portable XCB devices may also be deployed.

The meta-data can also be used to activate XCB devices to CALL HOME and to uplink relevant data in memory with a cloud host, and to receive new commands and instructions.

Figure 33A:
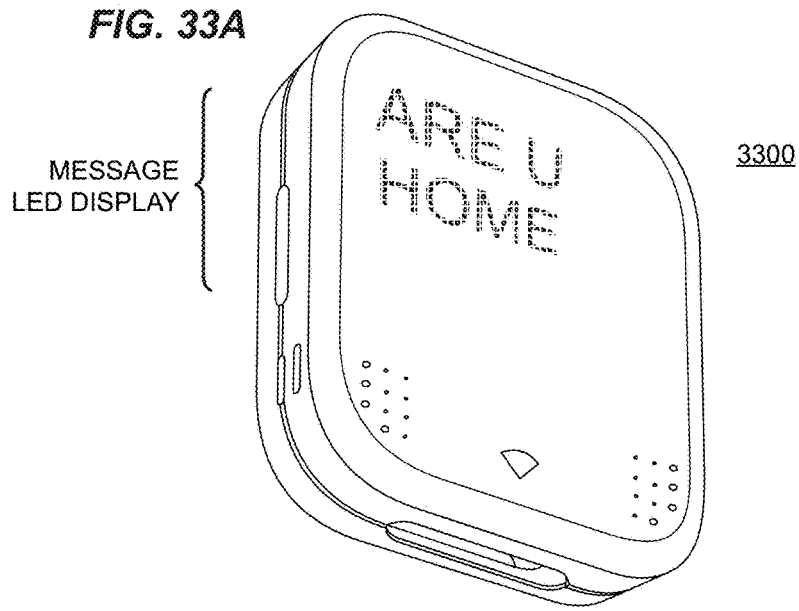
FIGS. 33A and 33B are views of an XCB radiotag with LED Dot Array Display configured for "banner" message display and with capacity for simple inquiries and responses using tactile switches on the front panel.
Figure 33B:
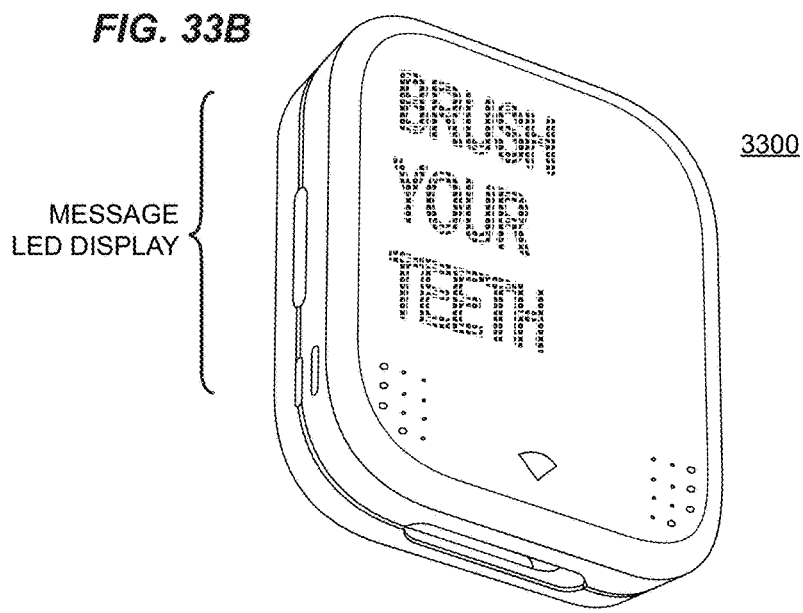

FIGS. 33A and 33B are views of an XCB radiotag 3300 with LED Array Display configured for "banner" message display and with capacity for simple inquiries and responses using tactile switches on the front panel. The device is adapted for dual BT/cellular communications of data and voice. The device includes a cellular radioset, a BT radioset, a processor, memory for storing radio and sensor data records, and a battery. The device also includes a speaker and microphone and a pair of button press switches for simplified texting of replies to Yes or No queries. The housing encloses BT and cellular radiosets and a processor as described in any of the schematics of FIG. 6C, 7A, 7B, 7C, 17, or 31, as representative schematics of a device of this kind—but including here an LED dot matrix array display and speaker with microphone.

Figure 34A:
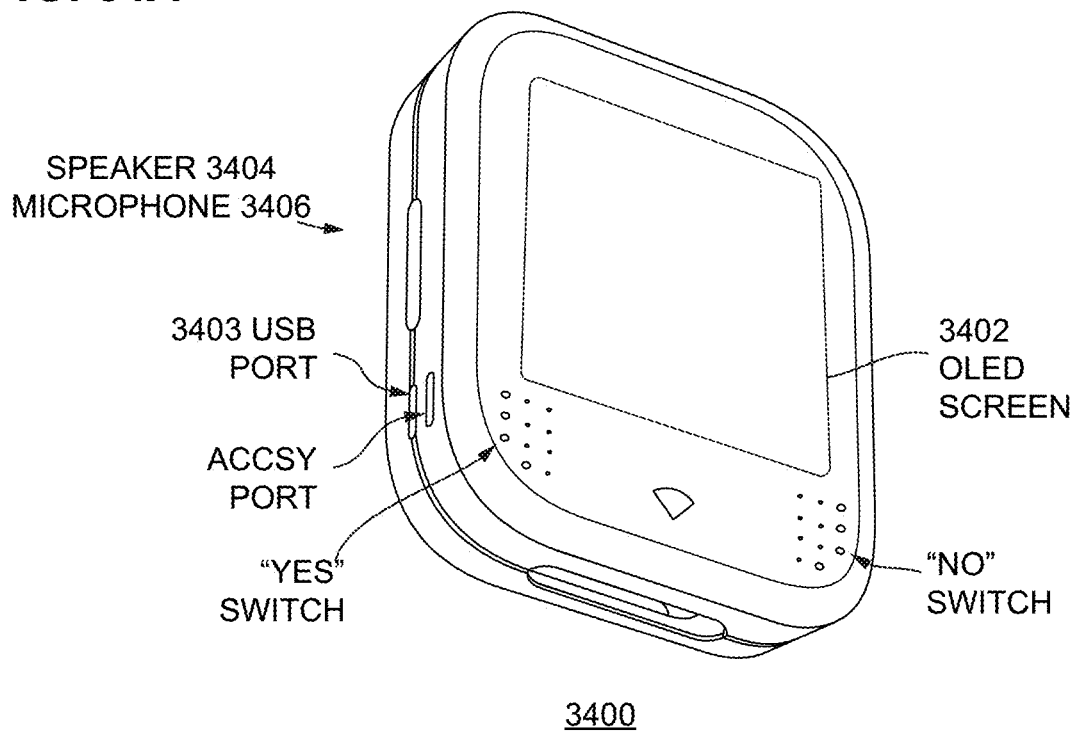
FIGS. 34A and 34B show the XCB device that includes a OLED display screen for video graphics.
Figure 34B:
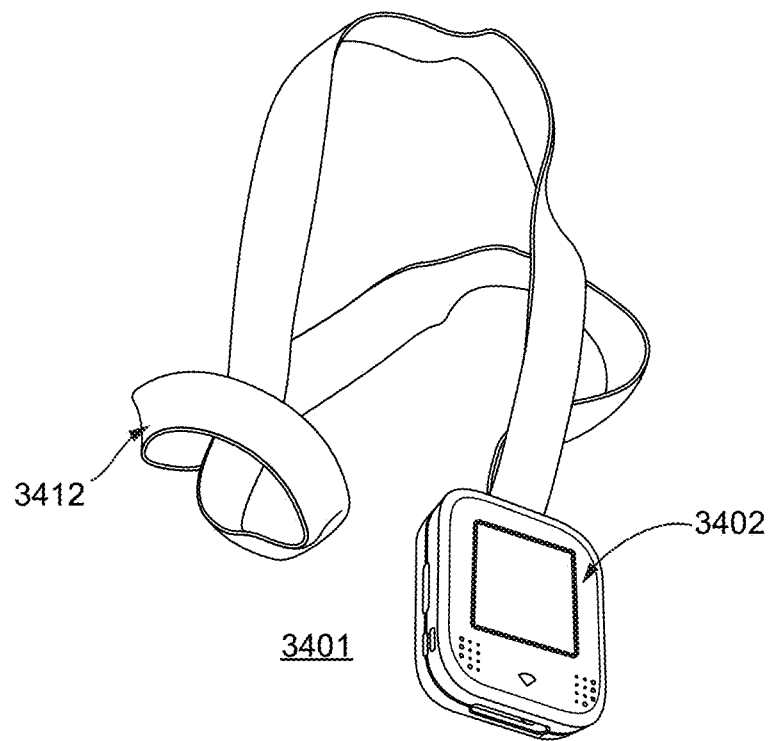

FIGS. 34A and 34B show an XCB device 3400 that includes an OLED display screen for video graphics, shown here as a color OLED screen with sufficient pixel resolution to display QR codes, emojis, icons, faces and simplified text. The body includes a shell surrounding a hollow core for the electronics. The device includes an OLED screen display 3402, with miniport for USB-A recharging 3403 and an accessory USB-C or HDMI port may also be included. The face includes pressure sensitive pads for button press commands.

The sensor package may include a temperature sensor. The sensor and device may be configured for attachment to an object in need of cold chain tracking with temperature data logging as a function of position or location. The sensor package may be adapted for use in measuring body temperature, and the device may be strapped onto or otherwise contacted with a living body to monitor temperature over time and to periodically report location and temperature, as is useful for fever mapping in a workplace or community. Typically the temperature sensor (not shown) is mounted on an exposed surface of the underside of the device.

For setup, the device can have a peel-off decal with QR Code over the OLED screen. The initial setup is relatively easy. Each Bluecell radiotag device is provided with a QR code label on the housing. Scanning the code with a companion smartphone intended as a "parent" device (once the needed software is installed) causes a folder to be created on the smartphone display and takes the user to a menu for assigning the Bluecell "child" device to a particular person (such as a dependent minor, an elderly aunt, travelling companion or friend designated as an addressee and respondent associated with a particular device) or pet, and entering any context or relevant background such as a profile, an appointment list, a calendar, a schedule of regular destinations and time brackets for each, and so forth. Once programmed, the child device is electronically tethered to the smartphone via a VPG. The smartphone can direct text messages to the child device, or can even call the device using VOW cellular service. Immediately after setup, the smart device can also display a map showing the current location of the child device and any direction of movement (if the circuit in the device includes an accelerometer). This innovation is discussed in more detail in US. Pat. Ser. No. 62/968,105, which is co-assigned and is incorporated here in full by reference.

The transparent QR decal may include a first QR Code that is static, and when the device is powered up, other details of the QR Code may be added, so that a smartphone that is used to read the QR code will see a first authentication code prior to power-on and a second authentication code after power on as a way of preventing counterfeiting. Devices are provided with SIM cards inside and a QR sticker outside, and the initial pairing is through BT radio of a user's smartphone. The QR code directs the user's smartphone to a cloud host, the cloud host will recognize the new SIM IMSI and will go through an activation setup in which BT commands are sent to the device processor via the BT radio. Subscription cellular network access can be bundled at very low cost, enabling private virtual gateways (VPG) in which network access is gated through a private IP Address and all packeted data is routed to a private server.

The battery is for example a 2400 mAh battery. An NFC antenna is mounted on the underside of the battery, which is a LiPo foil pouch battery. The NFC antenna can be used for tap-to-touch pairing, for example, and for exchanging secret keys using direct contact to ensure lack of eavesdropping.

The shell exterior supports ports for a speaker 3404 and microphone 3406. Yes and No button switches and a radio display LED are also mounted in the housing. The housing can include an interior speaker that causes the housing to resonate for voice and buzzer applications. Several antenna are embedded in the housing, one for Bluetooth, another for cellular radio. There may be multiple antenna for cellular radio on different frequency bands, or the antenna may be articulated to allow use at multiple frequencies for receiving and transmission.

As shown in FIG. 34B, device 3401 is perforated with a slot for a lanyard or belt 3412. Other means for attaching a device to an asset are known in the art. The attachment hardware can be adapted to use for attaching the device to a container or package. The device includes buckles for use on a lanyard and an OLED display 3402 with microphone and speaker for audiovisual communications as well as data logging.

Figure 35:
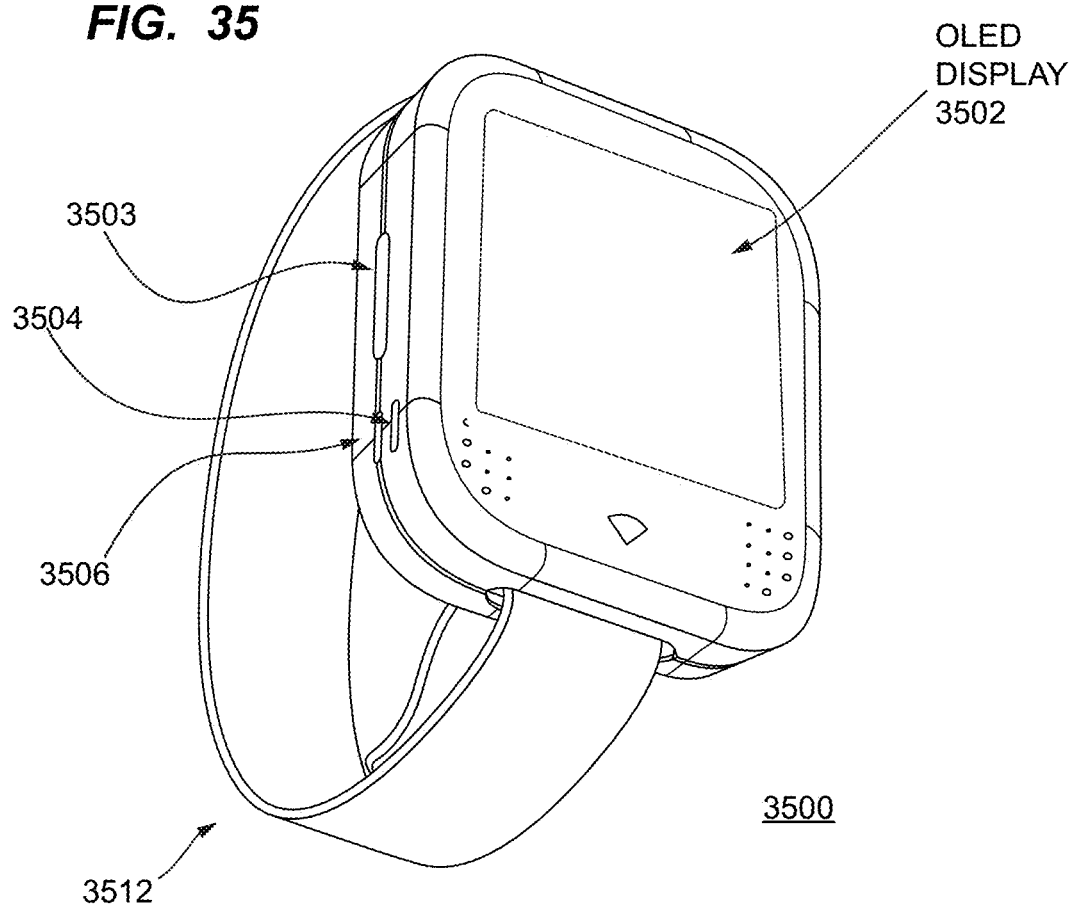
FIG. 35 is a view of an XCB device worn as a wrist strap that functions as a location and wayfinding monitor and as a messaging center.

FIG. 35 is a view of an XCB device 3500 worn as a wrist strap 3512 that functions as a location and wayfinding monitor and messaging center. The device has voice and display capability for cellular and BT voice and data networking, and incorporates a speaker 3503 and display 3502. The circuitry includes a microphone, voice encoder for voice transmission, and tactile buttons as part of a voice and touch user interface. Separate audio codecs are supplied for higher quality. The chipset can include a Monarch controller (Sequans, Paris FR) with integrated LTE modem. RAM memory for use in data logging is adapted as a buffer for audio/video transmission or separate memory and buffering is provided. Options may include a Satnav positioning module and a recharging circuit with external power supply, which may include for example a connector for a USB power cord. The device may also include a DSP for recognizing voice patterns, but voice recognition interfaces have increasingly been realized as a system service and are implemented on a system level, not as extra hardware that must be supported onboard the device. In one embodiment, a CEVA (Mountain View Calif.) Bluetooth BTLE or BTDM RF front end is combined with a Monarch (Sequans, Paris FR) cellular modem in which the BT radio controls of the power state of both chips via the processor. In another embodiment, an AeroFONE single-chip core from NPX Semiconductor may be combined with BT radio. USB ports 3504,3506 are configured for power or data connections.

The display 3502 on a device of this kind enables mixed media communication on a small screen. By also including a camera (not shown), higher functions (such as recognition of QR codes, biometric security features, and capturing photographs or videos) can be enabled, but the energy and buffering requirements for broadband capture, storage or transmission of images may preclude many of these uses in the smallest coin-sized devices. Devices without a camera can be simplified to operate on a lower energy budget but to supply a powerful tool for communicating with a user. The kinds of data that can be sent to a device with a display include QR codes that can be read by remote machines, text messages, machine-readable icons, pictures of faces, statistics, biographical information, biometrics, emojis that accompany voice messages, maps, directions, instructions in graphical form, animations, plots, graphs, decorative images, and so forth, any of which can be presented on a display screen without a need for a camera and associated processing power.

An NFC antenna on the underside adds the capacity for Tap-to-Pay and Tap-to-Connect. Qi charging is also envisaged. Devices of this kind are described further in U.S. Prov. Pat. Appl. No. 62/968,105, which is co-owned and is incorporated herein by reference for all it teaches.

Example I: Mobile Voice Hub

Figure 36:
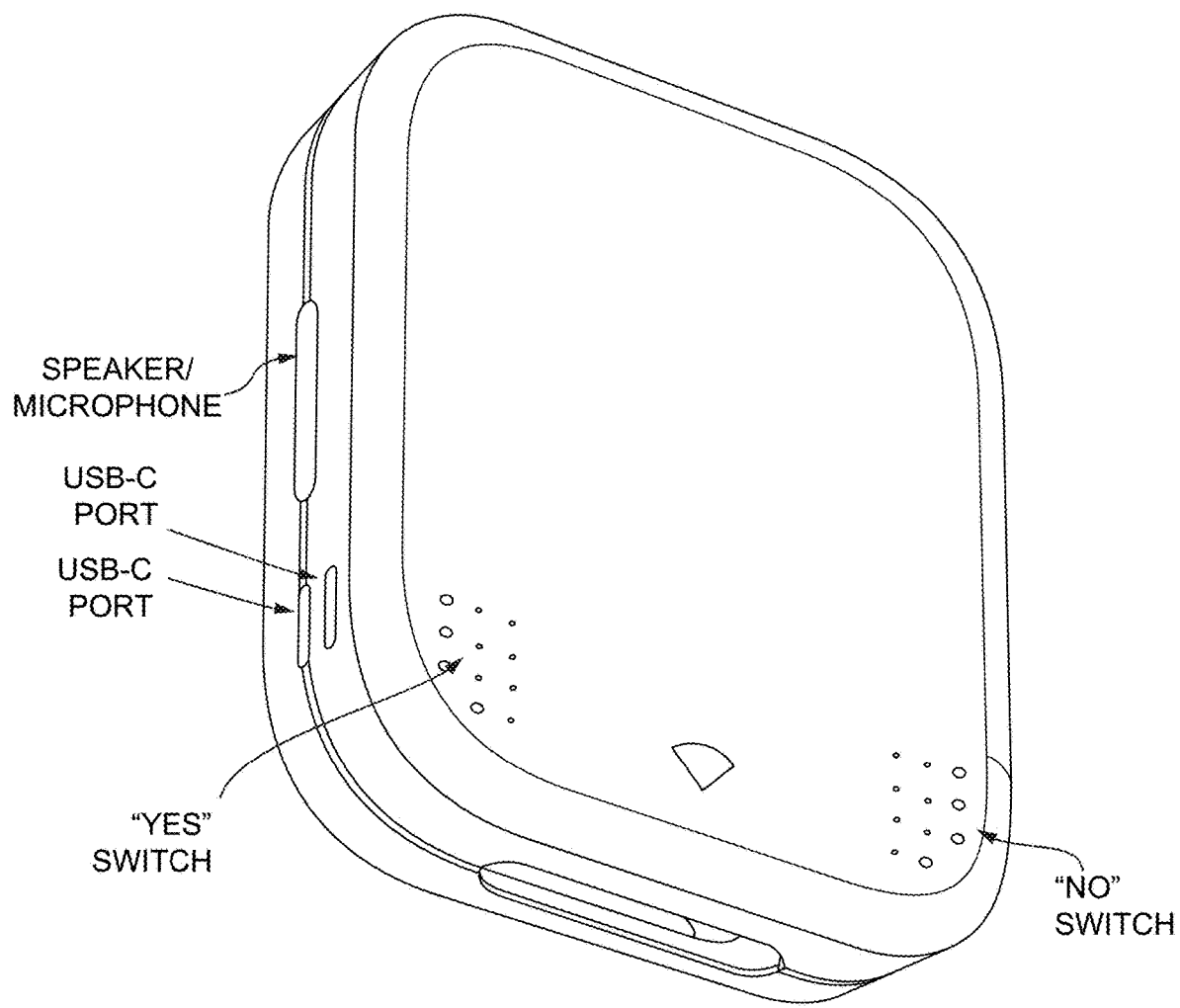
FIG. 36 is a schematic of an XCB device having voice and display capability for cellular and BT voice and data networking.

FIG. 36 is a view of a compact XCB mobile device for providing location management services with a natural language voice interface. In this exemplary embodiment, owner/subscriber 11 can communicate using an interactive voice interface through XCB devices 3600. Devices include a speaker with resonant voicebox, a microphone or microphones in a noise-cancelling array, and audio codexes for processing speech via radio. The communication can be conducted by an automated cloud host on one end and a human on the other, or can be a human-to-human interaction. The user can conduct a conversation with an intelligent machine analogous to voice-actuated user interfaces such as Google Assistant, Bixby and Alexa that are becoming more widely implemented in consumer electronics. The response back to the device can be as simple as a beep in acknowledgement of a button press, or can be a decorous "thank you," a "bien sur", or a "dō itashimashite", depending on the native language of the user.

The speaker and microphone array may optionally be contained in a circular, geodesic, prolate spheroid, or spherical acoustic housing. U.S. Pat. No. RE47,049 to Li teaches a dynamic microphone array for improved voice recognition. U.S. Pat. No. 7,177,798 to Hsu and U.S. Pat. No. 6,766,320 to Wang teach methods for natural language query and response interactions. These patent documents are incorporated in full by reference. Reference hub 20 may include a natural language interface incorporating cloud-based speech recognition and response, for example. A DSP (not shown) may be incorporated in the circuitry for recognizing basic wake words, for example. Mobile devices 10 may also include a natural language interface incorporating cloud-based speech recognition and response, for example.

Any interactive response can lead to further assistance, or to a two-way conversation between an owner/administrator and for example a community member who found the lost object or pet and pressed the button. Typically a message might be, in the case of a child with wrist radiotag, dog or cat wearing a radio collar, or a lost asset that carries an attached radiotag, "Your child/asset/pet has been found . . . and here is the location where the pet is now [ . . . see displayed map], for example." Arrangements can then be made to recover the/pet, or the owner can simply go to the spot and repeat the process of refining the current location until the animal is within reach. Extended voice interactions may be offered as part of the Cellular Remote Locator Services Toolkit.

The Bluetooth Proximity Locator Services Toolkit is valuable for finding concealed objects if needed. The back and forth allows for direct communication and speeds recovery. Items such as keys, jackets, purses, vehicles, valuables of any kind that can have an attached finder device, are readily tracked if lost. In an important application, children who have strayed can be re-united with their parents or teacher using this system. Also, using machine learning, devices that are about to be lost and children or pets who are about to stray can also be detected and preventative interventions taken by the system. The object of a smart system that can detect a lost child/asset/pet scenario before the owner knows the child/asset/pet is lost is realized by this system when combined with BT radio topology awareness, radio contact record data aggregation, and machine learning.

The promise of the IoT is a sea of information that empowers people to manage their lives. By incorporating XCB polyradio capacity in a portable device, we realize a platform for tracking, finding, and sensing that can provision itself with location data. This device can be used as a data logger for collecting all kinds of information—including the surrounding BT radio topology—that a cloud host can then use to steer events to a successful outcome without user intervention, or to notify the user of the need for intervention, such as by flagging a lost item status before the owner knows it is lost. The computing resources onboard an XCB radiotag may be limited, but radio contact logs containing location and sensor data, when uplinked, can power the computing resources of the cloud for the benefit of communities.

Location of a radiotag is readily determined by GPS or by network-assisted location service, for example, and the location is readily acquired by a system administrative host. In some instances, BT topology has the characteristics that allow a location call to be made by the device or the system. If needed, the owner/subscriber can request a location fix of the radiotag from the system host. If the XCB device is not awake and in a cellular paging window, the device can be contacted via its "always listening" BT radio with minimal latency. If the radiotag is not in a familiar radio environment, then a proxy smartphone or hub operated by an anonymous user of a community of users, in response to a BT advertising signal from the lost radiotag, will alert the system administrative host that the radiotag has been detected, and the system will acquire a location and notify the owner. This community approach is termed the "Community Open Arbors" system, analogous to a living forest in which branches, trunks and roots enable intercommunication between trees and leaves as nodes.

Ultimately, the XCB device of an embodiment works out of box with no setup. Autoprovisioning involves first actuation to find the cloud host via the cellular network. Subsequently, power management can be through a Bluetooth chip, for example.

Example II: Device with NFC "Tap-2-Connect"

Figure 37A:
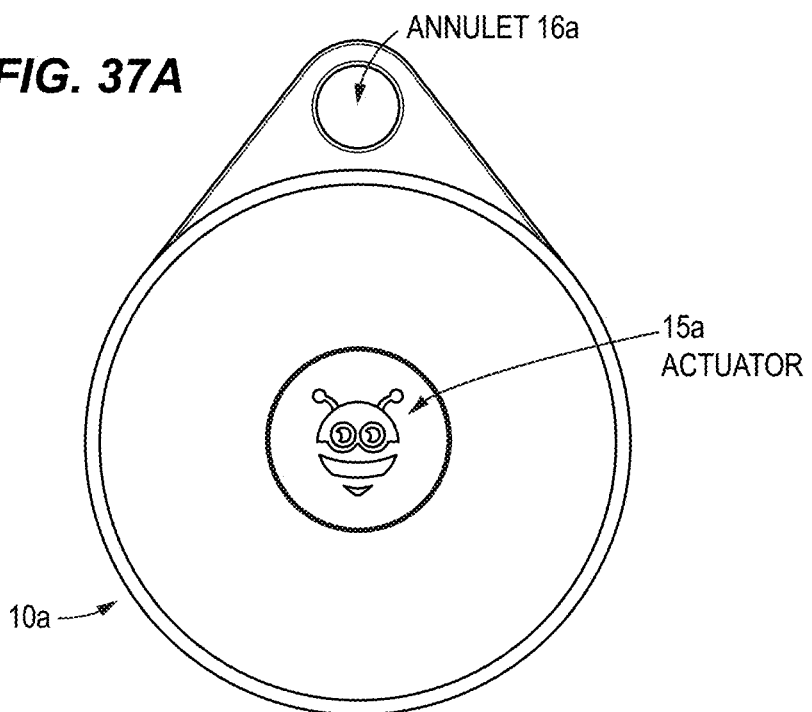
FIGS. 37A, 37B and 37C are plan and elevation views of an XCB radiotag for subscription services.
Figure 37B:
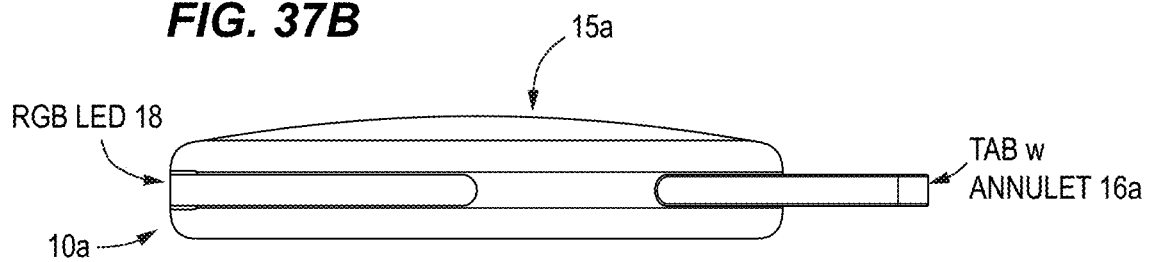
Figure 37C:
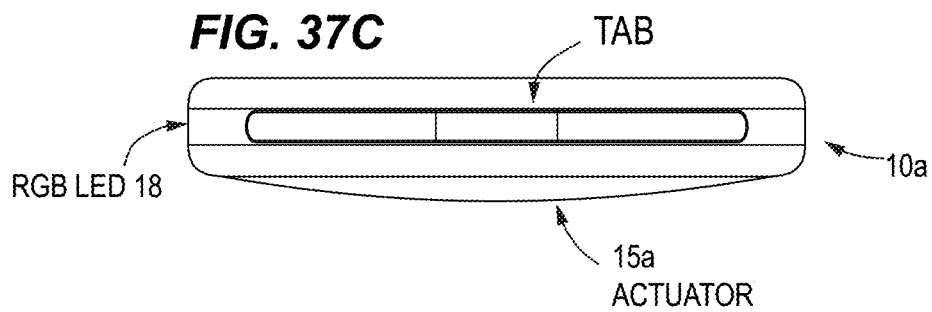

FIGS. 37A, 37B and 37C are plan and elevation views of an XCB radiotag. The radiotags 10a are discoid in shape with a diameter of about 4 cm and a thickness of about 8 mm. The upper case include an actuation switch 15a and the lower wall has an inlaid LED 18 that functions as part of the user interface and can also serve as a flashlight, such as is useful on a keychain in a dark parking lot. A tab on the bezel includes an annulet 16a for mounting the radiotag to an asset such as a keychain. The devices are inductively rechargeable and sealed. Setup and wireless synchronization and data services are achieved using the cellular, BT and NFC radios inside. These devices also include a SIM card or embedded SIM for authentication to a cellular network. As currently practiced, a virtual private gateway (VPG) with private IP address is used to connect the cellular modem to the network. For setup, a "tap-2-connect" scheme may be used, for example, by which the NFC radio of the radiotag, when in radio proximity to a smartphone having the required software, causes a link to be opened to a web server and the server handles registration of the devices. After initiating the device by pressing the actuation switch 15a, the case can be tapped on the smartphone, and an NFC carrier wave initiated by the tap engages an NFC transceiver in the smartphone. Authentication data and setup data are exchanged. NFC is used to bootstrap a higher bandwidth radio, such as the BT or the cellular radio of the XCB radiotag. The smartphone may use WiFi to connect to the cloud server, for example, or the XCB radiotag can make a direct cellular connection once it receives the needed control channel packets. User account information may be synchronized with user data already on file and the authentication is made with the smartphone in order to link the radiotag to the user's account. Once setup is completed, direct cellular network connectivity is established. The setup may also include updating software, firmware, network settings, and any information that the user wants entered to associate the radiotag with a particular smart object, such as a child, a pet, a backpack, camera or other asset.

Figure 37D:
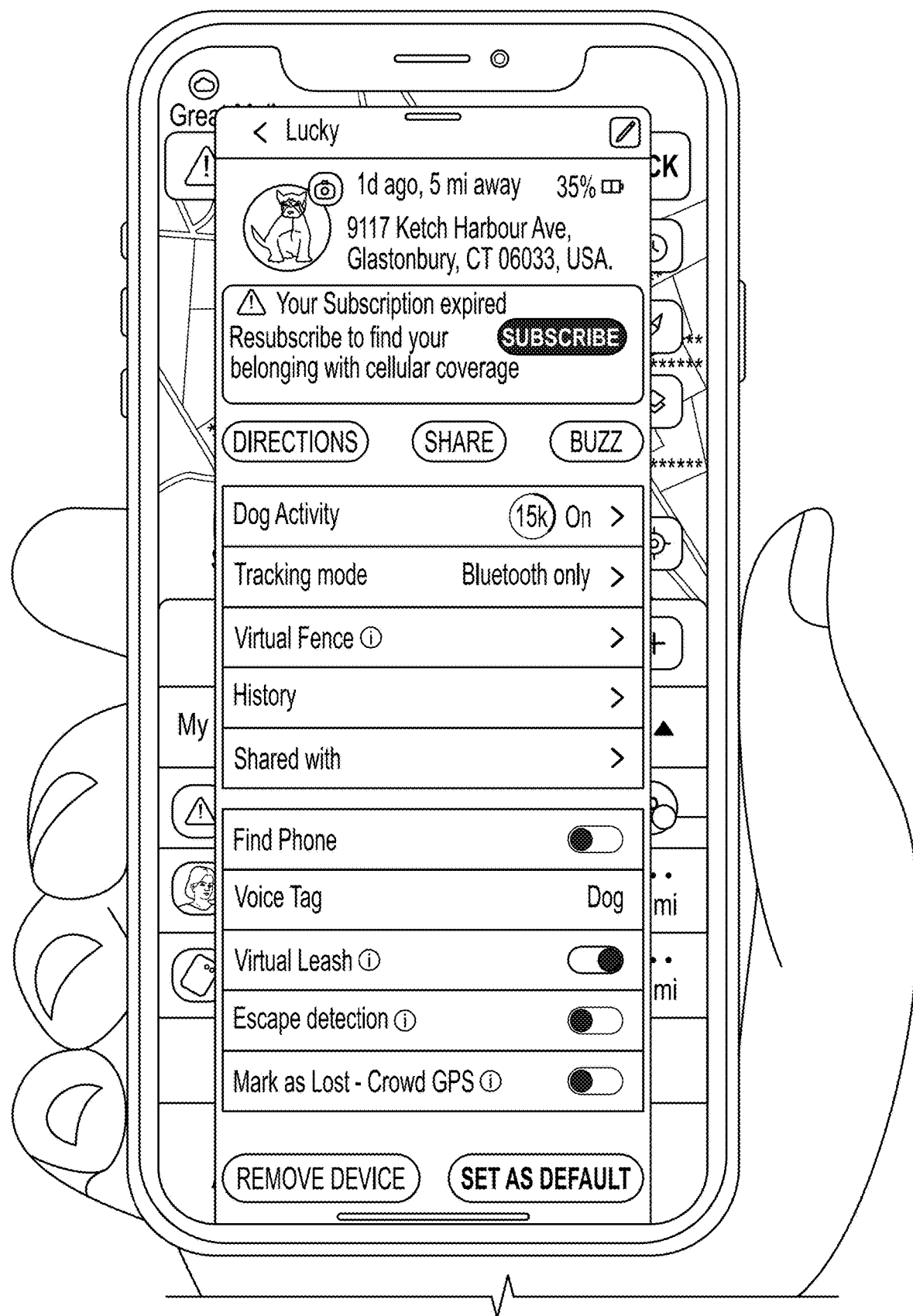
FIG. 37D is a screenshot listing exemplary features accessible for XCB radiotag users.

A cloud host is used to provide subscription lost-and-found services. FIG. 37D indicates some of the subscription services available, which can include biometrics telemetry from a mammal to which the radiotag is secured, real time tracking, establishment of safe zones enforced by radio tethers (as described earlier), tracking history, extrapolation of destination, detection of an escape from a geofenced area, community-supported lost asset recovery, voice interaction services, and a handy find phone utility that lets the actuation switch 15a on the radiotag cause your smartphone to ring so that you can quickly locate it if misplaced in the house.

Several levels of tracking services may be provided, each with a different expected battery life on a single charge. These are estimates based on balanced radio usage and latency for the cellular and/or BT radio modems. The "Dynamic Tracking" mode, which updates location at a central server every 30 to 90 minutes, is recommended for most routine use, but in the event of a lost smart object, the devices can be upgraded to uplink data every 4-8 min in an "Emergency Tracking" mode. Lower power tracking provides updates every 4-6 hours, and for maximum battery life (up to 1 year) a BT only tracking regimen is supplied. Each of the cellular plans is associated with radio parameters for EDRX and PSM, and can be modified anytime the radiotag opens a network connection in a paging window. As described earlier, the BT radio and sensor package, including motion and heading sensors, can trigger a CALL HOME during which the power savings parameters can be reset. Also, biometric data can be linked to a CALL HOME. And with learning, the device can recognize when it is lost, before the owner knows it is lost, by monitoring other BT radio traffic topology in its environment and using strangeness and familiarity indices to build situational awareness into its power management routines. The actuator button 15a can also cause a cellular connection to be initiated, or a tap by an NFC-enabled smartphone will actuate a network connection.

Figure 37E:
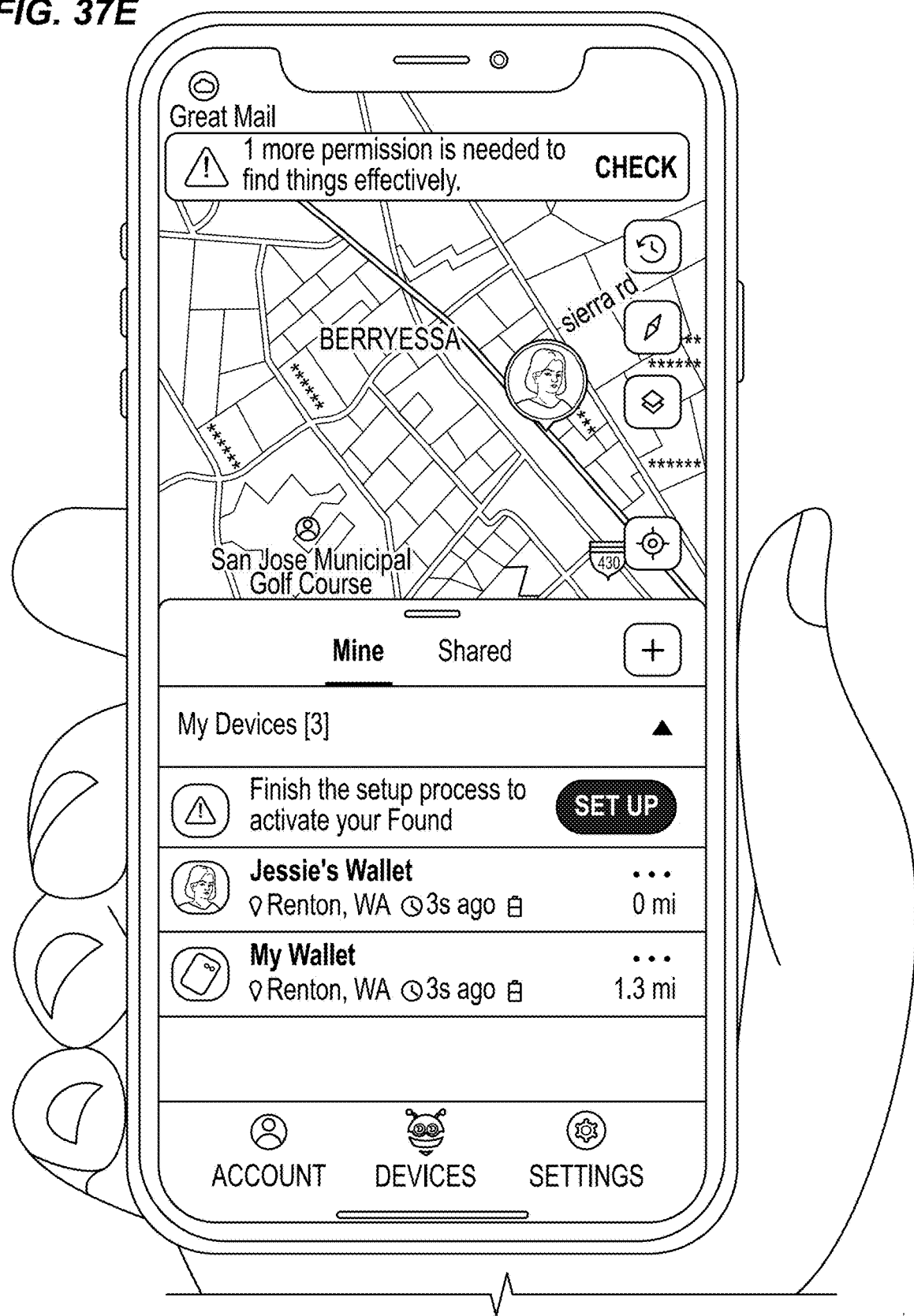
FIG. 37E provides a screenshot of the tracking application on a smartphone

FIG. 37E provides a screenshot of the tracking application on a smartphone, showing the location of one or more XCB radiotags on a map of a city. By using a combination of BT and cellular, very large areas of the planet can be scanned for a missing radiotag and the precise position pinpointed and displayed on a map, with the capacity to scale in and get directions for recovering the lost smart object.

The XCB radiotag need not be a standalone device, but in some instances may be embedded directly in a smart object and receive power from the smart object.

Example III: "Tap-2-Connect" Finder Management Services

Figure 38:
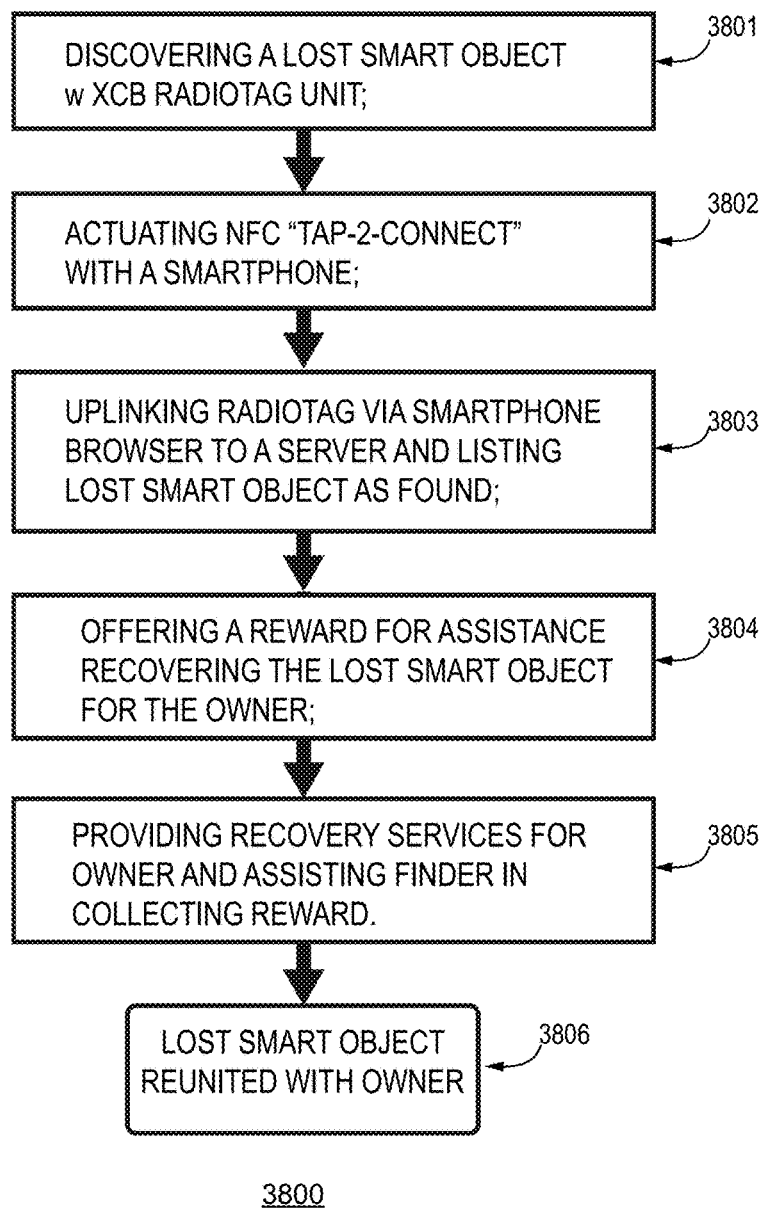
FIG. 38 shows a flow chart for the steps of a Tap-2-Connect found recovery operation effected by a cloud host in cooperation with an XCB radiotag and the smartphone of a passerby.

FIG. 38 shows a flow chart for the steps of a "Tap-2-Connect" found recovery method 3800 effected by a cloud host in cooperation with an XCB radiotag and the smartphone of a passerby.

In an initial step 3801, a passerby will discover a lost smart object having an attached or embedded XCB radiotag unit. On inspection, the radiotag will be found to provide instructions for making a notification to a lost-and-found recovery service. Generally, this will be an automated system operated as a cloud server. While it is possible to initiate a link to the cloud server by scanning a QR code on the radiotag, for example, a more direct initiation involves tapping a smartphone to the radiotag 3802, optionally first activating the radiotag by pressing a switch 15,15a on the front face. The NFC field of the radiotag is recognized by an NFC reader of the smartphone, and a limited amount of data is exchanged over the NFC connection. The data includes a deep intent link to the cloud server's webpage and causes the smartphone to be taken to the webpage. Also transmitted is identifying data that can be used to look up the radiotag and pull up a user profile. And the initial NFC link is escalated to a WLAN connection by a bootstrapping process that is managed by an App in the smartphone or is downloaded from the cloud server and installed on demand when the website is accessed. The escalated WLAN connection can be via the BT radio, via a WiFi radio, or can be a direct cellular connection through the smartphone of the passerby, using BT to link the radiotag into the call. The net effect is that the cloud server will list the radiotag as having been found 3803 and can notify the owner. The cloud server can also, for example, offer a reward 3804 to the passerby for assistance in getting the lost smart object back to its owner. Assistance can be as simple as entering into a conversation with the owner to make arrangements to meet, for example. Or obtaining a mailing address. The nature of the services 3805 is dependent on the goodwill of the passerby and the nature of the lost smart object. If the radiotag is attached to a child, for example, the police can assist. Pets also can receive assistance from authorities, and in some instances, an arrangement can be made to leave the smart object at a pre-arranged shop where the owner can go by and pick it up. The net effect is that the community can extend the search network to find a lost radiotag, and the XCB radiotag can facilitate or enable itself to be reunited with its true owner 3806 by engaging a cloud server directly or indirectly.

Minor variations in the method, for example use of a physical tap of a smartphone on actuation switch 15a triggers an accelerometric signal to actuate an NFC pulse link with the smartphone, and in other variants, a QR code is provided on the box or on the radiotag and causes the user to lower the smartphone near the radiotag so that the NFC link can be established when the QR code (or equivalent) is read by the smartphone camera.

Example IV: Qi Pad (NFC Option)

Figure 39:
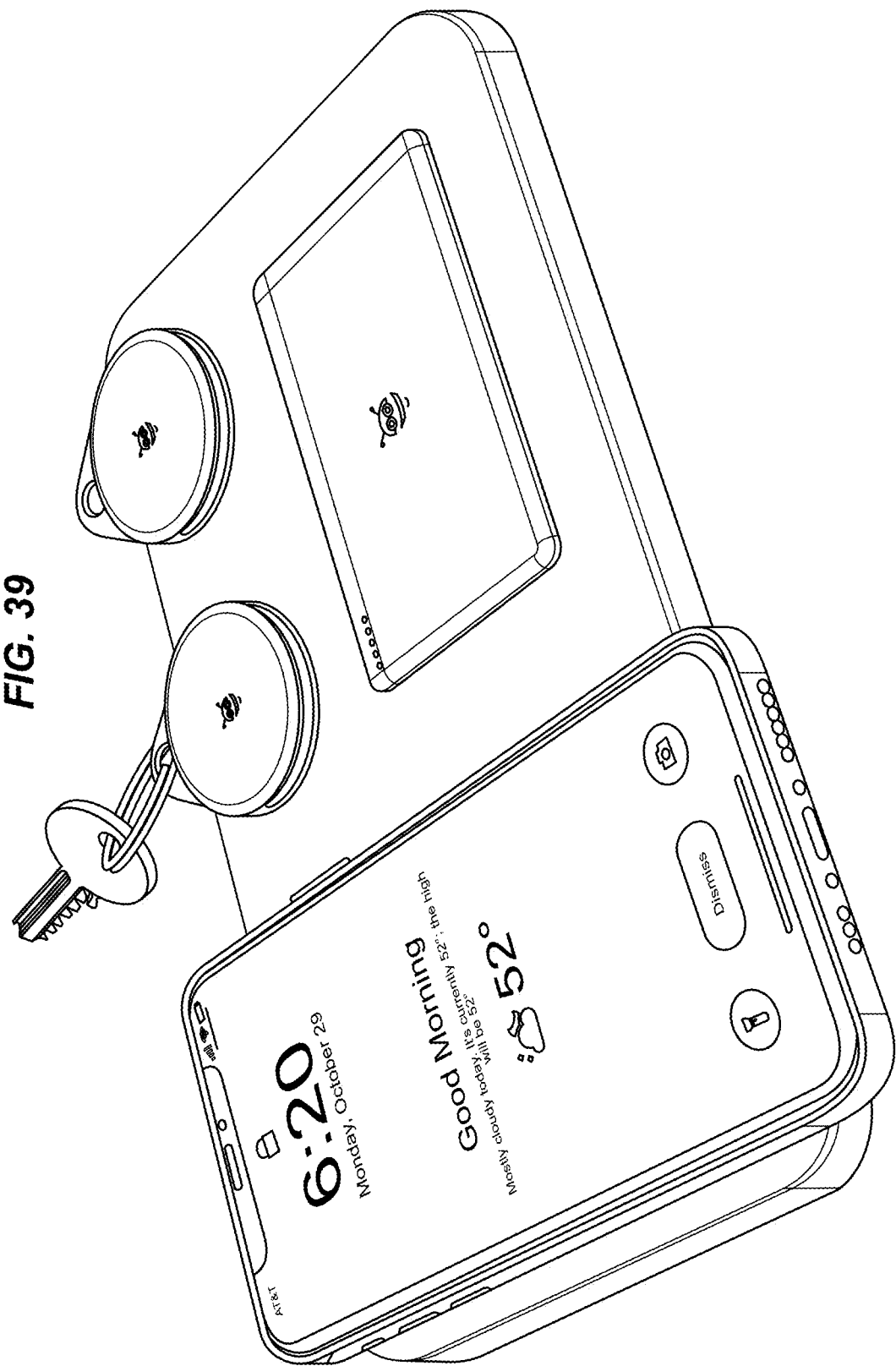
FIG. 39 is a view of an ensemble of XCB radiotags with a smartphone on a Qi charging pad.

FIG. 39 is a view of an ensemble of XCB radiotags with a smartphone on a Qi charging pad having dimensions of about 22×12 cm and a few millimeters thick. The pad allows for charging of three XCB radiotags along with the phone simultaneously and is for home use. The pad can also include provision for autosynchronization of data to an external server via one or more radios built into the pad. In future releases, an NFC pad having the capacity to charge the system will be used so as to also achieve data transfer over the NFC pulse connection. Data transfer is useful for example in synchronizing calendars, contact lists, and network settings. Each NFC radio is configured to enable escalation of a network connection to one of the higher bandwidth radios of the poly-radio devices; for example an NFC interrogatory can trigger setup and/or activation of a BT radio link with the NFC paired device, or a cellular link as a CALL HOME to a cellular base station. NFC interrogatory pulses can also trigger setup or activation of a WiFi connection with a home reference hub, for example.

Example V: Cold Chain Data Logging

As shown in FIGS. 40A and 40B, these devices may also be used for data logging. Cold-chain tracking is performed by attaching a radiotag 10 with temperature sensor to an asset in need of temperature monitoring. Here, data logging of temperature 4000 follows a shipment from Seattle to Chicago 4001. A failure of the coolant system occurs at timepoint 4003, as is evident from a sudden increase to room temperature in the data.

The radiotag is attached in a way so as to be thermally connected to the asset such that the temperature sensed by the radiotag is meaningful in assessing a corresponding temperature condition of the shipment/asset. The radiotag serves as a "data logger" for recording the sensed temperature as a function of time and optionally as a function of location and is able to report the data wirelessly. The processor of the radiotag is set up to perform routine cyclical temperature measurements and store the data in a table in flash memory. A simple user interface 4004 allows the user to select a variety of display formats for data.

The raw digital data records are simple in structure. Each record includes a TIMESTAMP, a radio unit ID (RUI) for the source radiotag device 10, the LOCATION where the data was collected, and one or more fields for sensor data DATA1 and DATA2, for example. In each record, sensor data is paired with a timestamp and a geostamp.

Using M2M data sharing protocols, the radiotag can establish a cellular network connection to report the data on a schedule, when a sensor datum is out of range, or when interrogated by a radiotag reader such as a smartphone with an installed software application configured to read the tags. To initiate a query in BT radio proximity, the tag reader transmits an inquiry to the BT radiotag, escalates the inquiry to a PAGE using standard Bluetooth methods, and develops a connection link with the radiotag whereby digital radio data exchange occurs. A button press on the radiotag may also be used to initiate a pairing or bonding of the radiotag and the tag reader. At greater distances, the radiotag may be caused to initialize the cellular modem for transmission of tabulated data across a cellular network, where the data is a chronology of temperature measurements that includes geostamp.

Location can be obtain using any of the cellular tools described here, including AGPS and PoLTE, for example, or BT mapping, and uploads of data can be triggered by sensor data, by proximity to a smart device configured as a reader, at pre-provisioned destinations, or on a schedule established by the network, for example. The upload can be transferred from a tag reader to a cloud host. A single upload when a package is delivered may be sufficient if all is well, but the radiotag can request network access at any point en route if there is a deviation from a preset temperature range as configured in software or firmware. By limiting the frequency of cellular network calls, the duration of sensor monitoring is extended without loss of data.

The data can be collected at regular intervals and uploaded discontinuously. For economy of storage and transmission, the data can be pruned by binning time intervals with temperatures that are within expected limits, but itemizing intervals where temperatures were outside expected limits, either too cold or too hot. An excursion of temperature sensor data output outside of threshold limits can trigger an upload on a cellular channel and can result in interventions by the system operator and/or notifications to the customer.

Example VI: Cellular Radio Power Consumption

FIG. 41 reproduces an oscilloscope image of instantaneous power consumption during a connection event followed by a series of paging opportunities in DRX mode of a cellular modem. This picture represents a full TAU cycle with a series of brief paging opportunities by eDRX events on the right of the WAKE, authentication and synchronization routine that appears as a series of steps in the plot on the left, each with higher power consumption. The device is controlled by a Monarch series processor with integrated LTE RF front end (Sequans, Paris FR).

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

SCOPE OF THE CLAIMS

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

We claim:

1. A microcontroller-based finding and tracking device with Bluetooth radio modem and antenna and cellular radio modem and antenna, which comprises a direct logic output from an output pin of the Bluetooth radio modem to a wake pin of the cellular radio modem, wherein the Bluetooth radio modem further comprises a digital correlator enabled to match the pattern of an incoming digital radio signal to a repertoire of qualified wake signals that, when matched, cause the Bluetooth modem to generate an output to the wake pin of the cellular modem while bypassing the microcontroller unit.

2. The device of claim 1, wherein the direct logic output from the Bluetooth radio modem to the wake pin of the cellular modem bypasses the microcontroller of the device.

3. The device of claim 1, wherein the Bluetooth radio modem is configured to discover bitstrings of Bluetooth transmissions over a spread spectrum that includes a plurality of advertising channels and data channels without executing an inquiry scan or a page scan.

4. The device of claim 1, wherein the Bluetooth radio modem includes firmware configured to discover bitstrings of Bluetooth transmissions in the raw signal received from the antenna and to report at least a part of any discovered Bluetooth bitstring in a record entered into a radio contact log in memory without executing an inquiry scan or a page scan.

5. The device of claim 4, wherein the microcontroller is configured to report the contents of the radio contact log to a cloud host as a snapshot of the Bluetooth radio envelope around the device.

6. The device of claim 5, which comprises software or firmware instructions configured to calculate a strangeness index from the ratio of bitstrings detected on advertising channels versus bitstrings detected on data channels in a snapshot, and to execute a notification to a user or a cloud host if the strangeness index rises above a threshold.

7. The device of claim 4, wherein the microcontroller is configured to report the contents of the radio contact log in one or more data packets transmitted over a cellular network as a snapshot of the Bluetooth radio envelope around the device.

8. The device of claim 4, which comprises a correlator for recognizing whitelisted Bluetooth bitstrings.

9. The device of claim 8, wherein the Bluetooth radio modem is configured to record a received signal strength index (RSSI) for each whitelisted Bluetooth bitstring in the radio contact log.

10. The device of claim 9, which comprises software or firmware instructions configured to execute a network-assisted location fix if the RSSI of a transmitter associated with a whitelisted Bluetooth bitstring drops below −100 dBm and a request from the device, directed to the transmitter, to increase transmission power is not acknowledged.

11. The device of claim 9, comprising software or firmware instructions configured to execute a cellular network notification to a user or a cloud host if the RSSI of a transmitter associated with a whitelisted Bluetooth bitstring drops below −100 dBm and a request from the device, directed to the transmitter, to increase transmission power is not acknowledged.

12. The device of claim 4, which comprises memory for storing records of radio contacts as a snapshot of the Bluetooth radio envelope around the device.

13. The device of claim 12, wherein the memory comprises a rolling stack of radio contact records in which each newest record displaces the oldest record, the rolling stack defining a snapshot of recent radio traffic.

14. The device of claim 13, which comprises a programmable timer that causes execution of a transmission of the snapshot to a cloud host for analysis at a regular interval.

15. The device of claim 14, wherein the programmable timer powers an eDRX paging window cycle of cellular network connections between the cellular modem of the device and a cloud host.

16. The device of claim 15, wherein the paging window cycle is linked to a network assisted location fix and the location fix is stored on the device.

17. The device of claim 4, wherein the Bluetooth radio modem is configured to map received Bluetooth bitstrings to a radio contact record database and the device is configured to transmit the database in packetized form for transmission over an IP packet network.

18. The device of claim 1, wherein the cellular modem comprises software or firmware instructions configured to execute a network-assisted location fix in response to a logic signal received at the wake pin from the Bluetooth modem.

19. The device of claim 18, wherein the microcontroller has software or firmware configured store the location fix as a waypoint in memory.

20. The device of claim 1, which comprises a heading sensor having a multi-axis gyroscope, magnetometer, and accelerometer coupled to a directional motion analyzer.

21. The device of claim 1, comprising a multi-threaded microcontroller.

22. The device of claim 1, wherein the Bluetooth modem is configured to adjust signal gain according to an instruction protocol executable by the microcontroller.

* * * * *